United States Patent [19]

Matyas et al.

[11] Patent Number: 5,200,999
[45] Date of Patent: * Apr. 6, 1993

[54] PUBLIC KEY CRYPTOSYSTEM KEY MANAGEMENT BASED ON CONTROL VECTORS

[75] Inventors: Stephen M. Matyas; Donald B. Johnson; An V. Le, all of Manassas; Rostislaw Prymak, Dumfries, all of Va.; William C. Martin, Concord; William S. Rohland, Charlotte, both of N.C.; John D. Wilkins, Somerville, Va.

[73] Assignee: International Business Machines Corporation, Armonk, N.Y.

[*] Notice: The portion of the term of this patent subsequent to Nov. 17, 2009 has been disclaimed.

[21] Appl. No.: 766,260
[22] Filed: Sep. 27, 1991
[51] Int. Cl.$^5$ .............................................. H04K 1/00
[52] U.S. Cl. .......................................... 380/25; 380/30
[58] Field of Search ............................. 380/23, 25, 30

[56] References Cited

U.S. PATENT DOCUMENTS

| | | | |
|---|---|---|---|
| 4,200,770 | 4/1980 | Hellman et al. | |
| 4,218,582 | 8/1980 | Hellman et al. | |
| 4,326,098 | 4/1982 | Bouricius | 380/23 |
| 4,393,269 | 7/1983 | Konheim et al. | 380/23 |
| 4,405,829 | 9/1983 | Rivest et al. | |
| 4,850,017 | 7/1989 | Matyas, Jr. et al. | 380/21 |
| 4,853,961 | 8/1989 | Pastor | 380/25 |
| 4,885,777 | 12/1989 | Takaragi et al. | 380/23 |
| 4,893,338 | 1/1990 | Pastor | 380/25 |
| 4,908,861 | 3/1990 | Brachtl et al. | 380/25 |
| 4,918,728 | 4/1990 | Matyas et al. | 380/21 |
| 4,924,514 | 5/1990 | Matyas et al. | 380/24 |
| 4,924,515 | 5/1990 | Matyas et al. | 380/25 |
| 4,941,176 | 7/1990 | Matyas et al. | 380/21 |
| 5,001,752 | 3/1991 | Fischer | 380/23 |
| 5,003,593 | 3/1991 | Mihm, Jr. | 380/25 |
| 5,005,200 | 4/1991 | Fischer | 380/25 |
| 5,164,988 | 11/1992 | Matyas et al. | 380/25 |

OTHER PUBLICATIONS

R. W. Jones, "Some Techniques for Handling Encipherment Keys," ICL Technical Journal, Nov. 1982, pp. 175-188.
D. W. Davies and W. L. Price, "Security for Computer Networks," John Wiley & Sons, N.Y., 1984, Sec. 6.5, Key Management With Tagged Keys, pp. 168-172.
W. Diffie et al., "Privacy and Authentication: An Introduction to Cryptography," Proc. of IEEE, vol. 67, No. 3, Mar. 1979; pp. 397-427.

*Primary Examiner*—David Cain
*Attorney, Agent, or Firm*—John E. Hoel

[57] ABSTRACT

A data processing system, method and program are disclosed, for managing a public key cryptographic system. The method includes the steps of generating a first public key and a first private key as a first pair in the data processing system, for use with a first public key algorithm and further generating a second public key and a second private key as a second pair in the data processing system, for use with a second public key algorithm. The method then continues by assigning a private control vector for the first private key and the second private key in the data processing system, for defining permitted uses for the first and second private keys. Then the method continues by forming a private key record which includes the first private key and the second private key in the data processing system, and encrypting the private key record under a first master key expression which is a function of the private control vector. The method then forms a private key token which includes the private control vector and the private key record, and stores the private key token in the data processing system.

At a later time, the method receives a first key use request in the data processing system, requiring the first public key algorithm. In response to this, the method continues by accessing the private key token in the data processing system and checking the private control vector to determine if the private key record contains a key having permitted uses which will satisfy the first request. The method then decrypts the private key record under the first master key expression in the data processing system and extracts the first private key from the private key record. The method selects the first public key algorithm in the data processing system for the first key use request and executes the first public key algorithm in the data processing system using the first private key to perform a cryptographic operation to satisfy the first key use request.

33 Claims, 28 Drawing Sheets

FIG. 5

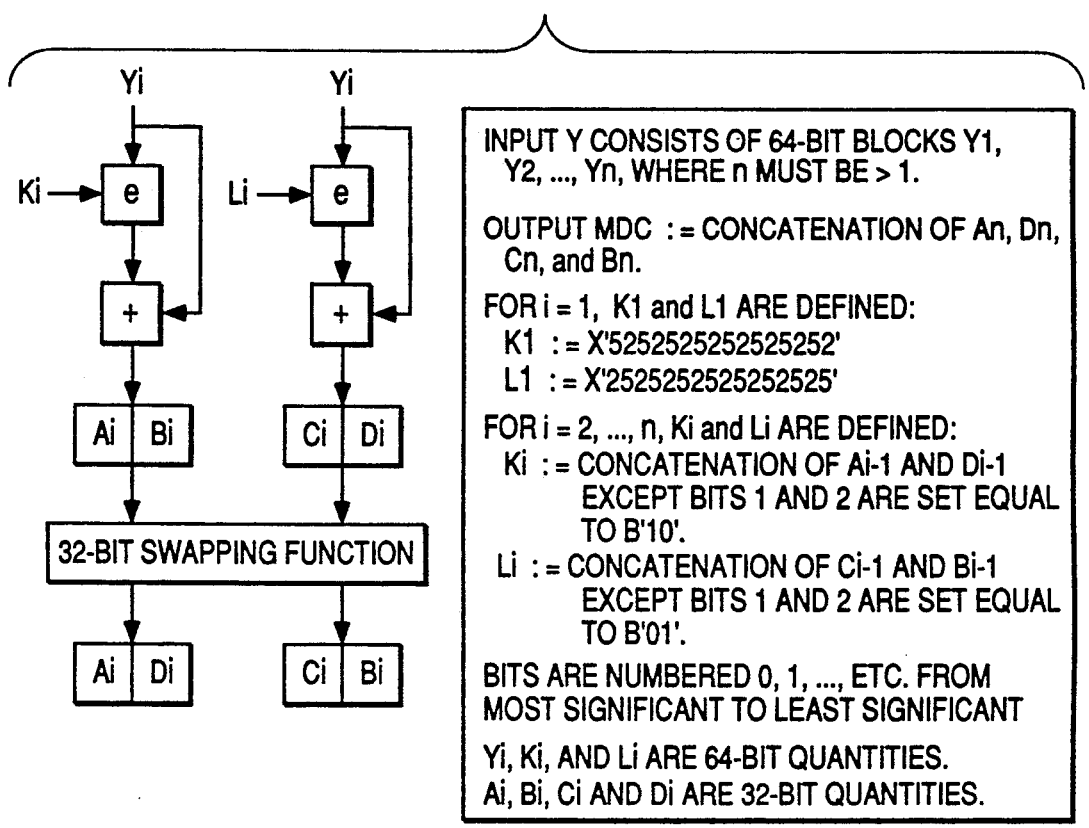

INPUT Y CONSISTS OF 64-BIT BLOCKS Y1, Y2, ..., Yn, WHERE n MUST BE > 1.

OUTPUT MDC := CONCATENATION OF An, Dn, Cn, and Bn.

FOR i = 1, K1 and L1 ARE DEFINED:
  K1 := X'5252525252525252'
  L1 := X'2525252525252525'

FOR i = 2, ..., n, Ki and Li ARE DEFINED:
  Ki := CONCATENATION OF Ai-1 AND Di-1 EXCEPT BITS 1 AND 2 ARE SET EQUAL TO B'10'.
  Li := CONCATENATION OF Ci-1 AND Bi-1 EXCEPT BITS 1 AND 2 ARE SET EQUAL TO B'01'.

BITS ARE NUMBERED 0, 1, ..., ETC. FROM MOST SIGNIFICANT TO LEAST SIGNIFICANT

Yi, Ki, AND Li ARE 64-BIT QUANTITIES.
Ai, Bi, Ci AND Di ARE 32-BIT QUANTITIES.

FIG. 6

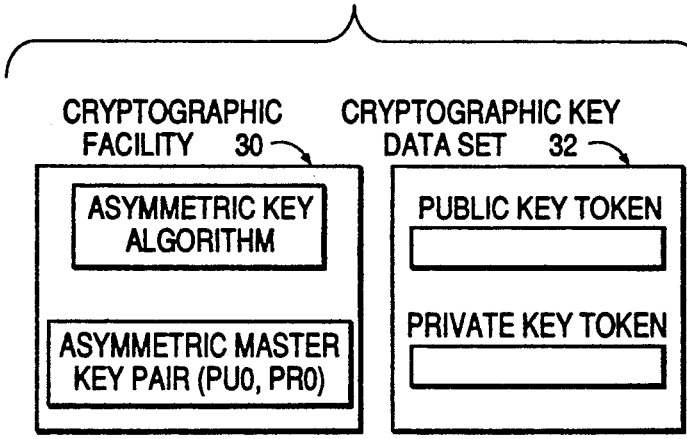

FIG. 7
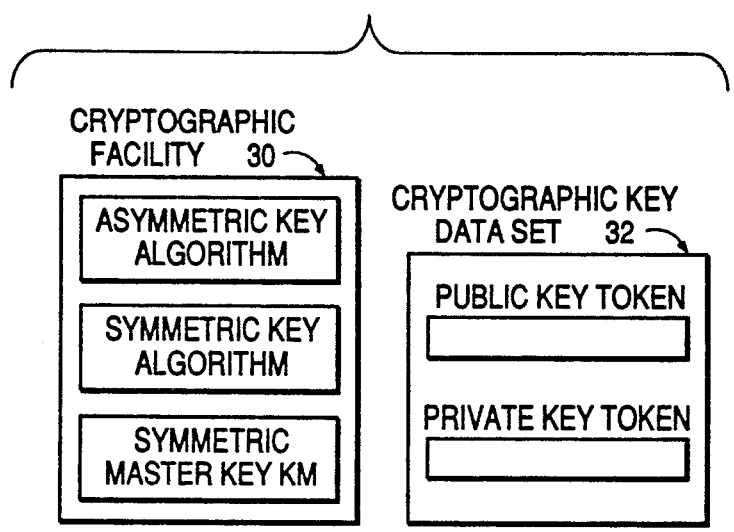
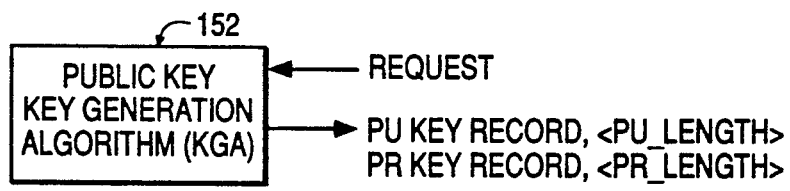
FIG. 8
FIG. 9

FIG. 23
INSTRUCTION PROCESSOR:
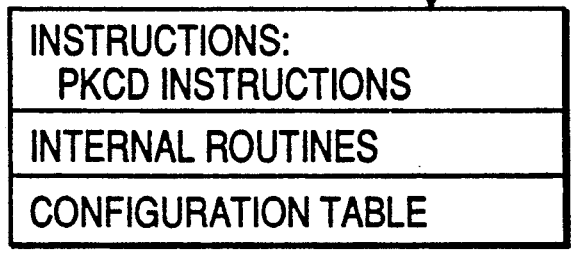
FIG. 24
| GLOBAL NAME | VALUE |
|---|---|
| START-INST-INDEX | 110 |
| KU-HEADER-LENGTH | 32 (BYTES) |
| CFER-HEADER-LENGTH | 64 (BYTES) |
| CFAR-HEADER-LENGTH | 64 (BYTES) |
| GKSP-BUFFER-LENGTH | 64 (BYTES) |
| IDK-BUFFER-LENGTH | 64 (BYTES) |
FIG. 25
CRYPTOGRAPHIC ALGORITHMS:
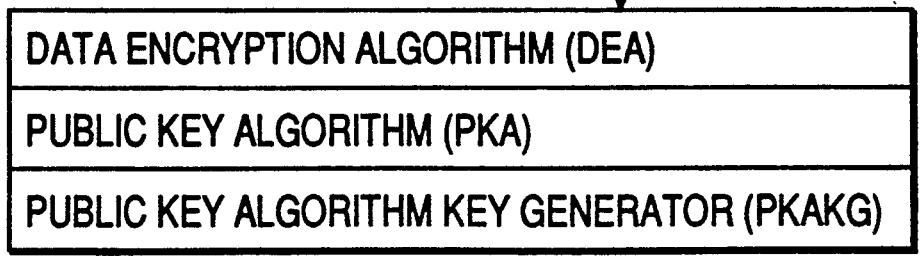

FIG. 26

CF ENVIRONMENT:

| | |
|---|---|
| CONFIGURATION VECTOR | (64 BYTES) |
| STATE VECTOR | (64 BYTES) |
| REGISTERS | (280 BYTES) |
| MDC TABLE | (272 BYTES) |
| COUNTER TABLE | (3 BYTES) |
| cfpkr1-LENGTH | (2 BYTES) |
| PUA BUFFER (CONTAINING cfpkr1) | (UNSPECIFIED) |
| cfpkr2-LENGTH | (2 BYTES) |
| PRA BUFFER (CONTAINING cfpkr2) | (UNSPECIFIED) |
| RESERVED | (2 BYTES) |
| SECRET PRODUCT ENVIRONMENT LENGTH | (4 BYTES) |
| SECRET PRODUCT ENVIRONMENT | (UNSPECIFIED) |
| NONSECRET PRODUCT ENVIRONMENT LENGTH | (4 BYTES) |
| NONSECRET PRODUCT ENVIRONMENT | (UNSPECIFIED) |
| EKU LENGTH (TEMPORARY USE ONLY) | (2 BYTES) |
| EKU BUFFER (TEMPORARY USE ONLY) | (UNSPECIFIED) |
| GKSP SAVE | (1 BYTE) |
| GKSP BUFFER LENGTH | (2 BYTES) |
| GKSP RECORD LENGTH | (2 BYTES) |
| GKSP BUFFER FLAG | (1 BYTE) |
| GKSP TICKET | (8 BYTES) |
| GKSP BUFFER | (UNSPECIFIED) |
| IDK SAVE | (1 BYTE) |
| IDK BUFFER LENGTH | (2 BYTES) |
| IDK RECORD LENGTH | (2 BYTES) |
| IDK BUFFER FLAG | (1 BYTE) |
| IDK TICKET | (8 BYTES) |
| IDK BUFFER | (UNSPECIFIED) |

FIG. 27

| INDEX | INSTRUCTION NAME | INDEX | INSTRUCTION NAME | INDEX | INSTRUCTION NAME | INDEX | INSTRUCTION NAME |
|---|---|---|---|---|---|---|---|
| 0 | RESERVED | 36 | RESERVED | 72 | RESERVED | 108 | RESERVED |
| 1 | RESERVED | 37 | RESERVED | 73 | RESERVED | 109 | RESERVED |
| 2 | RESERVED | 38 | RESERVED | 74 | RESERVED | 110 | VADS |
| 3 | RESERVED | 39 | RESERVED | 75 | RESERVED | 111 | SRALM |
| 4 | RESERVED | 40 | RESERVED | 76 | RESERVED | 112 | IPRNG |
| 5 | RESERVED | 41 | RESERVED | 77 | RESERVED | 113 | EPS |
| 6 | RESERVED | 42 | RESERVED | 78 | RESERVED | 114 | ECFAR |
| 7 | RESERVED | 43 | RESERVED | 79 | RESERVED | 115 | EIS |
| 8 | RESERVED | 44 | RESERVED | 80 | RESERVED | 116 | SAF |
| 9 | RESERVED | 45 | RESERVED | 81 | RESERVED | 117 | LMDCC |
| 10 | RESERVED | 46 | RESERVED | 82 | RESERVED | 118 | LMDC |
| 11 | RESERVED | 47 | RESERVED | 83 | RESERVED | 119 | LFPMKP (INPUT 0) |
| 12 | RESERVED | 48 | RESERVED | 84 | RESERVED | 120 | LFPMKP (INPUT 1) |
| 13 | RESERVED | 49 | RESERVED | 85 | RESERVED | 121 | CPMKP (INPUT 0) |
| 14 | RESERVED | 50 | RESERVED | 86 | RESERVED | 122 | CPMKP (INPUT 1) |
| 15 | RESERVED | 51 | RESERVED | 87 | RESERVED | 123 | GNPMK |
| 16 | RESERVED | 52 | RESERVED | 88 | RESERVED | 124 | GNDMK |
| 17 | RESERVED | 53 | RESERVED | 89 | RESERVED | 125 | CLNPMK |
| 18 | RESERVED | 54 | RESERVED | 90 | RESERVED | 126 | CLOPMK |
| 19 | RESERVED | 55 | RESERVED | 91 | RESERVED | 127 | SPMK |
| 20 | RESERVED | 56 | RESERVED | 92 | RESERVED | 128 | GPUPR (MODE 0/2) |
| 21 | RESERVED | 57 | RESERVED | 93 | RESERVED | 129 | GPUPR (MODE 1) |
| 22 | RESERVED | 58 | RESERVED | 94 | RESERVED | 130 | EPUK |
| 23 | RESERVED | 59 | RESERVED | 95 | RESERVED | 131 | IPUK |
| 24 | RESERVED | 60 | RESERVED | 96 | RESERVED | 132 | IPRK (INPUT 0) |
| 25 | RESERVED | 61 | RESERVED | 97 | RESERVED | 133 | IPRK (INPUT 1) |
| 26 | RESERVED | 62 | RESERVED | 98 | RESERVED | 134 | RTNPMK |
| 27 | RESERVED | 63 | RESERVED | 99 | RESERVED | 135 | RTCPMK |
| 28 | RESERVED | 64 | RESERVED | 100 | RESERVED | 136 | GKSP |
| 29 | RESERVED | 65 | RESERVED | 101 | RESERVED | 137 | IDK |
| 30 | RESERVED | 66 | RESERVED | 102 | RESERVED | 138 | GADS |
| 31 | RESERVED | 67 | RESERVED | 103 | RESERVED | 139 | GDS |
| 32 | RESERVED | 68 | RESERVED | 104 | RESERVED | 140 | VDS |
| 33 | RESERVED | 69 | RESERVED | 105 | RESERVED | 141 | ECFER |
| 34 | RESERVED | 70 | RESERVED | 106 | RESERVED | 142 | ICFER |
| 35 | RESERVED | 71 | RESERVED | 107 | RESERVED | 143 | VIKU |

FIG. 31

| BITS | | | |
|---|---|---|---|
| 00..06 | B'0000000',RESERVED(RP) | | P |
| 07 | PARITY (EVEN) | | NP |
| 08..14 | CV TYPE=B'1111010' | H | P |
| 15 | PARITY (EVEN) | | NP |
| 16..22 | PR USAGE | | P |
| 16 | ECFAR | H | P |
| 17 | EPUK | H | P |
| 18 | ECFER | H | P |
| 19 | ICFER | H | P |
| 20 | GDS | H | P |
| 21..22 | B'00',RESERVED(RP) | | P |
| 23 | PARITY (EVEN) | | NP |
| 24..29 | B'000000',RESERVED(RP) | | P |
| 30 | B'0', ANTIVARIANT ZERO | H | P |
| 31 | PARITY (EVEN) | | NP |
| 32..37 | SOFTWARE | | P |
| 38 | B'1', ANTIVARIANT ONE | H | P |
| 39 | PARITY (EVEN) | | NP |
| 40..44 | B'00000',RESERVED(RP) | | P |
| 45..46 | EXTENSION | H | P |
| 47 | PARITY (EVEN) | | NP |
| 48..54 | INSTALLATION | | P |
| 55 | PARITY (EVEN) | | NP |
| 56..58 | B'000',RESERVED(R) | | NP |
| 59..61 | B'000',TESTZERO(RPZ) | H | P |
| 62 | VALUE/AUTHENTICATOR | | P |
| 63 | PARITY (EVEN) | | NP |

| 64..67 | ALGORITHM | H | P |
|---|---|---|---|
| 68..70 | ALGORITHM EXTENSION | H | P |
| 71 | PARITY (EVEN) | | NP |
| 72..78 | LENGTH (BITS 00..06) | H | P |
| 79 | PARITY (EVEN) | | NP |
| 80..86 | LENGTH (BITS 07..13) | H | P |
| 87 | PARITY (EVEN) | | NP |
| 88..89 | LENGTH (BITS 14..15) | H | P |
| 90..94 | B'00000', RESERVED (RP) | H | P |
| 95 | PARITY (EVEN) | | NP |
| 96..102 | B'0000000',RESERVED(RP) | | P |
| 103 | PARITY (EVEN) | | NP |
| 104..110 | B'0000000',RESERVED(RP) | | P |
| 111 | PARITY (EVEN) | | NP |
| 112..118 | PU USAGE | H | P |
| 119 | PARITY (EVEN) | | NP |
| 120..126 | B'0000000',RESERVED(RP) | | P |
| 127 | PARITY (EVEN) | | NP |

FIG. 32

| BITS | | | |
|---|---|---|---|
| 00..06 | B'0000000',RESERVED(RP) | | P |
| 07 | PARITY (EVEN) | | NP |
| 08..14 | CV TYPE=B'1111000' | H | P |
| 15 | PARITY (EVEN) | | NP |
| 16..22 | PR USAGE | H | P |
| 16 | ECFAR | H | P |
| 17 | RTNPMK/RTCPMK (=B'1') | H | P |
| 18 | EPUK | H | P |
| 19 | GDS | H | P |
| 20..21 | B'00',RESERVED(RP) | | P |
| 22 | GADS | H | P |
| 23 | PARITY (EVEN) | | NP |
| 24..29 | B'000000',RESERVED(RP) | | P |
| 30 | B'0', ANTIVARIANT ZERO | H | P |
| 31 | PARITY (EVEN) | | NP |
| 32..37 | SOFTWARE | | P |
| 38 | B'1', ANTIVARIANT ONE | H | P |
| 39 | PARITY (EVEN) | | NP |
| 40..44 | B'00000',RESERVED(RP) | | P |
| 45..46 | EXTENSION | H | P |
| 47 | PARITY (EVEN) | | NP |
| 48..54 | INSTALLATION | | P |
| 55 | PARITY (EVEN) | | NP |
| 56..58 | B'000',RESERVED(R) | | NP |
| 59..61 | B'000',TESTZERO(RPZ) | H | P |
| 62 | VALUE/AUTHENTICATOR | | P |
| 63 | PARITY (EVEN) | | NP |

| BITS | | | |
|---|---|---|---|
| 64..67 | ALGORITHM | H | P |
| 68..70 | ALGORITHM EXTENSION | H | P |
| 71 | PARITY (EVEN) | | NP |
| 72..78 | LENGTH (BITS 00..06) | H | P |
| 79 | PARITY (EVEN) | | NP |
| 80..86 | LENGTH (BITS 07..13) | H | P |
| 87 | PARITY (EVEN) | | NP |
| 88..89 | LENGTH (BITS 14..15) | H | P |
| 90..93 | DOMAIN ID | H | P |
| 94 | B'0', RESERVED (RP) | | P |
| 95 | PARITY (EVEN) | | NP |
| 96..102 | B'0000000',RESERVED(RP) | | P |
| 103 | PARITY (EVEN) | | NP |
| 104..110 | B'0000000',RESERVED(RP) | | P |
| 111 | PARITY (EVEN) | | NP |
| 112..118 | PU USAGE | H | P |
| 119 | PARITY (EVEN) | | NP |
| 120..126 | B'0000000',RESERVED(RP) | | P |
| 127 | PARITY (EVEN) | | NP |

*FIG. 33*

| BITS | | | |
|---|---|---|---|
| 00..06 | B'0000000',RESERVED(RP) | | P |
| 07 | PARITY (EVEN) | | NP |
| 08..14 | CV TYPE=B'1111001' | H | P |
| 15 | PARITY (EVEN) | | NP |
| 16..22 | PR USAGE | H | P |
| 16 | ECFAR | H | P |
| 17 | RTNPMK/RTCPMK (=B'1') | H | P |
| 18 | EPUK | H | P |
| 19 | GDS | H | P |
| 20 | GKSP | H | P |
| 21 | IDK | H | P |
| 22 | GADS | H | P |
| 23 | PARITY (EVEN) | | NP |
| 24..29 | B'000000',RESERVED(RP) | | P |
| 30 | B'0', ANTIVARIANT ZERO | H | P |
| 31 | PARITY (EVEN) | | NP |
| 32..37 | SOFTWARE | | P |
| 38 | B'1', ANTIVARIANT ONE | H | P |
| 39 | PARITY (EVEN) | | NP |
| 40..44 | B'00000',RESERVED(RP) | | P |
| 45..46 | EXTENSION | H | P |
| 47 | PARITY (EVEN) | | NP |
| 48..54 | INSTALLATION | | P |
| 55 | PARITY (EVEN) | | NP |
| 56..58 | B'000',RESERVED(R) | | NP |
| 59..61 | B'000',TESTZERO(RPZ) | H | P |
| 62 | VALUE/AUTHENTICATOR | | P |
| 63 | PARITY (EVEN) | | NP |

| BITS | | | |
|---|---|---|---|
| 64..67 | ALGORITHM | H | P |
| 68..70 | ALGORITHM EXTENSION | H | P |
| 71 | PARITY (EVEN) | | NP |
| 72..78 | LENGTH (BITS 00..06) | H | P |
| 79 | PARITY (EVEN) | | NP |
| 80..86 | LENGTH (BITS 07..13) | H | P |
| 87 | PARITY (EVEN) | | NP |
| 88..89 | LENGTH (BITS 14..15) | H | P |
| 90..93 | DOMAIN ID | H | P |
| 94 | B'0', RESERVED (RP) | | P |
| 95 | PARITY (EVEN) | | NP |
| 96..97 | THRES-MDC | H | P |
| 98..102 | B'00000',RESERVED(RP) | | P |
| 103 | PARITY (EVEN) | | NP |
| 104..110 | B'0000000',RESERVED(RP) | | P |
| 111 | PARITY (EVEN) | | NP |
| 112..118 | PU USAGE | H | P |
| 119 | PARITY (EVEN) | | NP |
| 120..126 | B'0000000',RESERVED(RP) | | P |
| 127 | PARITY (EVEN) | | NP |

FIG. 34

| BITS | | | |
|---|---|---|---|
| 00..06 | B'0000000',RESERVED(RP) | | P |
| 07 | PARITY (EVEN) | | NP |
| 08..14 | CV TYPE=B'1111011' | H | P |
| 15 | PARITY (EVEN) | | NP |
| 16..22 | PR USAGE | H | P |
| 16 | ECFAR | H | P |
| 17 | RTNPMK/RTCPMK (=B'1') | H | P |
| 18 | EPUK | H | P |
| 19 | GDS | H | P |
| 20..21 | B'00',RESERVED(RP) | | P |
| 22 | GADS | H | P |
| 23 | PARITY (EVEN) | | NP |
| 24..29 | B'000000',RESERVED(RP) | | P |
| 30 | B'0', ANTIVARIANT ZERO | H | P |
| 31 | PARITY (EVEN) | | NP |
| 32..37 | SOFTWARE | | P |
| 38 | B'1', ANTIVARIANT ONE | H | P |
| 39 | PARITY (EVEN) | | NP |
| 40..44 | B'00000',RESERVED(RP) | | P |
| 45..46 | EXTENSION | H | P |
| 47 | PARITY (EVEN) | | NP |
| 48..54 | INSTALLATION | | P |
| 55 | PARITY (EVEN) | | NP |
| 56..58 | B'000',RESERVED(R) | | NP |
| 59..61 | B'000',TESTZERO(RPZ) | H | P |
| 62 | VALUE/AUTHENTICATOR | | P |
| 63 | PARITY (EVEN) | | NP |
| 64..67 | ALGORITHM | H | P |
| 68..70 | ALGORITHM EXTENSION | H | P |
| 71 | PARITY (EVEN) | | NP |
| 72..78 | LENGTH (BITS 00..06) | H | P |
| 79 | PARITY (EVEN) | | NP |
| 80..86 | LENGTH (BITS 07..13) | H | P |
| 87 | PARITY (EVEN) | | NP |
| 88..89 | LENGTH (BITS 14..15) | H | P |
| 90..93 | DOMAIN ID | H | P |
| 94 | B'0', RESERVED (RP) | | P |
| 95 | PARITY (EVEN) | | NP |
| 96 | HIST-IPRK | H | P |
| 97..102 | B'000000',RESERVED(RP) | | P |
| 103 | PARITY (EVEN) | | NP |
| 104..110 | B'0000000',RESERVED(RP) | | P |
| 111 | PARITY (EVEN) | | NP |
| 112..118 | PU USAGE | H | P |
| 119 | PARITY (EVEN) | | NP |
| 120..126 | B'0000000',RESERVED(RP) | | P |
| 127 | PARITY (EVEN) | | NP |

FIG. 35

| BITS | | | |
|---|---|---|---|
| 00..06 | B'0000000',RESERVED(RP) | | P |
| 07 | PARITY (EVEN) | | NP |
| 08..14 | CV TYPE=B'1110010' | H | P |
| 15 | PARITY (EVEN) | | NP |
| 16..22 | PR USAGE | H | P |
| 23 | PARITY (EVEN) | | NP |
| 24..29 | B'000000',RESERVED(RP) | | P |
| 30 | B'0', ANTIVARIANT ZERO | H | P |
| 31 | PARITY (EVEN) | | NP |
| 32..37 | SOFTWARE | | P |
| 38 | B'1', ANTIVARIANT ONE | H | P |
| 39 | PARITY (EVEN) | | NP |
| 40..44 | B'00000',RESERVED(RP) | | P |
| 45..46 | EXTENSION | H | P |
| 47 | PARITY (EVEN) | | NP |
| 48..54 | INSTALLATION | | P |
| 55 | PARITY (EVEN) | | NP |
| 56..58 | B'000',RESERVED(R) | | NP |
| 59..61 | B'000',TESTZERO(RPZ) | H | P |
| 62 | VALUE/AUTHENTICATOR | | P |
| 63 | PARITY (EVEN) | | NP |
| 64..67 | ALGORITHM | H | P |
| 68..70 | ALGORITHM EXTENSION | H | P |
| 71 | PARITY (EVEN) | | NP |
| 72..78 | LENGTH (BITS 00..06) | H | P |
| 79 | PARITY (EVEN) | | NP |
| 80..86 | LENGTH (BITS 07..13) | H | P |
| 87 | PARITY (EVEN) | | NP |
| 88..89 | LENGTH (BITS 14..15) | H | P |
| 90..93 | HIST-DOMAIN ID | H | P |
| 94 | B'0', RESERVED (RP) | | P |
| 95 | PARITY (EVEN) | | NP |
| 96 | HIST-IPUK | H | P |
| 97..98 | HIST-MDC | H | P |
| 99..100 | HIST-CHAIN | H | P |
| 101..102 | HIST-KREGMODE | H | P |
| 103 | PARITY (EVEN) | | NP |
| 104..110 | B'0000000',RESERVED(RP) | | P |
| 111 | PARITY (EVEN) | | NP |
| 112..118 | PU USAGE | H | P |
| 112 | RTNPMK/RTCPMK (=B'1') | H | P |
| 113 | IPUK | H | P |
| 114 | ECFER | H | P |
| 115 | ICFER | H | P |
| 116..118 | B'000',RESERVED(RP) | | P |
| 119 | PARITY (EVEN) | | NP |
| 120..126 | B'0000000',RESERVED(RP) | | P |
| 127 | PARITY (EVEN) | | NP |

FIG. 36

| BITS | | | |
|---|---|---|---|
| 00..06 | B'0000000',RESERVED(RP) | | P |
| 07 | PARITY (EVEN) | | NP |
| 08..14 | CV TYPE=B'1110000' | H | P |
| 15 | PARITY (EVEN) | | NP |
| 16..22 | PR USAGE | H | P |
| 23 | PARITY (EVEN) | | NP |
| 24..29 | B'000000',RESERVED(RP) | | P |
| 30 | B'0', ANTIVARIANT ZERO | H | P |
| 31 | PARITY (EVEN) | | NP |
| 32..37 | SOFTWARE | | P |
| 38 | B'1', ANTIVARIANT ONE | H | P |
| 39 | PARITY (EVEN) | | NP |
| 40..44 | B'00000',RESERVED(RP) | | P |
| 45..46 | EXTENSION | H | P |
| 47 | PARITY (EVEN) | | NP |
| 48..54 | INSTALLATION | | P |
| 55 | PARITY (EVEN) | | NP |
| 56..58 | B'000',RESERVED(R) | | NP |
| 59..61 | B'000',TESTZERO(RPZ) | H | P |
| 62 | VALUE/AUTHENTICATOR | | P |
| 63 | PARITY (EVEN) | | NP |

| BITS | | | |
|---|---|---|---|
| 64..67 | ALGORITHM | H | P |
| 68..70 | ALGORITHM EXTENSION | H | P |
| 71 | PARITY (EVEN) | | NP |
| 72..78 | LENGTH (BITS 00..06) | H | P |
| 79 | PARITY (EVEN) | | NP |
| 80..86 | LENGTH (BITS 07..13) | H | P |
| 87 | PARITY (EVEN) | | NP |
| 88..89 | LENGTH (BITS 14..15) | H | P |
| 90..93 | DOMAIN ID | H | P |
| 94 | B'0', RESERVED (RP) | | P |
| 95 | PARITY (EVEN) | | NP |
| 96 | HIST-IPUK | H | P |
| 97..98 | HIST-MDC | H | P |
| 99..100 | HIST-CHAIN | H | P |
| 101..102 | B'00',RESERVED(RP) | | P |
| 103 | PARITY (EVEN) | | NP |
| 104..110 | B'0000000',RESERVED(RP) | | P |
| 111 | PARITY (EVEN) | | NP |
| 112..118 | PU USAGE | H | P |
| 112 | RTNPMK/RTCPMK (=B'1') | H | P |
| 113 | IPUK | H | P |
| 114..118 | B'00000',RESERVED(RP) | | P |
| 119 | PARITY (EVEN) | | NP |
| 120..126 | B'0000000',RESERVED(RP) | | P |
| 127 | PARITY (EVEN) | | NP |

*FIG. 37*

| BITS | | | |
|---|---|---|---|
| 00..06 | B'0000000',RESERVED(RP) | | P |
| 07 | PARITY (EVEN) | | NP |
| 08..14 | CV TYPE=B'1110001' | H | P |
| 15 | PARITY (EVEN) | | NP |
| 16..22 | PR USAGE | H | P |
| 23 | PARITY (EVEN) | | NP |
| 24..29 | B'000000',RESERVED(RP) | | P |
| 30 | B'0', ANTIVARIANT ZERO | H | P |
| 31 | PARITY (EVEN) | | NP |
| 32..37 | SOFTWARE | | P |
| 38 | B'1', ANTIVARIANT ONE | H | P |
| 39 | PARITY (EVEN) | | NP |
| 40..44 | B'00000',RESERVED(RP) | | P |
| 45..46 | EXTENSION | H | P |
| 47 | PARITY (EVEN) | | NP |
| 48..54 | INSTALLATION | | P |
| 55 | PARITY (EVEN) | | NP |
| 56..58 | B'000',RESERVED(R) | | NP |
| 59..61 | B'000',TESTZERO(RPZ) | H | P |
| 62 | VALUE/AUTHENTICATOR | | P |
| 63 | PARITY (EVEN) | | NP |

| | | | |
|---|---|---|---|
| 64..67 | ALGORITHM | H | P |
| 68..70 | ALGORITHM EXTENSION | H | P |
| 71 | PARITY (EVEN) | | NP |
| 72..78 | LENGTH (BITS 00..06) | H | P |
| 79 | PARITY (EVEN) | | NP |
| 80..86 | LENGTH (BITS 07..13) | H | P |
| 87 | PARITY (EVEN) | | NP |
| 88..89 | LENGTH (BITS 14..15) | H | P |
| 90..93 | DOMAIN ID | H | P |
| 94 | B'0', RESERVED (RP) | | P |
| 95 | PARITY (EVEN) | | NP |
| 96 | HIST-IPUK | H | P |
| 97..98 | HIST-MDC | H | P |
| 99..100 | HIST-CHAIN | H | P |
| 101..102 | KREGMODE | H | P |
| 103 | PARITY (EVEN) | | NP |
| 104..110 | B'0000000',RESERVED(RP) | | P |
| 111 | PARITY (EVEN) | | NP |
| 112..118 | PU USAGE | H | P |
| 112 | RTNPMK/RTCPMK (=B'1') | H | P |
| 113 | IPUK | H | P |
| 114 | GKSP | H | P |
| 115 | IDK | H | P |
| 116..118 | B'000',RESERVED(RP) | | P |
| 119 | PARITY (EVEN) | | NP |
| 120..126 | B'0000000',RESERVED(RP) | | P |
| 127 | PARITY (EVEN) | | NP |

*FIG. 38*

| BITS | | | |
|---|---|---|---|
| 00..06 | B'0000000',RESERVED(RP) | | P |
| 07 | PARITY (EVEN) | | NP |
| 08..14 | CV TYPE=B'1110011' | H | P |
| 15 | PARITY (EVEN) | | NP |
| 16..22 | PR USAGE | H | P |
| 23 | PARITY (EVEN) | | NP |
| 24..29 | B'000000',RESERVED(RP) | | P |
| 30 | B'0', ANTIVARIANT ZERO | H | P |
| 31 | PARITY (EVEN) | | NP |
| 32..37 | SOFTWARE | | P |
| 38 | B'1', ANTIVARIANT ONE | H | P |
| 39 | PARITY (EVEN) | | NP |
| 40..44 | B'00000',RESERVED(RP) | | P |
| 45..46 | EXTENSION | H | P |
| 47 | PARITY (EVEN) | | NP |
| 48..54 | INSTALLATION | | P |
| 55 | PARITY (EVEN) | | NP |
| 56..58 | B'000',RESERVED(R) | | NP |
| 59..61 | B'000',TESTZERO(RPZ) | H | P |
| 62 | VALUE/AUTHENTICATOR | | P |
| 63 | PARITY (EVEN) | | NP |

| | | | |
|---|---|---|---|
| 64..67 | ALGORITHM | H | P |
| 68..70 | ALGORITHM EXTENSION | H | P |
| 71 | PARITY (EVEN) | | NP |
| 72..78 | LENGTH (BITS 00...06) | H | P |
| 79 | PARITY (EVEN) | | NP |
| 80..86 | LENGTH (BITS 07...13) | H | P |
| 87 | PARITY (EVEN) | | NP |
| 88..89 | LENGTH (BITS 14..15) | H | P |
| 90..93 | DOMAIN ID | H | P |
| 94 | B'0', RESERVED (RP) | | P |
| 95 | PARITY (EVEN) | | NP |
| 96 | HIST-IPUK | H | P |
| 97..98 | HIST-MDC | H | P |
| 99..100 | HIST-CHAIN | H | P |
| 101..102 | B'00',RESERVED(RP) | | P |
| 103 | PARITY (EVEN) | | NP |
| 104..110 | B'0000000',RESERVED(RP) | | P |
| 111 | PARITY (EVEN) | | NP |
| 112..118 | PU USAGE | H | P |
| 112 | RTNPMK/RTCPMK (=B'1') | H | P |
| 113 | IPUK | H | P |
| 114..118 | B'00000',RESERVED(RP) | | P |
| 119 | PARITY (EVEN) | | NP |
| 120..126 | B'0000000',RESERVED(RP) | | P |
| 127 | PARITY (EVEN) | | NP |

FIG. 39

| BITS | | | |
|---|---|---|---|
| 00..06 | HASH | H | P |
| 07 | PARITY (EVEN) | H | P |
| 08..14 | HASH | H | P |
| 15 | PARITY (EVEN) | H | P |
| 16..22 | HASH | H | P |
| 23 | PARITY (EVEN) | H | P |
| 24..29 | HASH | H | P |
| 30 | ANTIVARIANT ZERO | H | P |
| 31 | PARITY (EVEN) | H | P |
| 32..37 | SOFTWARE | H | P |
| 38 | ANTIVARIANT ONE | H | P |
| 39 | PARITY (EVEN) | H | P |
| 40..44 | HASH | H | P |
| 45..46 | EXTENSION | H | P |
| 47 | PARITY (EVEN) | H | P |
| 48..54 | HASH | H | P |
| 55 | PARITY (EVEN) | H | P |
| 56..61 | HASH | H | P |
| 62 | VAL/VAL AUTHENTICATOR | H | P |
| 63 | PARITY (EVEN) | H | P |

| | | | |
|---|---|---|---|
| 64..70 | HASH | H | P |
| 71 | PARITY (EVEN) | H | P |
| 72..78 | HASH | H | P |
| 79 | PARITY (EVEN) | H | P |
| 80..86 | HASH | H | P |
| 87 | PARITY (EVEN) | H | P |
| 88..94 | HASH | H | P |
| 95 | PARITY (EVEN) | H | P |
| 96..102 | HASH | H | P |
| 103 | PARITY (EVEN) | H | P |
| 104..110 | HASH | H | P |
| 111 | PARITY (EVEN) | H | P |
| 112..118 | HASH | H | P |
| 119 | PARITY (EVEN) | H | P |
| 120..126 | HASH | H | P |
| 127 | PARITY (EVEN) | H | P |

PUBLIC KEY CRYPTOSYSTEM KEY MANAGEMENT BASED ON CONTROL VECTORS

BACKGROUND OF THE INVENTION

1. Technical Field

The invention disclosed broadly relates to data processing systems and methods and more particularly relates to cryptographic systems and methods for use in data processing systems to enhance security.

2. Background Art

The following co-pending patent applications are related to this invention and are incorporated herein by reference:

B. Brachtl, et al., "Controlled Use of Cryptographic Keys Via Generating Stations Established Control Values," U.S. Pat. No. 4,850,017, issued Jul. 18, 1989, assigned to IBM Corporation and incorporated herein by reference.

S. M. Matyas, et al., "Secure Management of Keys Using Control Vectors," U.S. Pat. No. 4,941,176, issued Jul. 10, 1990, assigned to IBM Corporation and incorporated herein by reference.

S. M. Matyas, et al., "Data Cryptography Operations Using Control Vectors," U.S. Pat. No. 4,918,728, issued Apr. 17, 1990, assigned to IBM Corporation and incorporated herein by reference.

S. M. Matyas, et al., "Personal Identification Number Processing Using Control Vectors," U.S. Pat. No. 4,924,514, issued May 8, 1990, assigned to IBM Corporation and incorporated herein by reference.

S. M. Matyas, et al., "Secure Management of Keys Using Extended Control Vectors," U.S. Pat. No. 4,924,515, issued May 8, 1990, assigned to IBM Corporation and incorporated herein by reference.

S. M. Matyas, et al., "Secure Management of Keys Using Control Vectors with Multi-Path Checking," Ser. No. 07/596,637, filed Oct. 12, 1990, assigned to IBM Corporation and incorporated here by reference.

S. M. Matyas, et al., "Secure Cryptographic Operations Using Alternate Modes of Control Vector Enforcement," Ser. No. 07/574,012, filed Aug. 22, 1990, assigned to IBM Corporation and incorporated here by reference.

S. M. Matyas, et al., "Secure Key Management Using Programmable Control Vector Checking," U.S. Pat. No. 5,007,089, issued Apr. 9, 1991, assigned to IBM Corporation and incorporated herein by reference.

S. M. Matyas, et al., "Secure Key Management Using Control Vector Translation," U.S. Pat. No. 4,993,069 issued Feb. 12, 1991, assigned to IBM Corporation and incorporated herein by reference.

S. M. Matyas, et al., "Data Authentication Using Modification Detection Codes Based on a Public One Way Encryption Function," U.S. Pat. No. 4,908,861, issued Mar. 13, 1990, assigned to IBM Corporation and incorporated herein by reference.

D. Abraham, et al., "Smart Card Having External Programming Capability and Method of Making Same," Ser. No. 004,501, filed Jan. 19, 1987, assigned to IBM Corporation and incorporated herein by reference.

S. M. Matyas, "Technique for Reducing RSA Crypto Variable Storage", U.S. Pat. No. 4,736,423, issued Apr. 5, 1988, assigned to IBM Corporation and incorporated by reference.

S. M. Matyas, et al., "Method and Apparatus for Controlling the Use of a Public Key, Based on the Level of Import Integrity for the Key, " Ser. No. 07/602,989, filed Oct. 24, 1990, assigned to IBM Corporation and incorporated herein by reference.

S. M. Matyas, et al., "A Hybrid Public Key Algorithm/Data Encryption Algorithm Key Distribution Method Based on Control Vectors," Ser. No. 07/748,407, filed Aug. 22, 1991, assigned to IBM Corporation and incorporated herein by reference.

S. M. Matyas et al., "Generating Public and Private Key Pairs Using a Passphrase," filed on the same day as the instant application, assigned to IBM Corporation and incorporated herein by reference.

The cryptographic architecture described in the cited patents by S. M. Matyas, et al. is based on associating with a cryptographic key, a control vector which provides the authorization for the uses of the key intended by the originator of the key. The cryptographic architecture described in the cited patents by S. M. Matyas, et al. is based on the Data Encryption Algorithm (DEA), see American National Standard X3.92-1981, *Data Encryption Algorithm*, American Standards Institute, New York, (Dec. 31, 1981), whereas the present invention is based on both a secret key algorithm, such as the DEA, and a public key algorithm. Various key management functions, data cryptography functions, and other data processing functions are possible using control vectors, in accordance with the invention. A system administrator can exercise flexibility in the implementation of his security policy by selecting appropriate control vectors in accordance with the invention. A cryptographic facility (CF) in the cryptographic architecture is described in the above cited patents by S. M. Matyas, et al. The CF is an instruction processor for a set of cryptographic instructions, implementing methods and key generation methods. A memory in the cryptographic facility stores a set of internal cryptographic variables. Each cryptographic instruction is described in terms of a sequence of processing steps required to transform to a set of output parameters. A cryptographic facility application program (CFAP) is also described in there referenced patents and patent applications, which defines an invocation method, as a calling sequence, for each cryptographic instruction consisting of an instruction mnemonic and an address with corresponding input and output parameters.

Public key encryption algorithms are described in a paper by W. Diffie and M. E. Hellman entitled "Privacy and Authentication: An Introduction to Cryptography," *Proceedings of the IEEE*, Volume 67, No. 3, March 1979, pp. 397-427. Public key systems are based on dispensing with the secret key distribution channel, as long as the channel has a sufficient level of integrity. In a public key cryptographic system, two keys are used, one for enciphering and one for deciphering. Public key algorithm systems are designed so that it is easy to generate a random pair of inverse keys PU for enciphering and PR for deciphering and it is easy to operate with PU and PR, but is computationally infeasible to compute PR from PU. Each user generates a pair of inverse transforms, PU and PR. He keeps the deciphering transformation PR secret, and makes the enciphering transformation PU public by placing it in a public directory. Anyone can now encrypt messages and send them to the user, but no one else can decipher messages intended for him. It is possible, and often desirable, to encipher with PU and decipher with PR. For this reason, PU is usually called a public key and PR is usually called a private key. A corollary feature of public key cryptographic systems is the provision of a digital signature which uniquely identifies the sender of a message. If user A wishes to send a signed message M to user B, he operates on it with his private key PR to produce the signed messages. PR was used as A's deciphering key when privacy was desired, but it is now used as his "enciphering" key. When user B receives the message S, he can recover the message M by operating on the ciphertext S with A's public PU. By successfully decrypting A's message, the receiver B has conclusive proof it came from sender A. Examples of public key cryptography are provided in the following U.S. patents: U.S. Pat. No. 4,218,582 to Hellman, et al., "Public Key Cryptographic Apparatus and Method;" U.S. Pat. No. 4,200,770 to Hellman, et al., "Cryptographic Apparatus and Method;" and U.S. Pat. No. 4,405,829 to Rivest, et al., "Cryptographic Communications System and Method."

Most cryptographic systems make use of many different types of keys, so that information encrypted with a key of one type is not affected by using a key of another type. A key assigned on the basis of the information the key encrypts or the use being make of the key. For example, a data-encrypting key encrypts data. A key-encrypting key encrypts keys. A PIN-encrypting key encrypts personal identification numbers (PINs) used in electronic funds transfer and point-of-sale applications. A MAC key is used to generate and authenticate message authentication codes (MACs).

The use of encryption is based on a strategy of protecting a large amount of information (a data file or communications session) with a smaller additional amount of information (a single key). Sophisticated key hierarchies have been divised using this principle. For example, U.S. Pat. Nos. 4,850,017, 4,941,176, 4,918,728, 4,924,514, which are based on a symmetric key algorithm such as the Data Encryption Algorithm (DEA), make use of a key hierarchy wherein keys belonging to a cryptographic device are encrypted with a single master key and stored in a key data set. The master key is stored in clear form within the cryptographic hardware. The concept of using a single master key to encrypt keys stored in a key set is known as the master key concept (see C. H. Meyer and S. M. Matyas, *Cryptography—A New Dimension in Computer Data Security*, John Wiley & Sons, Inc., New York, 1982.). Until now, the master key concept has been applied only to cryptographic systems based on a symmetric key cryptographic algorithm. However, the present invention extends the master key concept and teaches how it may be applied to cryptographic systems based on an asymmetric key cryptographic algorithm, and more particularly how it may be applied cryptographic systems incorporating both asymmetric and symmetric key cryptographic algorithms, generally called employing (1) an asymmetric algorithm or (2) both asymmetric and symmetric algorithms, there is still a need to use many public and private keys pairs. Hence, at a minimum, the private keys must be stored in encrypted form outside the cryptographic hardware.

In order for a cryptographic system employing the master key concept to be made operable, each device must be first initialized with a master key and one or more other keys to permit the cryptographic system to communicate cryptographically with other cryptographic systems or to distribute keys to other cryptographic systems. Typically, these keys are generated and installed using manual entry techniques. In a well designed cryptographic system, all other keys are generated and handled by the cryptographic system automatically. Keys generated by the cryptographic system are stored in encrypted form in a cryptographic key data set or transmitted in encrypted form to a designated receiving device where the key is imported (i.e. re-encrypted to a form suitable for storage and use at the receiving device). Thus, an important feature of any key management scheme is the method used to encrypt keys for sage storage in a cryptographic key data set.

At the time a key is generated, the user or user application determines, from among the range of options permitted by the key management, the form of each generated key. For example, a generated key can be produced (1) in clear form, (2) in encrypted form suitable for storage in a cryptographic key data set, or (3) form suitable for distribution to a designated receiving device. Generally, cryptographic systems have different options for generating keys in these different forms. Also, at the time a key is generated, the user or user application determines, from among the range of options permitted by the key management, the type and usage of each generated key. Type and usage information are examples of a class of key-related information called control information. For example, in U.S. Pat. Nos. 4,850,017, 4,941,176, 4,918,728, 4,924,514, 4,924,515, and 5,007,089, the control information is embodied within a data variable called the control vector. The control vector concepts taught in these U.S. patents and IBM dockets is summarized in a paper by S. M. Matyas entitled "Key handling with control vectors," *IBM Systems Journal*, Volume 30, No. 2, 1991, pp 151–174.

In a cryptographic system employing control vectors, every key K has an associated control vector C. Thus, K and C denote a 2-tuple, where K initializes the cryptographic algorithm by selecting an enciphering transformation and C initializes the cryptographic hardware by selecting a set of cryptographic instructions, modes, and usage that K is granted. Implementation of the control vector concept requires that K and C be coupled cryptographically. Otherwise, the key-usage attributes granted to K by C could be changed by merely replacing C with another control vector. The method for accomplishing this is based on integrating C into the functions used to encrypt and decrypt keys, called control vector encryption (CVE) and control vector decryption (CVD). FIG. 1 is a block diagram illustration showing the implementation of the CVE and CVD algorithms within a cryptographic facility 30. CF 30 contains a CVE algorithm 1, a CVD algorithm 2, a master key (KM) 3, to-be-encrypted key K 4, and a recovered key K 5. The CVE algorithm 1 encrypts a clear key K 4 within CF 30 using a variant key KM+C formed as the Exclusive OR product of master key KM 3 stored within CF 30 and control vector C 6 specified as an input to CF 30 to produce an output encrypted key value of the form e*KM+C(K) 7. Note that "+" denotes the Exclusive OR operation and e* denotes encryption with a 128-bit key. The operation of encryption consists of encrypting K with the leftmost 64 bits of KM+C then decrypting the result with the rightmost 64 bits of KM+C and then encrypting that result with the leftmost 64 bits of KM+C. The CVD algorithm 2 decrypts the encrypted key e*KM+C(K) 9 specified as an input to CF 30 with the variant key KM+C formed as the Exclusive-OR produce of master key KM 3 stored within CF 30 and control vector C 8 specified as an input to CF 30 to produce an output clear key K 5. The operation of decryption consists of decrypting e*KM+C(K) with the leftmost 64 bit of KM+C them encrypting the result with the rightmost 64 bits of KM+C and then decrypting that result with the leftmost 64 bits of KM+C. The CVE algorithm is used to encrypt and protect keys stored outside the CF. The CVD algorithm is used to decrypt and recover keys to be processed within the CF.

FIG. 2 is a block diagram illustration of the control vector encryption (CVE) algorithm. Referring to FIG. 2, C is an input control vector whose length is a multiple of 64 bits; KK is a 128-bit key-encrypting key consisting of a leftmost 64-bit part KKL and a rightmost 64- bit KKR, i.e., KK=(KKL,KKR); K is a 64-bit key or the leftmost or rightmost 64-bit part of a 128-bit to be encrypted. The specification of KK is meant to be very general. For example, KK can be the master key KM, or some other key-encrypting key. The inputs are processed as follows. Control vector C is operated on by hashing algorithm ha, described below, to produce the 128-bit output hash vector H. H is Exclusive-ORed with KK to produce 128-bit output KK+H. Finally, K is encrypted with KK+H to produce output e*KK+H(K), where e* indicates encryption with 128-bit key KK+H using an encryption-decryption-encryption (e-d-e) algorithm as defined in ANSI Standard X9.17-1985 entitled "American National Standard for Financial Institution Key Management (Wholesale)", 1985, and is ISO Standard 8732 entitled "Banking—Key Management (Wholesale)", 1988.

FIG. 3 is a block diagram illustration of the control vector decryption (CVD) algorithm. Referring to FIG. 3, C is an input control vector whose length is a multiple of 64 bits; KK is a 128-bit key-encrypting key consisting of a leftmost 64-bit part KKL and a rightmost 64-bit part KKR, i.e., KK=(KKL,KKR); e*KK+H(K) is the encrypted key to be decrypted. Control vector C is operated on by hashing algorithm ha, described below, to produce the 128-bit output hash vector H. H is Exclusive-ORed with KK to produce 128-bit output KK+H. Finally, e*KK+H(K) is decrypted with KK+H using a decryption-encryption-decryption (d-e-d) algorithm to produce output K. The d-e-d algorithm is just the inverse of the e-d-e algorithm.

FIG. 4 is a block diagram illustration of hashing algorithm ha. Hashing algorithm ha operates on input control vector C (whose length is a multiple of 64 bits) to produce a 128-bit output H, where H=ha(C). If C is 64 bits, ha(C) is set equal to (C,C), where the comma denotes concatenation, and the extension field (bits 45,46) in ha(C) is set equal to B'00'. That is, ha acts like a concatenation function. If C is 128 bits, ha(C) is set equal to C, and the extension field in ha(C) is set equal to B'01'. That is, ha acts like an identity function. If C is greater than 128 bits, ha(C) is set equal to a 128-bit one way cryptographic function of C, e.g. a 128-bit modification detection code calculated by the MDC-2 algorithm in FIG. 5, and the extension field in ha(C) is set equal to B'10'. In each of the three cases, the eighth bit of each byte in ha(C) is adjusted such that each byte has even parity. This adjustment ensures that when ha(C) is exclusive-ORed with KK, the variant key KK+h(C) has the same parity as KK. The extension field in ha(C) serves to ensure, for a fixed KK, that the set of keys of the form KK+h(C) consists of three disjoint subsets S1, S2, and S3, where S1 denotes the keys resulting from all 64-bit control vectors, S2 denotes the keys resulting from all 128-bit control vectors, and S3 denotes the key resulting from all control vectors larger than 128 bits. This prevents a form of cheating wherein the CVD algorithm is tricked into decrypting an encrypted key using a false control vector. Hashing algorithm has fulfills two important objectives. First, it handles both short and long control vectors, thus ensuring that a key-management scheme based on the control vector concept is open-ended. Second, the processing overhead to handle short control vectors (64 and 128 bits) is minimized so as to have minimal impact on the key management scheme.

As an alternate embodiment, the length of the input control vector to the hashing algorithm ha can be encoded in the extension field (bits 45,46). If the input control vector is 64 bits long, the field is B'0', if the input control vector is 128 bits long, the field is set to B'01' and if the input control vector is longer than 128 bits, the field is set to B'10'. This has the advantage of simplifying the hashing algorithm ha so that it does not need to set the extension field in the resulting output H, except if the input control vector was greater than 128 bits.

FIG. 5 is a block diagram illustration of a cryptographic function for calculating a 128-bit modification detecting code (MDC), called the MDC-2 algorithm. Referring to FIG. 5, K1=X'5252525252525252' and L1=X'2525252525252525' are two 64-bit nonsecret constant keys. They are used only to process the first 64-bit block of plaintext, Y1. Thereafter, input value K2, K3, ..., etc. are based on output values (A1,D1), (A2,D2), ..., etc., and input values L2, L3, ..., etc. are based on output values (C1,B1), (C2,B2), ..., etc. That is, the outputs of each iteration are fed back and used as the keys at the next iteration. The 32-bit swapping function merely replaces 32-bit value B with 32-bit value D and 32-bit value D with 32-bit value B.

In summary, the prior art describes a method for controlling key usage in cryptographic systems based on a symmetric key cryptographic algorithm such as the DEA. Key usage information is stored in a control vector C which is cryptographically coupled with the key K using control vector encryption and control vector decryption algorithms, CVE and CVD, respectively. The CVE and CVD algorithms can handle both short and long control vectors. The only restriction on length is that the control vector must be a multiple of 64 bits. The control vector itself consists of a group of subfields, where each subfield has it own definition and use within the key management to control the processing of the key. Encoding the control vector as a group of independent subfields has many advantages. The processing control vector checking need only concern itself with those subfields that pertain tot he requested key usage. Thus, while the control vector may have many subfields, a particular cryptographic instruction may only need to check the encoded information in a few subfields. This speeds up the control vector checking process. Another important characteristic of the control vector is that the control vector accompanies (either explicitly or implicitly) the key wherever it goes. This is because the correct non-secret control vector must be specified to recover the correct secret key value. Thus, the control vector is available and can be checked at many different places within the cryptographic system: application program, cryptographic software, and cryptographic hardware.

Within a cryptographic system, the CVE and CVD algorithms are implemented so that their operation is transparent to the system. All clear keys are encrypted with the CVE algorithm before the keys are output from the cryptographic hardware. All encrypted keys are decrypted with the CVD algorithm before they are processed within the cryptographic hardware. Even within the cryptographic hardware, these services can be provided transparently from the cryptographic instructions that process keys. By employing a single pair of control vector encryption and decryption functions, most of the complexity associated with key handling can be encoded as information fields within the control vector and within the checking processes themselves, whereas the process of encrypting and decrypting keys and linking control vector information to the key can be handled with one common method.

The present invention provides a method for incorporating control vectors into a key management scheme that uses a public key algorithm. The reader will appreciate that while the advantages of controlling key usage with the control vector are universal in nature, the methods for accomplishing this can vary depending on the attributes of the cryptographic algorithm employed. For example, consider the method of encrypting K with a variant key KK+C to produce eKK+C(K). In this case, K is encrypted using the Data Encryption Algorithm, in which case the Exclusive-OR product of KK and C is always guaranteed to produce a valid DEA key, as DEA keys, ignoring parity bits, are maximally dense in the set of all binary numbers of their magnitude. When the cryptographic algorithm is an asymmetric algorithm such as the RSA algorithm, there are two keys PU and PR. In general, if (PU,PR) is a valid key pair, then (PU+C,PR+C) is not a valid key pair for an arbitrary value C. This is because the PU and PR key values meet certain mathematical constraints and are sparse in the set of all binary numbers of their magnitude. Thus, an alternate method for coupling C to PU and PR is needed. Moreover, encrypting one key with another can sometimes be cumbersome, e.g., when an the RSA algorithm is employed it is cumbersome to encrypt a key of one modulus value with a key of another modulus value if the value of the first modulus is greater than the value of the second modulus. This cumbersome situation must be dealt with in the underlying design so that a general methodology is achieved. The present invention will show how this is accomplished. In hybrid cryptographic systems where both a symmetric and asymmetric algorithm are implemented, the public and private keys belonging to the asymmetric algorithm can be encrypted with keys belonging to the symmetric key algorithm. In that case, the method for coupling a key and control vector can be similar to that described in the prior art. However, even here there are subtle differences that affect the design choice. For example, the public and private keys belonging to the asymmetric key algorithm are typically longer than the keys belonging to the symmetric key algorithm. Also, the possibility that the public and private keys will be of different and varying lengths must be addressed. 512-bit RSA keys are not uncommon, where a DEA master key is generally 128 bits. Thus, the CVE and CVD algorithms must be adjusted to permit long asymmetric keys to be encrypted with shorter (e.g., 128-bit) symmetric keys. Another difference is that, in theory, the public keys need not be encrypted when stored in a cryptographic key data set. However, there are advantages to handling both the public and private keys similarly. As examples, the same method for coupling the control vector and the private key can be used to couple the control vector and the public key, and the same method of authenticating the key value can be used. Also, handling the public and private keys in the same way means that all keys are handled and processed just one way, which reduces the complexity of the key management design. That is, as the private key must be encrypted to ensure that its value does not become known, the public key may also be encrypted to simplify the internal key management design, as then the key (whether public or private) will always be decrypted before being processed further.

When a public key algorithm is employed, the key lengths or key sizes are not fixed by the algorithm as with the DEA. In this case, the cryptographic system will most likely have to operate with public and private keys of different lengths, varying as much as several hundred bits. Therefore, the CVE and CVD algorithms must be designed to handle public and private keys with varying lengths. It is also important that the length of the key be made transparent from the application and the cryptographic system using the key.

In cryptographic systems based on the DEA, many cryptographic instructions that handle bulk data must be streamlined so that performance is not degraded by the introduction of the control vector and the encryption and decryption algorithms (CVE and CVD). However, when a public key (PK) algorithm is employed, the individual steps of encryption and decryption are orders of magnitude slower than encryption and decryption with the DEA. Thus, the design of a key management scheme based on a PK algorithm can have different underlying objectives. For example, key processing and key handling operations that introduce unwarranted processing overhead in a DEA-based key management, may indeed be appropriate for a PK-based key management. This is because the processing overhead while large compared to one DEA encryption may be insignificant compared to one PK encryption. In the present invention, a strategy is pursued of authenticating a key dynamically within the cryptographic hardware as part of the CVD algorithm. Relatively speaking, while this introduces significant processing overhead in a DEA-based key management scheme, it adds very little processing overhead in a PK-based key management scheme. However, this ensures that valid and strong PR and PU keys are used, and that an invalid (i.e., insecure) key value is not inadvertently used.

OBJECTS OF THE INVENTION

It is therefore an object of the invention to provide an improved method for controlling the usage of public and private keys.

It is another object of the invention to permit large amounts of control information for the public and private keys.

It is another object of the invention to permit the application, the system software, and the system hardware to check and set portions of the control information.

It is another object of the invention to permit keys to be authenticated within the crypto hardware as part of the key recovery process, so that all keys are authenticated before they are used by the crypto hardware.

It is another object of the invention to permit an open-ended design allowing new and expanded key usage to be added to the architecture.

It is another object of the invention to provide a single consistent method for handling both public and private keys.

It is another object of the invention to allow the physical makeup of the keys to appear transparent.

It is another object of the invention to allow users to port their public and private keys from one cryptographic system to another.

It is another object of the invention to base control vector encrypt and decrypt on a DEA master key of 128 bits.

It is another object of the invention to provide a general method for control vector encrypt and decrypt where the system master key is a private and public key pair of a commutative asymmetric cryptographic algorithm (i.e., no DEA or other symmetric algorithm master key is used).

It is another object of the invention to provide a general method for control vector encrypt and decrypt where the system master key is a quadruple of two key pairs of private and public keys of a non-commutative asymmetric cryptographic algorithm. Specifically the system master key quadruple consists of (1) a PU1 master key used to encrypt the public and private keys kept outside the cryptographic facility, (2) a PR1 master key used to decrypt the public and private keys kept outside the cryptographic facility, (3) a PR2 master key used to generate an authentication signature for the public and private keys kept outside the cryptographic facility, and (4) a PU2 master key used to verify the authentication signature of the public and private keys kept outside the cryptographic facility.

It is another object of the invention to provide a general method for control vector encrypt and decrypt where the system master key is a quadruple of one key pair of private and public keys using public key algorithm 1 and another key pair of private and public keys using public key algorithm 2. Specifically the system master key quadruple consists of (1) a PU1 master key (based on public key algorithm 1) used to encrypt the public and private keys kept outside the cryptographic facility, (2) a PR1 master key (using public key algorithm 1) used to decrypt the public and private keys kept outside the cryptographic facility, (3) a PR2 master key (using public key algorithm 2) used to generate an authentication signature for the public and private keys kept outside the cryptographic facility, and (4) a PU2 master key (using public key algorithm 2) used to verify the authentication signature for the public and private keys kept outside the cryptographic facility.

SUMMARY OF THE INVENTION

These and other objects, features, and advantages are accomplished by the invention disclosed herein.

The invention describes a method for encrypting the public and private keys of a cryptographic asymmetric key (public key) algorithm, when these keys are stored outside the secure boundary of the cryptographic facility (i.e., cryptographic hardware) and for decrypting these keys when they are processed or used within the secure boundary of the cryptographic facility. The so-produced encrypted keys may be kept in a cryptographic key data set belonging to the cryptographic system software or they may be managed by the cryptographic application programs that use the keys. The public and private keys are encrypted by a system master key stored in clear form within the secure boundary of the cryptographic facility. In situations where the cryptographic system implements a symmetric key algorithm in addition to the asymmetric key algorithm the system master key can be a symmetric key. For example, if the cryptographic system implements both DEA and RSA algorithms, then the RSA public and private keys are protected with a 128-bit DEA master key.

In situations where the cryptographic system implements a commutative asymmetric key algorithm (such as the RSA algorithm), the system master key consists of a special public and private key pair (PU0,PR0) stored in clear form within the cryptographic facility. A commutative asymmetric key algorithm in one where the operation of encryption followed by decryption is equal to the operation of decryption followed by encryption in that both result in the original plaintext. The master public key PU0 is used to encrypt and verify authenticity for public and private keys stored outside the cryptographic facility and the master private key PR0 is used to decrypt and generate authentication signatures on the public and private keys stored outside the cryptographic facility. In addition to providing a means to encrypt and decrypt the public and private keys stored outside the cryptographic facility, the invention also provides a means to cryptographically couple the control vector with the public and private keys and to authenticate the public and private keys using a special authenticator produced within the cryptographic facility.

In situations where the cryptographic system implements only a non-commutative asymmetric key algorithm, the system master key may consist of a special quadruple composed of a two public and private key paris ((PU1,PR1),(PU2,PR2)) stored in clear form within the cryptographic facility. A non-commutative asymmetric key algorithm is one where encryption must always be done before decryption. Master public key PU1 is used to encrypt public and private keys stored outside the cryptographic facility and master private keys PR1 is used to decrypt public and private keys stored outside the cryptographic facility. Master public key PU2 is used to verify the authenticity of and private keys stored outside the cryptographic facility and master private key PR2 is used to generate authentication signatures for the public and private keys stored outside the cryptographic facility.

In situations where the cryptographic system implements two different asymmetric algorithms, where one algorithm is used for key encryption/decryption and another (different) algorithm is used for authentication, the system master key consists of a special quadruple composed of a two public and private key pairs ((PU1,PR1),(PU2,PR2)) stored in clear form within the cryptographic facility. (PU1,PR1) comprise an asymmetric key pair from a first public key algorithm and (PU2,PR2) comprise an asymmetric key pair from a second public key algorithm, which is different from the first algorithm. Master public key PU1 is used to encrypt public and private keys stored outside the cryptographic facility and master private key PR1 is used to decrypt public and private keys stored outside the cryptographic facility. Master public key PU2 is used to verify the authenticity of public and private keys stored outside the cryptographic facility and master private key PR2 is used to generate authentication signatures for the public and private keys stored outside the cryptographic facility.

Note also, as an alternate embodiment, if the public key algorithm is not commutative, if both the public key and the private keys that are used as the master key pair are kept secret, then only one master key pair is needed. In this case, the (secret) public key is used to encrypt the authentication record and the private key is used to decrypt it. Normally this would represent a security exposure, but as the public key is secret and known only inside the cryptographic facility, there is no exposure. Care must be taken to ensure that the (secret) public key is never inadvertently exposed.

FIG. 6 illustrates a cryptographic facility 30 containing a commutative asymmetric algorithm master key. In this case, the public and private keys stored outside the cryptographic facility 30 are protected (i.e., encrypted for privacy and authenticated) with an asymmetric master key pair, designated (PU0,PR0). Outside the cryptographic facility 30, all public and private keys are stored in key tokens. Public keys are stored in public key tokens (PU key tokens) and private keys are stored in private key tokens (PR key tokens). The PU Key tokens and PR key tokens are stored in a cryptographic key data set 32 managed by the cryptographic system software, or they may be managed by the cryptographic application programs themselves (not shown in FIG. 6).

FIG. 7 illustrates a cryptographic facility 30 containing an asymmetric key algorithm and a symmetric key algorithm. In this case, the public and private keys stored outside the cryptographic facility 30 are protected with a symmetric system master key, designated KM. If the symmetric key algorithm is the DEA, then KM is a 128-bit key, as described in the prior art. As in FIG. 6, the public and private keys are stored in PU key tokens and PR key tokens. The PU key tokens and PR key tokens are stored in a cryptographic key data set 32 managed by the cryptographic system software, or they may be managed by the cryptographic application programs themselves (not shown in FIG. 7).

The reader will appreciate from the full description of the invention, provided below that, except for the special functions that encrypt and decrypt the keys in the key tokens, the means for protecting keys based on any of the following methods:

(1) a symmetric system master key (KM),
(2) a commutative asymmetric system master key pair (PU0,PR0),
(3) a non-commutative asymmetric master key pair (PU0,PR0) where both the public and private key are kept secret,
(4) a non-commutative asymmetric master key quadruple ((PU1,PR1),(PU2,PR2)), or
(5) a master key quadruple ((PU1,PR1),(PU2,PR2)) when the first key pair uses one public key algorithm for key encryption/decryption and the second key pair uses another public key algorithm different from the first for authentication can be made transparent to the user of a cryptographic system. Thus, the cryptographic instructions that process and use the public and private keys and the cryptographic software and cryptographic application programs that handle the public and private key tokens are unaffected by the particular encryption and decryption means for storage and recovery of the public and private keys. This is so because the keys are treated as logical entities. Their physical characteristics such as length, format, component make up, etc., are kept transparent to the cryptographic system. This is partially accomplished through the use of special records called the public key record (PU key record) and private key record (PR key record) which may have varying length, as the keys they contain may have varying length. All public and private keys generated within the cryptographic system are stored in these varying-length key records. As an alternate embodiment, the key records may be set to a fixed size that will contain the largest size public and private keys that will be generated and/or used on the system.

FIG. 8 illustrates the production of public and private keys using a public key key generation algorithm (KGA) 152. In response to a request to generate a (PU,PR) key pair, public key generation algorithm 152 causes a (PU,PR) key pair to be generated. The generated public key PU is stored in a PU key record and the generated private key PR is stored in PR key record. The PU key record and PR key record are returned as outputs. In addition to returning the PU key record and PR key record, the public key generation algorithm 152 may also optionally return a PU_length parameter indicating the length of PU key record and a PR_length parameter indicating the length of PR key record. The optional length parameters may be useful in implementations where the lengths of PU key record and PR key record may vary.

FIG. 9 illustrates the formats of the PU key record and PR key record. The PU key record contains parse data that permits the public key to be recovered from the record. The parse data may be length and displacement data of fields in the record. The PU key record also contains control information that may be useful in describing the record type and type of key or keys stored within the record. The PU key record also permits one or more public keys to be stored as a single logical public key. This may be particularly useful in situations where a first public key algorithm is used for DEA key encryption/decryption purposes, e.g., to distribute DEA keys from one device to another, and a second public key algorithm is used for generating and verifying digital signatures. Thus, a first public key PU1 is used to encrypt DEA keys and a second public key PU2 is used verify digital signatures. In such situations, the cryptographic system is designed in such a way that the key processing operations will know from the context of the operations being performed whether the public key to be used is PU1 or PU2. The PR key record also contains parse data that permits the private key to be recovered from the record. The PR key record also contains control information that may be useful in describing the record type and type of key or keys stored within the record. The PR key record also permits one or more private keys to be stored as a single logical private key. Thus, a first private key PR1 is used to decrypt a DEA key encrypted by the first public key PU1, and a second private key PR2 is used to generate digital signatures for later verification by the second public key PU2. In such situations, the cryptographic system is designed in such a way that the key processing operations will know from the context of the operations being performed whether the private key to be used is PR1 or PR2. The PU and PR key records keep algorithm specific and key specific information transparent to the cryptographic system. Only the public key algorithm itself that processes the key records need be aware of the internal structure and makeup of these key records.

As an alternate embodiment, in certain situations, there may be advantages to maintaining the logical key records in two forms: the first containing both the private keys and public keys for the owner or creator of the keys and the second containing just the public keys for distribution to others. As before, if using the owner's logical key record containing both private and public keys, the correct key to use can be determined from context.

FIG. 10 illustrates the production of public and private key pairs using a Generate Public and Private Key Pair (GPUPR) instruction. The GPUPR instruction is described in detail in co-pending patent application by S. M. Matyas, et al. entitled "Generating Public and Private Key Paris Using a Passphrase", as cited in the background art. Referring now to FIG. 10, the GPUPR instruction 52 is contained in an instruction processor 142 within the cryptographic facility (CF) 30. In practice, the CF 30 is implemented within secure hardware, so that keys and cryptographic variables stored within the CF 30 are protected, i.e., both the secrecy and integrity of these keys and cryptographic variables are protected. The CF 30 also contains a CF environment memory 146 for the storage if keys and cryptographic variables such as a master key 15. FIG. 10 does not specify whether the master key is (1) a symmetric master key KM, (2) an asymmetric commutative master key pair (PU0,PR0), (3) a non-commutative asymmetric master key pair (PU0,PR0) where both the public and private keys are kept secret, (4) an asymmetric non-commutative master key quadruple ((PU1,PR1),(PU2,PR2)), or (5) an asymmetric two-PK-algorithm master key quadruple ((PU1,PR1),(PU2,PR2)) where the first pair uses one public key algorithm and the second pair uses a different public key algorithm from the first. The CF 30 also contains cryptographic algorithms 144, which includes an asymmetric key algorithm 10, an optional symmetric key algorithm 11, and an asymmetric key key generation algorithm (KGA) 152. The inputs to the GPUPR instruction at 50 consist of a mode, an optional code word, PU control vector, and PR control vector. In response to a request to execute the GPUPR instruction 50, the GPUPR instruction invokes the KGA 152, at 53, passing the mode and optional code word. The mode indicates to KGA 152 whether the to-be-generated public and private key pair (PU,PR) are generated from a code word (mode='PP') or not (mode='no_PP'). In response the KGA 152 produces a public and private key pair (PU,PR) which are formatted in a PU key record and PR key record. The PU key record and PR key record are returned to the GPUPR instruction at 54. In response, the GPUPR instruction builds a PU key token and a PR key token containing the encrypted PU key record and encrypted PR key record, respectively. Each key token contains a control vector and an authenticator, as further described below. The GPUPR instruction 52 also performs consistency checking on the mode and control vector supplied as inputs at 50, see also co-pending patent application by S. M. Matyas, et al. entitled "Generating Public and Private Key Pairs Using a Passphrase," cited in the background art, for a further discussion of this consistency checking. The so-produced PU key token and PR key token are returned as outputs at 51.

FIG. 11 illustrates the formats of the PU key token and PR key token. The PU key token consists of a header, a PU control vector, an encrypted PU key record, and a PU authenticator. As an alternate embodiment, the PU key token may consist of a header, a PU control vector, a plaintext PU key record, and a PU authenticator. The preferred embodiment has an encrypted PU key record in the PU key token as the PR key token must contain an encrypted PR key record (to maintain its secrecy) and doing both PU and PR key tokens in the same manner simplifies the processing. The PR key token consists of a header, a PR control vector, an encrypted PR key record, and a PR authenticator. The header in the PU key token consists of information (e.g., offsets or displacements to start of fields, offsets or displacements to end of fields, and/or lengths of fields) that enable the system to determine the start and end of each other field in the PU key token. The PU control vector consists of a PU key type, PU key usage data, PR key usage data (for history purposes), algorithm identifier, algorithm-specific data, key start date/time, key expiration data/time, device identifier, user identifier, key identifier, logical device identifier, and user-defined data. The fields of PU control vectors are presented in more detail under "Description of the Best Mode for Carrying Out the Invention." If the system master key is a symmetric key KM, then PU key record is encrypted with a variant key derived from KM, as explained below. If the system master key is an asymmetric key pair (PU0,PR0), then PU key record is encrypted with PU0, as explained below. The PU authenticator is a special authentication code produced at the time the PU key token is constructed. Later, when the PU key token is specified as a parameter input to a cryptographic instruction, the PU authenticator is used to validate the public key as part of key recovery, before the recovered PU is processed within the cryptographic instruction.

The header in the PR key token consists of information (e.g., offsets or displacements to start of fields, offsets or displacements to end of fields, and/or lengths of fields) that enable the system to determine the start and end of each other field in the PR key token. The PR control vector consists of a PR key type, PR key usage data, PU key usage data (for history purposes), algorithm identifier, algorithm-specific data, key start date/time, key expiration data/time, device identifier, user identifier, key identifier, logical device identifier, and user-defined data. The fields of PR control vectors are presented in more detail under "Description of the Best Mode for Carrying Out the Invention." If the system master key is a symmetric key KM, then PR key record is encrypted with a variant key derived from KM, as explained below. If the system master key is an asymmetric key pair (PU0,PR0), then the PR key record is encrypted with PU0, as explained below. The PR authenticator is a special authentication code produced at the time the PR key token is constructed. Later, when the PR key token is specified as a parameter input to a cryptographic instruction, the PR authenticator is used to validate the public key as part of key recovery, before the recovered PR is processed within the cryptographic instruction.

In co-pending patent application by S. M. Matyas, et al. entitled "Generating Public and Private Key Pairs Using a Passphrase", cited in the background art, the outputs of key generator algorithm 152 are the generated public and private key, PU and PR. Actually, the outputs are a PU key record and a PR key record, containing the generated PU and PR, respectively, as defined here. Those skilled in the art will appreciate that the description of the GPUPR instruction and the key generation algorithm in co-pending patent application by S. M. Matyas, et al. entitled "Generating Public and Private Key Pairs Using a Passphrase", is for all intents and purposes the same as the description provided here, and that returning PU and PR as outputs from the key generation algorithm 152, instead of return PU and PR key records does not depend from the underlying invention.

BRIEF DESCRIPTION OF THE DRAWINGS

These and other objects, features, and advantages of the invention will be more fully appreciated with reference to the accompanying figures.

FIG. 5 is a block diagram illustration of the MDC-2 algorithm.

FIG. 6 is a block diagram illustration of a first embodiment of the invention wherein the generated public and private keys stored outside the cryptographic facility are protected with a commutative asymmetric system master key pair (PU0,PR0).

FIG. 7 is a block diagram illustration of a second embodiment of the invention wherein the generated public and private keys stored outside the cryptographic facility are protected with a symmetric system master key KM.

FIG. 8 is a block diagram illustration of a public key key generation algorithm (KGA).

FIG. 9 illustrates the formats of the PU key record and PR key record.

FIG. 23 lists the components of the Instruction Processor 142.

FIG. 24 shows the elements of the Configuration Table in the CF Environment Memory 146.

FIG. 25 shows the main elements of the Cryptographic Algorithms 144.

FIG. 26 is a block diagram illustration of the components of the CF Environment.

FIG. 27 shows the instructions controlled by the DEFINE, AUTH CONTROL, AUTH, and ENABLE fields in the Configuration Vector.

FIG. 31 is a block diagram illustration of the fields in a control vector associated with a private authentication key.

FIG. 32 is a block diagram illustration of the fields in a control vector associated with a private certification key.

FIG. 33 is a block diagram illustration of the fields in a control vector associated with a private key management key.

FIG. 34 is a block diagram illustration of the fields in a control vector associated with a private user key.

FIG. 35 is a block diagram illustration of the fields in a control vector associated with a public authentication key.

FIG. 36 is a block diagram illustration of the fields in a control vector associated with a public certification key.

FIG. 37 is a block diagram illustration of the fields in a control vector associated with a public key management key.

FIG. 38 is a block diagram illustration of the fields in a control vector associated with a public user key.

FIG. 39 is a block diagram illustration of the fields in a has vector.

DESCRIPTION OF THE BEST MODE FOR CARRYING OUT THE INVENTION

Environment Description

Figure 12:
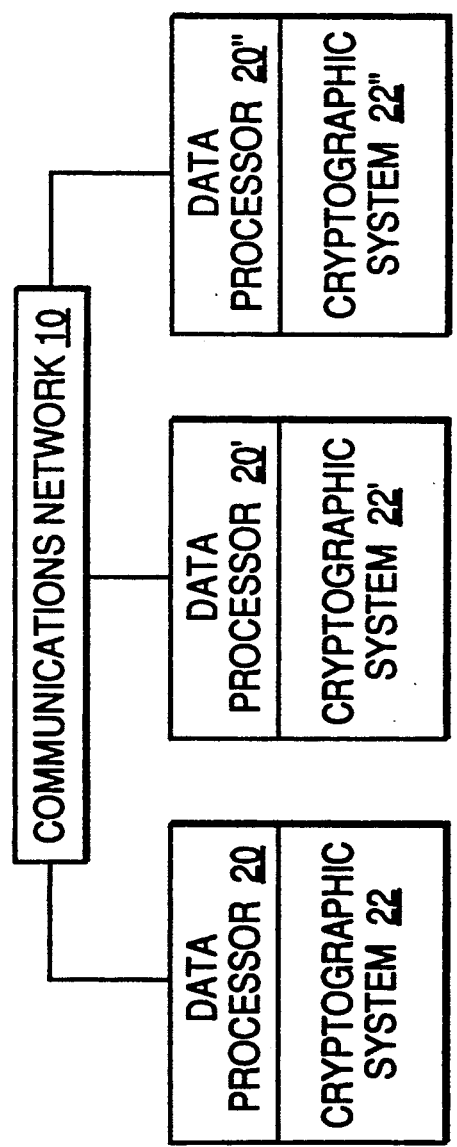
FIG. 12 illustrates a communications network 10 including a plurality of data processors, each of which includes a cryptographic system.

FIG. 12 illustrates a network block diagram showing a communications network 10 to which is connected a plurality of data processors including data processor 20, data processor 20', and data processor 20". Also included in each data processor is a cryptographic system, as shown in FIG. 12. Data processor 20 includes cryptographic system 22, data processor 20' includes cryptographic system 22' and data processor 20" includes cryptographic system 22". Each data processor supports the processing of one or more applications which require access to cryptographic services such as for the encryption, decryption and authenticating of application data and the generation and installation of cryptographic keys. The cryptographic services are provided by a secure cryptographic facility in each cryptographic system. The network provides the means for the data processors to send and receive encrypted data and keys. Various protocols, that is, formats and procedural rules, govern the exchange of cryptographic quantities between communicating data processors in order to ensure the interoperability between them.

Figure 13:
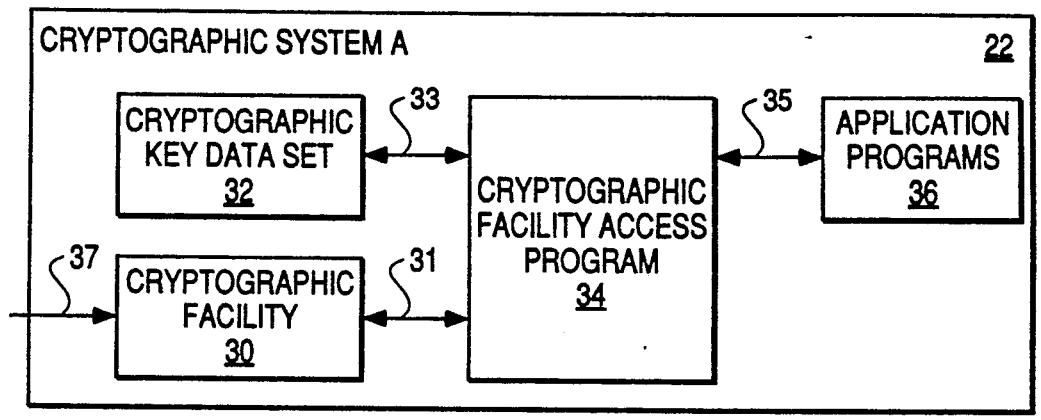
FIG. 13 is a block diagram of a cryptographic system 22.

FIG. 13 illustrates the cryptographic system 22. In the cryptographic system 22, the cryptographic facility (CF) 30 has an input 37 from a physical interface. The cryptographic facility access program (CFAP) 34 is coupled to the cryptographic facility 30 by means of the interface 31. The cryptographic key data set (CKDS) 32 is connected to the cryptographic facility access program 34 by means of the interface 33. The application programs (APPL) 36 are connected to the cryptographic facility access program 34 by means of the interface 35.

A typical request for cryptographic service is initiated by APPL 36 via a function call to the CFAP 34 at the interface 35. The service request includes key and data parameters, as well as key identifiers which the CFAP 34 uses to access encrypted keys from the CKDS 32 at the interface 33. The CFAP 34 processes the service request by issuing one or more cryptographic access instructions to the CF 30 at the interface 31. The CF 30 may also have an optional physical interface 37 for direct entry of cryptographic variables into the CF 30. Each cryptographic access instruction invoked at the interface 31 has a set of input parameters processed by the CF 30 to produce a set of output parameters returned by the CF 30 to the CFAP 34. In turn, the CFAP 34 may return output parameters to the APPL 36. The CFAP 34 may also use the output parameters and input parameters to subsequently invoke instructions. If the output parameters contain encrypted keys, then the CFAP 34, in many cases, may store these encrypted keys in the CKDS 32.

Figure 14:
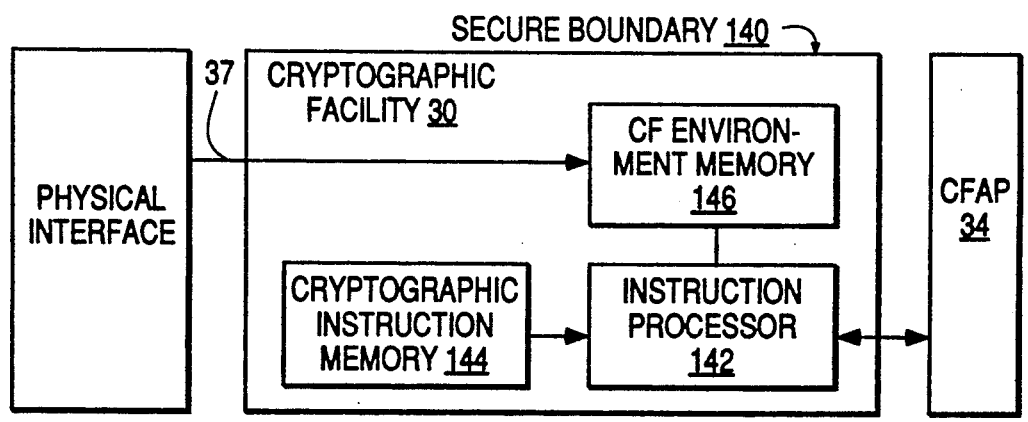
FIG. 14 is a block diagram of a cryptographic facility 30.

FIG. 14 illustrates the cryptographic facility 30. The cryptographic facility 30 is maintained within a secure boundary 140. The cryptographic facility 30 includes the instruction processor 142 which is coupled to the cryptographic algorithms 144 which are embodied as executable code. The cryptographic facility environment memory 146 is coupled to the instruction processor 142. The physical interface can be coupled over line 37 to the CF environment memory 146, as shown in the figure. The instruction processor 142 is coupled to the cryptographic facility access program (CFAP) 34 by means of the interface at 31.

The instruction processor 142 is a functional element which executes cryptographic microinstructions invoked by the CFAP access instruction at the interface 31. For each access instruction, the interface 31 first defines an instruction mnemonic or operation code used to select particular microinstructions for execution. Secondly a set of input parameters is passed from the CFAP 34 to the CF 30. Thirdly, a set of output parameters is returned by the CF 30 to the CFAP 34. The instruction processor 142 executes the selected instruction by performing an instruction specific sequence of cryptographic processing steps embodied as microinstructions stored in cryptographic microinstruction memory 144. The control flow and subsequent output of the cryptographic processing steps depend on the values of the input parameters and the contents of the CF environment memory 146. The CF environment memory 146 consists of a set of cryptographic variables, for example keys, flags, counters, CF configuration information, etc., which are collectively stored within the CF 30. The CF environment variables in memory 146 are initialized via the interface 31, that is by execution of certain CF microinstructions which read input parameters and load them into the CF environment memory 146. Alternatively, initialization can be done via an optional physical interface which permits cryptographic variables to be loaded directly into the CF environment memory 146, for example via an attached key entry device.

The physical embodiment of the cryptographic facility secure boundary 140, incorporates the following physical security features. The physical embodiment resists probing by an insider adversary who has limited access to the cryptographic facility 30. The term "limited" is measured in minutes or hours as opposed to days or weeks. The adversary is constrained to a probing attack at the customer's site using limited electronic devices as opposed to a laboratory attack launched at a site under the control of the adversary using sophisticated electronic and mechanical equipment. The physical embodiment also detects attempts at physical probing or intruding, through the use of a variety of electromechanical sensing devices. Also, the physical embodiment of the cryptographic facility 30 provides for the zeroization of all internally stored secret cryptographic variables. Such zeroization is done automatically whenever an attempted probing or intrusion has been detected. The physical embodiment also provides a manual facility for a zeroization of internally stored secret cryptographic variables. Reference to the Abraham, et al. patent application cited above, will give an example of how such physical security features can be implemented.

Key Record Encryption/Decryption

Figure 15:
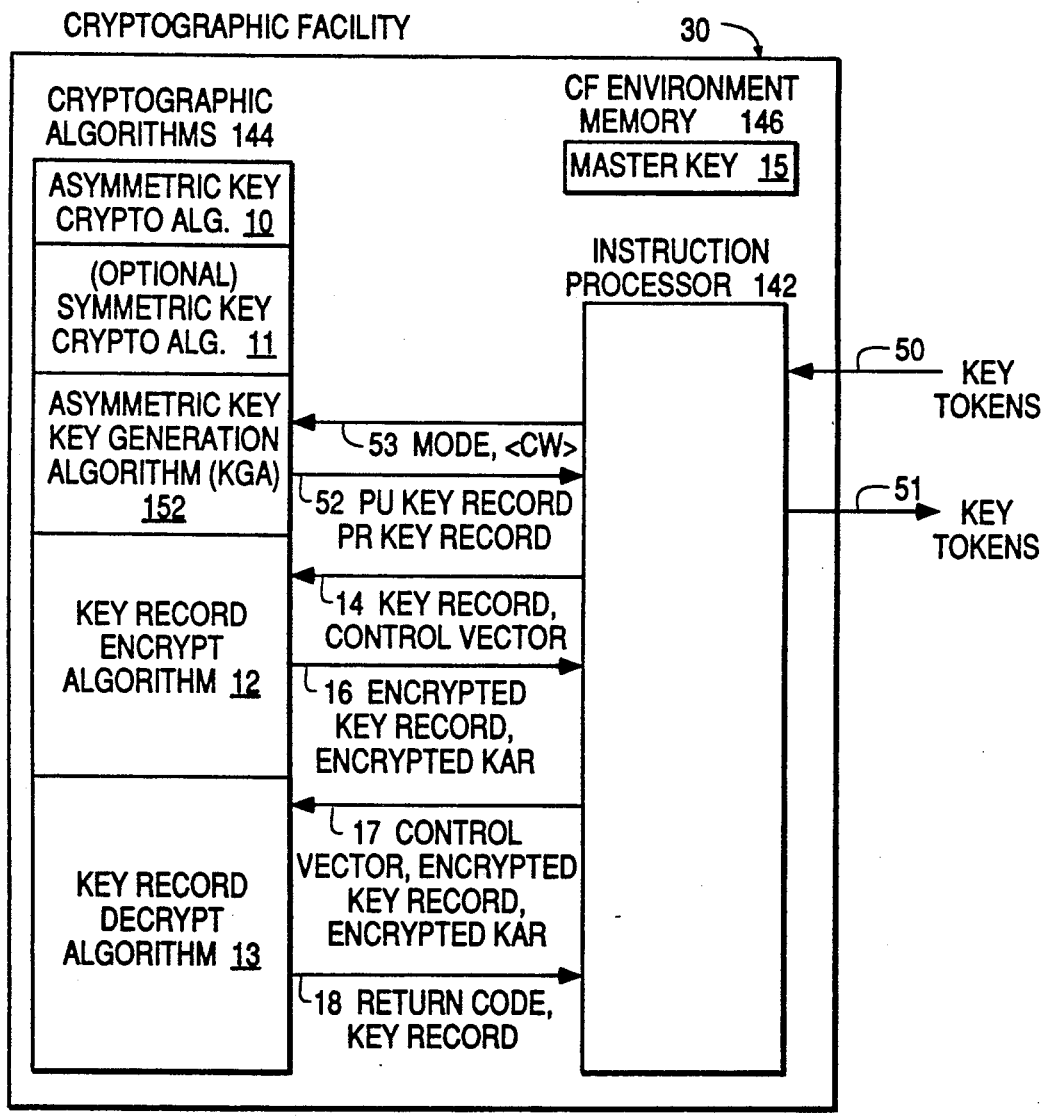
FIG. 15 is a block diagram illustration of the cryptographic algorithms 144 component of the cryptographic facility 30 containing the key record encrypt and key record decrypt algorithms.

FIG. 15 is a block diagram illustration of cryptographic facility 30 incorporating the key record encrypt and key record decrypt algorithms. Cryptographic facility 30 contains an instruction processor 142 consisting of a plurality of cryptographic instructions (not shown in FIG. 15), a CF environment memory 146 containing a master key 15, and cryptographic algorithm 144. Cryptographic algorithms 144 contains an asymmetric key cryptographic algorithm 10, an optional symmetric-key cryptographic algorithm 11, an asymmetric-key key generation algorithm 152, a key record encrypt algorithm 12, and a key record decrypt algorithm 13. Key record encrypt algorithm 12 is a low-level functions used by instruction processor 142 to encrypt a key record (PU key record or PR key record) and produce an encrypted key authenticator record (KAR), which serves to authenticate the key record and associated control vector to the cryptographic facility 30. During key generation (via the GPUPR instruction), the PU and PR key records produced by the asymmetric key key generation algorithm 152 are encrypted and then stored in key tokens constructed by the instruction processor. These key tokens are returned as outputs at 51. The key record encrypt algorithm 12 is invoked by the instruction processor 142 at 14, passing a key record and control vector. In response, key record encrypt algorithm 12 encrypts the key record with master key 15, or a variant key derived from master key 15, as explained below. Key record encrypt algorithm 12 also produces a key authenticator record (KAR) from the key record or from the control vector and key record, again as explained below. The so-produced KAR is then encrypted with master key 15, or a variant key derived from master key 15 (different from the variant key used to encrypt the key record), as explained below. Note that if the KAR was not encrypted, this might represent a security exposure, as the control vector and key record for a public key and the KAR generation algorithm are all assumed to be public knowledge. This would possibly allow substitution of a incorrect public key or incorrect control vector for the correct values, for example, in the cryptographic key data set. While the KAR for a private key may not need to be encrypted for security, in the preferred embodiment, it is encrypted to allow consistent processing of the KAR for both public and private keys. As an alternate embodiment, the KAR for the private key could just be the output of a strong cryptographic one-way function, such as the MDC-2 function described elsewhere. The encrypted key record and encrypted KAR are returned at 16 to the instruction processor 142. Key record decrypt algorithm 13 is a low-level function used by instruction processor 142 to decrypt a key record (PU key record or PR key record) and authenticate the key record and associated control vector to the cryptographic facility 30 before permitting instruction processor 142 to process or use the key in the decrypted key record. Many of the cryptographic instructions executing in the instruction processor 142 make use of cryptographic keys stored in key tokens and supplied as inputs at 50 to the instruction processor 142. Before a key can be processed or used by the instruction processor 142, it must be recovered. During key recovery, the encrypted PU and PR key records contained in the input key tokens (at 50) are decrypted and authenticated. The key record decrypt algorithm 13 is invoked at 17 by the instruction processor 142, passing a key record and control vector as inputs. In response, key record decrypt algorithm 13 decrypts the encrypt key record with master key 15, or a variant key derived from master key 15, as explained below. Key record decrypt algorithm 13 also produces a key authenticator record (KAR) from the recovered key record, or from the control vector and recovered key record, again as explained below. The key record decrypt algorithm 13 then decrypts the encrypted KAR and compares the recovered value of KAR and the generated or produced KAR for equality. If the two values of KAR are equal, the key record decrypt algorithm 13 returns the recovered key record and a return code (e.g., RC=0) indicating that the key record has been successfully authenticated via the KAR. Otherwise, if the two value of KAR are unequal, the key record decrypt algorithm 13 returns only a return code (e.g., RC=1) indicating that the key record has failed to be authenticated via the KAR.

Figure 1:
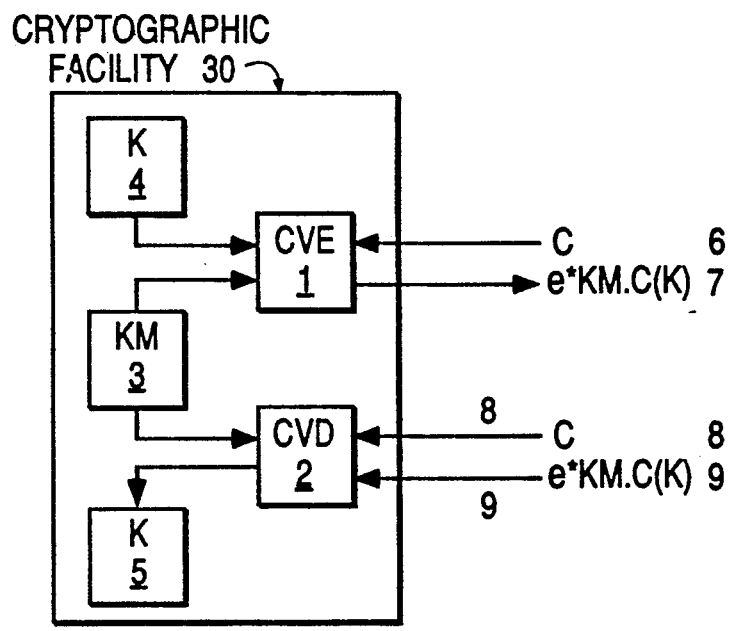
FIG. 1 is a block diagram illustration of the process to encrypting keys and decrypting keys in a DEA-based cryptographic system using the control vector encrypt (CVE) and control vector decrypt (CVD) algorithms.
Figure 2:
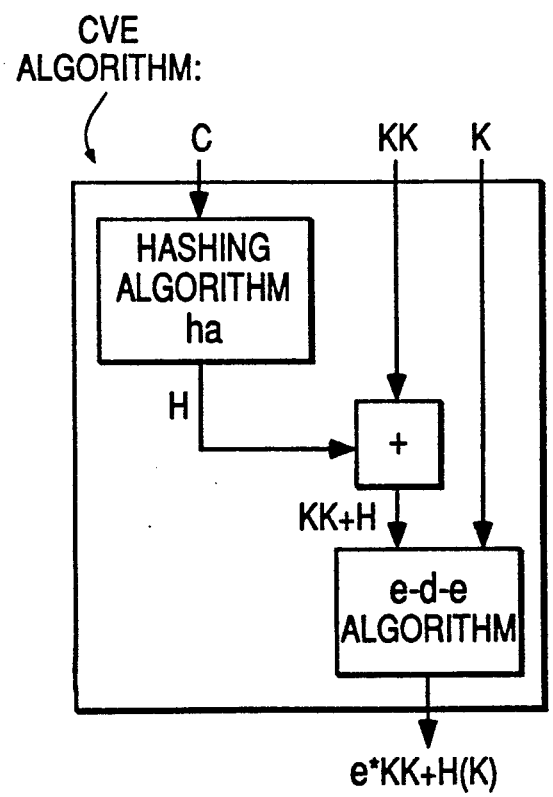
FIG. 2 is a block diagram illustration of the CVE algorithm implemented in a DEA-based cryptographic system.
Figure 3:
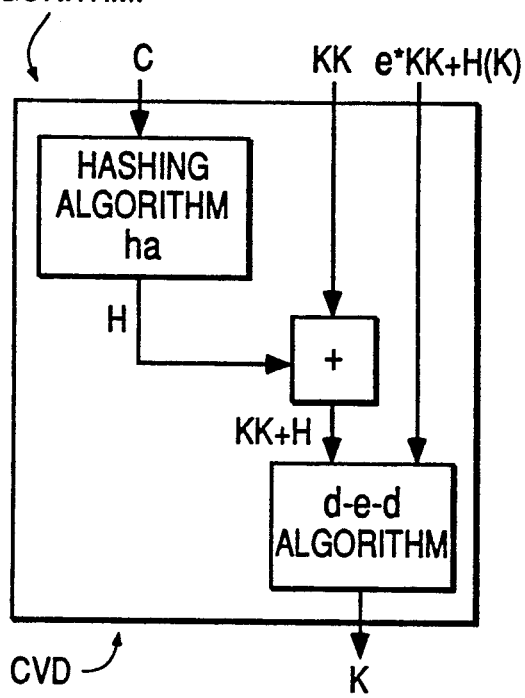
FIG. 3 is a block diagram illustration of the CVD algorithm implemented in a DEA-based cryptographic system.
Figure 4:
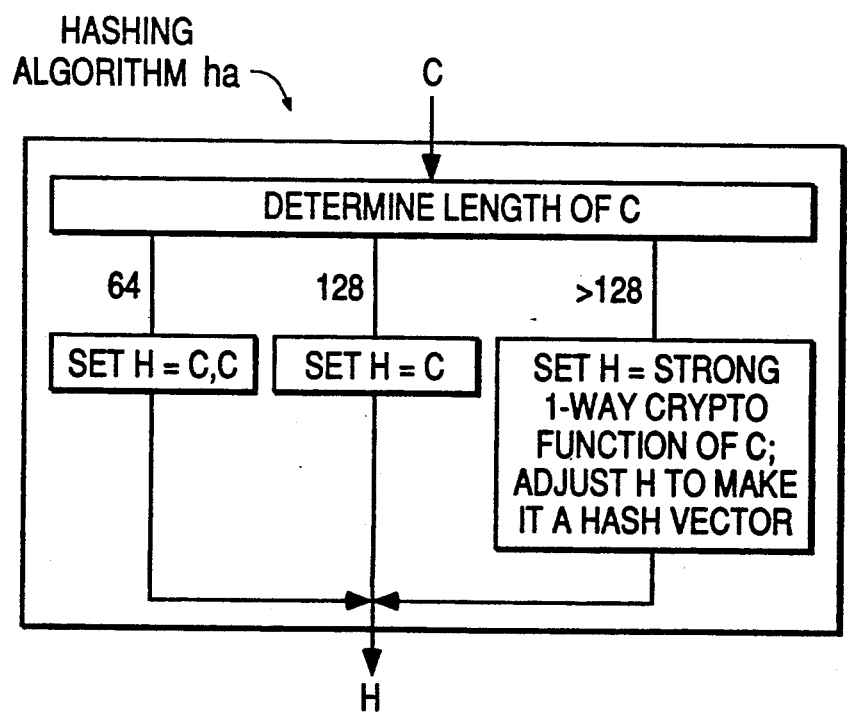
FIG. 4 is a block diagram illustration of the hashing algorithm ha implemented in the CVE and CVD algorithms of FIGS. 1, 2, and 3.
Figure 10:
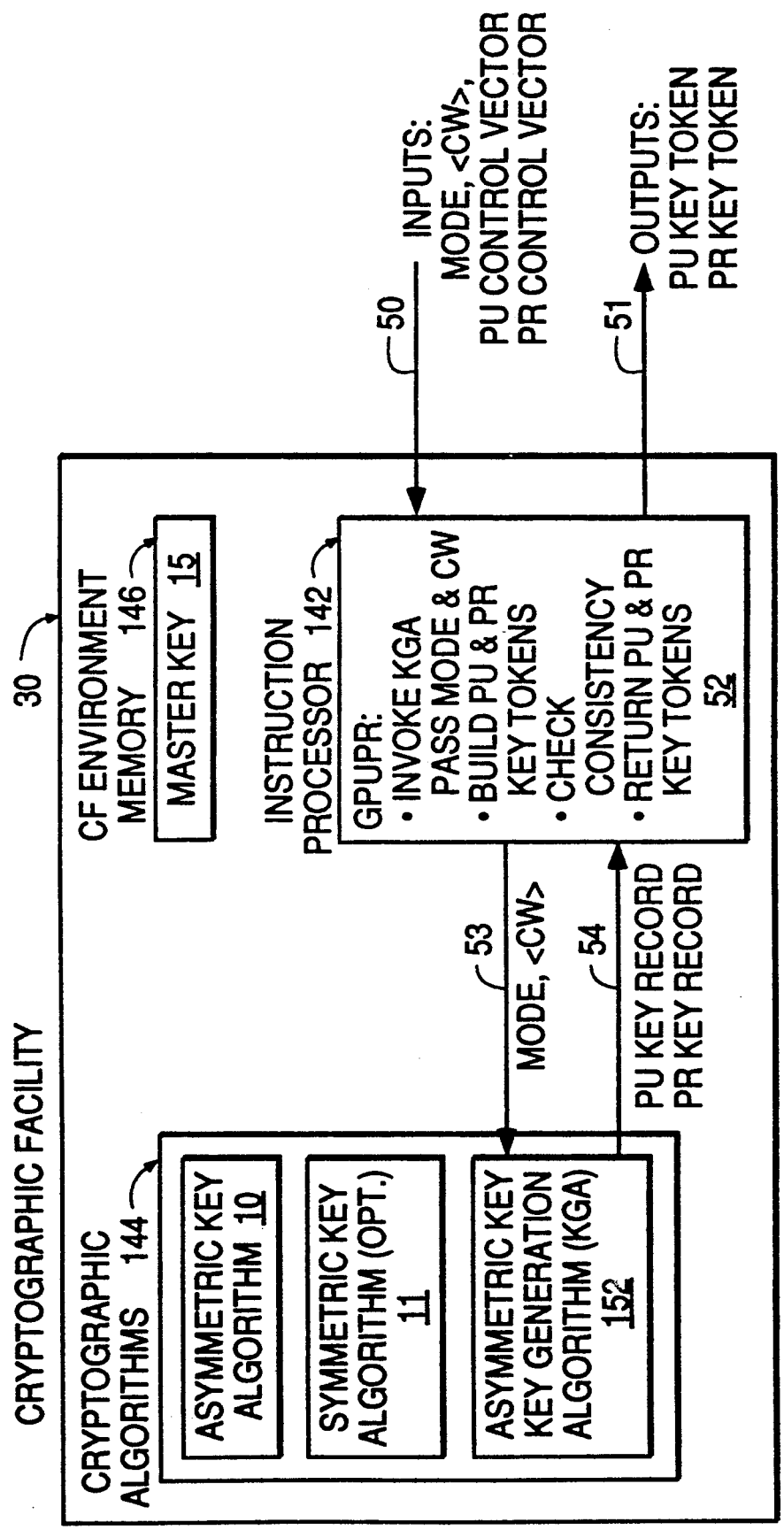
FIG. 10 is a block diagram illustration of the GPUPR instruction.
Figure 11:
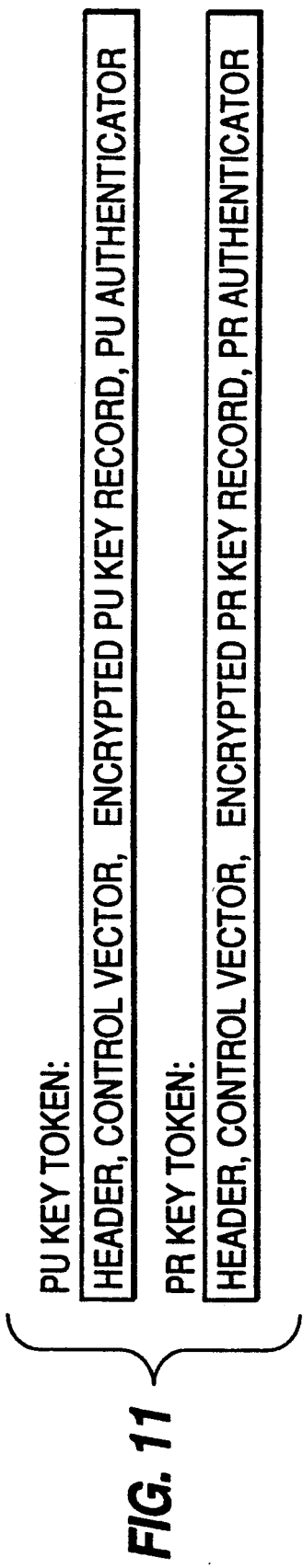
FIG. 11 illustrates the formats of the PU key token and the PR key token.
Figure 16:
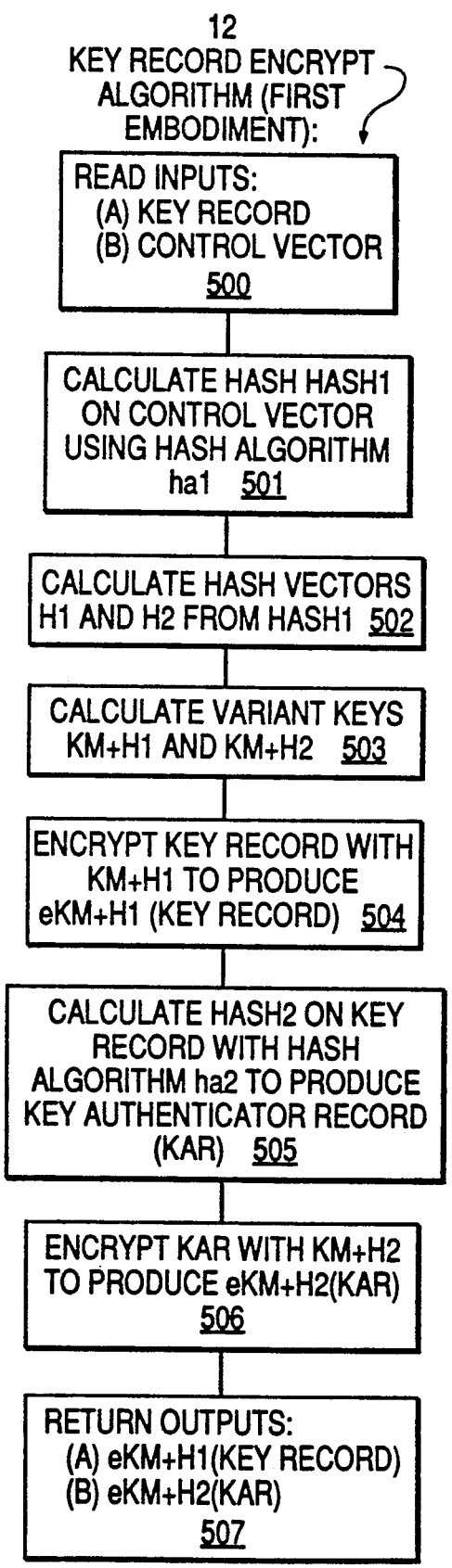
FIG. 16 is a flow diagram of a first embodiment of key record encrypt algorithm 12.

FIG. 16 is a block diagram illustration of a first embodiment of the key record encrypt algorithm 12. The first embodiment of the invention covers the case where the cryptographic system implements both a symmetric key algorithm and an asymmetric key algorithm, and where the master key used to encrypt the key records in the key token stored outside the cryptographic facility is a symmetric key KM. Referring now to FIG. 16, the inputs (a) key record and (b) control vector are read at step 500. Key record is the key record to by encrypted and control vector is key-related data, or data related to the key stored in key record. Control vector is the same control vector stored in the key token, as described in FIG. 11. At step 501, a hash value HASH1 is calculated on the control vector using hash algorithm ha1. For example, when the master key is a 128-bit DEA master key, HASH1 can be a 128-bit MDC calculated with the MDC-2 algorithm of FIG. 5. At step 502, hash vectors H1 and H2 are calculated from HASH1. For example, when the master key is a 128-bit DEA master key and H1 and H2 are both 128-bit has vectors, the procedures for calculating H1 and H2 is as follows. The 128-bit hash vector H1 is calculated from HASH1 as follows:

1. Set bit 30 of HASH1 equal to B'0'.
2. Set bit 38 of HASH1 equal to B'1'.
3. Set bit 45 . . . 46 of HASH1 equal to B'10'.
4. Set bit 62 of HASH1 equal B'0'.
5. For each byte in HASH1 (bits are numbered b0 through b7), set bit b7 so that bits b0 through b7 have an even number of one bits (i.e., to have even parity).

Bits 30 and 38 are anti-variant bits whose values are set so that the resulting hash vector H is guaranteed to be different from a variant value in which each byte of the variant has the same bit pattern. Bits 45 and 46 are set to B'10' to distinguish H1 from a 64-bit control vector (bits 45 . . . 46 equal to B'00') and a 128-bit control vector (bits 45 . . . 46 equal to B'01'). In this case, B'10' indicates that H1 has been derived from a "long" control vector whose length exceeds 128 bits. Bit 62 indicates whether the control vector is associated with a key record (B'0') or a key authenticator record (B'1'). The 128-bit has vector H2 is calculated from H1 as follows:

1. Set H2 equal to H1.
2. Set bit 62 of H2 equal to B'1'.
3. Invert bit 63 of H2 (i.e., the parity bit).

Basically, H2 differs from H1 only in that H1 is associated with a key record (bit 62 equals B'0') and H2 is associated with a key authenticator record (bit 62 equals B'1'). The parity bit is adjusted to maintain even parity. Otherwise, H1 and H2 are equal. At step 503, variant key KM+H1 is formed as the Exclusive-OR product of master key KM and has vector H1 and variant key KM+H2 is formed as the Exclusive-OR product of master key KM and control vector H2. In the event that the length of KM differs from the length of H1 and H2, H1 and H2 can be Exclusive-ORed with a portion of KM only. Those skilled in the art will recognize that a combining operation other than the Exclusive-OR operation can be performed instead of the Exclusive-OR operation, without departing from the spirit of the invention. When KM is a DEA master key of 128 bits, then the Exclusive-OR operation calculates the Exclusive-OR product of two 128-bit values, which is the straightforward way in which this operation works. At step 504, the key record supplied as input at 50 is encrypted with variant key KM+H1 to produce the encrypted key record value eKM+H1(key record). Again, those skilled in the art will recognize that many different modes of encryption can be used here, since the goal is to protect the secrecy of the key record but not necessarily to pursue one single strategy for providing an encryption capability. For example, if the variant key KM+H1 is a 64-bit DEA key, then the key record can be encrypted using the Cipher Block Chaining (CBC) mode of encryption. If the variant key KM+H1 is a 128-bit DEA key, then key record can be encrypted using a variation on the CBC mode of encryption. In that case, key record is first encrypted with CBC mode using the leftmost 64 bits of KM+H1, the result is next decrypted with CBC mode using the rightmost 64-bits of KM+H1, and finally that result is encrypted with CBC mode using the leftmost 64-bits of KM+H1. An initialization vector (IV) of zero is used throughout the encryption and decryption operations. In each case, inverse decryption operations are employed in the key record decrypt algorithm, discussed below. Those skilled in the art will recognize that encryption methods other than those illustrated here can be used without departing from the spirit of the invention. At step 505, a hash value HASH2 is calculated on key record using hash algorithm ha2. Hash algorithm ha2 may be different from hash algorithm ha1 or it may be the same. For example, hash algorithm ha2 may be the MDC-2 algorithm of FIG. 5 and HASH2 a 128-bit MDC value. The value HASH2 is for practical purposes defined to be the key authenticator record (KAR). However, the KAR may contain additional data besides HASH2. At step 506, KAR is encrypted with variant key KM+H2 t produce the encrypted KAR value eKM+H2(KAR). Again, those skilled in the art will recognize that many different modes of encryption can be used here, since the goal is to protect the integrity of the KAR by making it infeasible for an adversary to substitute an alternate value of KAR of his or her choosing. Since an adversary has no ability to exercise the encryption function using KM+H2, it is not possible to substitute an encrypted KAR value that will authenticate an encrypted key record, except by mere chance. For example, if the variant key KM+H2 is a 64-bit DEA key, then KAR can be encrypted using the Cipher Block Chaining (CBC) mode of encryption. If the variant key KM+H2 is a 128-bit DEA key, then KAR can be encrypted using a variation on the CBC mode of encryption as described above for the encryption of the key record. In each case, inverse decryption operations are employed in the key record decrypt algorithm, discussed below. Those skilled in the art will recognize that encryption methods other than those illustrated here can be used without departing from the spirit of the invention. At step 507, the calculated values (a) eKM+H1(key record) and (b) eKM+H2(KAR) are returned as outputs.

Figure 17:
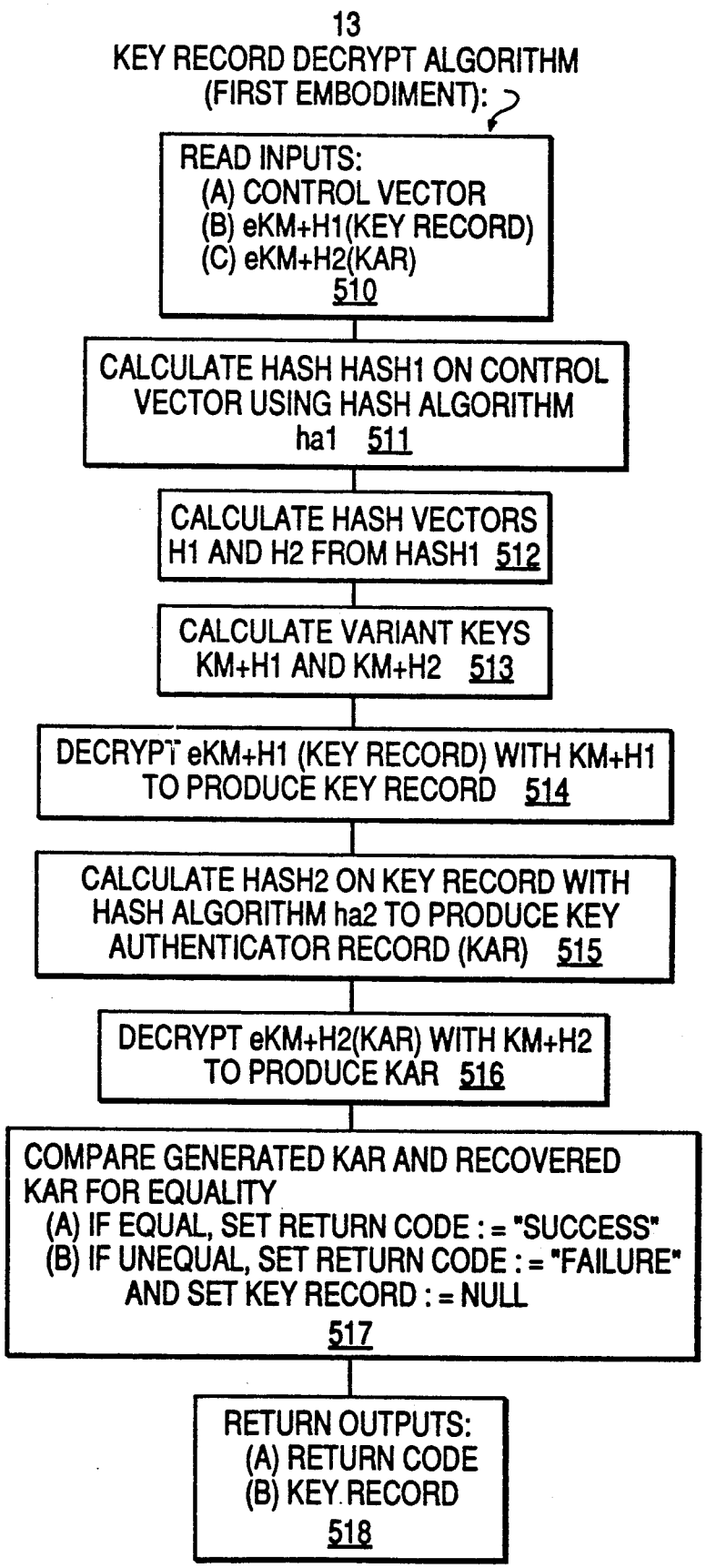
FIG. 17 is a flow diagram of a first embodiment of key record decrypt algorithm 13.

FIG. 17 is block diagram illustration of a first embodiment of the key record decrypt algorithm 13. The first embodiment of the invention covers the case where the cryptographic system implements both a symmetric key algorithm and an asymmetric key algorithm, and where the master key used to encrypt the key records in the key tokens stored outside the cryptographic facility is a symmetric key KM. The key record encrypt algorithm 12 of FIG. 16 and the key record decrypt algorithm 13 of FIG. 17 are inverse algorithms, i.e., key records encrypted with key record encrypt algorithm 12 of FIG. 16 are decrypted with key record decrypt algorithm 13 of FIG. 17. Referring now to FIG. 17, the inputs (a) control vector, (b) eKM+H1(key record), and (c) eKM+H2(KAR) are read at step 510. Control vector is key-related data, or data related to the key stored in key record. Control vector is the same control vector stored in the key token, as described in FIG. 11. eKM+H1(key record) and eKM+H2(KAR) are values produced by the key record encrypt algorithm 12 of FIG. 16. At step 511, a hash value HASH1 is calculated on the control vector using hash algorithm ha1 using the same method as described in step 501 of FIG. 16. At step 512, hash vectors H1 and H2 are calculated from HASH1 using the same method as described in step 502 of FIG. 16. At step 513, variant keys KM+H1 and KM+H2 are calculated from master key KM and hash vectors H1 and H2 using the same method as described in step 503 of FIG. 16. At step 514, the encrypted key record, eKM+H1(key record), supplied as input at 510 is decrypted with variant key KM+H1 to produce the clear value of key record. The method of decryption at step 514 of FIG. 17 is just the inverse operation of encryption at step 504 of FIG. 16. At step 515, a hash value HASH2 is calculated on key record using hash algorithm ha2. Step 515 of FIG. 17 is the same as step 505 of FIG. 16. At step 516, the encrypted KAR, eKM+H2(KAR), supplied as input at 510, is decrypted with variant key KM+H2 to produce the clear value of KAR. The method of decryption at step 516 of FIG. 17 is just the inverse operation of encryption at step 506 of FIG. 16. At step 517, the generated KAR is compared for equality with the decrypted KAR. If equal, then a return code is set equal to "success". If unequal, then a return code is set equal to "failure" and key record is set equal to null (i.e., the recovered key record is erased). At step 518, the values of (a) return code and (b) key record are returned as outputs. If the key record authenticates properly, it is returned as an output at step 518. Otherwise a null value is returned. Those skilled in the art will recognize that there are other ways in which the output values can be returned or not returned. The intent here is for key record decrypt algorithm 13 to return the recovered key record when it authenticates properly and to not return it when it does not authenticate properly. The return code could be omitted from the design, if desired, provided that a protocol is adopted wherein the key record has a special reserved value, say zero, to indicate a failure condition (a non-zero value indicates success).

Figure 18:
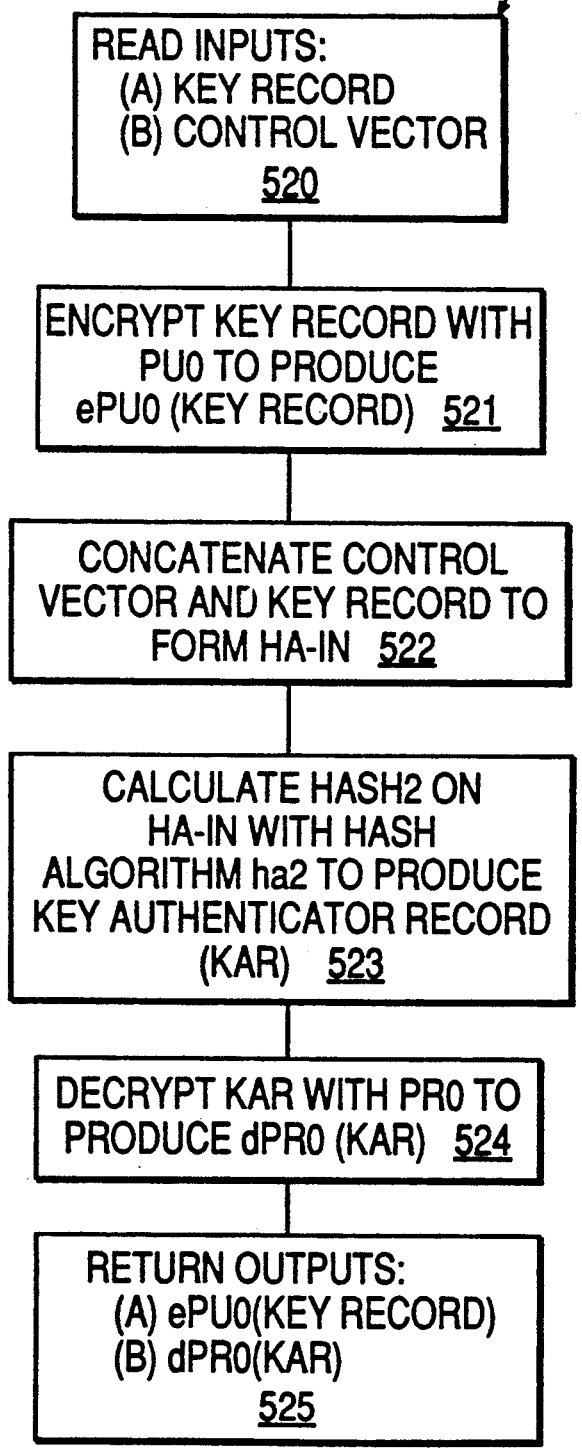
FIG. 18 is a flow diagram of a second embodiment of key record encrypt algorithm 12.

FIG. 18 is block diagram illustration of a second embodiment of the key record encrypt algorithm 12. The second embodiment of the invention covers the case where the cryptographic system implements an commutative asymmetric key algorithm, and where the master key is an asymmetric key pair (PU0,PR0). Master public key PU0 is used to encrypt key records and to verify digital signatures. Master private key PR0 is used to decrypt key records and to generate digital signatures. Referring now to FIG. 18, the inputs (a) key record and (b) control vector are read at step 520. Key record is the key record to be encrypted and control vector is key-related data, or data related to the key stored in key record. Control vector is the same control vector stored in the key token, as described in FIG. 11. At step 521, the key record supplied as input at 520 is encrypted with public master key PU0 to produce the encrypted key record value ePU0(key record). Since the length of key record may be greater than the block size (or modulus size) of the asymmetric key algorithm, an encryption means must be employed to handle "long" key records. One approach is to use a means similar to Cipher Block Chaining (CBC) mode, as defined for the DEA. In this case, key record is divided into blocks whose length is such that each block can be encrypted with the asymmetric key algorithm. After each step of encryption, the so-produced ciphertext block is Exclusive-ORed with the next block of input plaintext in key record. Those skilled in the art will appreciate that there are many ways in which the encryption with PU0 can be performed and that these various alternate means do not depart from the spirit of the invention. At step 522 control vector and key record are concatenated to form an intermediate value called HA-IN. At step 523, a hash value HASH2 is calculated on HA-IN using hash algorithm ha2. For example, hash algorithm ha2 may be the MDC-2 algorithm of FIG. 5 and HASH2 a 128-bit MDC value. The value HASH2 is for practical purposes defined to be the key authenticator record (KAR). However, the KAR may contain additional data besides HASH2. At step 524, KAR is decrypted with private master key PR0 to produce dPR0(KAR). In public key cryptography, the ciphertext dPR0(KAR) is called a digital signature. In this case, dPR0(KAR) is a digital signature on HA-IN (the concatenation of control vector and key record). At step 525, the calculated values (a) ePU0(key record) and (b) dPR0(KAR) are returned as outputs.

Figure 19:
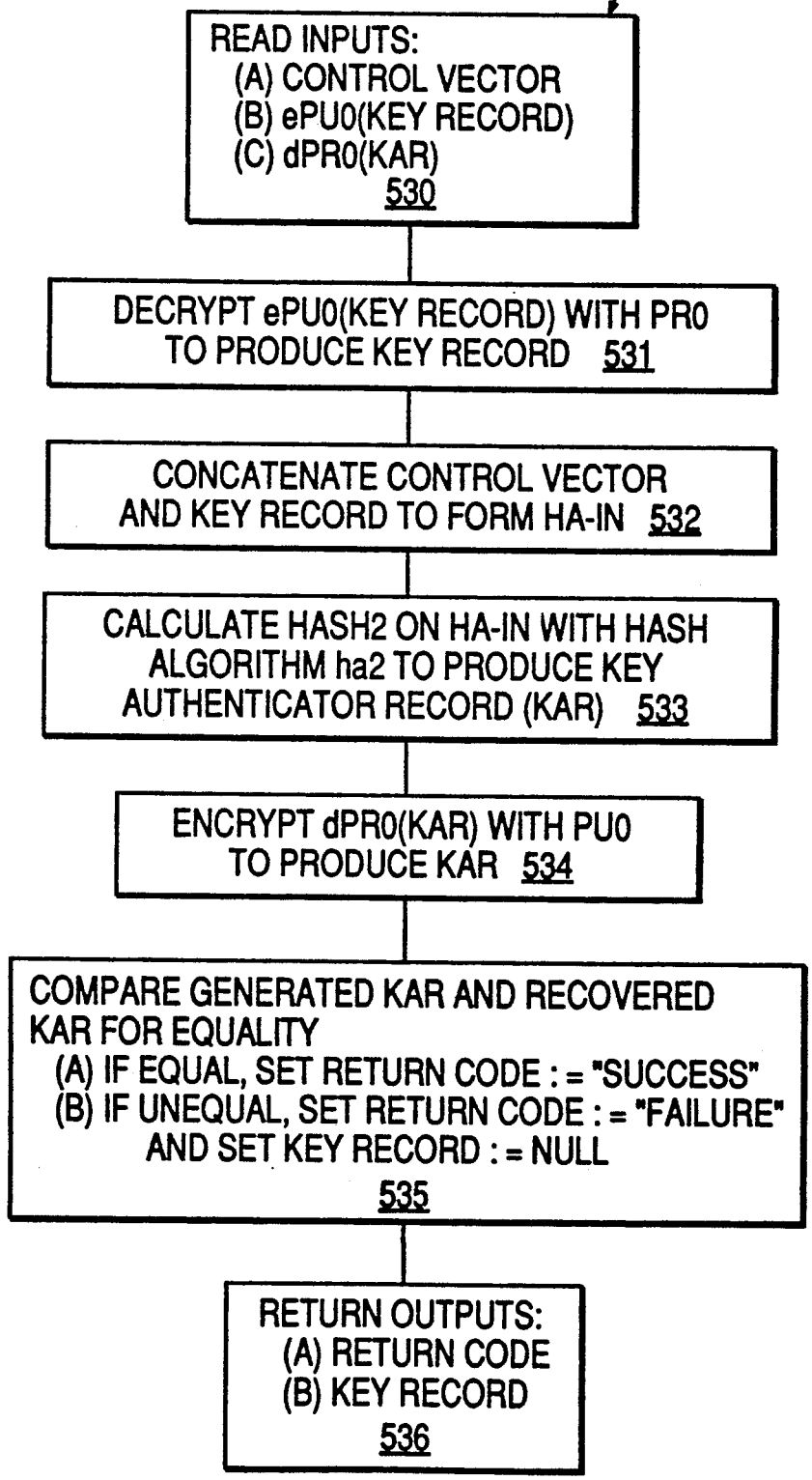
FIG. 19 is a flow diagram of a second embodiment of key record decrypt algorithm 13.

FIG. 19 is a block diagram illustration of a second embodiment of the key record decrypt algorithm 13. The second embodiment of the invention covers the case where the cryptographic system implements a commutative asymmetric key algorithm, and where the master key is an asymmetric key pair (PU0,PR0). Master public key PU0 is used to encrypt key records and to verify digital signatures. Master private key PR0 is used to decrypt key records and to generate digital signatures. The key record encrypt algorithm 12 of FIG. 18 and the key record decrypt algorithm 13 of FIG. 19 are inverse algorithms, i.e., key records encrypted with key record encrypt algorithm 12 of FIG. 18 are decrypted with key record decrypt algorithm 13 of FIG. 19. Referring now to FIG. 19, the inputs (a) control vector, (b) ePU0(key record), and (c) dPR0(KAR) are read at step 530. Control vector is key-related data, or data related to the key stored in key record. Control vector is the same control vector stored in the key token, as described in FIG. 11. ePU0(key record) and dPR0(KAR) are values produced by the key record encrypt algorithm 12 of FIG. 18. At step 531, the encrypted key record, ePU0(key record), supplied as input at 530 is decrypted with private master key PR0 to produce a clear key record. The step of decryption is just the inverse operation of encryption performed at step 521 of FIG. 18. At step 532, control vector supplied as input at 530 and key record recovered at 531 are concatenated to form an intermediate value called HA-IN. Step 532 is just the same as step 522 in FIG. 18. At step 533, a hash value HASH2 is calculated on HA-IN using hash algorithm ha2. The value HASH2 is for practical purposes defined to be the key authenticator record (KAR). However, the KAR may contain additional data besides HASH2. Step 533 is just the same as step 523 in FIG. 18. At step 534, the decrypted KAR, dPR0(KAR), is encrypted with public master key PU0 to produce a clear value of KAR (called the recovered KAR). Note that this is the step that requires the asymmetric key algorithm be commutative. At step 535, the generated KAR is compared for equality with the recovered KAR. If equal, than a return code is set equal to "success". If unequal, then a return code is set equal to "failure" and key record is set equal to null (i.e., the recovered key record is erased). At step 536, the values of (a) return code and (b) key record are returned as outputs. If the key record authenticates properly, it is returned as an output at step 536. Otherwise a null value is returned. Those skilled in the art will recognize that there are other ways in which the output values can be returned or not returned. The intent here is for key record decrypt algorithm 13 to return the recovered key record when it authenticates properly and to not return it when it does not authenticate properly. The return code could be omitted from the design, if desired, provided that a protocol is adopted wherein the key record has a special reserved value, say zero, to indicate a failure condition (a nonzero value indicating success).

Those skilled in the art will recognize that step 521 in FIG. 18 could make use of a decryption operation using the public master key PU0 and step 531 of FIG. 19 could likewise make use of an encryption operation using the private master key PR0. In like master, step 524 in FIG. 18 could make use of an encrypt operation using private master key PR0 and step 534 of FIG. 19 could make use of a decrypt operation using public master key PU0, as long as both the public key PU0 and private key PR0 remain secret. In fact, the choice of encrypt or decrypt at step 521 of FIG. 18 is independent of the choice of encrypt or decrypt at step 524 of FIG. 18, so that alternate embodiments of the invention can make use of these alternate schemes of encryption versus decryption or decryption versus encryption. And those skilled in the art will recognize that these alternate embodiments do not depart from the spirit of the invention.

Those skilled in the art will also recognize that the key record encrypt algorithm 12 of FIG. 18 and the key record decrypt algorithm 13 of FIG. 19 could make use of a symmetric master key KM instead of a public and private master key (PU0,PR0). In that case, all operations performed with PU0 and PR0 are instead performed with KM. In an alternate approach, variant keys KM1 and KM2 (not equal to KM1) can be used as the master key. In this case, KM1 is used in place of PU0 and KM2 is used in place of PR0. This provides a form of cryptographic separation between the encryption and authentication components of the design. Thus, encryption of the key record is performed with KM1 and encryption of the KAR is performed with KM2. Those skilled in the art will appreciate that these alternate embodiments do not depart from the spirit of the invention.

Figure 20:
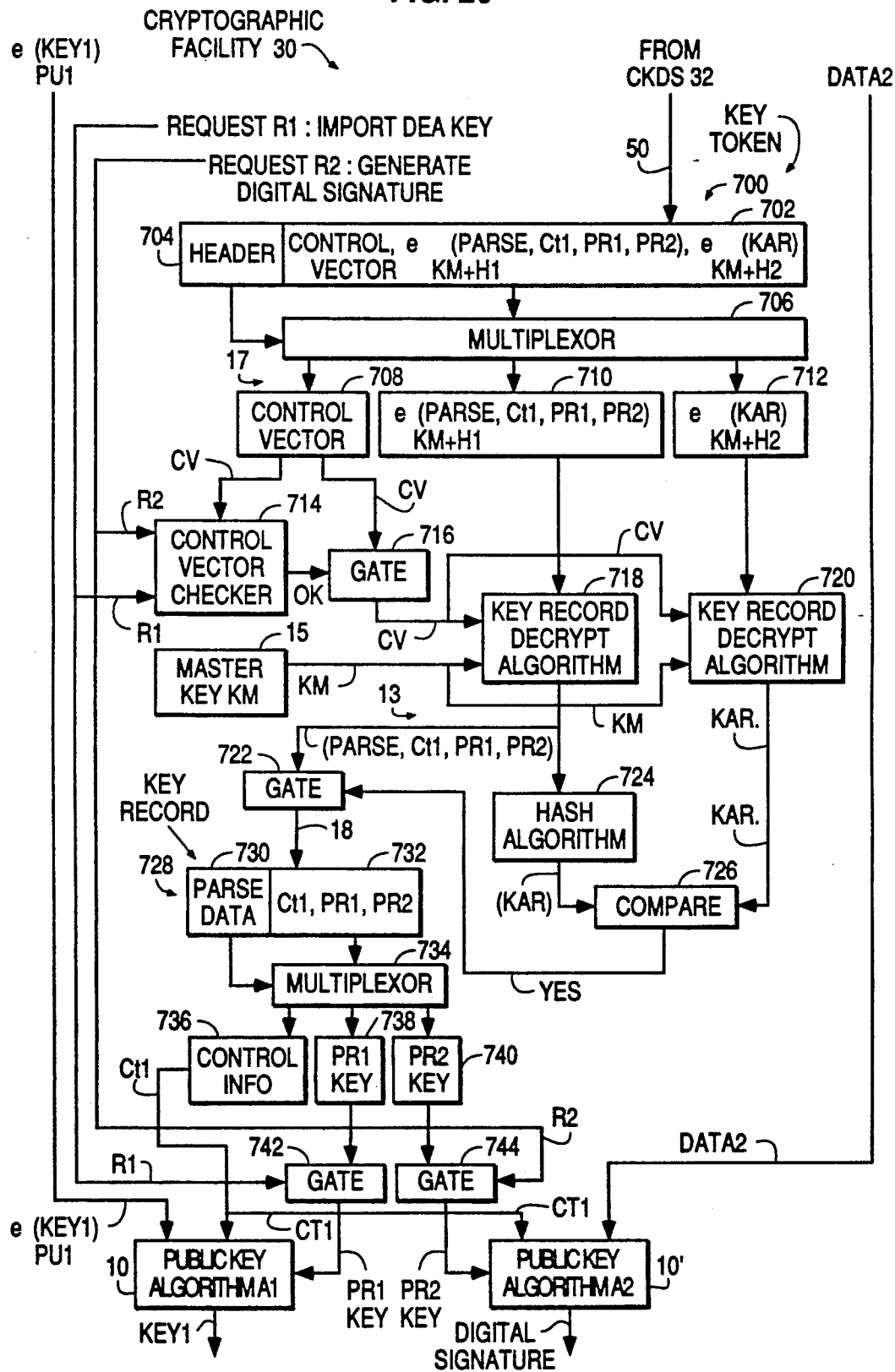
FIG. 20 is a functional block diagram illustrating the recovery of two private keys and their use in two public key algorithms to fulfill two different cryptographic service requests.

FIG. 20 shows a functional block diagram of the cryptographic facility 30, for recovering a plurality of public and/or private keys from a key token for use in a plurality of public key algorithm, in response to a plurality of diverse cryptographic service requests. In particular, FIG. 20 depicts how two private keys, PR1 and PR2 can be recovered from a key token accessed from the cryptographic key data set CKDS 32 for use in two different public key algorithms, to fulfill two different cryptographic service requests. The first request R1 is to import the encrypted DEA key ePU1(key1), which was encrypted under a first public key PU1, and decrypt the key under the corresponding private key PR1 to obtain key1, using a first public key algorithm A1. The second request R2 is to generate a digital signature from Data2 under a second private key PR2, using a second public key algorithm A2.

The key token is input from the CKDS on line 50 to the key token register 700, with the header portion in the component register 704 and the concatenated control vector CV, encrypted key record eKM+H1(parse,Ct1,PR1,PR2) and encrypted key authentication record eKM+H2(KAR) in the component register 702. The header in register 704 defines the beginning and ending of the control vector, the encrypted key record and the encrypted key authentication record in register 702. The header register 704 output is connected to a control input of the multiplexor 706, which separates the control vector for output over line 17 to the control vector register 708, which separates the encrypted key record for output to the encrypted key record register 710 and which separates the encrypted key authentication record for output to the encrypted key authentication register 712.

The control vector checker 714 receives the control vector CV from the register 708. If the Import DEA Key request R1 is the cryptographic service request which has been made, then the control vector checker receives R1 and performs the checking operations on CV to ensure that the key record contains a key which is permitted to be applied to this use. If CV satisfies the control vector checker 714, then an enabling signal "ok" is sent to the gate 716, whose data input is connected to the output of the control vector register 708, passing CV to the control vector input of the key record decrypt algorithm 718 and 720. If CV fails to pass the checks by the control vector checker 714, then the process is aborted.

Alternately, if the Generate Digital Signature request R2 is the cryptographic service request which has been made, then the control vector checker receives R2 and performs the checking operations on CV to ensure that the key record contains a key which is permitted to be applied to this use. If CV satisfies the control vector checker 714, then an enabling signal "ok" is sent to the gate 716, whose data input is connected to the output of the control vector register 708, passing CV to the control vector input of the key record decrypt algorithm 718 and 720. If CV fails to pass these checks by the control vector checker 714, then the process is aborted.

The key record decrypt algorithm 13 in the flow diagram of FIG. 17 is executed by the functional blocks 718, 720, 722, 724, and 726 of FIG. 20. Two functional blocks, 718 and 720, are arranged in parallel and are labeled "Key Record Decrypt Algorithm", in FIG. 20, to provide a clear description of the decryption operations on the encrypted key record and on the encrypted key authentication record. However, in the preferred embodiment of the invention, the two functional blocks 718 and 720 would be combined into a single Key Record Decrypt Algorithm which would operate sequentially on the encrypted key record and on the encrypted key authentication record. Doing so enables second hash vector H2 to be produced from first hash vector H1 by changing only a single bit in H1. The key record decrypt algorithm 718 receives CV and performs the hashing operation described in steps 511 and 512 of FIG. 17, producing the hash vector H1. The master key KM is input from register 15 and the exclusive OR product with H1 is formed, yielding the variant key KM+H1, as described in step 513 of FIG. 17. The second key record decrypt algorithm 720 receives CV and performs the hashing operation described in steps 511 and 512 of FIG. 17, producing the second hash vector H2. The master key KM is input from register 15 and the exclusive OR product with H2 is formed, yielding the second variant key KM+H2, as described in step 513 of FIG. 17. The first key record decrypt algorithm 718 then uses the variant key KM+H1 to decrypt the encrypted key record, as described in step 514 of FIG. 17, yielding the key record (parse,Ct1,PR1,PR2). The key record from key record decrypt algorithm 718 is input to the hash algorithm 724, to produce the computed key authentication record (KAR), as described in step 515 of FIG. 17. Then the computed key authentication record (KAR) is input to a first side of the comparator 726. The second key record decrypt algorithm 720 uses the variant key KM+H2 to decrypt the encrypted key authentication record, as described in step 516 of FIG. 17, yielding the key authentication record KAR. Then the key authentication record KAR is input to a second side of the comparator 726. If the comparator 726 determines that the computed (KAR) is equal to the decrypted KAR, then an enabling signal "yes" is output to a control input of the gate 722, to pass the key record (parse,Ct1,PR1,PR2) from the first key record decrypt algorithm 718 to the key record register 728.

The key record is input to the key record register 728 over line 18, with the parse data in a first component register 730 and the concatenated control information Ct1, first private key PR1 and second private key PR2 in a second component register 732. The parse data in register 730 defines the beginning and ending of the control information Ct1, the first private key PR1 and the second private key PR2 in register 732. The parse data register 730 output is connected to a control input of the multiplexor 734, which separates the control information Ct1 for output through register 736 to the public key algorithms 10 and 10', which separates the first private key PR1 for output through register 738 to the gate 742 and which separates the second private key PR2 for output through register 740 to the gate 744.

Gate 742 has a control input connected to receive the Import DEA Key request signal R1, which enables the passing of the first private key PR1 to the first public key algorithm A1 at 10. The encrypted DEA key ePU1(key1) which was encrypted under a first public key PU1, is input to the operand input of the first public key algorithm A1. The control information Ct1 input to the first public key algorithm A1 describes the key type for the first private key PR1 (i.e., specifies PR1 is a decryption key). Using the first private key PR1, the public key algorithm A1 at 10 decrypts the encrypted DEA key ePU1(key1), which was encrypted under a first public key PU1, to obtain the clear text key1.

Gate 744 has a control input connected to receive the Generate Digital Signature request signal R2, which enables the passing of the second private key PR2 to the second public key algorithm A2 at 10'. The clear text Data2 expression is input to the operand input of the second public key algorithm A2. The control information Ct1 input to the second public key algorithm A2 describes the key type for the second private key PR2 (i.e., specifies PR2 is a decryption key). Using the second private key PR2, the public key algorithm A2 at 10' "decrypts" the clear text Data2 expression to obtain the requested digital signature.

Alternate embodiments of the functional block diagram of FIG. 20 can include providing a single key record decrypt algorithm which sequentially performs the functions of algorithms 718 and 720. Another alternate embodiment can include providing a single public key algorithm which sequentially performs the functions of algorithms 10 and 10'. Another alternate embodiment can include storing Key1 in a key block and receiving and processing the key in the encrypted form ePU1(key block). In that case, the output from public key algorithm A1 is a key block containing Key1. Another alternate embodiment eliminates the control information in the key record specifying that the key is a private key or a public key. Instead, the public key algorithms A1 and A2 include a control line indicating encryption or decryption, which is set by cryptographic facility 30 on the basis of the type of cryptographic operation requested. For example, for requests R1 and R2, cryptographic facility 30 will know that the key record contains a private key and that decryption with the private key is required. Thus, a decryption signal can be sent on the control line to the public key algorithms, A1 and A2.

Key Tokens and Key Units

Figure 21:
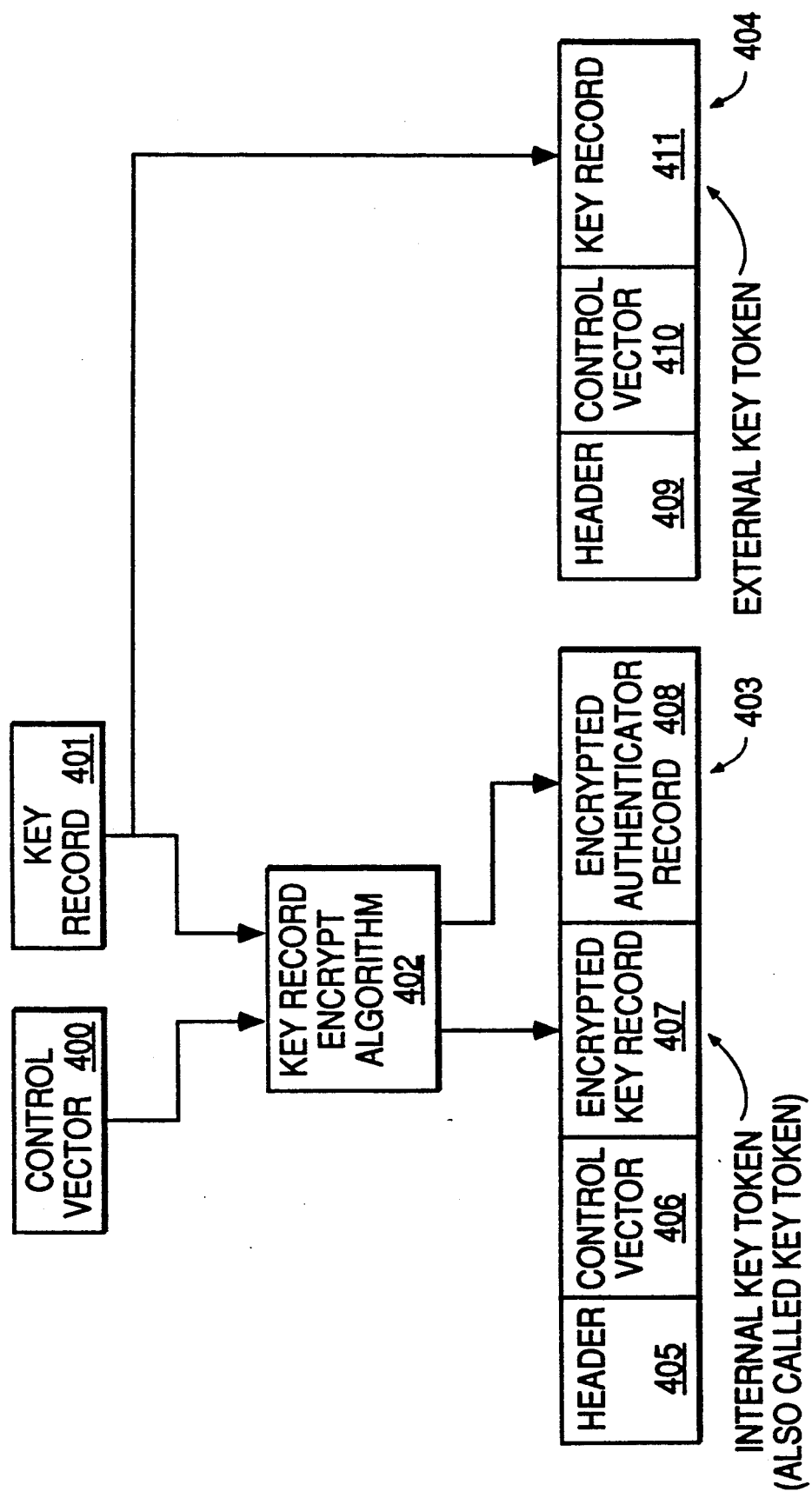
FIG. 21 is a block diagram showing the production of an internal key token from a key record and the production of an external key token from a key record.

Thus far the described invention has taught that a key token is produced within the cryptographic facility (CF) 30 from a control vector and a key record, as shown in FIG. 21, and the so-produced key tokens are stored outside CF 30 in a cryptographic key data set 32. Referring to FIG. 21, a key record 401 and associated control vector 400 are stored either in an internal key token 403 or an external key token 404. That is, a key token is either an internal key token (also referred to as a key token, i.e., without the modifier 'internal') or an external key token. An Internal Key Token 403 consists of a header 405, a control vector 406, and encrypted key record 407, and an encrypted authenticator 408. The encrypted key record 407 and encrypted authenticator record 408 are produced via key record encrypt algorithm 402, using as inputs control vector 400 and key record 401. Control vector 406 in internal key token 403 is just a copy of control vector 400, which is the control vector associated with key record 401. Key record encrypt algorithm 402 is the same key record encrypt algorithm 12 of FIG. 15. An External Key Token 404 consists of a header 409, a control vector 410, and a key record 411 (i.e., a clear key record). Control vector 410 in external key token 404 is just a copy of control vector 400, which is the control vector associated with key record 401. A key record is either a public key record (i.e., PU key record) or a private key record (i.e., PR key record). Likewise, an internal key token is either a internal PU key token or a internal PR key token, depending on whether the key token contains a PU key record or a PR key record, respectively, and an external key token is either an external PU key token or an external PR key token, depending on whether the key token contains a PU key record or a PR key record, respectively.

Figure 22:
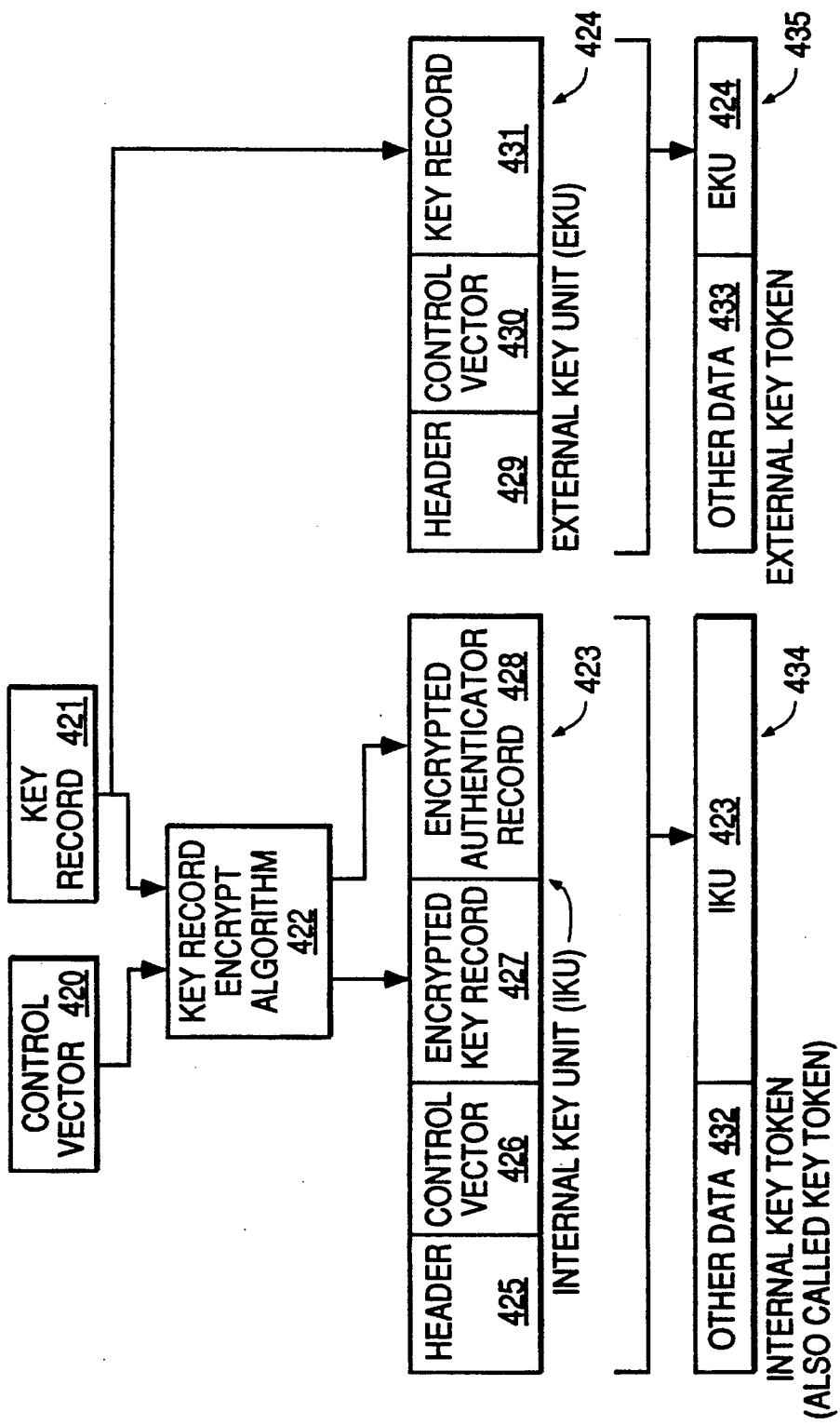
FIG. 22 is a block diagram showing the production of an internal key token from an internal key unit produced from a key record and the production of an external key token from an external key unit produced from a key record.

However, it may be advantageous to permit the cryptographic facility access program (CFAP) 34 to store key-related information in the key token, not directly available to the CF 30 and therefore not convenient or possible for the CF 30 to store in the key token. Thus, it may be more practical for the CFAP 34 to add certain information fields to the key token once the key token is returned to the CFAP 34 as an instruction output. In such situations where the CFAP is permitted to add information to the key token, a new set of terminology is introduced, as illustrated in FIG. 22. Thus, the internal key token 403 in FIG. 21 becomes internal key unit 423 in FIG. 22, and external key token 404 in FIG. 21 becomes external key unit 435 in FIG. 22. Likewise, control vector 400, key record 401, and key record encrypt algorithm of FIG. 21 are just control vector 420, key record 421, and key record encrypt algorithm 422 of FIG. 22. Likewise, header 405, control 406, encrypted key record 407 and encrypted authenticator record 408 of FIG. 21 are just header 425, control vector 426, encrypted key record 427, and encrypted authenticator record 423 of FIG. 22. Likewise header 409, control vector 410 and key record 411 of FIG. 21 are just header 429, control vector 430 and key record 431 of FIG. 22. Referring again to FIG. 22, internal key token 434 contains IKU 423 as well as other data 432 supplied by CFAP 34. Likewise, external key token 435 contains EKU 424 as well as other data 433 supplied by CFAP 34. Where convenient, the terminology IKU (i.e., internal key unit) and EKU (i.e., external key unit) will be used in lieu of internal key token and external key token when it is necessary to refer to quantities produced by CF 30.

Public Key Cryptographic Design

Full features and apparatus of the invention, which is referred to herein as the Public Key Cryptographic Design (PKCD), are now described. The reader will appreciate that the methods used for key record encryption and decryption described earlier are essential for coupling the usage control to a key in a public key cryptosystem. The reader will also notice that although alternate embodiments have been discussed earlier for key record encryption and decryption, only the first embodiment of FIG. 16 and FIG. 17 is incorporated in the PKCD.

COMPONENTS OF THE CRYPTOGRAPHIC FACILITY

The Cryptographic Facility contains three major components:
Instruction Processor
Cryptographic Algorithms
CF Environment

Instruction Processor

FIG. 23 is a block diagram illustration of the components of the Instruction Processor. They are:
Instructions: The CF instructions are invoked at the CFAP-To-CF interface. They provide the following cryptographic services to the CFAP:
System Digital Signatures
Application Digital Signatures
Key Management
CKDS Update
CF Backup
CF Audit
CF Initialization
CF Configuration
CF Control
Utility Internal Routines: The internal routines are invoked only from within the CF. Collectively they represent a set of algorithms and processing functions that are common to many CF instructions. The internal routines have been specified to simplify the architectural description and definition, and to make each instruction's functional specification precise and less apt to contain errors and ambiguities. Although the internal routines are an integral part of the instruction functional specifications, an implementer may elect to implement the instructions and internal routines in a way that best suits or optimizes the particular implementation.

Configuration Table: The Configuration Table is a collection of constants that may vary in value from one implementation to another. The Configuration Table permits the Instructions and Internal Routines to be defined in a more general and open-ended way. Unlike the CF Environment, the Configuration Table is an integral part of the CF (e.g. hardware or ROS microcode).

FIG. 24 is a block diagram illustration of the elements in the Configuration Table.

Cryptographic Algorithms

FIG. 25 is a block diagram illustration of the main components of Cryptographic Algorithms of the CF.

The Cryptographic Algorithms components are these:

Data Encryption Algorithm (DEA): The DEA is described in the American National Standards Institute (ANSI) Data Encryption Algorithm (DEA) X3.92-1981. The DEA is a symmetric algorithm which encrypts or decrypts a 64 bit input with a 64 bit key to produce a 64 bit output. The 64 bit key specified to the algorithm consists of 56 key bits used by the algorithm and 8 non-key bits, which optionally may be used for error detection. According to ANSI X3.92-1981, the 8 non-key bits *may* be used for error detection. On the other hand, according to FIPS PUB 46, the 8 non-key bits *shall* be used for error detection and more specifically the error detection is based on byte-by-byte odd parity. Although the Symmetric Key Cryptographic Algorithm can be an optional component of the Cryptographic algorithms 144 shown in FIG. 15, the DEA is a required component in the PKCD, as it is needed for key record encryption and decryption.

Public Key Algorithm (PKA): PKA is a generic term referring to one of several possible public key algorithms. The PKCD does not specify the use of a particular PKA. However, the PKA must permit key distribution to be based on a key server concept wherein a DEA key, randomly generated and encrypted with a public key of a receiving device, is served to a receiving device where it is decrypted with the private key of the receiving device and reencrypted under the master key. The PKA must also permit generation and verification of digital signatures. A digital signature is produced by decrypting a signature record, containing a hash value, with a private key. A digital signature is verified by encrypting the signature with a public key and comparing hash values. The PKCD also permits key distribution with a first PKA and digital signatures to be implemented with a second PKA.

Public Key Algorithm Key Generator (PKAKG): PKAKG is a separate algorithm for the generation of keys used by the PKA.

Besides the main components, there are lower level algorithms, such as Key Record Encryption and Key Record Decryption algorithms needed for frequent encryption and decryption of public and private keys, as discussed earlier.

CF Environment

FIG. 26 is a block diagram illustration of the components of the CF Environment.

The CF Environment components are these:

Configuration Vector: The configuration vector is a collection of encoded fields that limit or restrict the operation of the cryptographic facility. The configuration vector is set to a default value via execution of the Enter Initialization State (EIS) instruction, or it may be set to an installation-specified value via execution of the Load Configuration Vector (LCV) instruction.

State Vector: The state vector is a collection of flags and state variables that define the current state of the cryptographic facility. The state vector is used by the instruction processor to control the order in which PKCD instructions are executed.

Registers: The registers contain space for the storage PKCD cryptovariables, including keys, MDC values, internal counters, identifiers, and control vectors.

MDC Table: The MDC table contains space for the storage of Modification Detection Codes (MDCs) used by the Import Public Keys (IPUK) instruction to import External Key Units. Each table entry is an MDC calculated on an External Key Unit using a hash algorithm.

Counter Table: The Counter table contains space for the storage of counters, where each counter is associated with a particular PKCD instruction. Counter(i) contains a value "n" from 1 to 255, set by the SEF instruction, which represents the number of times instruction "i" is permitted to be executed.

cfpkr1-length: The length of cfpkr1 in 8-byte blocks. cfpkr1 is stored in the PUA Buffer and contains the Public Device Authentication Key (PUA).

PUA Buffer: The PUA buffer contains space for the storage of cfpkr1, which contains PUA. The PUA buffer is used only by the PKCD instructions.

cfpkr2-length: The length of cfpkr2 in 8-byte blocks. cfpkr2 is stored in the PRA Buffer and contains the Private Device Authentication key (PRA).

PRA Buffer: The PRA buffer contains space for the storage of cfpkr2, which contains PRA. The PRA buffer is used only by the PKCD instructions.

Secret Product Environment Length: The length of the secret product environment in bytes.

Secret Product Environment: The secret product environment consists of a set of the secret cryptographic variables unique to a product or implementation. That is, secret cryptographic variables not specified by PKCD but needed by a product.

Nonsecret Product Environment Length: The length of the nonsecret product environment in bytes.

Nonsecret Product Environment: The nonsecret product environment consists of a set of the nonsecret cryptographic variables unique to a product or implementation. That is, nonsecret cryptographic variables not specified by PKCD but needed by a product.

EKU Length: The length in bytes of the EKU in the EKU buffer.

EKU Buffer: A buffer for the temporary storage of an External Key Unit (EKU) (e.g., an EKU loaded into the CF via an interface other than the CFAP-to-CF interface).

GKSP Save: A field used by process-mode=1 of the Generate Key Set Pair (GKSP) instruction to save information needed by process-mode=2 of the GKSP instruction.

GKSP Buffer Length: The length of GKSP Buffer in bytes.

GKSP Record Length: The length of record or block in GKSP Buffer in bits.

GKSP Buffer Flag: A flag indicating the status of the record or block in GKSP Buffer, as follows:

4-255: reserved
3: GKSP Buffer contains a record of unspecified format that must be processed to produce a keyblk which is then encrypted.
2: GKSP Buffer contains a keyblk of unspecified format that needs only to be encrypted.
1: GKSP Buffer contains a CF DEA Key Record.
0: GKSP Buffer is empty.

GKSP Ticket: An 8-byte pseudorandom value generated via execution of process-mode=1 of the GKSP instruction.

GKSP Buffer: A buffer for the storage of a key record or key block.

IDK Save: A field used by process-mode=1 of the Input DEA Key (IDK) instruction to save information needed by process-mode=2 of the IDK instruction.

IDK Buffer Length: The length of IDK Buffer in bytes.

IDK Record Length: The length of record or block in IDK Buffer in bits.

IDK Buffer Flag: A flag indicating the status of the record or block in IDK Buffer, as follows:
4-255: reserved
3: IDK Buffer contains a record of unspecified format recovered from a keyblk of specified format recovered by process-mode=1 of the IDK instruction by decrypting ePUM(keyblk).
2: IDK Buffer contains a keyblk of unspecified format recovered by process-mode=1 of the IDK instruction by decrypting ePUM(keyblk).
1: IDK Buffer contains a CF DEA Key Record.
0: IDK Buffer is empty.

IDK Ticket: An 8-byte pseudorandom value generated via execution of process-mode=1 of the IDK instruction.

IDK Buffer: A buffer for the storage of a key record of key block.

Configuration Vector

The configuration vector has the following specification:

```
CONFIGURATION VECTOR:
  bits
  00..07 Version Number
    X'00':reserved
    X'01':PKCD
    X'10-X'FF':reserved
  08..151 DEFINE field
    The DEFINE field is a vector indexed as DEFINE(i)
      for i = 0,1, ..., 143.
    For i = 0,109 DEFINE(i) is reserved.
    For i = 110,111, ..., 143 DEFINE(i) pertains to the
      instruction of the PKCD.
```

DEFINE(i) for i=110, ..., 143 has the following meaning:
B'1': instruction is defined to the CF in the "run" state
B'0': instruction is not defined to CF in the "run" state
Note: DEFINE(i) for i=110, ..., 143 pertains only to execution of instructions in the "run" state.
A list of the instructions and their corresponding indices are provided in FIG. 27.

```
152..295 AUTH CONTROL field
  The AUTH CONTROL field is a vector indexed as
    AUTH CONTROL(i) for i = 0,1, ..., 143.
  For i = 0,1, ..., 109 AUTH CONTROL(i) is reserved.
  For i = 110, ..., 143 AUTH CONTROL(i) pertains to the
    instructions of PKCD.
```

AUTH CONTROL(i) has the following meaning:
B'1': the LCV instruction sets AUTH(i)=B'1' and ENABLE(i)=B'11' (i.e., "authorization required" & "disabled").
B'0': the LCV instruction sets AUTH(i)=B'0' and ENABLE(i)=B'00' (i.e., "authorization required" & "enabled").
A list of the instructions and their corresponding indices are provided in FIG. 27.

```
296 CERTIFICATION
  B'1': certification center (the device can act as a
    certification center)
  B'0': not a certification center (the device cannot act
    as a certification center ). This means the following:
    Generate Public and Private Key Pair (GPUPR) cannot
    generate a certification key pair;
    a PRC key cannot be used with the
    Generate Digital Signature (GDS),
    Generate Application Digital Signature (GADS),
    and/or Export Public Key (EPUK) instructions to
    generate a digital signature.
297 KMP RELOAD
  B'1': if CKMP HISTORY in state vector = 0, then KMP-
    mode = 1 must be specified in the ECFER instruction
    (i.e., the PKA Key Encrypting Master Key (KMP) must
    be reloaded at the receiving device).
  B'0': no restrictions
```

Note that this field pertains only to the ECFER instruction.

```
298 KM RELOAD
  B'1': (reserved for future use) if CKM HISTORY in state
    vector = 0, then KM-mode = 1 must be specified in the
    ECFER instruction
    (i.e., the DEA key encrypting master key KM
    must be reloaded at the receiving device).
  B'0': no restrictions
```

Note: this field pertains only to the ECFER instruction.

Note: the LCV instruction sets this bit=B'0', which guarantees that present system shall be compatible with future releases implementing the KM RELOAD bit.

```
299..300 FLOOR-MDC field
  The FLOOR-MDC field specifies the following:
  a. The minimum THRES-MDC value that may be specified in the PRM
    control vector in the GPUPR instruction.
  b. The minimum HIST-MDC value in the PUA control vector that
    can be processed by the ECFER and ICFER instructions.
  The FLOOR-MDC field has the following meaning:
    B'11': The referenced THRES-MDC or HIST-MDC must have a value =
      B'11.
    B'10': The referenced THRES-MDC or HIST-MDC must have a value ≧
      B'10.
    B'01': The referenced THRES-MDC or HIST-MDC must have a value ≧
      B'01.
    B'00': reserved
```

Note that the FLOOR-MDC field controls the processing of PU keys in the GPUPR, ECFER, and ICFER instructions.

301..302 KMGT PROTOCOL (i.e., key management protocol via the GKSP and IDK instructions).
  B'11': CKMGT & PKMGT (i.e., certification center and private key management protocols are enabled).
  B'10': CKMGT (i.e., certification center key management protocol is enabled)
  B'01': PKMGT (i.e., private key management protocol is enabled)
  B'00': none a) KMGT PROTOCOL=B'11' means that the key-management-protocol parameter in the GKSP and IDK instructions may by 0 or 1.
b) KMGT PROTOCOL=B'10' means that the key-management-protocol parameter in the GKSP and IDK instructions may only be 1.
c) KMGT PROTOCOL=B'01' means that the key-management-protocol parameter in the GKSP and IDK instructions may only be 0.
d) KMGT PROTOCOL=B'00' means that key management via the GKSP and IDK instructions is not permitted.

303..304 BKUP PROTOCOL (i.e., protocol for CF-environment backup via the ECFER and ICFER instructions).
  B'11': PBKUP (private protocol, i.e., no restriction on how PUA is imported)
  B'10': CBKUP2 (certification center protocol where the PUA control vector has HIST-CHAIN=3)
  B'01': CBKUP1 (certification center protocol where the PUA control vector has HIST-CHAIN=2)
  B'00': no backup permitted Note that the specification matches that of the protocol-mode parameter in the ECFER and ICFER instructions.

The BKUP PROTOCOL field is valid only when DEFINE(ECFER)=B'1' or DEFINE(ICFER)=B'1'.

305 KREG field
  The KREG field defines the key registration mode or modes permitted for certification center key management and for certification center backup, as follows:
  1 : restricted mode
  0 : unrestricted mode Note: the meanings attached to restricted mode and unrestricted mode are specified by the network, i.e., set forth according to network security policy.

For example, the certification center could define restricted mode such that the conditions in (a) or (b) must be satisfied, as follows:
  (a) PUM key registration is performed in a physically secure environment, KMP is loaded into the device by trusted personnel using the LFPMKP and CPMKP instructions or KMP is internally generated using the GNPMK instruction.
  (b) PUM key registration is not performed in a physically secure environment, but the External Key Unit containing PUM (sent to the certification center for registration) is signed with a PRA key which has been independently validated by the certification center as originating from within the said device. KMP is internally generated using the GNPMK instruction.

Both (a) and (b) represent very 'high security' modes.

306 INTERCHANGE
  B'1' : interchange (the device can act as an interchange device) A PRA, PRM, and PRU key can be used with the GDS instruction to generate digital signatures.
  B'0' : not interchange (the device cannot act as an interchange device). A PRA, PRM, and PRU key cannot be used with the GDS instruction to generate digital signatures.
307..308 SIG-COMPATIBILITY field
  The SIG-COMPATIBILITY field is a vector indexed as COMPATIBILITY(i) for i = 0 and 1.
  For i = 0, SIG-COMPATIBILITY(i) pertains to the IPUK instruction.
  For i = 1, SIG-COMPATIBILITY(i) pertains to the IDK instruction.

SIG-COMPATIBILITY(i) has the following meaning:
  B'1': the instruction does not require CF authentication of system signatures.
  B'0': the instruction requires CF authentication of system signatures.

309..511 reserved, set:= 203 B'0'.

Default Configuration Vector

The default configuration vector is the value of the configuration vector automatically set via execution of an EIS instruction. The value of the default configuration vector in 8 groups of 16 hexadecimal digits per group is as follows:
  1. X'01FFFFFFFFFFFFFF'
  2. X'FFFF0000000003FF'
  3. X'FFFFFF0000000000'
  4. X'0000000000000000'
  5. X'00000000000E0000'
  6. X'0000000000000000'
  7. X'0000000000000000'
  8. X'0000000000000000'

The default configuration vector has the following specification:

DEFAULT CONFIGURATION VECTOR:
| bits | value | field |
|---|---|---|
| 00..07 | (= B'00000001') | Version Number |
| 08..151 | | DEFINE |
| 08..79 | (= 72 B'1') | Reserved |
| 80..117 | (=38 B'0') | reserved |
| 118..151 | (= 34 B'1') | PKCD instructions (VADS thru VIKU) |
| 152..295 | (= 144 B'0') | AUTH CONTROL |
| 296 | (= B'0') | CERTIFICATION (not certification center) |
| 297 | (= B'0') | KMP RELOAD (no restrictions) |
| 298 | (= B'0') | KM RELOAD (no restrictions) |
| 299..300 | (= B'01') | FLOOR-MDC field (The referenced THRES-MDC or HIST-MDC must have a value ≧ B'01'.) |
| 301..302 | (= B'11') | KMGT PROTOCOL (CKMGT and PKMGT modes) |

```
303..304 (= B'00')    BKUP PROTOCOL (backup not permitted)
    305 (= B'0')      KREG field (unrestricted mode)
    306 (= B'0')      INTERCHANGE (not an interchange)
    307 (= B'0')      SIG-COMPATIBILITY(IPUK) (signature required)
    308 (= B'0')      SIG-COMPATIBILITY(IDK) (signature required)
309..511 (= 203 B'0') reserved
```

State Vector

The state vector has the following specification:

```
STATE VECTOR:
   00 KP FLAG (Key Part)
      B'1' : the KP register is in the "full" state
      B'0' : the KP register is in the "empty" state
   01 OKM FLAG (Old DEA key encrypting master key)
      B'1' : the OKM register is in the "full" state
      B'0' : the OKM register is in the "empty" state
```

Note: In a subsequent release of PKCD, the existing OKM flag shall be reimplemented within the state vector. For the present, this field is initialized only via the ECFAR instruction (thus making it appear that the OKM flag is implemented within the state vector).

```
02 CKM FLAG (Current DEA key encrypting master key)
   B'1' : the CKM register is in the "full" state
   B'0' : the CKM register is in the "empty" state
```

Note: In a subsequent release of PKCD, the existing CKM flag shall be reimplemented within the state vector. For the present, this field is initialized only via the ECFAR instruction (thus making it appear that the CKM flag is implemented within the state vector).

```
03.. 04 NKM FLAG (New DEA key encrypting master key)
   B'11' : reserved
   B'10' : the NKM register is in the "full" state
   B'01' : the NKM register is in the "partially full" state
   B'00' : the NKM register is in the "empty" state
```

Note: In a subsequent release of PKCD, the existing NKM flag shall be reimplemented within the state vector. For the present, this field is initialized only via the ECFAR instruction (thus making it appear that the NKM flag is implemented within the state vector).

```
05 Reserved
06.. 12 RESERVED (= 7B'0')
13 PROG FLAG
   B'1' : An executable program has been loaded
   B'0' : An executable program has not been loaded
14 PROGMDC0 FLAG (Secure loadable program MDC #0)
   B'1' : PROGMDC0 buffer is in the "full" state
   B'0' : PROGMDC0 buffer is in the "empty" state
15 PROGMDC1 FLAG (Secure loadable program MDC #1)
   B'1' : PROGMDC1 buffer is in the "full" state
   B'0' : PROGMDC1 buffer is in the "empty" state
16.. 21 KM HISTORY field
   The KM HISTORY field is a vector indexed as KM
   HISTORY(i) for i = 0,1,2, where i is defined as:
      0 : OKM
      1 : CKM
      2 : NKM
```

KM HISTORY(i) has the following meaning:
B'11': reserved

B'10': (reserved) GNDMK (i.e., the contents of the KM register were produced via execution of the GNDMK instruction).

B'01': (reserved) LFMKP/CMKP (i.e., the contents of the KM register were produced via execution of the LFMKP and CMKP instructions).

B'00': indeterminate

Note: The EPS instruction sets this field to B'000000', ensuring the present PKCD will be compatible with future releases of PKCD implementing code points B'01' and B'10' of the KM HISTORY field. Note: In a subsequent release of PKCD, the SMK instruction shall be modified so that the OKM HISTORY field is updated from the CKM HISTORY field.

Note: In a subsequent release of PKCD, the SMK instruction shall be modified so that the CKM HISTORY field is updated using a method which is similar to that followed by the SPMK instruction in its management of the CKMP HISTORY field. The SMK instruction shall also be modified so that the CKM HISTORY field is reset to the "indeterminate" state whenever the CKM FLAG is reset to the "empty" state, and the NKM HISTORY field is reset to the "indeterminate" state whenever the NKM FLAG is reset to the "empty" state. Note: In a subsequent release of PKCD, the GNDMK instruction shall be modified to reset the NKM HISTORY field to B'10', and the LFMKP and CMKP instructions shall be modified to reset the NKM HISTORY field to B'01'.

```
22..165 AUTH field
   The AUTH field is a vector indexed as AUTH(i) for i =
   0,1, ... 143.
   For i = 0,1, ..., 109 AUTH(i) is reserved
   For i = 110, ..., 143 AUTH(i) pertains to instructions
   of the PKCD.
```

AUTH(i) has the following meaning:

B'1': the SEF instruction can be used to enable execution of instruction or instruction mode "i" only after supplying appropriate proof of authorization to the CF. The level of authorization is determined by the implementation and can be different for each "i."

B'0': no restrictions

AUTH(i) is not defined for the following instructions:

(1) LPID, GDAK, LCV, since they do not execute in the "run" state.

(2) ERS, since the specification is contradictory.

(3) SEF, since this could lead to "lockout."

A list of the instructions and their corresponding indices are provided in FIG. 27.

```
166..453 ENABLE field
   The ENABLE field is a vector indexed as AUTH(i)
   for i = 0,1, ... 143.
   For i = 0,1, ..., 109 ENABLE(i) is reserved
   For i = 110, ..., 143 ENABLE(i) pertains to instructions
```

-continued
of the PKCD.

ENABLE(i) has the following meaning:
B'11': instruction or instruction mode execution not enabled.
B'10': instruction or instruction mode enabled for n executions, where n (a value from 1 to 255) is a value specified by an instruction input parameter.
B'01': instruction or instruction mode enabled for 1 execution.
B'00': instruction or instruction mode enabled for any number of executions.
ENABLE(i)=B'00' and ENABLE=B'11' are valid for all but the following instructions:
(1) LPID, GDAK, LCV, since they do not execute in the "run" state.
(2) ERS, since the specification is contradictory.
(3) SEF, since this could lead to "lockout."
ENABLE(i)=B'10' is valid only for the following instructions:
(1) CPMKP input-mode=0 and CPMKP input-mode=1
(2) GPUPR mode=0/2.
ENABLE(i)=B'01' is valid only for the following instructions:
(1) LMDCC
(2) LMDC
(3) LFPMK input-mode=0 and LFPMK input-mode=1
(7) GNPMK,
(8) GNDMK,
(9) SPMK,
(10) ECFER A list of the instructions and their corresponding indices is provided in FIG. 27.

---
454 CLONE (history bit)
B'1' : CF-environment has been set via the ICFER instruction.
B'0' : original CF-environment
Note: this bit is reset to 0 via execution of an EPS instruction but not by an EIS instruction. This bit is set to B'1' via execution of the ICFER instruction.
455..457 KMP-HISTORY field
The KMP-HISTORY field is a vector indexed as KMP-HISTORY(i) for i = 0,1,2, where i is defined as:
0 : OKMP HISTORY
1 : CKMP HISTORY
2 : NKMP HISTORY
KMP stands for PKA Key encrypting Master key.
---

KMP-HISTORY(i) has the following meaning:
B'1': GNPMK (i.e., the contents of the KMP register were produced via execution of the GNPMK instruction).
B'0': LFPKMP/CPMKP (i.e., the contents of the KMP register were produced via execution of the LFPKMP and CPMKP instructions).
Note: KMP-HISTORY(i) has meaning only when KMP-FLAG(i) is in the "full" state.

---
458..461 KMP-FLAG field
The KMP-FLAG field is a vector indexed as KMP-FLAG(i) for i = 0,1,2, where i is defined as:
0 : OKMP FLAG
1 : CKMP FLAG
2 : NKMP FLAG
---

For i=0 and 1, KMP-FLAG(i) is a 1 bit field with the following meaning:
B'1': the KMP register is in the "full" state
B'0': the KMP register is in the "empty" state
For i=2, KMP-FLAG(i) is a 2 bit field with the following meaning:
B'11': reserved
B'10': the KMP register is in the "full" state
B'01': the KMP register is in the "partially full" state
B'00': the KMP register is in the "empty" state ---
462 GDAK FLAG
B'1' : the PUA buffer, PRA buffer, PUACV register, and PRACV register are in the "full" state.
B'0' : the PUA buffer, PRA buffer, PUACV register, and PRACV register are in the "empty" state.
463 LPID FLAG
B'1' : the DID and EID registers are in the "full" state.
B'0' : the DID and EID registers are in the "empty" state.
464 LCV FLAG
B'1' : a configuration vector has been loaded using an LCV instruction.
B'0' : a configuration vector has not been loaded using an LCV instruction.
If CF STATE = "init" or "run", then CONFIG FLAG = B'0' indicates that a default configuration vector has been loaded.
465 EKU FLAG
B'1' : an EKU is stored in the EKU buffer and its length is stored in EKU Length.
B'0' : an EKU is not stored in the EKU buffer and its length is not stored in EKU Length.
---

```
466..467 CF STATE
    B'11' : reserved
    B'10' : the CF is in the "run" state
    B'01' : the CF is in the "init" state
    B'00' : the CF is in the "pre-init" state
    Note: the CF states control instruction execution.
468..501 EKUMDC FLAG field
    The EKUMDC FLAG field is a vector indexed as EKUMDC FLAG(i)
    for i = 0,1,...,16.
```

For i=0,1, ..., 15, EKUMDC FLAG(i) has the following meaning:
B'11': EKUMDC(i) has been initialized with an MDC loaded via a secure interface (e.g., via a smart card).
B'10': EKUMDC(i) has been initialized with the LMDCC instruction.
B'01': EKUMDC(i) has been initialized via the IPUK instruction.
B'00': EKUMDC(i) is uninitialized.

For i=16, EKUMDC FLAG(16) has the following meaning:
B'11': EKUMDC(16) has been initialized with an MDC loaded via a secure interface (e.g., via a smart card).
B'10': EKUMDC(16) has been initialized via an LMDC instruction.
B'01': reserved
B'00': EKUMDC(16) is uninitialized.

```
502 PR HISTORY
    B'1' : one or more PR have not been randomly generated inside
        the CF.
    B'0' : all PR have been randomly generated inside the CF.
503 ECFER Status
    B'1' : the ECFER instruction has been executed at least once
        (i.e., the CF environment of this device has been exported).
    B'0' : the ECFER instruction has not been executed.
504 ALARM FLAG
    B'1' : Alarm has been activated
    B'0' : no Alarm
505..508 HIST-DOMAIN
    This field contains a domain identifier (an arbitrary value from
    B'0000' to B'1111'). The HIST-DOMAIN field in the state vector
    is set by the ECFER instruction equal to the value of DOMAIN ID
    in the HIST-DOMAIN field of the PUA control vector contained in
    IKU1, which is input to the ECFER instruction.
    This field is valid only if the CLONE bit in the state vector is
    equal to B'1' and BKUP PROTOCOL in the configuration vector is
    equal to B'01' (CBKUP1) or B'10' (CBKUP2).
509..511 reserved, set = 3 B'0'.
```

Registers

The following registers are defined by PKCD:

| Register | | Size | Description |
|---|---|---|---|
| NKMP Register | S | 128b | New PKA Master Key Register |
| CKMP Register | P | 128b | Current PKA Master Key Register |
| OKMP Register | P | 128b | Old PKA Master Key Register |
| DID Register | P | 128b | Device Identifier Register |
| EID Register | P | 128b | Environment Identifier Register |
| PUACV Register | P | 128b | PUA Control Vector |
| PRACV Register | P | 128b | PRA Control Vector |

The registers are designated as permanent (encoded with letter "P") or semi-permanent (encoded with letter "S"). The contents of the permanent registers must be preserved for the "life of the system," e.g., via a battery-backed RAM. Values stored in the permanent registers change or are changed according to an installation-determined schedule. The contents of the semi-permanent registers must be preserved only until the information they contain has been processed by a CF instruction.

MDC Table

The MDC Table is a vector EKUMDC(i), for i=0,1, ..., 16, where each EKUMDC(i) contains storage for a 128 bit MDC value.

Figure 28:
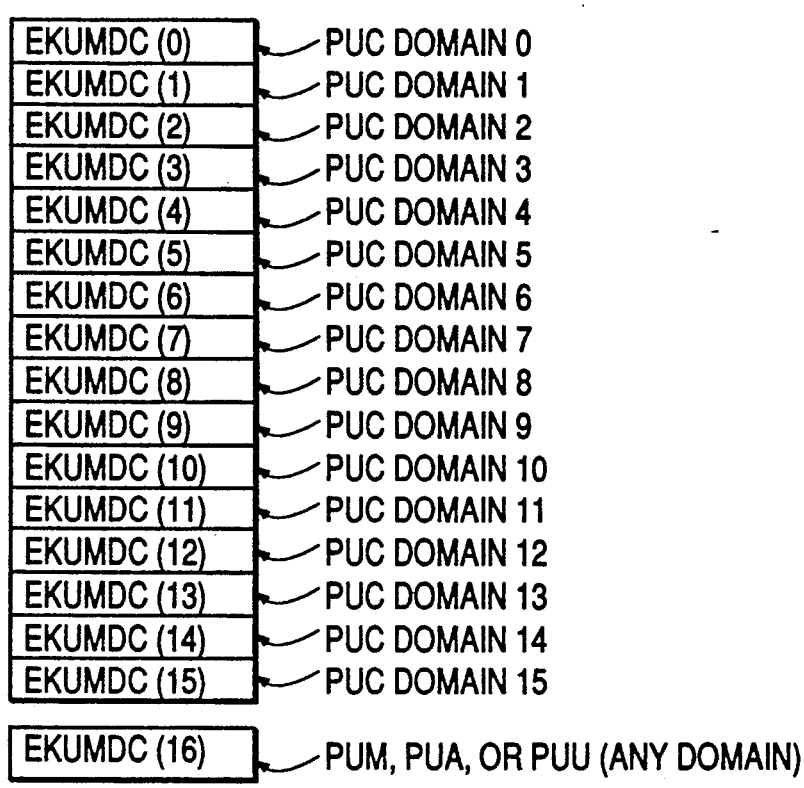
FIG. 28 is a block diagram illustration of the MDC Table.

FIG. 28 illustrates the organization and indexing of the MDC Table.

The MDC Table is used by the IPUK instruction to import public keys, which are presented to the IPUK instruction in the form of an External Key Unit (EKU). For i=0, ..., 15, the MDC in EKUMDC(i) must be calculated on an EKU containing a public certification key (i.e., a PUC key) and the domain ID field in the control vector of the PUC key must contain the value "i". For i=16, the MDC in EKUMDC(i) must be calculated on a EKU containing a public key management key, a public authentication key, or a public user key (i.e., a PUM, PUA, or PUU key). The domain ID field can contain any value from 0 to 15.

Counter Table

The Counter Table is a vector COUNTER(i), for i=0,1, ..., 143, where each COUNTER(i) contains storage for an 8 bit counter. For i=113, 114, or 120, COUNTER(i) is defined. For i≠113, 114, or 120, COUNTER(i) is not defined (i.e., this portion of Counter Table is null).

The value of COUNTER(i) denotes the number of times that instruction "i" can be executed before ENABLE(i) is set from B'10' to B'11'. FIG. 27 specifies the relationship between index and instruction name, For example, i=113 denotes input-mode=0 of the CPMKP instruction.

Figure 29:
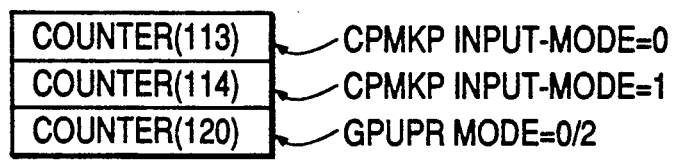
FIG. 29 is a block diagram illustration of the Counter Table.

FIG. 29 illustrates the organization and indexing of the Counter Table.

Control Vector Enforcement

Control vector enforcement is a method which ensures that the control vectors processed by each CF instruction are consistent with and in conformance with certain instruction-unique rules and restrictions which limit or define the values that these control vectors may have. Control vector enforcement may be accomplished by, although is not limited to, one of the following methods or combinations thereof:

Specify Control Vector in CFAP and Check Control Vector Bits in CF: This method checks bits and fields within the control vector to ensure that they contain permitted values. In certain cases, cross checking of bits and fields among two or more control vectors is necessary to ensure that they contain only permitted combinations of values.

Specify Control Vector in CFAP and Set Control Vector Bits in CF: This method sets bits and fields within the control vector to prescribed values (i.e., by overwriting the bits and fields of the control vectors passed at the instruction interface).

Generate Control Vector in CF from Information Specified by CFAP: This method generates control vectors from parameter information passed at the instruction interface.

Table Lookup of Control Vector in CF from Index Specified by CFAP: This method uses a table of control vectors stored within the CF. An index value passed at the instruction interface selects the control vector or vectors used by an instruction.

For convenience, control vector enforcement is defined in this teaching using a combination of the first and third methods described above. Some control vectors are specified as instruction parameters and bits and fields in these control vectors are checked by the CF. Other control vectors are generated within the CF, e.g., it is typical for the control vector associated with the rightmost 64 bits of a 128 bit key to be derived from the control vector associated with the leftmost 64 bits of a 128 bit key.

Initialization Requirements

Some CF instructions process cryptovariables stored internally within the CF, which must be loaded or imported into the CF before instruction execution. Several CF instructions have been defined to support the initialization and configuration of the CF. However, PKCD does not define or specify how key parts are loaded into the KP register.

PKCD do not define how key parts are loaded into the KP register. One possibility is for key parts to be loaded by authorized installation personnel via a protected, controlled interface. The physical interface described earlier could be used for this purpose.

| Instruction | Cryptovariable | CF Storage Location |
|---|---|---|
| LFPMKP | key part | KP register |
| CPMKP | key part | KP register |

PKCD do not define how key parts are loaded into the KP register. One possibility is for key parts to be loaded by authorized installation personnel via a protected, controlled interface. The physical interface described earlier could be used for this purpose.

Power On Sequence

During each power-on, the CF executes a power-on sequence (POS) routine. The POS routine does the following:

Initialize the PRNGKEY1 and PRNGKEY2 registers with random seed keys.

If the content of the POS register=X'01234567-89ABCDEF0123456789ABCDEF' then continue; else do the following:

Perform the EIS instruction to clear the CF environment.

Set POS register:=X'0123456789ABCDEF0123456789ABCDEF'.

RECORD FORMATS AND DESCRIPTIONS

The following records are defined by PKCD:

| Record Name | Length |
|---|---|
| Crypto Facility PKA Key Record | multiple of 8 bytes |
| Crypto Facility Key Authenticator Record | multiple of 8 bytes |
| Crypto Facility DEA Key Record | 64 bytes |
| Crypto Facility Backup DEA Key Record | 64 bytes |
| Crypto Facility System Signature Record | 64 bytes |
| Crypto Facility Environment Record | multiple of 8 bytes |
| Crypto Facility Audit Record | multiple of 8 bytes |
| Internal Key Unit | multiple of 8 bytes |
| Clear Key Unit | multiple of 8 bytes |
| External Key Unit | multiple of 8 bytes |
| Skeleton Key Unit | multiple of 8 bytes |

Crypto Facility PKA Key Record (CFPKR)

The Crypto Facility PKA Key Record (CFPKR) contains a public or private key used with a public key algorithm. If different public key algorithms are used for key distribution and digital signatures, then the CFPKR contains two public or two private keys—one key for key distribution and the other for digital signatures. The CFPKR is defined to be a multiple of 8 bytes.

A Crypto Facility PKA Key Record has the following form:

| Offset | Length (in bits) | Data |
|---|---|---|
| 0 | a | Parse |
| a | b | Key |
| c | d | RN (where c = a+b) |
| e | 0 | End of CFPKR (where e = c+d) |

| Data | Description |
|---|---|
| Parse | The parse field contains data that permits the CF to parse the key field. The length of the key parse field is not prescribed by the architecture. The key parse field MUST permit the key, or any portion of the key, to be uniquely identified and located in the key field. The parse field must directly or indirectly specify key length, such that an adversary cannot cause the CF to use only a portion of a key as a full key. In addition, the parse field contains at leaset 8 bytes of random data to act as a confounder to thwart revealing any |

| | -continued |
|---|---|
| Key | contents of the encrypted CFPKR by pattern analysis by an adversary.<br>The key field contains a PKA key. The key is either a public key or a private key. The key stored in the key field consists of one or more key variables that together constitute or define the key. For example, if the PKA is based on exponentiation modulo a number n, then the key consists of an exponent e and a modulus n. Both e and n are stored in the key field, and the parse field is defined in such a way to permit e and n to be located. Key length and format of the parse and key fields can be different depending on whether the key is a public key or a private key. If a first PKA is used for key distribution and a second PKA is used for digital signatures, then the Key field contains a pair of public or private keys (i.e., a key for each algorithm). The fact that there are two algorithms is made transparent to the CFAP. |
| RN | The RN field contains a d-bit random number generated within the CF. The value d ranges from 0 to 63 and is chosen so that the length of CFPKB is a multiple of 8 bytes. |

Outside the CF, the CFPKR is encrypted under a variant key KMP.C formed as the Exclusive OR product of KMP and control vector C.

Crypto Facility Key Authenticator Record (CFKAR)

The Crypto Facility Key Authenticator Record (CFKAR) contains information functionally related to a single CFPKR. The CFKAR is used to authenticate a CFPKR. The CFKAR is defined to be a multiple of 8 bytes.

A Crypto Facility Key Authenticator Record has the following form:

Outside the CF, the CFKAR is encrypted under a variant key KMP.C formed as the Exclusive OR product of KMP and control vector C.

Methods for deriving a key authenticator from a key record has been discussed in Key Record Encrypt Algorithm 12 of FIG. 16.

Crypto Facility DEA Key Record (CFDKR)

The Crypto Facility DEA Key Record is produced by a GKSP instruction and is processed by an IDK instruction. The CFDKR is a 52 byte record.

A Crypto Facility DEA Key Record has the following form:

| Offset | Length (in bits) | Data |
|---|---|---|
| 0 | a | Key Authenticator |
| a | b | RN |
| c | 0 | End of CFPKR (where c = a+b) |
| Data | | Description |
| Key Authenticator | | The key authenticator field contains data functionally related to a CFPKR. |
| RN | | The RN field contains a b-bit random number generated within the CF. The value b ranges from 0 to 63 and is chosen so that the length of CFKAR is a multiple of 8 bytes. |

| Offset | Length (in bytes) | Data |
|---|---|---|
| 0 | 1 | Record ID<br>The most significant bit in a byte is the leftmost bit.<br>0000 0000 - 'Crypto Facility DEA Key Record' |
| 1 | 1 | Record Code<br>000 xxxxx - 128b key-encrypting key produced by GKSP and processed by IDK.<br>When bits 0..2 of the above field are B'000',<br>bits 3..7 are defined as follows:<br>Control Vector Format<br>000 xxx00 - control vector field stores hash of 128 bit C.<br>000 xxx01 - control vector field stores hash of 64 bit C.<br>000 xxx1x - reserved<br>KEY-MANAGEMENT-PROTOCOL specified in GKSP (implying IDK must also specify the same)<br>000 0xxxx - private protocol<br>000 1xxxx - certification center protocol<br>KEY-MANAGEMENT-MODE specified in GKSP (implying IDK must also specify the same)<br>000 x0xxx - key registration is performed using mode 0<br>000 x1xxx - key registration is performed using mode 1<br>001 xxxxx - reserved<br>01x xxxxx - reserved<br>1xx xxxxx - reserved |
| 2 | 2 | Reserved (=X'0000') |
| 4 | 16 | EID - The value of EID stored in the CF Environment of the originating device. |
| 20 | 16 | h(C), where C is a 64- or 128-bit control vector and h is a hash function. Basically, if C is 64 bits, then h(C) = concat(C,C). And, if C is 128 bits, then h(C) = C. |
| 36 | 16 | Key - This field contains a 128 bit odd parity adjusted | key generated within the CF by the GKSP instruction.

Crypto Facility Backup DEA Key Record (CFBDKR)

The Crypto Facility Backup DEA Key Record is produced by a ECFER instruction and is processed by an ICFER instruction. The CFBDKR is a 52 byte record.

A Crypto Facility Backup DEA Key Record has the following form:

| Offset | Length (in bytes) | Data |
|---|---|---|
| 0 | 1 | Record ID<br>The most significant bit in a byte is the leftmost bit.<br>0000 0001 - 'Crypto Facility Backup DEA Key Record' |
| 1 | 1 | Record Code<br>PROTOCOL-MODE specified in ECFER (implying ICFER must also specify the same)<br>xxxx 00xx - invalid<br>xxxx 01xx - certification center protocol where the PUA control vector has HIST-CHAIN=2<br>xxxx 10xx - certification center protocol where the PUA control vector has HIST-CHAIN=3<br>xxxx 11xx - private protocol.<br>KMP MODE specified in ECFER (implying ICFER must also specify the same)<br>xxxx xx0x - KMP-mode = 0 has been specified in ECFER<br>xxxx xx1x - KMP-mode = 1 has been specified in ECFER<br>KM MODE specified in ECFER (implying ICFER must also specify the same)<br>xxxx xxx0 - KM-mode = 0 has been specified in ECFER<br>xxxx xxx1 - KM-mode = 1 has been specified in ECFER |
| 2 | 1 | Hash Rule<br>Indicated the has algorithm used to generate the hash.<br>X'00': MDC-2 algorithm with 128-bit hash<br>X'01': MDC-4 algorithm with 128-bit hash<br>X'02': MD4 algorithm with 128-bit hash<br>X'03'-X'FF' : reserved. |
| 3 | 17 | Reserved (=17 X'00') |
| 20 | 16 | MDC - A 128-bit MDC calculated on a CFER in the CF by an ECFER instruction. The MDC is calculated using the MDC-2 hash algorithm. |
| 36 | 16 | Key - This field contains a 128-bit odd parity adjusted key generated within the CF by the ECFER instruction, which may be Exclusive ORed with KM, KMP, or both (depending on KMP-mode and KM-mode specified in ECFER). |

Crypto Facility System Signature Record (CFSSR)

The Crypto Facility System Signature Record is produced by one of the following instructions: ECFAR, EPUK, GKSP, GDS, and ECFER. The CFSSR can be processed by one or more of the following instructions: IPUK, IDK, VDS, and ICFER. The CFSSR is a 253-bit record.

A Crypto Facility System Signature Record has the following form:

| Offset | Length (in bytes) | Data |
|---|---|---|
| 0 | 4 | Reserved (=B'0000') |
| 4 | 1 | Emulation<br>B'1' : CFSSR created via the GDA instruction<br>B'0' : CFSSR created via the instruction specified in the first nibble of Record Code field. |
| 5 | 8 | Record ID (=B'0000 0010' for CFSSR) |
| 13 | 16 | Record length (in bits)<br>The record length is currently fixed at 253 bits (=X'00FD') |
| 29 | 8 | Record Code<br>The first nibble indicates the CF instruction, and the second nibble indicates the key type of the private key used to generate the signature.<br>First nibble:     Second nibble:<br>B'0000' - ECFAR     B'1000' - PRC<br>B'0001' - EPUK     B'1001' - PRM<br>B'0010' - GKSP     B'1010' - PRA<br>B'0011' - ECFER     B'1011' - PRU<br>B'0100' - GDS     B'0xxx' - reserved<br>B'0101' - reserved     B'11xx' - reserved<br>B'011x' - reserved<br>B'1xxx' - reserved |
| 37 | 8 | Hash Rule<br>Indicates the hash algorithm used to generate the hash, and the rule (if any) for formatting and producing, from the generated hash value, the value to be stored in the Hash field.<br>X'00': MDC-2 algorithm with 128-bit hash<br>X'01': MDC-4 algorithm with 128-bit hash<br>X'02': MD4 algorithm with 128-bit hash<br>X'03'-X'FF' : reserved. |
| 45 | 208 | Hash field<br>The field in which the hash value is stored–right justified, and filled with higher order zero bits. |

Crypto Facility Environment Record (CFER)

The Crypto Facility Environment Record (CFER) contains that portion of A CF Environment necessary to "clone" a device (i.e., by replicating the CF Environment of one device into another device).

The Crypto Facility Environment Record has the following form:

| Offset | Length (in bytes) | Data |
|---|---|---|
| 00 | 64 | Header (H) |
| 64 | a | Secret Part (SP) |
| 64+a | b | Nonsecret Part (NSP) |
| Data | | Description |
| Header | | The Header (H) contains information necessary to parse the CFER. H has a fixed length of 64 bytes. |
| Secret Part | | The Secret Part (SP) contains the secret part of the CF Environment to be ported. SP is variable length, but a multiple of 8 bytes. |
| Nonsecret Part | | The Nonsecret Part (NSP) contains ONLY THAT PART OF THE NONSECRET PART OF THE CF ENVIRONMENT to be ported. NSP is vaiable length, but contains a whole number of bytes. |

The Header has the following form:

| Offset | Length (in bytes) | Data |
|---|---|---|
| 00 | 64 | Header |
| 00 | 01 | Record ID (=B'00000011') |
| 01 | 03 | Reserved (=x X'00') |
| 04 | 04 | Length of Secret Part in 8-byte blocks; (112+a+b)/8 Value is coded in binary representation. |
| 08 | 04 | Length of Secret Part of Product Environment in bytes ("a"). Value is coded in binary representation. |
| 12 | 03 | Reserved (=3 X'00') |
| 15 | 01 | Length of Random Pad for Secret Part in bytes ("b"). Value is coded in binary representation. |
| 16 | 04 | Length of Nonsecret Part in bytes; (568+d+e). Value is coded in binary representation. |
| 20 | 02 | Reserved (=2 X'00') |
| 22 | 02 | reserved (=2 X'00') |
| 24 | 04 | Length of Nonsecret Part of Product Environment in bytes ("e"). Value is coded in binary representation. |
| 28 | 36 | Reserved (=36 X'00') |
| 64 | 00 | End of Header |

The Secret Part has the following form:

| | | |
|---|---|---|
| 64 | 112+c | Secret Part |
| 64 | 112 | Registers |
| 64 | 16 | CKM Register (Current DEA-key-encrypting Master key) |
| 80 | 16 | OKM Register (Old DEA-key-encrypting Master key) |
| 96 | 8 | PRNGCTR1 Register (Pseudo-Random Number Counter #1) |
| 104 | 8 | PRNGCTR2 Register (Pseudo-Random Number Counter #2) |
| 112 | 16 | PRNGKEY1 Register (Pseudo-Random Number Seed Key #1) |
| 128 | 16 | PRNGKEY2 Register (Pseudo-Random Number Seed Key #2) |
| 144 | 16 | CKMP Register (Current PKA-key-encrypting Master key) |
| 160 | 16 | OKMP Register (Old PKA-key-encrypting Master key) |
| 176 | 0 | End of Registers |
| 176 | a | Secret Part of Product Environment |
| | | The product environment contains information specific to a product implementation (beyond that called for by the the PKCD). |
| 176+a | b | Random Pad |
| | | The Random Pad field contains "b" randomly generated pad bytes, where "b" is a number from 0 to 7. The random pad field is adjusted so that the length of the Secret Part is guaranteed to be a multiple of 8 bytes. |
| 176+c | 0 | End of Secret Part (where c = a+b) |

The Nonsecret Part has the following form:

| | | |
|---|---|---|
| 176+c | 488+f | Nonsecret Part |
| 176+c | 64 | Configuration Vector |
| 240+c | 64 | State Vector |
| | | The collowing flags are reset to reflect that the corresponding registers do not port: |
| | | KP FLAG := B'0' |
| | | NKM FLAG := B'00' |
| | | PIN FLAG := B'0' |
| | | KMP FLAG (2) := B'00' |
| 304+c | 80 | Registers |
| 304+c | 16 | PROGMDC0 Register (Secure Loadable Program MDC #0) |
| 304+c | 16 | PROGMDC1 Register (Secure Loadable Program MDC #1) |
| 336+c | 16 | EID Register (Environment Identifier) |
| 352+c | 16 | PUACV Register (Public Device Authentication key CV) |
| 368+c | 16 | PRACV Register (Private Device Authentication key CV) |
| 384+c | 0 | End of Registers |
| 384+c | 272 | MDC Table |
| 656+c | 3 | Counter Table |
| 659+c | 5 | Reserved (=X'0000000000') |
| | | Keeps remaining fields on an 8 byte boundary. |

.* The next line is changed from PIN Tables to reserved

-continued

| | | |
|---|---|---|
| 664+c | d | reserved |
| 664+c+d | e | Nonsecret Part of Product Environment |
| | | The product environment contains information specific to a product implementation (beyond that called for by the PKCD). |
| 664+c+f | 0 | End of Nonsecret Part (where f = d+e) |
| 664+c+f | 0 | End of CFER |

Outside the CF, the Secret Portion of the CFER is encrypted with a 128 bit DEA key KK1. KK1 is generated within the CF and encrypted with a public device authentication key PUA. The Nonsecret Portion of the CFER is specifically not encrypted to prevent a covert privacy channel from being set up when the CFER is used with the ECFER and ICFER instructions.

External Crypto Facility Environment Record (XCFER)

The External Crypto Facility Environment Record has the following form:

| Offset | Length (in bytes) | Data |
|---|---|---|
| 00 | 64 | Header (H) |
| 64 | a | Encrypted Secret Part (ESP) |
| 64+a | b | Nonsecret Part (NSP) |

| Data | Description |
|---|---|
| Header | The Header (H) contains information necessary to parse the CFER. H has a fixed length of 64 bytes. |
| Ecrypted Secret Part | The Encrypted Secret Part (ESP) contains the secret part of the CF Environment to be ported encrypted under a key shared with, or to-be-shared with, a designated receiving device. The length of ESP equals the length of SP. SP is variable length, but a multiple of 8 bytes. |
| Nonsecret Part | The Nonsecret Part (NSP) contains the nonsecret part of CF Environment to be ported. NSP is variable length, but a whole number of bytes. |

Crypto Facility Audit Record (CFAR)

The Crypto Facility Audit Record (CFAR) contains the nonsecret part of the CF Environment plus additional nonsecret information. The CFAR is designed to be a multiple of 8 bytes.

The Crypto Facility Audit Record has the following form:

| Offset | Length (in bytes) | Data |
|---|---|---|
| 00 | 64 | Header (H) |
| 64 | a | Nonsecret Part (NSP) |

| Data | Description |
|---|---|
| Header | The Header (H) contains information necessary to parse the CFAR. It also contains a random number (RN) field and a date and time (DT) field. The Header is 64 bytes in length. |
| Nonsecret Part | The Nonsecret Part (NSP) contains the nonsecret part of the CF Environment. NSP is variable length, but must be a whole number of bytes. The NSP in the CFAR is not the same as the NSP in the CFER (see Crypto Facility Environment Record). |

The External Crypto Facility Environment Record (XCFER) is the same as the CFER expect that the Secret Part is encrypted.

The Header has the following form:

| Offset | Length (in bytes) | Data |
|---|---|---|
| 00 | 64 | Header |
| 00 | 01 | Record ID (=B'00000100') |
| 01 | 03 | Reserved (=3 X'00') |
| 04 | 04 | Length of Nonsecret Part of CF Environment in bytes; (520+a+b+d). Value is coded in binary representation |
| 08 | 02 | Reserved (=2 X'00') |
| 10 | 02 | Length of cfpkr1 containing PUA ("a") in bytes. Value is coded in binary representation |
| 12 | 02 | Reserved (=2 X'00') |
| .* Next line is changed from PIN-table-length to reserved | | |
| 14 | 02 | reserved (=2 X'00') |
| 16 | 04 | Length of Nonsecret Part of Product Environment ("d") in bytes. Value is coded in binary representation. |
| 20 | 04 | Reserved (=4 X'00') |
| 24 | 08 | RN field |
| 32 | 03 | Reserved (=3 X'00') |
| 35 | 14 | DT field |

-continued

| | | |
|---|---|---|
| 49 | 15 | Reserved (=15 X'00') |
| 64 | 00 | End of Header |
| Data | | Description |
| RN | | An 8 byte CFAP-supplied time-variant parameter. This field is set by the ECFAR instruction only when process-mode=1 or process-mode=2. This field is intended to be used as a nonce in a request/response protocol to guarantee freshness of the Audit record. The Certification Center generates and random number and sends it to the device to be audited in the Request-for-Audit message. The device then supplies this random number to the Export Cryptographic Facility Audit Record instruction. This results in the signed Audit record being sent to the Certification Center by the Audited device with the correct nonce. The Certification Center is assured that the Audit record is current. |

The Nonsecret Part has the following form:

| | | |
|---|---|---|
| 64 | 520+e | Nonsecret Part of CF Environment |
| 64 | 64 | Configuration Vector |
| 128 | 64 | State Vector |
| 192 | 112 | Registers |
| 192 | 16 | PROGMDC0 Register |
| 208 | 16 | PROGMDC1 Register |
| 224 | 16 | POS Register |
| 240 | 16 | DID Register |
| 256 | 16 | EID Register |
| 272 | 16 | PUACV Register |
| 288 | 16 | PRACV Register |
| 304 | 0 | End of Registers |
| 304 | 272 | MDC Table |
| 576 | 3 | Counter Table |
| 579 | 5 | Reserved (=5 X'00') Keeps remaining fields on an 8 byte boundary. |
| 584 | a | cfpkr1 from the PUA Buffer |
| .* Next line is changed from PIN Tables to reserved. | | |
| 584+a | b | reserved |
| 584+c | 0 | GKSP Save (not audited) |
| 584+c | 0 | GKSP Buffer Length (not audited) |
| 584+c | 0 | GKSP Record Length (not audited) |
| 584+c | 0 | GKSP Buffer Flag (not audited) |
| 584+c | 0 | GKSP Ticket (not audited) |
| 584+c | 0 | IDK Save (not audited) |
| 584+c | 0 | IDK Buffer Length (not audited) |
| 584+c | 0 | IDK Record Length (not audited) |
| 584+c | 0 | IDK Buffer Flag (not audited) |
| 584+c | 0 | IDK Ticket (not audited) |
| 584+c | d | Nonsecret Part of Product Environment (where c = a+b) The product environment contains information specific to a product implementation (beyond that called for by the PKCD). |
| 584+e | 0 | End of Nonsecret Part of CF Environment (where e = c+d) |
| 584+e | 0 | End of CFAR |

No encrypted information in the CFER ever appears in the clear in the CFAR. Specifically, this is done to prevent a covert privacy channel from being set up when the CFER is used with the ECFER and ICFER instructions.

Internal Key Unit (IKU)

The IKU is an internal form of a Key Unit. The Key Unit contains an encrypted CFPKR, an encrypted CFKAR, and information about the public or private key in the CFPKR. The IKU is designed to be a multiple of 8 bytes.

The Internal Key Unit has the following form:

| Offset | Length (in bytes) | Data |
|---|---|---|
| 00 | 32 | Header (H) |
| 32 | a | System Control Block (SCB) |
| 32+a | b | User Control Block (UCB) |
| 32+c | d | Encrypted Crypto Facility PKA Key Record (ECFPKR), c=a+b |
| 32+e | f | Encrypted Crypto Facility Key Authenticator Record, e=c+d (ECFKAR) |
| Data | | Description |
| Header | | The Header (H) contains information necessary to parse the IKU. |
| System Control Block | | |
| | | The System Control Block (SCB) contains information about the key in CFPKR, including a control vector C1. The SCB is managed by the system. The SCB is designed to be a multiple of 8 bytes. |
| User Control Block | | |
| | | The User Control Block (UCB) contains information about the key in CFPKR. The UCB is specified by the user (or installation). The UCB must be a multiple of 8 bytes. |

| | |
|---|---|
| Encrypted Crypto Facility PKA Key Record | |
| | The Encrypted Crypto Facility PKA Key Record (ECFPKR) contains a CFPKR encrypted under a key KMP.C2 formed as the Exclusive OR product of KMP and a control vector C2. C2 is generated from SCB and UCB using the method discussed in steps 501 and 502 of the Key Record Encrypt Algorithm 12 in FIG. 16. The CFPKR contains a public or private key. |
| Encrypted Crypto Facility Key Authenticator Record | |
| | The Encrypted Crypto Facility Key Authenticator Record (ECFKAR) contains a CFKAR encrypted under a key KMP.C3 formed as the Exclusive OR product of KMP and a control vector C3. C3 is generated from SCB and UCB using the method described in steps 501 and 502 of the Key Record Encrypt Algorithm 12 in FIG. 16. |

The Header has the following form:

| Offset | Length (in bytes) | Data |
|---|---|---|
| 00 | 32 | Header (H) |
| 00 | 02 | Anti-ISO field (=X'8080') |
| | | The anti-ISO field is a 2-byte field purposely encoded to be invalid as the leading 2 bytes of a data record conforming to 'Basic Encoding Rules of ASN.1(ISO 8825)'. |
| 02 | 01 | Record ID (=B'00000101') |
| 03 | 03 | (=3 X'00') |
| 06 | 02 | SCB-Length - number of 8 byte blocks in SCB. Value is coded in binary representation SCB-Length must be > 0 |
| 08 | 02 | (=2 X'00') |
| 10 | 02 | UCB-Length - number of 8 byte blocks in UCB. Value is coded in binary representation UCB-Length must be >= 0 |
| 12 | 02 | (=2 X'00') |
| 14 | 02 | ECFPKR-Length - number of 8 byte blocks in ECFPKR. Value is coded in binary representation ECFPKR-Length must be > 0 |
| 16 | 02 | (=2 X'00') |
| 18 | 02 | ECFKAR-Length - number of 8 byte blocks in ECFKAR. Value is coded in binary representation ECFKAR-Length must be > 0 |
| 20 | 12 | (=12 X'00') |
| 32 | 0 | End of Header (H) |

The System Control Block has the following form:

| Offset | Length (in bytes) | Data |
|---|---|---|
| 32 | a | System Control Block (SCB) |
| 32 | 16 | Control Vector |
| 48 | 16 | EID - Environment ID |
| 64 | 2 | Reserved (set to zero) |
| 66 | 14 | Tstart |
| 80 | 2 | Reserved (set to zero) |
| 82 | 14 | Texp |
| 96 | 4 | Reserved (set to zero) |
| 100 | 4 | Seq |
| 104 | 64 | LDID - Logical Device Indentifier |
| 168 | 64 | LKN - Local Key Name |
| 232 | 64 | UID - User Identifier |
| 296 | b | Optional CFAP fields |
| 296+b | 0 | End of System Control Block (SCB) |
| Data | | Description |
| Control Vector | | A 128 bit control vector associate with the public or private key stored in the CFPKR. The control vector is a CF enforced field. The control vector is a required field in the SCB. |
| EID | | A 16 byte Environment ID of the crypto facility where IKU is created. EID is a CF enforced field (i.e., the CF verifies that EID equals the value stored in the EID register of the CF when a key is created and, as appropriate, verifies that EID is equal or not equal to the value in the EID register when an IKU is processed). Note that EID may exist in multiple physical devices, depending on the number of "cloned" CF Environments active at any one time. EID is a required field in the SCB. |
| Tstart | | A 14 character field with format YYYYMMDDHHMMSS containing the date and Coordinated Universal Time (UTC) when the IKU becomes active. The characters in Tstart are decimal (0 thru 9) and are encoded using 8-bit ASCII representation. Tstart is a CF enforced field (i.e., the IKU cannot be processed unless Tstart has passed). A value of 14 ASCII '0's denotes that Tstart is ignored. Tstart is a required field in the SCB. |
| Texp | | A 14 character field with format YYYYMMDDHHMMSS containing the date and Coordinated Universal Time (UTC) when the IKU expires. The characters in Texp are decimal (0 thru 9) and are encoded using 8-bit ASCII representation. Texp is a CF |

-continued

| | |
|---|---|
| | enforced field (i.e., the IKU cannot be processed when Texp has passed). A value of 14 ASCII '9's denotes that Texp is ignored. Texp is a required field in the SCB. |
| Seq | A 4 byte sequence number. Seq is not a CF enforced field. The seq field may be used by CFAP to record the relative sequence of IKU in a chain starting with a "root" IKU. Seq is an optional field in the SCB. |
| LDID | Logical Device Identifier (LDID) is the identifier of the logical, as opposed to physical, device to which IKU belongs. LDID is not a CF enforced field. LDID consists of 1 or more name elements $x_i$ separated by periods (i.e., x1, x2, x3 is stored as x1.x2.x3). Each name element $x_i$ is 1 to 8 characters and is encoded in 8-bit ASCII representation. (Note that LDID is the network equivalent of EID.) LDID is an optional field in the SCB. |
| LKN | Local Key Name (LKN) is the name or local name of the key in IKU and is assigned by the "logical" device to which IKU belongs. LKN is not a CF enforced field. LKN consists of 1 or more name elements $x_i$ separated by periods (i.e., x1, x2, x3 is stored as x1.x2.x3). Each name element $x_i$ is 1 to 8 characters and is encoded in 8-bit ASCII representation. LDID.LKN and UID.LKN constitute global key names that uniquely identify a key. LKN is an optional field in the SCB. |
| UID | User Identifier (UID) is the identifier of the user to which IKU belongs. UID is not a CF enforced field. UID consists of 1 or more name elements $x_i$ separated by periods (i.e., x1, x2, x3 is stored as x1.x2.x3). Each name element $x_i$ is 1 to 8 characters and is encoded in 8-bit ASCII representation. UID is an optional field in the SCB. |

Clear Key Unit (CKU)

The CKU is a clear form of an Internal Key Unit. The Key Unit contains a clear CFPKR and a clear CFKAR. The CKU is designed to be a multiple of 8 bytes.

The Clear Key Unit has the following form:

| Offset | Length (in bytes) | Data |
|---|---|---|
| 00 | 32 | Header (H) |
| 32 | a | System Control Block (SCB) |
| 32+a | b | User Control Block (UCB) |
| 32+c | d | Crypto Facility PKA Key Record (CFPKR), c=a+b |
| 32+e | f | Crypto Facility Key Authenticator Record (CFKAR), e=c+d |
| Data | | Description |
| Header | | The Header (H) contains information necessary to parse the CKU. See below. |
| System Control Block | | |
| | | The System Control Block (SCB) contains information about the key in CFPKR, including a control vector C1. The SCB is managed by the system. The SCB is designed to be a multiple of 8 bytes. (The SCB form in the CKU is the same as in the IKU.) |
| User Control Block | | |
| | | The User Control Block (UCB) contains information about the key in CFPKR. The UCB is specified by the user (or installation). The UCB must be a multiple of 8 bytes. (The UCB form in the CKU is the same as in the IKU.) |
| Crypto Facility PKA Key Record | | |
| | | The Crypto Facility PKA Key Record (CFPKR) contains a public or private key. |
| Crypto Facility Key Authenticator Record | | |
| | | The Crypto Facility Key Authenticator Record (CFKAR) is used by the CF to validate the CFPKR. |

The Header has the following form:

| Offset | Length (in bytes) | Data |
|---|---|---|
| 00 | 32 | Header (H) |
| 00 | 02 | Anti-ISO field (=X'8080') The anti-ISO field is a 2-byte field purposely encoded to be invalid as the leading 2 bytes of a data record conforming to 'Basic Encoding Rules of ASN.1(ISO 8825)'. |
| 02 | 01 | Record ID (=B'00000110') |
| 03 | 03 | Reserved (=3 X'00') |
| 06 | 02 | SCB-Length - number of 8 byte blocks in SCB. Value is coded in binary representation. SCB-Length must be > 0 |
| 08 | 02 | Reserved (=2 X'00') |
| 10 | 02 | UCB-Length - number of 8 byte blocks in UCB. Value is coded in binary representation. UCB-Length must be >= 0 |
| 12 | 02 | Reserved (=2 X'00') |
| 14 | 02 | CFPKR-Length - number of 8 byte blocks in CFPKR. Value is coded in binary representation CFPKR-Length must be > 0 |
| 16 | 02 | reserved (=2 X'00') |
| 18 | 02 | CFKAR-Length - number of 8 byte blocks in CFKAR. Value is coded in binary representation. CFKAR-Length must be > 0 |
| 20 | 12 | Reserved (=12 X'00') |

Note: The specification for System Control Block, User Control Block, Crypto Facility PKA Key Record, and Crypto Facility Key Authenticator Record are the same as those for the IKU.

The Header has the following form:

| Offset | Length (in bytes) | Data |
|---|---|---|
| 00 | 32 | Header (H) |
| 00 | 02 | Anti-ISO field (=X'8080') The anti-ISO field is a 2-byte field purposely encoded to be invalid as the leading 2 bytes of a data record conforming to 'Basic Encoding Rules of ASN.1(ISO 8825)'. |
| 02 | 01 | Record ID (=B'00000111') |
| 03 | 03 | Reserved (=3 X'00') |
| 06 | 02 | SCB-Length - number of 8 byte blocks in SCB. Value is coded in binary representation. SCB-Length must be > 0 |
| 08 | 02 | Reserved (=2 X'00') |
| 10 | 02 | UCB-Length - number of 8 byte blocks in UCB. Value is coded in binary representation. UCB-Length must be >= 0 |
| 12 | 02 | Reserved (=2 X'00') |
| 14 | 02 | CFPKR-Length - number of 8 byte blocks in CFPKR. Value is coded in binary representation. CFPKR-Length must be > 0 |
| 16 | 02 | reserved (=2 X'00') |
| 18 | 02 | Constant (=2 X'00') |
| 20 | 12 | (=12 X'00') |
| 32 | 0 | End of Header (H) |

External Key Unit (EKU)

The EKU is an external form of a Key Unit. The Key Unit contains a clear CFPKR and information about the public or private key in the CFPKR. The EKU has no encrypted or clear CFKAR. The EKU is designed to be a multiple of 8 bytes.

The External Key Unit has the following form:

| Offset | Length (in bytes) | Data |
|---|---|---|
| 00 | 32 | Header (H) |
| 32 | a | System Control Block (SCB) |
| 32+a | b | User Control Block (UCB) |
| 32+c | d | Crypto Facility PKA Key Record (CFPKR), c=a+b |

| Data | Description |
|---|---|
| Header | The Header (H) contains information necessary to parse the EKU. |
| System Control Block | The System Control Block (SCB) contains information about the key in CFPKR, including a control vector C1. The SCB is managed by the system. The SCB is designed to be a multiple of 8 bytes. (The SCB form in the EKU is the same as in the IKU.) |
| User Control Block | The User Control Block (UCB) contains information about the key in CFPKR. The UCB is specified by the user (or installation). The UCB must be a multiple of 8 bytes. (The UCB form in the EKU is the same as in the IKU.) |
| Crypto Facility PKA Key Record | The Crypto Facility PKA Key Record (CFPKR) contains a public or private key, although ordinarily only public keys occur in an EKU. |

Note: The specification for System Control Block, User Control Block, and Crypto Facility PKA Key Record Record are the same as those for the IKU.

Skeleton Key Unit (SKU)

The SKU is a partially completed Key Unit. The SKU is designed to be a multiple of 8 bytes.

The Skeleton Key Unit has the following form:

| Offset | Length (in bytes) | Data |
|---|---|---|
| 00 | 32 | Header (H) |
| 32 | a | System Control Block (SCB) |
| 32+a | b | User Control Block (UCB) |

| Data | Description |
|---|---|
| Header | The Header (H) contains information necessary to parse the SKU. |
| System Control Block | The System Control Block (SCB) contains information about the key in CFPKR, including a control vector C1. The SCB is managed by the system. The SCB is designed to be a multiple of 8 bytes. The SCB format is the same as that for the IKU. |

-continued

User Control Block
　　The User Control Block (UCB) contains information about the key in CFPKR. The UCB is specified by the user (or installation). The UCB is an optional field in the SKU. The UCB must be a multiple of 8 bytes.

The Header has the following form:

| Offset (in bytes) | Length | Data |
|---|---|---|
| 00 | 32 | Header (H) |
| 00 | 02 | (=X'8080') |
| 02 | 04 | (=4 X'00') |
| 06 | 02 | SCB-Length - number of 8 byte blocks in SCB. Value is coded in binary representation. SCB-Length must be > 0 |
| 08 | 02 | (=2 X'00') |
| 10 | 02 | UCB-Length - number of 8 byte blocks in UCB. Value is coded in binary representation. UCB-Length must be >= 0 |
| 12 | 02 | (=2 X'00') |
| 14 | 02 | Constant (=2 X'00') |
| 16 | 02 | (=2 X'00') |
| 18 | 02 | Constant (=2 X'00') |
| 20 | 12 | (=12 X'00') |
| 32 | 0 | End of Header (H) |

Note: The specification for System Control Block and User Control Block are the same as those for the IKU.

CONTROL VECTOR FORMATS AND DESCRIPTIONS

An Overview of PKCD Key Types

Figure 30:
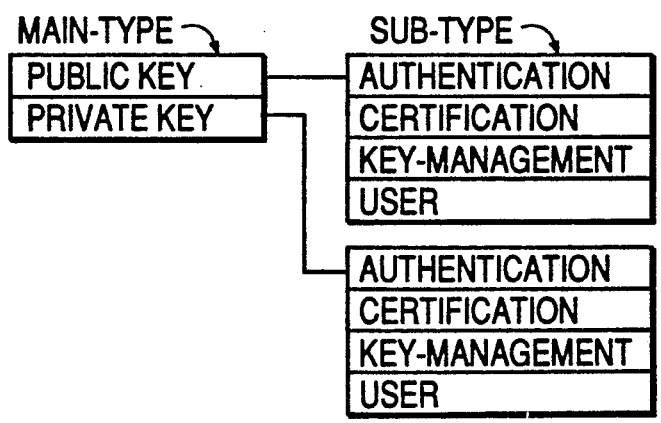
FIG. 30 illustrates the control vector hierarchy of PKCD keys.

FIG. 30 illustrates the PKCD control vector hierarchy. Each PKCD control vector has a CV TYPE field consisting of a main-type and a sub-type. The main-type portion of the CV TYPE field permits broad classes of keys and cryptovariables to be defined, whereas the sub-type portion of the CV TYPE field permits generic key types to be defined within each class, which are more closely associated with the functional use of the key or cryptovariable. The lefthand portion of FIG. 30 illustrates the control vector main-types defined by PKCD. The righthand portion of FIG. 30 illustrates the control vector sub-types defined for each main-type. When no sub-type distinction is made, the key or cryptovariable is generally referred to by its main-type.

The PKCD names ascribed to keys are determined by a concatenation of the names associated with main-type and sub-type. The following keys are defined by PKCD:
　　Public Authentication Key
　　Public Certification Key
　　Public Key Management Key
　　Public User Key
　　Private Authentication Key
　　Private Certification Key
　　Private Key Management Key
　　Private User Key General format for PKA control vectors The fields defined for one or more control vectors are these:

| ALGORITHM | GKSP | LENGTH |
|---|---|---|
| ALGORITHM EXTENSION | HIST-CHAIN | PARITY |
| ANTIVARIANT ONE | HIST-DOMAIN ID | PR USAGE |
| ANTIVARIANT ZERO | HIST-IPRK | PU USAGE |
| CV TYPE | HIST-IPUK | RTNKMP/RTCKMP |
| DOMAIN ID | HIST-KREGMODE | SOFTWARE |
| ECFAR | HIST-MDC | TESTZERO |
| ECFER | ICFER | THRES-MDC |
| EPUK | IDK | VAL/VAL AUTHENTICATOR |
| EXTENSION | INSTALLATION | |
| GADS | IPUK | |
| GDS | KREGMODE | |

A definition of the control vector fields is provided below in alphabetical order:

ALGORITHM <4 bits>

This field contains an algorithm unique code word which permits the CF to distinguish keys associated with one PKA from another. (The architecture permits the CF to implement multiple PKAs.) Each different PKA is assigned a different code word. The ALGORITHM field is checked before a key is used by the PKA, thus preventing keys associated with one PKA to be used with another PKA. The coding of this field is as follows:
　　B'0000': RSA Algorithm (modulus size from 512 to 2048 bits)
　　B'0001'-B'1111': reserved

ALGORITHM EXTENSION <3 bits>

This field is an extension of the ALGORITHM field, and the coding is dependent on the value of the ALGORITHM field.

For ALGORITHM field=B'0000', the coding of the ALGORITHM EXTENSION field is as follows:
　　B'000': No restrictions
　　B'001': Public key exponent is 3
　　B'010': Public key exponent is $2^{**}16+1$
　　B'011'-B'111': reserved

ANTIVARIANT ONE <1 bit>

This field is a fixed value of B'1'.

ANTIVARIANT ZERO <1 bit>

This field is a fixed value of B'0'.

CV TYPE <7 bits>

This field indicates the type of the control vector, which is also the key type of the key with which this control vector is associated. The following key types are defined for PKA keys:
　　1. B'1110010': Public Authentication Key 2. B'1111010': Private Authentication Key
3. B'1110000': Public Certification Key
4. B'1111000': Private Certification Key
5. B'1110001': Public Key Management Key
6. B'1111001': Private Key Management Key
7. B'1110011': Public User Key
8. B'1111011': Private User Key Note that the value of the first three bits of the CV TYPE field of PKA control vectors are always B'111', as opposed to other values for DEA control vectors.

DOMAIN ID <4 bits>

This field contains a domain identifier (an arbitrary value from B'0000' to B'1111' assigned by an installation). The domain ID field of all public and private keys used within a cryptographic instruction must be equal.

ECFAR <1 bit>

This field indicates whether a private key PR can be used in an ECFAR instruction to generate a digital signature on a CFAR:
B'0': cannot
B'1': can

ECFER <1 bit>

In a PRA control vector, this field indicates whether a PRA key can be used in the ECFER instruction to generate a digital signature on an XCFER. In a PUA control vector, this field indicates whether a PUA key can be used to encrypt a CFBDKB.
B'0': cannot
B'1': can

EPUK <1 bit>

This field indicates whether a private key can be used in an EPUK instruction to generate a digital signature on an output External Key Unit (EKU).
B'0': cannot
B'1': can

EXTENSION <2 bits>

This field indicates whether the control vector is a 64-bit, 128-bit, or >128-bit control vector. In PKCD, all control vectors are >128-bit control vectors.
B'00': 64 bit control vector base
B'01': the control vector is a 128-bit control vector
B'10': the control vector is >128-bit control vector
B'11': reserved

GADS <1 bit>

This field indicates whether a private key (PRC, PRM or PRU) can be used in a GADS instruction to generate a digital signature.
B'0': cannot
B'1': can

GDS <1 bit>

This field indicates whether a private key (PRA, PRC, PRM or PRU) can be used in a GDS instruction to generate a digital signature.
B'0': cannot
B'1': can

GKSP <1 bit>

This field indicates whether a key (PRM or PUM) can be used in a GKSP instruction.
B'0': cannot
B'1': can

HIST-CHAIN <2 bits>

This field indicates a chain of history of how a public key has been imported in the IPUK instruction:
B'00': other (i.e., not B'01', B'10', B'11')
B'01': conditions stated in (a) or (b) must be true:
  (a) PU in EKU1 is a PUC and is imported via import-mode=0;
  (b) PU in EKU1 is a PUC and is imported via import-mode=1; PU in IKU2 is a PUC with HIST-IPUK=1 and HIST-CHAIN=1; PU in EKU1 and PU in IKU2 have same DOMAIN ID.
B'10': conditions stated in (c) or (d) must be true:
  (c) PU in EKU1 is a PUM and is imported via import-mode=1; PU in IKU2 is a PUC with HIST-IPUK=1 and HIST-CHAIN=1; PU in EKU1 and PU in IKU1 have same DOMAIN ID.
  (d) PU in EKU1 is a PUA and is imported via import-mode=1; PU in IKU2 is a PUC with HIST-IPUK=1 and HIST-CHAIN=1.
B'11': conditions stated in (e) must be true:
  (e) PU in EKU1 is a PUA with HIST-IPUK=0 and is imported via import-mode=1; PU in IKU2 is a PUM with HIST-IPUK=1 and HIST-CHAIN=2.

Note: this field is valid only when HIST-IPUK=B'1'.

HIST-DOMAIN ID <4 bits>

HIST-DOMAIN ID is a field in a PUA control vector used to record the value of DOMAIN ID in a PUC or PUM control vector. A domain identifier is an arbitrary value from B'0000' to B'1111'. PUA is a key in an EKU imported with IPUK and PUM or PUC is a key used to validate the digital signature previously generated on the to-be-imported EKU at the sending device.

Note: this field is valid only when HIST-IPUK=B'1 and either HIST-CHAIN=B'10' or HIST-CHAIN=B'11'.

HIST-IPRK <1 bits>

This field indicates whether a private user key has been imported via the IPRK instruction, as follows:
B'0': not imported via IPRK
B'2': imported via IPRK

HIST-IPUK <1 bits>

This field indicates whether a public key (PUA, PUC, PUM, or PUU) has been imported via the IPUK instruction, as follows:
B'0': not imported via IPUK
B'1': imported via IPUK Note: the HIST-MDC and HIST-CHAIN fields in the control vector are valid only when HIST-IPUK in the control vector=B'1'. HIST-KREGMODE is valid only when HIST-IPUK=B'1' and HIST-CHAIN=B'11'.

HIST-KREGMODE <2 bits>

HIST-KREGMODE is a field in a PUA control vector used to record the value of KREGMODE in a PUM control vector. See also KREGMODE. PUA is a key in the EKU imported with IPUK and PUM is a key used to validate the digital signature previously generated on the to-be-imported EKU at the sending device.
B'00': KREGMODE=B'00' in PUM B'01': KREGMODE=B'01' in PUM
B'10': KREGMODE=B'10' in PUM
B'11': reserved
Note: this field is valid only when HIST-IPUK=B'1' and HIST-CHAIN=B'11'.

HIST-MDC <2 bits>

This field records IPUK information about a root PU in a chain, as follows:
B'00': reserved
B'01': root PU was imported in IPUK using MDC-mode=0 (i.e., no MDC)
B'10': root PU was imported in IPUK using MDC-mode=1 (i.e., with MDC) such that EKUMDC FLAG=B'10'.
B'11': root PU was imported in IPUK using MDC-mode=0 (i.e., with MDC) such that EKUMDC FLAG=B'11'.
Note: this field is valid only when HIST-IPUK=B'1'.

ICFER <1 bit>

In a PUA control vector, this field indicates whether a PUA key can be used in the ICFER instruction to validate a digital signature on an XCFER. In a PRA control vector, this field indicates whether a PRA key can be used to decrypt an encrypted CFBDKB.
B'0': cannot
B'1': can

IDK <1 bit>

This field indicates whether a key (PRM or PUM) can be used in an IDK instruction.
B'0': cannot
B'1': can

INSTALLATION <7 bits>

This field represents control vector bits that are controlled/managed entirely by the installation. The INSTALLATION field is not checked/enforced by the hardware (CF).

IPUK <1 bit>

This field indicates whether a public key can be used in an IPUK instruction to validate a digital signature on an input External Key Unit (EKU).
B'0': cannot
B'1': can
Note: the IPUK usage bit does not control the use of PU in an EKU to validate a signature on that same EKU.

KREGMODE <2 bits>

This field indicates the method used to register a public key management key (PUM) in a certification center environment.
B'00': PUM not registered
B'01': PUM registered without restrictions
B'10': PUM registered with restrictions
B'11': reserved

LENGTH <16 bits>

This field contains a length value which directly or indirectly determines key length or key size. The coding and interpretation of the LENGTH field is dependent of the ALGORITHM field.
For ALGORITHM=B'0000' (i.e., RSA) the LENGTH field contains a value from 512 to 2048 representing modulus length in bits. Unless elsewhere restricted, the public and private keys can range in length up to the modulus length. The key generator shall ensure that if LENGTH=n, then a modulus is generated such that the value of the modulus is B'1' followed by n−1 zero and one bits.

PARITY <16 bits>

This is a set of bits in the control vector reserved for use by CFAP and by the algorithm used to calculate the Hash Function h. The PARITY bits are used to set even byte parity on the 128-bit value H=h(C) produced by applying Hash Function h to control vector C.

PR USAGE <7 bits>

In a PR control vector, PR USAGE consists of architected usage bits and reserved bits. The PR USAGE field is also stored as history information in the associated PU control vector.
The following PR USAGE subfields are defined for a PRA control vector:
ECFAR <1 bit>
EPUK <1 bit>
ECFER <1 bit>
ICFER <1 bit>
GDS <1 bit>
The following PR USAGE subfields are defined for a PRC control vector:
ECFAR <1 bit>
RTNPMK/RTCPMK <1 bit>, reserved (=B'1')
EPUK <1 bit>
GDS <1 bit>
GADS <1 bit>
The following PR USAGE subfields are defined for a PRM control vector:
ECFAR <1 bit>
RTNPMK/RTCPMK <1 bit>, reserved (=B'1')
EPUK <1 bit>
GDS <1 bit>
GKSP <1 bit>
IDK <1 bit>
GADS <1 bit>
The following PR USAGE subfields are defined for a PRU control vector:
ECFAR <1 bit>
RTNPMK/RTCPMK <1 bit>, reserved (=B'1')
EPUK <1 bit>
GDS <1 bit>
GADS <1 bit>

PU USAGE <7 bits>

In a PU control vector, PU USAGE consists of architected usage bits and reserved bits. The PU USAGE field is also stored as history information in the associated PR control vector.
The following PU USAGE subfields are defined for a PUA control vector:
RTNPMK/RTCPMK <1 bit>, reserved (=B'1')
IPUK <1 bit>
ECFER <1 bit>
ICFER <1 bit>
The following PU USAGE subfields are defined for a PUC control vector:
RTNPMK/RTCPMK <1 bit>, reserved (=B'1')
IPUK <1 bit>
The following PU USAGE subfields are defined for a PUM control vector:
RTNPMK/RTCPMK <1 bit>, reserved (=B'1')

IPUK <1 bit>
GKSP <1 bit>
IDK <1 bit>

The following PU USAGE subfields are defined for a PUU control vector:

RTNPMK/RTCPMK <1 bit>, reserved (=B'1')
IPUK <1 bit>

RTNKMP/RTCKMP <1 bit>

This field indicates whether a public or private key can be reenciphered in an RTNKMP or RTCKMP instruction:
B'0': cannot
B'1': can
Note: This field has a fixed value of B'1', and is enforced in the GDAK and GPUPR instruction

SOFTWARE <6 bits>

This field represents control vector bits that are controlled/managed entirely by CFAP. The SOFTWARE field is not checked/enforced by the hardware (CF).

TESTZERO <3 bits>

This field is reserved by the CF and tested for zero. That is, TESTZERO must equal B'000'.

THRES-MDC <2 bits>

This field is used in a PRMa control vector to establish a threshold on HIST-MDC in a corresponding PUMb control vector. The PRMa and PUMb are used together in a GKSP or IDK instruction. Note that "a" represents this device and "b" another device.
B'00': reserved
B'01': HIST-MDC must be ≧B'01'
B'10': HIST-MDC must be ≧B'10'
B'11': HIST-MDC must be =B'11'

VALUE/AUTHENTICATOR <1 bit>

The VALUE/AUTHENTICATOR field is reserved for use by the algorithm used to calculate the Hash Function h.

The layout of control vectors for all PKCD keys are described in FIGS. 31 through 38, inclusive.

General Format for the Hash Vector

A definition of the has vector fields is provided below in alphabetical order:

ANTIVARIANT ONE <1 bit>

This field is a fixed value of B'1'.

ANTIVARIANT ZERO <1 bit>

This field is a fixed value of B'0'.

EXTENSION <2 bits>

This field indicates whether the hash vector is produced from a 64-bit, 128-bit, or >128-bit control vector. In PKCD, all hash vectors are produced from >128-bit control vectors.
B'00': hash vector produced from 64 bit control vector
B'01': hash vector produced from 128-bit control vector
B'10': hash vector produced from >128-bit control vector
B'11': reserved

HASH <107 bits>

The HASH field consists of 107 bits of a 128 bit Modification Detection Code (MDC) produced by using the MDC-2 hash algorithm. The HASH field consists of bits 00..06, 08..14, 16..22, 24..29, 32..37, 40..44, 48..54, 56..61, 64..70, 72..78, 80..86, 88..94, 96..102, 104..110, 112..118, 120..126 from the MDC.

PARITY <16 bits>

The PARITY bits are used to set even byte parity on the 128 hash vector.

VALUE/AUTHENTICATOR <1 bit>

The VALUE/AUTHENTICATOR field indicates whether the hash vector is associated with a value or an authenticator, as follows:
B'00': value
B'01': authenticator The layout of the Hash vector is described in FIG. 39.

Instruction Processing

Instruction Set

The CF instructions may be logically divided into eight functional categories:

| | |
|---|---|
| CF Initialization | These instructions support various CF initialization, including the PKA master key. |
| CF Configuration | This instruction is used to load a configuration vector into the CF. |
| CF Audit | This instruction is used to export the nonsecret portion of the CF environment. |
| CF Control | These instructions are used to control instruction execution and to change CF state. |
| CKDS Update | These instructions are used to reencipher the keys in a CKDS from a current to a new, or an old to a current, PKA master key. |
| Key Management | These instructions are used to generate, export, and import PKCD PKA keys. They are also used to generate and import DEA key-encrypting keys. |
| System Digital Signatures | These instructions are used to generate and verify system digital signatures. |
| Application Digital Signatures | These instructions are used to generate and verify application digital signatures. |
| Crypto Facility Backup | These instructions are used to export and import a CF environment. |
| Utility | These instructions provide miscellaneous cryptographic functions. |

The instructions are listed by group in the following table:

TABLE 1

| Instruction Name | Instruction Mnemonic |
|---|---|
| CF Initialization: | |
| Load Physical Identifier | LPID |
| Generate Device Authentication Key Pair | GDAK |
| Load First PKA Master Key Part | LFPMKP |
| Combine PKA Master Key Parts | CPMKP |
| Generate New PKA Master Key | GNPMK |
| Generate New DEA Master Key | GNDMK |
| Set PKA Master Key | SPMK |
| Load MDC For Public Certification Key | LMDCC |
| Load MDC | LMDC |
| Initialize Pseudo Random Number Generator | IPRNG |
| CF Configuration: | |
| Load Configuration Vector | LCV |
| CF Audit: | |
| Export Crypto Facility Audit Record | ECFAR |
| CF Control: | |
| Enter Preinit State | EPS |
| Enter Init State | EIS |
| Enter Run State | ERS |
| Clear New PKA Master Key Register | CLNPMK |
| Clear Old PKA Master Key Register | CLOPMK |
| Set Authorization Flag | SAF |
| Set Enable Flag | SEF |
| CKDS Update: | |
| Reencipher to New PKA Master Key | RTNPMK |
| Reencipher to Current PKA Master Key | RTCPMK |
| Key Management: | |
| Generate Public and Private Key Pair | GPUPR |
| Export Public Key | EPUK |
| Import Public Key | IPUK |
| Import Private Key | IPRK |
| Generate Key Set PKA | GKSP |
| Import DEA Key | IDK |
| Verify Internal Key Unit | VIKU |
| System Digital Signatures: | |
| Generate Digital Signature | GDS |
| Verify Digital Signature | VDS |
| Application Digital Signatures: | |
| Generate Application Digital Signature | GADS |
| Verify Application Digital Signature | VADS |
| Crypto Facility Backup: | |
| Export Crypto Facility Environment Record | ECFER |
| Import Crypto Facility Environment Record | ICFER |
| Utility: | |
| Set and Reset Alarm | SRALM |

CF Initialization

Load Physical Device ID (LPID)

```
          EQUATION:
    PID   /128b/
    →
    CC    /unspecified/
          PARAMETER DEFINITIONS:
    Inputs   Description
    PID      A 128 bit physical identifier of a device.
    Outputs  Description
    CC       Condition code indicating success or failure of the instruction execution.
```

Description:

The Load Physical Device ID instruction permits a 128 bit physical identifier of a device to be loaded into the CF and stored in the DID and EID registers. Execution of the LPID instruction causes the DID flag to be set to the "full" state. The instruction executes only when the DID flag is in the "empty" state. (Note that an EPS instruction must be executed in order to reset the DID flag to the "empty" state.) The DID flag serves two purposes: (a) it controls the execution of the LPID instruction, and (b) it indicates whether the DID and EID registers have or have not been initialized.

The value of PID stored in the DID register is the PID value associated with PUA and PRA (i.e., the PUA and PRA of that device).

The value of PID stored in the EID register is used for two purposes: (a) it is the value stored in the EIDO field of a certificate, and thus identifies the device to another device, and (b) it is the value stored in a DEA key record, which is used by the GKSP and IDK instructions as an anti-reimport value.

The 16 byte PID consists of an 8 byte network part and an 8 byte node part. The 8 byte node part uniquely identifies the node within a network. The 8 byte network part uniquely identifies the network. The objective is to arrive at a naming convention that will ensure unique PID values from one network to another. One possibility is for the 8 byte network part to be registered (e.g., with an IBM registration center).

The ECFAR instruction can be used by CFAP to read the contents of the DID and EID registers.

For reasons of security, the LPID instruction is architected such that the DID register contents cannot be changed without erasing the contents of the PUA and PRA buffers (i.e., a different PID can't be assigned to the same key pair stored in the PUA and PRA buffers). In like manner, the ICFER instruction is architected such that the EID register contents cannot be changed without reinitializing the CKMP register with a new key. Otherwise, use of the EID buffer as an anti-reimport value would be ineffective.

The LPID instruction executes only in the "preinit" state.

Generate Device Authentication Key Pair (GDAK)

```
          EQUATION:
    C1    /128 bits/
    C2    /128 bits/
    →
    CC    /unspecified/
          PARAMETER DEFINITIONS:
    Inputs   Description
    C1       A 128 bit control vector associated with the generated public authentication key PUA.
    C2       A 128 bit control vector associated with the generated private authentication key PRA.
```

| Outputs | Description |
|---|---|
| CC | Condition code indicating success or failure of the instruction execution. |

Description:

The Generate Device Authentication Key Pair instruction generates a public and private authentication key pair, PUA and PRA. The generated keys are stored in the PUA buffer and PRA buffer in the CF, respectively, as Crypto Facility PKA Key Record 1 (CFPKR1) and Crypto Facility PKA Key Record 2 (CFPKR2). The 128 bit control vectors associated with PUA and PRA are specified to the GDAK instruction as inputs C1 and C2, respectively. The control vectors specify the public key algorithm and other algorithm related information necessary for key generation. Consistency checking is performed on C1 and C2. For example, the ALGORITHM, ALGORITHM EXTENSION, and LENGTH fields in C1 and C2 must match.

Execution of the GDAK instruction causes the GDAK FLAG in the state vector to be set to the "full" state from the "empty state" state. The instruction executes only when the GDAK FLAG is in the "empty" state. (Note that the ES instruction must be executed to reset the GDAK FLAG to the "empty" state.)

The GDAK FLAG serves two purposes: (a) it controls execution of the GDAK instruction, and (b) it indicates when the PUA and PRA buffers have been initialized.

The GDAK instruction executes only in the "preinit" state.

Functional Specification:
1. Perform input parameter consistency checking: None.
2. Perform state vector checking:
   a. Verify that CF State in the state vector is in the "preinit" state
   b. Verify the GDAK FLAG in state vector is in the "empty" state.
   Continue if checking succeeds; otherwise set CC status flag and jump to step 8.
3. Perform control vector checking. Continue if checking succeeds; otherwise set CC status flag and jump to step 8.
4. Store control vectors:
   a. Store C1 in PUACV Register
   b. Store C2 in PRACV Register
5. Generate a pair of cryptographic facility PKA records cfpkr1 and cfpkr2 of length s1 and s2, respectively, where s1 and s2 are pre-selected values that indicate the number of 8 byte blocks.
6. Store generated keys and lengths:
   a. Store s1 in PUA Buffer Length field in CF Environment.
   b. Store cfpkr1 in PUA Buffer in CF Environment.
   c. Store s2 in PRA Buffer Length field in CF Environment.
   d. Store cfpkr2 in PRA Buffer in CF Environment.
7. Perform state vector update.
   a. Set GDAK FLAG to the "full" state.
8. Produce output CC from CC status flags.
Control Block and Control Vector Checking:
Perform control vector checking:
1. Checking on C1 (associated with PUA)
   a. Verify CV TYPE='public authentication key'
   b. Note: checking on CV TYPE EXTENSION has been deleted.
   c. Verify RTNKMP/RTCKMP usage bit=B'1'
   d. Perform Control Vector Validate on C1 to validate certain fields in C1.
   e. Verify RC1=0.
   If any of the above checking fails then stop the control vector checking and issue a condition code to indicate that C1 is not valid.
2. Checking on C2 (associated with PRA):
   a. Verify CV TYPE='private authentication key'
   b. Perform Control Vector Validate on C1 to validate certain fields in C1.
   c. Verify RC1=0.
   If any of the above checking fails then stop the control vector checking and issue a condition code to indicate that C2 is not valid.
3. Checking on C1 and C2.
   a. Note: checking on CV TYPE EXTENSION has been deleted.
   b. Verify ALGORITHM in C1=ALGORITHM in C2
   c. Verify ALGORITHM EXTENSION in C1=ALGORITHM EXTENSION in C2
   d. Verify LENGTH in C1=LENGTH in C2
   e. Verify PR USAGE in C1=PR USAGE in C2
   f. Verify PU USAGE in C1=PU USAGE in C2
   If any of the above checking fails then stop the control vector checking and issue a condition code to indicate that cross checking among control vectors has failed.
   Note that there is no cross checking in (1) DOMAIN ID since this field is not implemented in the PUA and PRA control vectors.

Load First PKA Master Key Part (LFPMKP)

```
EQUATION:
input-mode     /1b minimum/
<key-part>     /128b/        ; if input-mode=0
→
CC             /unspecified/
```

PARAMETER DEFINITIONS:

| Inputs | Description |
|---|---|
| input-mode | specifies how the key part to be processed is supplied to the instruction.<br>• 0: the key part is passed via the instruction interface, i.e., via input parameter key-part. |
| key-part | 128 bit key part. This parameter is required only when input-mode=0. |

| Outputs | Description |
|---|---|
| CC | Condition code indicating success or failure of the instruction execution. |

Description:

The Load First PKA Master Key Part instruction loads the first part of the PKA master key (KMP) into the NKMP (New PKA Master Key) register. An input-mode parameter indicates whether the loaded key part is passed as an input parameter at the instruction interface or whether it is retrieved from the internal KP register. The NKMP flag is set to the "partially full" state from the "empty" state and the NKMP History Flag is set to 0 (indicating that the contents of the NKMP register were loaded via the LFPMKP instruction). If input-mode=1, the operation is performed only if the KP flag is in the "full" state; in which case the KP flag is set to the "empty" state. The operation is performed only if the NKMP flag is in the "empty" state.

Note: If input-mode=1, it is assumed that prior to the execution of this instruction the first PKA master key part has been entered into the key part register via a key-entry device, keyboard, etc., which, optionally, may operate only in a special authorized mode (e.g., supersecure mode enabled via a physical key-activated switch).

The LFPMKP instruction executes only in the "run" state.

Combine PKA Master Key Parts (CPMKP)

```
    EQUATION:
input-mode    /1b minimum/
mode          /1b minimum/
<key-part>    /128b/        ; if input-mode=0
→
CC            /unspecified/
```
PARAMETER DEFINITIONS:

| Inputs | Description |
|---|---|
| input-mode | specifies how the key part to be processed is supplied to the instruction.<br>• 0: the key part is passed via the instruction interface, i.e., via input parameter key-part.<br>• 1: the key part is retrieved from the internal KP register. |
| mode | indicates whether the PKA master key part in the key part register is an intermediate key part or a last key part.<br>• 0:intermediate key part<br>• 1:last key part |
| key-part | 128 bit key part. This parameter is required only when input-mode=0. |
| Outputs | Description |
| CC | Condition code indicating success or failure of the instruction execution. |

Description:

The Combine PKA Master Key Parts instruction Exclusive ORs a PKA master key part with the PKA master key part stored in the NKMP register and stores the result in the NKMP register. An input-mode parameter indicates whether the loaded key part is passed as an input parameter at the instruction interface or whether it is retrieved from the internal KP register. The NKMP flag is set to the "full" state if mode=1 or to the "partially full" state if mode=0. For mode32 1, the CPMKP instruction ensures that the produced value of KMP has odd parity (odd parity adjusted, if necessary) and that the left and right 64 bit parts of KMP are not equal. If input-mode=1, the operation is performed only if the KP flag is in the "full" state; in which case the KP flag is set to the "empty" state. The operation is performed only if the NKMP flag is in the "partially full" state and the NKMP History flag is zero. The instruction has no output.

Note: If input-mode=1, it is assumed that prior to the execution of this instruction the first PKA master key part has been entered into the key part register via a key-entry device, keyboard, etc., which, optionally, may operate only in a special authorized mode (e.g., supersecure mode enabled via a physical key-activated switch).

The CPMKP instruction executes only in the "run" state.

Generate New PKA Master Key (GNPMK)

```
       EQUATION:
0
→
CC     /unspecified/
```
PARAMETER DEFINITIONS:

| Inputs | Description |
|---|---|
|  | None. |
| Outputs | Description |
| CC | Condition code indicating success or failure of the instruction execution. |

Description:

The Generate New PKA Master Key instruction causes a 128 bit odd parity adjusted random number to be generated and stored in the NKMP register. The left and right 64 bit parts of the generated key must be unequal. The instruction executes only if the NKMP flag is in the "empty" state. Successful execution of the GNPMK instruction causes the NKMP flag to be set to the "full" state from the "empty" state and the NKMP History flag to be set:=B'1'.

The GNPMK instruction executes only in the "run" state

Generate New DEA Master Key (GNDMK)

```
      EQUATION:
0
```

-continued

```
→
CC     /unspecified/
    PARAMETER DEFINITIONS:
Inputs    Description
          None.
Outputs   Description
CC        Condition code indicating success or failure of the instruction execution.
```

Description:
The Generate New DEA Master Key instruction causes a 128 bit odd parity adjusted random number to be generated and stored in the new master key register (i.e., the NKM register). The left and right 64 bit parts of the generated key must be unequal. The instruction executes only if the NKMP flag is in the "empty" state. Successful execution of the GNDMK instruction causes the NMK flag to be set to the "full" state from the "empty" state.

The GNDMK instruction executes only in the "run" state

Set PKA Master Key (SPMK)

```
    EQUATION:
0
→
CC     /unspecified/
    PARAMETER DEFINITIONS:
Inputs    Description
          None.
Outputs   Description
CC        Condition code indicating success or failure of the instruction execution.
```

Description:
The Set PKA Master Key instruction transfers the contents of the CKMP register into the OKMP register and then transfers the contents of the NKMP register into the CKMP register. This instruction operates only if the NKMP flag (new PKA master key flag) is in the "full" state and the left and right 64 bit parts of the key stored in the NKMP register are unequal. Also, if the CKMP flag is in the "full" state and CKMP HISTORY=1, then the instruction operates only if NKMP HISTORY=1. This guarantees that a CF-generated KMP can't be replaced by a CFAP-supplied KMP.

The SPMK instruction is sued to activate a new KMP after the RTNPMK instruction has been used to reencipher encrypted records in the CKDS from encryption under the current KMP to a new KMP.

The SPMK instruction executes only in the "run" state.

Load MDC For Public Certification Key (LMDCC)

The Load MDC For Public Certification Key instruction permits a 128 bit MDC, designated MDC-value, to be loaded and stored in the CF in one of 16 possible storage locations in MDC Table, designated as EKUMDC(0), ..., EKUMDC(15). MDC-value is stored in EKUMDC(i), where i is the value of index-value. MDC-value contains an MDC calculated on an External Key Unit (EKU) using one of several possible hashing algorithms (see the hash-rule parameter of the IPUK instruction). The EKU must contain a public certification key PUC. (The fact that EKU contains a public certification key is verified when EKU is imported using the IPUK instruction.) The Load MDC For Public Certification Key instruction sets EKUMDC FLAG(i) equal to B'10'.

The LMDCC instruction operates only when EKUMDC FLAG(i)=B'00'. Otherwise, to load an MDC into an already occupied MDC Table location requires EKUMDC FLAG(i) to be reset to B'00'. This can be done only be issuing an EPS or EIS instruction. For reasons of security, the LMDCC instruction is architected such that the MDC Table locations EKUMDC(0) thru EKUMDC(15) cannot be changed without erasing the contents of the CKMP register. Thus, a certification center has the means to audit each security module to ensure that public certification keys have been loaded in conformance with an established network security policy.

The EKUMDC FLAG serves the following purposes: (a) it controls initialization of the MDC Table via the LMDCC and LMDC instructions, and (b) it controls import of public keys via the "MDC-mode" parameter of the IPUK instruction.

```
    EQUATION:
index-value   /4b/
MDC-value     /128b/
→
CC            /unspecified/
    PARAMETER DEFINITIONS:
Inputs        Description
index-value   A 5 bit field containing an index value from 0 to 15.
MDC-value     A 128 bit modification detection code to be loaded into one of 16 128-bit storage
              locations in MDC Table, designated as EKUMDC(0), ..., EKUMDC(15).
Outputs       Description
CC            Condition code indicating success or failure of the instruction execution.
```

Description:

The ECFAR instruction can be used by CFAP to view the contents of the MDC Table and the EKUMDC FLAG field.

The LMDCC instruction executes only in the "run" state.

Load MDC (LMDC)

```
EQUATION:
MDC-value    /128b/
→
CC           /unspecified/
PARAMETER DEFINITIONS:
Inputs       Description
MDC-value    A 128 bit modification detection code to be loaded into EKUMDC(16).
Outputs      Description
CC           Condition code indicating success or failure of the instruction execution.
```

Description:

The Load MDC instruction permits a 128 bit MDC to be loaded and stored in MDC Table storage location EKUMDC(16). MDC-value contains MDC calculated on an External Key Unit (EKU) using one of several possible hashing algorithms (see the hash-rule parameter of the IPUK instruction). The EKU must contain a public key management key, a public authentication key, or a public user key (no public certification key).

(The fact that EKU contains a public key management key, a public authentication key, or a public user key is verified when EKU is imported using the IPUK instruction.)

Unlike the LMDCC instruction, the LMDC instruction executes regardless of the current value of EKUMDC FLAG(16). Execution of the LMDC instruction causes MDC-value to be loaded into EKUMDC(16) and EKUMDC FLAG(16) to be set equal to B'10'.

The EKUMDC FLAG serves the following purposes: (a) it controls initialization of the MDC Table via the LMDCC and LMDC instructions, and (b) it controls import of public keys via the "MDC-mode" parameter of the IPUK instruction.

The ECFAR instruction can be used by CFAP to view the contents of the MDC Table and the EKUMDC FLAG field.

The LMDC instruction executes only in the "run" state.

Initialize Pseudorandom Number Generator (IPRNG)

```
EQUATION:
0
→
CC           /unspecified/
PARAMETER DEFINITIONS:
Inputs       Description
             None.
Outputs      Description
CC           Conditon code indicating success or failure of the instruction execution.
```

Description:

The Initialize Pseudorandom Number Generator instruction initializes the pseudorandom number generator using the method specified in the Initialize Pseudo-Random Number algorithm (Initialize Pseudo-random Number). The Initialize Pseudorandom Number algorithm reads the current values stored in the PRNGKEY1, PRNGKEY1, and PRNGCTR1 registers and calculates two new key values which are then stored back into the PRNGKEY1 and PRNGKEY2 registers.

The IPRNG instruction executes in the "preinit", "init", and "run" states.

CF Configuration

Load Configuration Vector (LCV)

```
EQUATION:
config-vector  /512b/
→
CC             /unspecified/
PARAMETER DEFINITIONS:
Inputs         Description
config-vector  A configuration vector.
Outputs        Description
CC             Condition code indicating success or failure of the instruction execution.
```

Description:

The Load Configuration Vector instruction permits a 64 byte configuration vector to be loaded and stored within the CF Environment. Execution of the LCV instruction causes the LCV FLAG to be set to the "full" state. The LCV instruction executes only when the LCV FLAG is in the "empty" state. The LCV FLAG can only be reset to the "empty" state via execution of an EPS or EIS instruction. In effect, the LCV FLAG controls LCV execution as follows: (a) If the LCV FLAG = "empty" state, then LCV instruction execution is enabled for one execution only, whereas (b) if the LCV FLAG = "full" state, then LCV instruction execution is disabled.

Execution of the EIS instruction causes a configuration vector in the CF Environment to be initialized/reinitialized to a "default" value. This value can be changed by executing an LCV instruction.

For reasons of security, the LCV instruction is architected such that the configuration vector value stored in the CF Environment cannot be changed without erasing or invalidating the contents of the CKMP buffer.

The LCV instruction executes only in the "init" state.

Functional Specification:
1. Perform configuration vector and state vector checking:
   a. Verify that CF STATE in the state vector is in the "init" state.
   b. Verify that LCV FLAG in the state vector is in the "empty" state.
   Continue if checking succeeds; otherwise set CC status flag and jump to step 5.
2. Perform consistency checking on config-vector:
   a. Verify Version Number=X'01'
   b. Verify KM RELOAD=B'0'.
   c. Verify DEFINE(EPS)=B'1' or DEFINE(EIS)=B'1' (i.e., EPS or EIS or both are defined to prevent CF-reinitialization lockout)
   d. For i=0 to 71, do the following:
      1) Verify DEFINE(i)=B'1'.
      2) Verify AUTH CONTROL(i)=B'0'.
   e. For i=72 to start-inst-index minus 1, do the following:
      1) Verify DEFINE(i)=B'0'
      2) Verify AUTH CONTROL(i)=B'0'.
   continue if checking succeeds; otherwise set CC status flag and jump to step 5.
3. Load the value of configvector into the configuration vector
4. Perform state vector update:
   a. Set LCV FLAG to the "full" state.
   b. For i=start-inst-index to 143, process AUTH CONTROL as follows:
      1) If AUTH CONTROL(i)=B'0', then set AUTH-(i):=B'0' and ENABLE(i):=B'00'
      2) If AUTH CONTROL(i)=B'1', then set AUTH-(i):=B'1' and ENABLE(i):=B'11'
5. Produce output CC from CC status flags.

Control Vector Checking:
None.

Export Crypto Facility Audit Record (ECFAR)

| EQUATION: | | |
|---|---|---|
| process-mode | /2b minimum/ | |
| PUA-key | /1b minimum/ | |
| product-component | /1b minimum/ | |
| <hash-rule> | /3b minimum/ | ; if process-mode = (1 or 2) |
| <IKU1-length> | /16b/ | ; if process-mode = 2 |
| <IKU1> | /unspecified/ | ; if process-mode = 2 |
| <RN> | /64b/ | ; if process-mode = (1 or 2) |
| → | | |
| cfar-length | /16b/ | |
| cfar | /unspecified/ | |
| <dsig1-length> | /16b/ | ; if process-mode = (1 or 2) |
| <dsig1> | /unspecified/ | ; if process-mode = (1 or 2) |
| CC | /unspecified/ | |

PARAMETER DEFINITIONS:

| Inputs | Description |
|---|---|
| process-mode | The process-mode parameter specifies the type of processing to be performed:<br>• process-mode = 0 : no digital signature is generated<br>• process-mode = 1 : a digital signature is generated on CFAR1 using the private authentication key PRA stored in the PRA buffer in the CF.<br>• process-mode = 2 : a digital signature is generated on CFAR1 using the private key PR specified in IKU1.<br>• process-mode = 3 : reserved |
| PUA-key | The PUA-key parameter indicates whether the cfar should contain cfpkr1, which contains the PUA key:<br>• PUA-key=0 : no<br>• PUA-key=1 : yes |
| product-component | The product-component parameter indicates whether the cfar should contain the Nonsecret Product Environment:<br>• product-component=0 : no<br>• product-component=1 : yes |
| hash-rule | Specifies the hash algorithm to be used to calculate a hash value on cfar. The encoding of the hash-rule is as follows:<br>• hash-rule = 0 : MDC-2 algorithm<br>• hash-rule = 1 : MDC-4 algorithm<br>• hash-rule = 2 : MD4 algorithm<br>• hash-rule = 3 : quadratic residue<br>• hash-rule = 4-7 : reserved<br>This parameter is required only when process-mode=1 or process-mode=2. |
| IKU1-length | The length of IKU1 in bytes. This parameter is required only when process-mode=2. |
| IKU1 | An Internal Key Unit containing a private key PR. This parameter is required only when process-mode=2. The value of EID in SCB1 must equal the value in the EID register. The values of Tstart and Texp in SCB1 must satisfy the relationship Tstart ≤ DT < Texp, where DT is the current date and time expressed in Coordinated Universal Time. |
| RN | A CFAP-supplied time-variant parameter to be stored in CFAR1. This parameter is required only when process-mode=1 or process-mode=2. |
| Outputs | Description |
| cfar-length | The length of cfar in bytes. |
| cfar | A Crypto Facility Audit Record. |
| dsig1-length | The length of dsig1 in bits. This parameter is required only when process-mode=1 or process-mode=2. |
| dsig1 | A digital signature produced from a CF System Signature Record (CFSSR) and a private key PR, in accordance with section 6 of ISO DIS 9796. The CFSSR contains a 128-bit hash value calculated on cfar. This parameter is required only when process-mode=1 or |

|   |   |
|---|---|
|   | process-mode=2. |
| CC | Condition code indicating success or failure of the instruction execution. |

Description:

The Export Crypto Facility Audit Record instruction constructs a Crypto Facility Audit Record (CFAR) and returns it to the CFAP. The CFAR contains (1) a copy of the nonsecret part of the CF Environment, a date and time (DT) supplied by the CF, and (3) for process-mode=1 and process-mode=2, a CFAP-supplied time-variant value RN. RN can be a random number, sequence number, or time stamp, which may be used by a designated receiving device to ensure that a produced CFAR is current.

A process-mode parameter specifies to the instruction whether a digital signature is generated on the CFAR and, if so, then whether the private key is (1) PRA or (2) a PR supplied to the ECFAR instruction A hash-rule parameter indicates to the ECFAR instruction the hash algorithm to be used in generating the digital signature.

Process-mode=1 can only be executed when the GDAK FLAG is in the "full" state. Process-mode=2 can only be executed when the CKMP FLAG is in the "full" state.

The Export Crypto Facility Audit Record instruction executes in the "preinit", "init", and "run" states.

CF Control

Enter Preinit State (EPS)

and it executes algorithm Initialize Pseudo-random Number to (further) initialize the pseudorandom number generator. The Enter Preinit State instruction DOES NOT erase or zeroize the PRNGCTR1, PRNGCTR2, PRNGKEY1, and PRNGKEY2 registers, which are registers used by the Initialize Pseudo-random Number.

Enter Init State (EIS)

EQUATION:

$0 \rightarrow$ CC  /unspecified/

PARAMETER DEFINITIONS:

| Inputs | Description |
|---|---|
|   | None. |
| Outputs | Description |
| CC | Conditon code indicating success or failure of the instruction execution. |

Description:

The Enter Init State instruction loads a "default" configuration vector into the CF environment and resets certain flags in the state vector to change the state of the CF and to clear certain registers and buffers. (See "Configuration Vector" for a description of the default configuration vector.) More particularly, the Enter Init State instruction causes the flags controlling the old, current, and new KMP registers to be reset to the "empty" state, thereby causing these keys to be invalid. It causes EKUMDC FLAG field to be reset to zero, thereby invalidating any MDCs currently loaded in the MDC Table. It causes the LCV FLAG to be reset to the "empty" state, thereby enabling execution of the LCV instruction. It causes the CF STATE to be reset to the "init" state.

The Enter Init State instruction does not reset flags

EQUATION:

$0 \rightarrow$ CC  /unspecified/

PARAMETER DEFINITIONS:

| Inputs | Description |
|---|---|
|   | None. |
| Outputs | Description |
| CC | Conditon code indicating success or failure of the instruction execution. |

Description:

The Enter Preinit State instruction resets the CF STATE to the "preinit" state; it resets the configuration and state vectors to zero; it resets the POS register to value X'0123456789ABCDEF0123456789ABCDEF';

associated with the master key KM.

The EIS instruction can be executed in the "preinit", "init", and "run" states.

Enter Run State (ERS)

EQUATION:

$0 \rightarrow$ CC  /unspecified/

PARAMETER DEFINITIONS:

| Inputs | Description |
|---|---|
|   | None. |
| Outputs | Description |
| CC | Conditon code indicating success or failure of the instruction execution. |

81

Description:
The Enter Run State instruction causes the CF STATE flag to be set to the "run" state.
The ERS instruction executes only in the "init" state.

82

The Clear Old PKA Master Key Register instruction executes only in the "run" state.

Set Authorization Flag (SAF)

EQUATION:
inst-index /16b/
$\rightarrow$
CC /unspecified/

PARAMETER DEFINITIONS:

| Inputs | Description |
|---|---|
| inst-index | An instruction and instruction-mode index referencing AUTH(inst-index) in the AUTH field of the state vector. inst-index is a positive integer value between start-inst-index and 143, inclusive. See Configuration Table for a definition of start-inst-index and end inst-index. See also AUTH field in the state vector. | inst-index is value referencing the following PKCD instructions and instruction modes:

| | | |
|---|---|---|
| 110 VADS | 121 CPMKP (input 0) | 132 IPRK (input 0) |
| 111 SRALM | 122 CPMKP (input 1) | 133 IPRK (input 1) |
| 112 IPRNG | 123 GNPMK | 134 RTNPMK |
| 113 EPS | 124 GNDMK | 135 RTCPMK |
| 114 ECFAR | 125 CLNPMK | 136 GKSP |
| 115 EIS | 126 CLOPMK | 137 IDK |
| 116 SAF | 127 SPMK | 138 GADS |
| 117 LMDCC | 128 GPUPR (mode 0/2) | 139 GDS |
| 118 LMDC | 129 GPUPR (mode 1) | 140 VDS |
| 119 LFPMKP (input 0) | 130 EPUK | 141 ECFER |
| 120 LFPMKP (input 1) | 131 IPUK | 142 ICFER |
| | | 143 VIKU |

| Outputs | Description |
|---|---|
| CC | Condition code indicating success or failure of the instruction execution. |

Clear New PKA Master Key Register (CLNPMK)

Description:
The Set Authorization Flag instruction permits an

EQUATION:
0
$\rightarrow$
CC /unspecified/

PARAMETER DEFINITIONS:

| Inputs | Description |
|---|---|
| | None. |

| Outputs | Description |
|---|---|
| CC | Conditon code indicating success or failure of the instruction execution. |

Description:
The Clear New PKA Master Key Register instruction causes the NKMP flag in the state vector to be reset to the "empty" state.

The Clear New PKA Master Key Register instruction executes only in the "run" state.

Clear Old PKA Master Key Register (CLOPMK)

AUTH flag associated with a particular instruction or instruction mode to be set to the "authorization required" state. Initially, the AUTH flag may be in the "authorization not required" or "authorization required" state.

AUTH flags are reset to the "authorization not required" state via execution of an EPS or EIS instruction.

EQUATION:
0
$\rightarrow$
CC /unspecified/

PARAMETER DEFINITIONS:

| Inputs | Description |
|---|---|
| | None. |

| Outputs | Description |
|---|---|
| CC | Conditon code indicating success or failure of the instruction execution. |

Description:
The Clear Old PKA Master Key Register instruction causes the OKMP flag in the state vector to be reset to the "empty" state.

The Set Authorization Flag instruction executes in the "init" and "run" states.

Set Enable Flag (SEF)

EQUATION:
inst-index /16b/
flag-val /2b minimum/

-continued

| | | |
|---|---|---|
| <ctr> | /8b/ | ; if inst-index='CPMKP input-mode=0'<br>or inst-index='CPMKP input-mode=1'<br>or inst-index='GPUPR mode=0/2' |
| <r> | /16b/ | |
| <V> | /unspecified/ | |
| → | | |
| CC | /unspecified/ | |

PARAMETER DEFINITIONS:

| Inputs | Description |
|---|---|
| inst-index | An instruction and instruction-mode index referencing ENABLE(inst-index) in the ENABLE field of the state vector. inst-index is a positive integer value between start-inst-index and 143, inclusive. See Configuration Table for a definition of start-inst-index and 143. See also ENABLE field in the state vector.<br>inst-index is value referencing the PKCD instructions and instruction modes, as follows:<br>110 VADS    121 CPMKP (input 0)   132 IPRK (input 0)<br>111 SRALM   122 CPMKP (input 1)   133 IPRK (input 1)<br>112 IPRNG   123 GNPMK             134 RTNPMK<br>113 EPS     124 GNDMK             135 RTCPMK<br>114 ECFAR   125 CLNPMK            136 GKSP<br>115 EIS     126 CLOPMK            137 IDK<br>116 SAF     127 SPMK              138 GADS<br>117 LMDCC   128 GPUPR (mode 0/2)  139 GDS<br>118 LMDC    129 GPUPR (mode 1)    140 VDS<br>119 LFPMKP (input 0)  130 EPUK       141 ECFER<br>120 LFPMKP (input 1)  131 IPUK       142 ICFER<br>                                     143 VIKU |
| flag-val | A parameter specifying the ENABLE(inst-index) value, as follows:<br>• 0 : enabled for any number of executions.<br>• 1 : enabled for 1 execution only.<br>• 2 : enabled for n(n= 1 thru 255) executions, where n is specified in input parameter ctr.<br>• 3 : not enabled<br>The permitted values of flag-val for each instruction and instruction mode are listed below (see also the ENABLE field in the state vector for a description of ENABLE(inst-index) values which are valid and invalid). |

| inst index | 0 | 1 | 2 | 3 | inst index | 0 | 1 | 2 | 3 |
|---|---|---|---|---|---|---|---|---|---|
| 108 reserved | | | | | 127 SPMK | y | y | | y |
| 109 reserved | | | | | 128 GPUPR (mode 0/2) | y | | y | y |
| 110 VADS | y | | | y | 129 GPUPR (mode 1) | y | | | y |
| 111 SRALM | y | | | y | 130 EPUK | y | | | y |
| 112 IPRNG | y | | | y | 131 IPUK | y | | | y |
| 113 EPS | y | | | y | 132 IPRK (input 0) | y | | | y |
| 114 ECFAR | y | | | y | 133 IPRK (input 1) | y | | | y |
| 115 EIS | y | | | y | 134 RTNPMK | y | | | y |
| 116 SAF | y | | | y | 135 RTCPMK | y | | | y |
| 117 LMDCC | y | y | | y | 136 GKSP | y | | | y |
| 118 LMDC | y | y | | y | 137 IDK | y | | | y |
| 119 LFPMKP (input 0) | y | y | | y | 138 GADS | y | | | y |
| 120 LFPMKP (input 1) | y | y | | y | 139 GDS | y | | | y |
| 121 CPMKP (input 0) | y | | y | y | 140 VDS | y | | | y |
| 122 CPMKP (input 1) | y | | y | y | 141 ECFER | y | y | | y |
| 123 GNPMK | y | y | | y | 142 ICFER | y | | | y |
| 124 GNDMK | y | y | | y | 143 VIKU | y | | | y |
| 125 CLNPMK | y | | | y | | | | | |
| 126 CLOPMK | y | | | y | | | | | |

| | |
|---|---|
| ctr | A counter specifying a number (1 thru 255) of permitted executions of the instruction or instruction-mode specified by inst-index. This parameter is required only when inst-index='CPMKP input-mode=0' or inst-index='CPMKP input-mode=1' or inst-index='GPUPR mode=0/2'. |
| r | The length of V in bytes. This parameter is required only when V is present. |
| V | A parameter containing proof of authorization. The specification of what V contains, the format of V, and the processing performed on V is not defined by the PKCD. This is an implementation choice. This parameter is optional and is needed only when required by the implementation. |
| Outputs | Description |
| CC | Condition code indicating success or failure of the instruction execution. |

Description:

The Set Enable Flag instruction permits an ENABLE flag associated with a particular instruction or instruction mode to be set to one of its permitted ENABLE flag values. The possible ENABLE flag values are (1) enabled, (2) enabled for 1 execution, (3) enabled for n execution, where in is a number from 1 to 255, and (4) disabled.

The ENABLE flag value supported by each instruction vary. See the definition of the flag-val parameter.

The SEF instruction has no associated DEFINE, AUTH CONTROL, AUTH, and ENABLE flags to control SEF instruction execution.

The SEF instruction executes in the "init" and "run" states.

CKDS Update

Reencipher To New PKA Master Key (RTNPMK)

| EQUATION: | |
|---|---|
| IKU1-length | /16b/ |
| IKU1 | /unspecified/ |
| → | |
| IKU2 | /unspecified/ |
| CC | /unspecified/ |
| PARAMETER DEFINITIONS: | |
| Inputs | Description |
| IKU1-length | The length of IKU1 in bytes. |
| IKU1 | An Internal Key Unit. |
| Outputs | Description |
| IKU2 | An Internal Key Unit. The length of IKU2 in bytes is equal to IKU1-length. |
| CC | Condition code indicating success or failure of the instruction execution. |

Description:
The Reencipher To New PKA Master Key instruction reenciphers an IKU from encryption under the current PKA master key (CKMP) to encryption under a new PKA master key (NKMP). The instruction operates only if the CKMP FLAG and the NKMP FLAG are in the "full" states. Also, if CKMP has been generated via the GNPMK instruction, then the instruction operates only if NKMP has been generated via the GNPMK instruction.

The RTNPMK instruction executes only in the "run" state.

Reencipher To Current PKA Master Key (RTCPMK)

| EQUATION: | |
|---|---|
| IKU1-length | /16b/ |
| IKU1 | /unspecified/ |
| → | |
| IKU2 | /unspecified/ |
| CC | /unspecified/ |
| PARAMETER DEFINITIONS: | |
| Inputs | Description |
| IKU1-length | The length of IKU1 in bytes. |
| IKU1 | An Internal Key Unit. |
| Outputs | Description |
| IKU2 | An Internal Key Unit. The length of IKU2 in bytes is equal to IKU1-length. |
| CC | Condition code indicating success or failure of the instruction execution. |

Description:
The Reencipher To Current PKA Master Key instruction reenciphers an IKU from encryption under the old PKA master key (OKMP) to encryption under the current PKA master key (CKMP). The instruction operates only if the OKMP FLAG and the CKMP FLAG are in the "full" states.

Key Management

Generate Public and Private Key Pair (GPUPR)

| EQUATION: | | |
|---|---|---|
| gen-mode | /2b minimum/ | |
| <codeword> | /128b/ | ; if gen-mode=1 |
| SKU1-length | /16b/ | |
| SKU1 | /unspecified/ | |
| SKU2-length | /16b/ | |
| SKU2 | /unspecified/ | |
| → | | |
| IKU1-length | /16b/ | |
| IKU1 | /unspecified/ | |
| <IKU2-length> | /16b/ | ; if gen-mode=0 or gen-mode=1 |
| <IKU2> | /unspecified/ | ; if gen-mode=0 or gen-mode=1 |
| <EKU2-length> | /16b/ | ; if gen-mode=2 |
| <EKU2> | /unspecified/ | ; if gen-mode=2 |
| CC | /unspecified/ | |
| PARAMETER DEFINITONS: | | |
| Inputs | Description | |
| gen-mode | The gen-mode parameter specifies the generation mode of the GPUPR instruction.<br>• gen-mode=0 : PU and PR are randomly generated. The generated (PU,PR) are a (PUC,PRC), (PUM,PRM), or (PUU,PRU). PU and PR are output as IKU1 and IKU2, respectively.<br>• gen-mode=1 : PU and PR are generated from codeword, such that whenever the same codeword is specified to the GPUPR instruction the same (PU,PR) pair is generated. The generated (PU,PR) is a (PUU,PRU). PU and PR are output as IKU1 and IKU2, respectively.<br>• gen-mode=2 : PU and PR are randomly generated. The generated (PU,PR) is a (PUU,PUR). PU and PR are output as IKU1 and EKU1, respectively. | |
| codeword | A value using by the key generator to derive PU and PR. | |
| SKU1-length | The length of SKU1 in bytes. | |

| | -continued |
|---|---|
| SKU1 | A Skeleton Key Unit for to-be-generated PU. |
| SKU2-length | The length of SKU2 in bytes. |
| SKU2 | A Skeleton Key Unit for to-be-generated PR. |
| Outputs | Description |
| IKU1-length | The length of IKU1 in bytes. |
| IKU1 | An Internal Key Unit containing generated PU. The value of EID in SCB1 must equal the value in the EID register. The value of Texp in SCB1 must satisfy the relationship DT < Texp, where DT is the current date and time expressed in Coordinated Universal Time. |
| IKU2-length | The length of IKU2 in bytes. This parameter is required only when gen-mode=0 or gen-mode=1. |
| IKU2 | An Internal Key Unit containing generated PR. This parameter is required only when gen-mode=0 or gen-mode=1. The value of EID in SCB2 must equal the value in SCB1. The values of Tstart and Texp in SCB2 must equal the values of Tstart and Texp in SCB1. |
| EKU2-length | The length of EKU2 in bytes. This parameter is required only when gen-mode=2. |
| EKU2 | An External Key Unit containing generated PR. This parameter is required only when gen-mode=2. |
| CC | Condition code indicating success or failure of the instruction execution. |

Description

The Generate Public and Private Key Pair instruction generates a public and private key pair, PU and PR, and stores each key in and Internal Key Unit (IKU) or External Key Unit (EKU) depending the value of a gen-mode parameter supplied to the Generate Public and Private Key Pair instruction.

For gen-mode=0, the generated keys can be a (PUC,PRC), (PUM,PRM), or (PUU,PRU) key pair. However, to generate a (PUC,PRC) pair, the device must be configured as a certification center (i.e., CERTIFICATION=B'1' must be specified in the configuration vector). Both PU and PR are output as Internal Key Units.

For gen-mode=1, the generated keys can be a (PUU,PRU) key pair only. In this case, the keys are generate from a 128 bit code word supplied to the Generate Public and Private Key Pair instruction. Both PUU and PRU are output as Internal Key Units.

For gen-mode=2, the generated keys can be a (PUU,PRU) key pair only. PUU is output as an Internal Key Unit and PRU is output as an External Key Unit (i.e., PRU is output in clear form).

The attributes of the to-be-generated keys, PU and PR, are specified in Skeleton Key Units, SKU1, and SKU2, respectively. Consistently checking is performed on the control blocks and control vectors in SKU1 and SKU2, prior to generating PU and PR. Control vector fields such as ALGORITHM, ALGORITHM EXTENSION, LENGTH, DOMAIN ID must be the same for both PU and PR. The EID field in SCB1 of SKU1 and the EID field in SCB2 of SKU2 must be equal to the value stored in the EID register of the CF (i.e., the EID value originally set using an LPID instruction).

The control vector fields ALGORITHM, ALGORITHM EXTENSION, and LENGTH specify to the cryptographic facility the public key algorithm and other key generation information sufficient to permit (PU,PR) to be generated.

The Generate Public and Private Key Pair instruction executes only in the "run" state.

Functional Specification:

1. Perform input parameter consistency checking.
   a. Verify gen-mode has value 0, 1, or 2
   b. Verify that SKU1 is consistent to definition of an SKU.
   c. Verify that SKU2 is consistent to definition of an SKU.

Continue if checking succeeds; otherwise set CC status flag and jump to step 9.

2. Perform configuration vector and state vector checking:
   a. Verify that CF STATE in state vector is in the "run" state.
   b. Verify that KMP-FLAG(CKMP) in state vector is in the "full" state.
   c. If gen-mode=0 or gen-mode=2, then do:
      1) Verify that DEFINE(GPUPR mode=0/2) in config. vector=B'1'.
      2) Verify that ENABLE(GPUPR mode=0/2) in state vector=B'00' or B'10'.
   d. If gen-mode=1 then do:
      1) Verify that DEFINE(GPUPR mode=1) in config. vector=B'1'.
      2) Verify that ENABLE(GPUPR mode=1) in state vector=B'00'.

Continue if checking succeeds; otherwise set CC status flag and jump to step 9.

3. Perform control block and control vector checking. Continue if checking succeeds; otherwise set CC status flag and jump to step 9.

4. Generate Keys:
   a. If gen-mode=0 or gen-mode=2, then perform PKA Key Generation to generate a pair of public and private cryptographic facility PKA records cfpkr1 and cfpkr2, respectively. The length of cfpkr1 and cfpkr2 are s1 and s2, respectively, where s1 and s2 are pre-selected values that indicate the number of 8 byte blocks.
   b. If gen-mode=1, then perform PKA Key Generation, with code-word supplied as an input, to regenerate a pair of public and private cryptographic facility PKA records cfpkr1 and cfpkr2, respectively. The length of cfpkr1 and cfpkr2 are sq and s2, respectively, where s1 and s2 are pre-selected values that indicate the number of 8 byte blocks.

5. Prepare outputs IKU1-length and IKU1:
   a. Construct a key authenticator record cfkar1 from the kay record cfpkr1, using the method specified in Key Record Encrypt Algorithm 12.
   b. Construct a clear key unit CKU1 from SKU1, cfpkr1, and cfkar1.
   c. Set CKMP:=value of KMP stored in the CKMP register.
   d. Perform Encipher Clear Key Unit on CKU1 to obtain an internal key unit IKU1, using CKMP as the master key KMP.

6. Prepare outputs IKU2-length and IKU2, if gen-mode=0 or gen-mode=1:
  a. Construct a key authenticator record cfkar2 from the key record cfpkr2, using the method specified in Key Record Encrypt Algorithm 12.
  b. Construct a clear key unit CKU2 from SKU2, cfpkr2, and cfkar2.
  c. Perform Encipher Clear Key Unit on CKU2 to obtain an internal key unit IKU2, using CKMP as the master key KMP.
7. Prepare outputs EKU2-length and EKU2, if gen-mode=2:
  a. Construct an external key unit EKU2 from SKU2 and cfpkr2.
8. Perform state vector update:
  a. If (gen-mode=0 and ENABLE(GPUPR mode=0/2)=B'10') or (gen-mode=2 and ENABLE(GPUPR mode≦0/2)=B'10'), then do:
    1) Decrement COUNTER(GPUPR mode=0/2) in Counter Table by 1.
    2) If COUNTER(GPUPR mode=0/2)=0, then reset ENABLE(GPUPR mode=0/2):=B'11' (i.e., reset the ENABLE Flag to the "disabled" state).
9. Produce output CC from CC status flags.

Control Block and Control Vector Checking:
Perform control block and control vector checking:
1. Extract SCB1 and C1 from SKU1:
  a. Extract the system control block SCB1 from SKU1.
  b. Extract control vector C1 from SCB1.
2. Extract SCB2 and C2 from SKU2.
  a. Extract the system control block SCB2 from SKU2.
  b. Extract control vector C2 from SCB2.
3. Checking on C1 (associated with pub'ic key):
  a. If gen-mode=0, then verify CV TYPE in C1='public certification key' or 'public key management key' or 'public user key'
  b. If gen-mode=1 or gen-mode=2, then verify CV TYPE in C1='public user key'
  c. Verify RTNPMK/RTCPMK in C1=B'1' (i.e., 'enabled')
  d. Verify HIST-IPUK in C1=B'0' (i.e., 'not imported')
4. checking on C2 (associated with private key):
  a. If CV TYPE in C2='PRU', then verify HIST-IPRK in C2=B'0' (i.e., not imported via IPRK instruction)
  b. Verify RTNPMK/RTCPMK in C2=B'1' (i.e., 'enabled')
5. Checking on C1 and C2 (i.e., for a PUC/PRC, PUM/PRM, or PUU/PRU):
  a. Verify (CV TYPE in C1) XOR B'0001000'=(CV TYPE in C2)
  b. Verify (ALGORITHM in C1)=(ALGORITHM in C2)
  c. Verify (ALGORITHM EXTENSION in C1)=(ALGORITHM EXTENSION in C2)
  d. Verify (LENGTH in C1)=(LENGTH in C2)
  e. Verify (DOMAIN ID in C1)=(DOMAIN ID in C2)
  f. Verify (PR USAGE in C1)=(PR USAGE in C2)
  g. Verify (PU USAGE in C1)=(PU USAGE in C2)
6. Checking on C1 and configuration vector:
  a. If CV TYPE in C1='public certification key', then verify CERTIFICATION in config. vector=B'1' (i.e., certification center).
  b. If (CV TYPE in C1='public key management key') and (KREGMODE in C1=B'01'), then verify KREG in config. vector=B'0'.
7. Checking on C2 and configuration vector, if CV TYPE in C2='private key management key':
  a. Verify THRES-MDC in C2≧FLOOR-MDC in config. vector.
8. (optional) Checking on SCB1:
  a. (optional) Verify that the current date and time is less than the expiration time Texp specified in SCB1.
  b. (optional) Verify that the Environment ID stored in the EID register is the same as the Environment ID stored in SCB1.
  Note: :Tstart, Texp, and EID are checked only when an IKU is used.
9. Checking on SCB1 and SCB2:
  a. Verify that the values of Environment ID stored in SCB1 and SCB2 are the same.
  b. Verify that the values of Tstart stored in SCB1 and SCB2 are the same.
  c. Verify that the values of Texp stored in SCB1 and SCB2 are the same.

Continue if checking succeeds; otherwise set CC status flag and jump to step 9.

Export Public Key (EPUK)

| EQUATION: | | |
|---|---|---|
| PU-mode | /1b minimum/ | |
| PR-mode | /2b minimum/ | |
| <hash-rule> | /3b minimum/ | ; if PR-mode=2 or PR-mode=3 |
| <IKU1-length> | /16b/ | ; if PU-mode=0 |
| <IKU1> | /unspecified/ | ; if PU-mode=0 |
| <IKU2-length> | /16b/ | ; if PR-mode=2 |
| <IKU2> | /unspecified/ | ; if PR-mode=2 |
| C3 | /128b/ | |
| → | | |
| EKU3-length | /16b/ | |
| EKU3 | /unspecified/ | |
| <dsig1-length> | /16b/ | ; if PR-mode=2 or PR-mode=3 |
| <dsig1> | /unspecified/ | ; if PR-mode=2 or PR-mode=3 |
| CC | /unspecified/ | |

PARAMETER DEFINITIONS:

| Inputs | Description |
|---|---|
| PU-mode | The PU-mode parameter specifies the source of the public key to be exported, as follows: <br> • PU-mode=0 : use PU in IKU1 <br> • PU-mode=1 : use PUA in CF |
| PR-mode | The PR-mode parameter specifies whether a digital signature is generated and, if so, then |

|  |  |
|---|---|
|  | also the source of PR.<br>• PR-mode=0 : no<br>• PR-mode=1 : reserved<br>• PR-mode=2 : yes, use PR in IKU2<br>• PR-mode=3 : yes, use PRA in CF |
| hash-rule | Specifies the hash algorithm to be used to calculate a hash value on EKU3. The encoding of the hash-rule is as follows:<br>• hash-rule = 0:MDC-2-algorithm<br>• hash-rule = 1:MDC-4 algorithm<br>• hash-rule = 2:MD4 algorithm<br>• hash-rule = 3:quadratic residue<br>• hash-rule = 4-7:reserved<br>This parameter is required only when PR-mode=2 or PR-mode=3. |
| IKU1-length | The length of IKU1 in bytes. This parameter is required only when PU-mode=0. |
| IKU1 | An Internal Key Unit containing PU. This parameter is required only when PU-mode=0<br>No checking is performed on the EID, Tstart, and Texp fields in SCB1. |
| IKU2-length | The length of IKU2 in bytes. This parameter is required only when PR-mode=2. |
| IKU2 | An Internal Key Unit containing PR. This parameter is required only when PR-mode=2. The value of EID in SCB2 must equal the value in the EID register. The values of Tstart and Texp in SCB2 must satisfy the relationship Tstart $\leq$ DT $<$ Texp, where DT is the current date and time expressed in Coordinated Universal Time. |
| C3 | A 16 byte control vector for to-be-exported PU. |
| Outputs | Description |
| EKU3-length | The length of EKU3 in bytes. |
| EKU3 | An External Key Unit containing the exported PU. |
| dsig1-length | The length of dsig1 in bits. This parameter is required only when PR-mode=2 or PR-mode=3. |
| dsig1 | A digital signature produced from a CF System Signature Record (CFSSR) and a private key PR, in accordance with section 6 of ISO DIS 9796. The CFSSR contains a 128-bit hash value calculated on EKU3. This parameter is required only when PR-mode=2 or PR-mode=3. |
| CC | Condition code indicating success or failure of the instruction execution. |

Description:

The Export Public Key instruction (1) translates an Internal Key Unit containing public key PU to an External Key Unit containing PU (PU-mode=0) or (2) it constructs an External Key Unit for the internally stored key PUA (PU-mode=1).

The Export Public Key instruction has options for outputting the constructed External Key Unit (1) without a digital signature (PR-mode=0), (2) with a digital signature generated with a PR supplied to the Export Public Key instruction (PR-mode=2), or (3) with a digital signature generated with the internally stored key PRA (PR-mode=3). The private key PR used with PR-mode=2 can be a PRC, PRM, or PRU key. However, to generate a digital signature with private key PRC, the device must be configured as a certification center (i.e., CERTIFICATION=B'1' must be specified in the configuration vector). A hash-rule parameter indicates to the EPUK instruction the has algorithm to be used in generating the digital signature.

Control vectors C1, C3, and C4 are all associated with the PU to be exported. C1 is stored either in IKU1 (PU-mode=0) or in the PUACV register (PU-mode=1). C4 is stored in EKU3, and C3 is an intermediate value used by the CFAP to request changes to C1, as follows. When a PU is exported, the CFAP is permitted, in certain cases, to change control vector fields. If no change is desired or no change is permitted, then the CFAP sets C3:=C1, else the CFAP produces C3 by making selected changes to C1. The control vector checking process assures that C3 is properly specified. Likewise, when a PU is exported the CF is permitted to change certain control vector fields. If no change is needed or prescribed, then the CF sets C4:=C3; else the CF produced C4 by making selected changes to C3.

The export Public Key instruction executes only in the "run" state.

Functional Specification:

1. Perform input parameter consistency checking:
   a. Verify PR-mode has value 0, 2, or 3
   b. If PU-mode=0, then verify that IKU1 is consistent to definition of an IKU
   c. If PR-mode=2, then verify that IKU2 is consistent to definition of an IKU Continue if checking succeeds; otherwise set CC status flag and jump to step 9.

2. Perform configuration vector and state vector checking:
   a. Verify that DEFINE(EPUK) in config. vector=B'1'.
   b. Verify that CF STATE in state vector is in the "run" state.
   c. Verify that ENABLE(EPUK) in state vector=B'00'.
   d. Verify that KMP-FLAG(CKMP) in state vector is in the "full" state.

Continue if checking succeeds; otherwise set CC status flag and jump to step 9.

3. Perform control block and control vector checking. Continue if checking succeeds; otherwise set CC status flag and jump to step 9.

4. Construct outputs EKU3-length and EKU3, if PU-mode=0:
   a. Set CKMP:=value of KMP in the CKMP register.
   b. Perform Recover Clear Key Unit on IKU1 to recover a clear key unit CKU1, using CKMP as the master key KMP.
   c. Construct control vector C4 from C3.
   d. Construct an external key unit EKU3 and its length EKU3-length, from CKU1 and C4.

5. Construct outputs EKU3-length and EKU3, if PU-mode=1:
   a. Construct control vector C4 from C3.
   b. Construct SCB for an external key unit, from C4 and Environment ID.
   c. Construct external key unit EKU3 and its length EKU3-length, from the the key record of the PUA stored inside the CF and from the SCB.

6. Produce outputs dsig1-length and disg1, if PR-mode=2:
   a. Extract control vector C from IKU2.
   b. Calculate a hash value on EKU3, using the hash algorithm specified by input hash-rule.
   c. Construct a cryptographic facility system signature record cfssr1 from hash-rule and the calculated hash value.
   d. Calculate digital signature dsig1 on the constructed cfssr1, using the private key stored in IKU2.
7. Produce outputs dsig1-length and dsig1, if PR-mode=3:
   a. Calculate a hash value on EKU3, using the hash algorithm specified by
   b. Construct a cryptographic facility system signature record from hash-rule and the calculated hash value.
   c. Calculate digital signature dsig1 on the constructed cryptographic facility system signature record, using the private authenticator key stored inside the CF.
8. Perform state vector update: None.
9. Produce output CC from CC status flags.
   Control Block and Control Vector Checking:
   Perform control block and control vector checking:
1. Extract SCB1 and C1 from IKU1, if PU-mode=0:
   a. Extract the system control block SCB1 from IKU1.
   b. Extract control vector C1 from SCB1.
2. Extract C1 from PUACV register, if PU-mode=1:
   a. Set C1:=16 byte control vector in the PUACV register.
3. Extract SCB2 and C2 from IKU2, if PR-mode=2:
   a. Extract the system control block SCB2 from IKU2.
   b. Extract control vector C2 from SCB2.
4. Extract C2 from PRACV register, if PR-mode=3:
   a. Set C2:=16 byte control vector in the PRACV register.
5. Checking on C1 (associated with PU to-be-exported), if PU-mode=0:
   a. Verify CV TYPE in C1=B'1110xxx' (i.e., a public PKA key)
6. Checking on C1 (associated with PUA to-be-exported), if PU-mode=1: none
7. Checking on C2 (associated with PR), if PR-mode=2:
   a. Verify CV TYPE in C2=B'1111xxx' (i.e., a private PKA key)
   b. Verify EPUK usage bit=B'1' (i.e., enabled)
   c. Perform Control Vector Validate on C1 to validate certain fields in C1.
8. Checking on C2 (associated with PRA), if PR-mode=3:
   a. Verify EPUK usage bit=B'1' (i.e., enabled)
9. Checking on C1 and C3:
   a. Verify C3=C1.
10. Checking on c2 and configuration vector:
    a. If CV TYPE in C2='private certification key', then verify CERTIFICATION in config. vector=B'1' (i.e., certification center).
11. (optional) Checking on SCB1, if PU-mode=0:
    a. (optional) Verify that the current date and time is less than the expiration time Texp specified in SCB1.
    Note: :Tstart, Texp, and EID are checked only when an IKU is used.
12. checking on SCB2, if PR-mode=2:
    a. Verify that the current date and time are in the time interval (Tstart,Texp), specified in SCB2 (i.e., Tstart≦DT<Texp).
    b. Verify that the Environment ID stored in the EID register is the same as the Environment ID stored in SCB2.
    Continue if checking succeeds; otherwise set CC status flag and jump to step 9.

Import Public key (IPUK)

| EQUATION: | | |
|---|---|---|
| import-mode | /1b minimum/ | |
| <MDC-mode> | /1b minimum/ | ; if import-mode=0 |
| <MDC-index> | /5b minimum/ | ; a) if import-mode=0 & MDC-mode=0 & EKU1 contains a PUC key |
| | | b) if import-mode=0 & MDC-mode=1 |
| <hash-rule> | /3b minimum/ | ; a) if import-mode=0 & MDS-mode=0 & EKU1 contains a PUC key |
| | | b) if import-mode=0 & MDC-mode=1 |
| signature-mode | /2b minimum/ | |
| EKU1-length | /16b/ | |
| EKU1 | /unspecified/ | |
| <dsig1-length> | /16b/ | ; if signature-mode=0 |
| <dsig1> | /unspecified/ | ; if signature-mode=0 |
| <IKU2-length> | /16b/ | ; if import-mode=1 & signature-mode = (0, 1) |
| <IKU2> | /unspecified/ | ; if import-mode=1 & signature-mode = (0, 1) |
| C3 | /128b/ | |
| → | | |
| IKU3-length | /16b/ | |
| IKU3 | /unspecified/ | |
| CC | /unspecified/ | |

PARAMETER DEFINITIONS:

| Inputs | Description |
|---|---|
| import-mode | specifies the mode of public key import as follows:<br>• import-mode=0 : The public key in EKU1 is imported as a root PU.<br>• import-mode=1 : The public key in EKU1 is imported as a successor PU. |
| MDC-mode | Specifies the MDC processing mode, as follows:<br>• MDC-mode=0 : If EKU1 contains a PUC key, then an MDC caluclated on EKU1 is loaded into EKUMDC Table. (The EKUMDC Table entry must be uninitialized.) Otherwise, if EKU1 contains a PUA, PUM, or PUU key, no MDC is loaded.<br>• MDC-mode=1 MDC calculated on EKU1 is validated against an MDC value in the EKUMDC Table. (The EKUMDC Table entry must be preinitialized.)<br>The MDC-mode parameter is required when import-mode=0. |

-continued

| | |
|---|---|
| | Note: The hash-rule parameter specifies the hash algorithm to be used in calculating an MDC on EKU1. |
| MDC-index | The MDC-index parameter specifies a number n = 0,1, ..., 16, where n refers to EKUMDC(n).<br>This parameter is required when (a) import-mode=0, MDC-mode=0, and EKU1 contains a PUC key, or (b) import-mode=0, MDC-mode=1. For case(a), MDC-index must be a value 0, 1, ..., 15. For case (b), MDC-index must be a value 0, ..., 15, when EKU1 contains a PUC key and MDC-index must be value 16 when EKU1 contains a PUA, PUM, or PUU key. |
| hash-rule | Specifies the hash algorithm to be used to hash the External Key Unit EKU1. The encoding of the hash-rule is as follows:<br>• hash-rule = 0 : MDC-2 algorithm<br>• hash-rule = 1 : MDC-4 algorithm<br>• hash-rule = 2 : MD4 algorithm<br>• hash-rule = 3 : quadratic residue<br>• hash-rule = 4–7 : reserved<br>This parameter is required when (a) import-mode=0, MDC-mode=0, and EKU1 contains a PUC key, or (b) import-mode=0, MDC-mode=1. |
| signature-mode | Specifies the signature processing mode, as follows:<br>• signature-mode=0 : system signature (checked by CF)<br>• signature-mode=1 : application signature (checked by CFAP)<br>• signature-mode=2 : no signature<br>Signature-mode=2 may be specified only when import-mode=0. That is, a public key imported with signature-mode=2 (no signature) must be a root PU.<br>The following processing is indicated by signature-mode and import-mode:<br>1. For signature-mode=0 and import-mode=0, the system signature, dsig1, is verified by the CF using the PU in EKU1.<br>2. For signature-mode=0 and import-mode=1, the system signature, dsig1, is verified by the CF using the PU in IKU2.<br>3. For signature-mode=1 and import-mode=1, an application signature is verified by the CFAP using the PU in EKU2.<br>4. For signature-mode=1 and import-mode=1, an application signature is verified by the CFAP using the PU in IKU2. |
| EKU1-length | The length of EKU1 in bytes. |
| EKU1 | An External Key Unit containing the to-be-imported PU. For import-mode=0, Texp in SCB1 must satisfy the relationship DT < Texp, where DT is the current date and time expressed in Coordinated Universal Time. This is because the to-be-imported PU is used to verify a 'weak' signature generated on EKU1. |
| dsig1-length | The length of dsig1 in bits. This parameter is required only when signature-mode=0. |
| dsig1 | A digital signature produced from a CF System Signature Record (CFSSR) and a private key PR in accordance with section 6 of ISO DIS 9796. The CFSSR contains a 128-bit hash value calculated on EKU1. This parameter is required only when signature-mode=0. |
| IKU2-length | The length of IKU2 in bytes. This parameter is required only when import-mode=1 and signature-mode=(0 or 1). |
| IKU2 | An Internal Key Unit containing PU. The values of Tstart and Texp in SCB2 must satisfy the relationship Tstart ≤ DT < Texp, where DT is the current date and time expressed in Coordinated Universal Time. This parameter is required only when import-mode=1 and signature-mode=(0 or 1). |
| C3 | A 16 byte control vector for the to-be-imported PU. |
| Outputs | Description |
| IKU3-length | The length of IKU3 in bytes. |
| IKU3 | An Internal Key Unit containing the imported PU. |
| CC | Condition code indicating success or failure of the instruction execution. |

Description:

The import Public key instruction translates an External Key Unit containing a public key PU to an Internal Key Unit containing PU. The imported PU can be a PUA, PUC, PUM, or PUU. A PU imported with import-mode=0 is called a "root" PU in a chain; a PU imported with import-mode=1 is called a "successor" PU in a chain.

The External Key Unit can also have an attached digital signature (dsig1), which is validated using (1) the PU contained in the External Key Unit to be imported (import-mode=0) or (2) a PU contained in an Internal Key Unit supplied to the Import Public key instruction (import-mode=1). The PU used to validate the attached digital signature can be a PUA, PUC, PUM, or PUU.

A signature-mode parameter indicates whether a system signature is specified to the IPUK instruction (signature-mode=0) or whether a system signature is not specified to the IPUK instruction (signature-mode=1 and signature-mode=2). signature-mode=1 indicates that an application signature is specified to, and checked by, the CFAP. signature-mode=1 causes the IPUK instruction to execute exactly the same as signature-mode=0, except that the step of validating the system signature is omitted. For example, when import-mode=1 and signature-mode=1, history information is set in the control vector associated with IKU3 using information in the control vector associated with IKU2, even though the PU in IKU2 is not used to validate a system signature on EKU1. The IPUK instruction assumes that the CFAP uses the PU in IKU2 to validate an application signature on EKU1, and therefore the IPUK instruction uses IKU2 only to update IKU3 as a service to the CFAP. Likewise, when import-mode=0 and signature-mode=1, the IPUK instruction assumes that the CFAP uses the PU in EKU1 to validate an application signature on EKU1, and therefore the IPUK instruction uses EKU1 only to update IKU3 as a service to the CFAP. On the other hand, signature-mode=2 indicates that no signature is specified to, and checked by, the CFAP. signature-mode=2 is valid only when import-mode=0. Signature-mode=2 can be specified only when a root PU is imported (i.e., when import-mode=0 is specified). When signature-mode=2, the IPUK instruction sets the HIST-CHAIN field=B'00' in the control vector of the imported public key (i.e., the imported PU key is always typed as a BRONZE key).

A field in the configuration vector, designated SIG-COMPATIBILITY(IPUK), indicates whether dsig1 is required (i.e., signified by SIG-COMPATIBILITY(PIUK)=B'0') or whether dsig1 is optional (i.e., signified by SIG-COMPATIBILITY(IPUK)=B'1'). For example, when signature-mode=1 or signature-mode=2 are specified, the IPUK instruction ensures that SIG-COMPATIBILITY(IPUK)=B'1'.

When a device is configured to specify SIG-COMPATIBILITY(IPUK)=B'0', the system signature attached to the External Key Unit is produced at an originating device (a) via an EPUK instruction, if the originating device is configured as an ordinary security module (i.e., INTERCHANGE field in configuration vector B'0') or (b) via a GDS instruction, if the originating device is specifially configured as an interchange device (i.e., INTERCHANGE field in configuration vector B'1'). Except when the originating device is an interchange device, the IPUK instruction executed at the receiving device ensures that an imported PUA key with HIST-CHAIN=3 must have originated with the same device as the PUM key used to validate the digital signature on that imported PUA key.

For import-mode=0, an MDC-mode parameter additionally specifies whether the imported External Key Unit is validated against an MDC value in the MDC Table stored in the CF Environment. MDCs stored in the MDC Table may be calculated using either MDC-2 or MDC-4 hash algorithm. An MDC-index parameter specifies which entry in the MDC Table is used for validating the imported EKU. If EKU contains a PUC key, then MDC-index must have a value from 0 to 15, inclusive. If EKU contains a PUA, PUM, or PUU key, then MDC-index must have a value of 16. However, if import-mode=0, MDC-mode=0, and EKU contains a PUC key, then the IPUK instruction performs as follows: (1) MDC-index is set equal to the value of DOMAIN ID in the PUC control vector, (2) it is verified that EKUMDC FLAG(MDC-index)=B'00', (3) an MDC is calculated on EKU and stored in EKUMDC(MDC-index), and (4) EKUMDC FLAG(MDC-index) is set equal to B'01'. The IPUK processing rules ensure that one and only one PUC key can be imported for each domain (DOMAIN ID).

Control vectors C1, C3, and C4 are all associated with the PU to be imported. C1 is stored in EKU1, C4 is stored in IKU3, and C3 is an intermediate value used by the CFAP to request changes to C1, as follows. When a PU is imported, the CFAP is permitted, in certain cases, to change control vector fields. If no change is desired or no change is permitted, then the CFAP sets C3:=C1, else the CFAP produces C3 by making selected changes to C1. The control vector checking process assures that C3 is properly specified. Likewise, when a PU is imported the CF is permitted to change certain control vector fields, e.g., to record import "history", about PU. If no change is needed or prescribed, then the CF sets C4:=C3; else the CF produces C4 by making selected changes to C3.

The fundamental strategy followed in key import is to freely permit, rather than restrict, the key import process—except that all relevant history and actions pertaining to the key and to the key import process are recorded in the control vector of the imported key. Thereafter, when the key is used, the "history" information in the control vector is be tested to ensure that it meets whatever minimum standard has been set forth. For example, when used together with a private key in one of the key management instructions, such as a GKSP or IDK instruction, the logged "history" information in the control vector of the public key must be at least as great as the threshold information that has been encoded into the control vector of the private key at the time of key generation via the GPUPR instruction.

The Import Public key instruction executes only in the "run" state.

Functional Specification:
1. Perform input parameter consistency checking:
   a. If import-mode=0, then verify MDC-mode=0 or 1
   b. If import-mode=0 and MDC-mode=1, then verify 0≦MDC-index≦16.
   c. Verify that EKU1 is consistent to definition of an EKU.
   d. If import-mode=1, then verify that IKU2 is consistent to definition of an EKU.
   e. If import-mode=0, verify that signature-mode=0, 1 or 2.
   f. Else (import-mode=1) verify signature-mode=0 or 1.

Continue if checking succeeds; otherwise set CC status flag and jump to step 13.

2. Perform configuration vector and state vector checking:
   a. Verify that CF STATE in state vector is in the "run" state.
   b. Verify that KMP-FLAG(CKMP) in state vector is in the "full" state.
   c. Verify that DEFINE(IPUK) in config. vector=B'1'.
   d. Verify that ENABLE(IPUK) in state vector=B'00'.
   e. If import-mode=0 and MDC-mode=1, then verify EDUMDC FLAG(MDC-index) in state vector >B'00'.
   f. If signature-mode=1 or signature-mode=2, then verify that SIG-COMPATIBILITY(IPUK) in config. vector=B'1'.

Continue if checking succeeds; otherwise set CC status flag and jump to step 13.

3. Perform control block and control vector checking. Continue if checking succeeds; otherwise set CC status flag and jump to step 13.

4. Calculate MDC on EKU3, using the hash algorithm specified by input hash-rule, if import mode=0 and MDC-mode=1.

5. Initialize MDC Table entry, if import-mode=0 and MDC-mode=0 and EKU1 contains a PUC key:
   If import-mode=0 and MDC-mode=0, then do:
   a. Extract the system control block SCB1 from EKU1.
   b. Extract the control vector C1 from SCB1.
   c. If CV TYPE in C1='PUC', then do:
      1) Verify 0≦MDC-index≦15.
      2) Set X:=value of DOMAIN ID in C1 (i.e., 0 to 15)
      3) Verify X=MDC-index
      4) Verify EKUMDC FLAG(MDC-index) in state vector=B'00'.

5) Continue if all of the above checking succeeds; otherwise set CC status flag and jump to step 13.
6) Calculate MDC on EKU1, using the hash algorithm specified by input hash-rule.
7) Set EKUMDC FLAG(MDC-index) in state vector:=B'01'.
8) Set EKUMDC(MDC-index) in MDC Table:=MDC (i.e., MDC calculated above)

6. Validate MDC if import-mode=0 and MDC-mode=1:
   a. Set MDC-of-reference:=EKUMDC(MDC-index) in MDC Table
   b. Verify MDC-of-reference=MDC (calculated above)

Continue if checking succeeds; otherwise set CC status flag and jump to step 13.

7. Construct expected record-code1 to be referenced against record-code stored in cfssr1, if signature-mode=0:
   a. If import-mode=0, then extract control vector C from EKU1.
   b. If import-mode=1, then extract control vector C from IKU2.
   c. Construct record-code1 from control vector C.

8. Recover and validate cfssr1, if signature-mode=0:
   a. If import-mode=0, then recover cryptographic facility system signature record cfssr1 from from digital signature dsig1, using the public key stored in EKU1.
   b. If import-mode=1, then recover cryptographic facility system signature record cfssr1 from from digital signature dsig1, using the public key stored in IKU2.
   c. Verify that cfssr1 is consistent to definition of a cryptographic facility system signature record.
   d. Extract hash rule hash-rule1 from cfssr1.
   e. Verify that record-code stored in cfssr1 is the same as record-code1.

Continue if checking succeeds; otherwise set CC status flag and jump to step 13.

9. Calculate hash value MDC1 on EKU1 using the hash algorithm specified by hash-rule1, if signature-mode=0.

10. Validate MDC1 against reference MDC1 in cfssr1, if signature-mode=0:
    a. Extract the hash value stored in the hash field in cfssr1.
    b. Verify that MDC1 is the same as the extracted hash value.

Continue if verification succeeds; otherwise set CC status flag and jump to step 13.

11. Construct outputs IKU3-length and IKU3:
    a. If import-mode=0, then set C2:=C1
    b. Set C4:=C3 and update history information (HIST-IPUK, HIST-CHAIN, HIST-MDC, HIST-DOMAIN ID, and HIST-KREGMODE) in C4, using the Control Vector Generate.
    c. Replace the value of the control vector stored in EKU1 with C4.
    d. Construct a key authenticator record kar1 from the key record in EKU1, using the method specified in Key Record Encrypt Algorithm 12.
    e. Construct a clear key unit CKU1 from EKU1 and kar1.
    f. Set CKMP:=value of KMP stored in the CKMP register.
    g. Perform Encipher Clear Key Unit on CKU1 to obtain an internal key unit IKU3, using CKMP as the master key KMP 12. Perform state vector update: None.
13. Produce output CC from CC status flags.

Control Block and Control Vector Checking:
Perform control block and control vector checking:
1. Extract SCB1 and C1 from EKU1:
   a. Extract the system control block SCB1 from EKU1.
   b. Extract control vector C1 from SCB1.
2. Extract SCB2 and C2 from IKU2, if import-mode=1:
   a. Extract system control block SCB2 from IKU2.
   b. Extract control vector C2 from SCB2.
3. Checking on C1 (associated with PU to-be-imported):
   a. Verify CV TYPE in C1=B'1110xxx'(i.e., a public PKA key)
   b. If import-mode=0 and MDC-mode=1, then do:
      1) If CV TYPE in C1='PUC', then verify MDC-index=DOMAIN ID in C1 (i.e., value 0 to 15).
      2) If CV TYPE in C1≠'PUC', then verify MDC-index=16.

Note: For import-mode=0, IPUK usage is not checked since the use of PU to validate a 'weak' signature is always implied.

4. Checking on C2, if import-mode=0: none
   Note: The IPUK usage bit is not checked for import-mode=0, since the usage in this case is implied.
5. Checking on C2 (associated with PU used to validate signature), if import-mode=1:
   a. Verify CV TYPE in C3=B'1110xxx' (i.e., a public PKA key)
   b. Verify IPUK usage bit in C2=B'1' (i.e., enabled)
   c. Perform Control Vector Validate on C2 to validate certain fields in C2.
6. Checking on C1 and C3:
   a. Verify C3=C1
   Note: there are currently no fields in C1 that may be altered be CFAP.
7. (optional) Checking on SCB1, if import-mode=0:
   a. (optional) Verify that the current date and time is less than the expiration time Texp specified in SCB1.
   Note: :Tstart, Texp, and EID are checked only when an IKU is used.
8. Checking on SCB1, if import-mode=1 (i.e., when PU is the key being imported): no checking required
9. Checking on SCB2, if import-mode=1 (i.e., when PU is used to verify a 'strong' signature):
   a. Verify that the current date and time are in the time interval (Tstart,Texp), specified in SCB2 (i.e., Tstart≦DT<Texp).

Continue if checking succeeds; otherwise set CC status flag and jump to step 13.

In the above checking steps, it should be noted that import-mode=1 implies that (1) signature-mode=0 or signature-mode=1 and that (2) an IKU2 is specified to the IPUK instruction.

Import Private Key (IPRK)

```
EQUATION:
input-source    /1b minimum/
<EKU1-length>   /16b/        ; if input-source=0
```

-continued

| | | |
|---|---|---|
| `<EKU1>` | /unspecified/ | ; if input-source=0 |
| → | | |
| IKU2-length | /16b/ | |
| IKU2 | /unspecified/ | |
| CC | /unspecified/ | |

PARAMETER DEFINITIONS:

| Inputs | Description |
|---|---|
| input-source | The input-source parameter specifies the source of EKU1-length and EKU1, as follows:<br>• input-source=0 : instruction input<br>• input-source=1 : EKU buffer in CF Environment |
| EKU1-length | The length of EKU1 in bytes. This input is required if input-source = 0. |
| EKU1 | An External Key Unit containing the to-be-imported PR. This input is required if input-source = 0. The value of EID in SCB1 must equal the value in the EID register. The value of Texp in SCB1 must satisfy the relationship DT < Texp, where DT is the current date and time expressed in Coordinated Universal Time. |
| Outputs | Description |
| IKU2-length | The length of IKU2 in bytes. |
| IKU2 | An Internal Key Unit containing the imported PR. |
| CC | Conditon code indicating success or failure of the instruction execution. |

Description:

The Import Private Key instruction translates an External Key Unit EKU1 containing a PRU key to an Internal Key Unit containing the PRU. An input source parameter indicates whether EKU1 is supplied as a parameter input to the Import Private Key instruction or whether it is read from the EKU buffer in the CF Environment. An EKU1 read from the EKU buffer must be loaded into the CF via a protected interface, e.g., a smart card reader.

The EID field in the System Control Block (SCB) of EKU1 must be initialized with 16 ASCII '0's or with a value equal to the value stored in the EID register of the CF (i.e., the EID value originally set using an LPID instruction).

The Import Private Key instruction executes only in the "run" state.

Generate Key Set PKA (GKSP)

| EQUATION: | | |
|---|---|---|
| process-mode | /2b minimum/ | |
| domain-id | /4b/ | ; if process-mode=(0 or 1) |
| key-management-protocol | /1b minimum/ | ; if process-mode=(0 or 1) |
| `<key-management-mode>` | /1b minimum/ | ; if process-mode=(0 or 1), key-management-protocol=1 |
| `<PR-mode>` | /1b minimum/ | ; if process-mode=(0 or 2) |
| `<has-rule>` | /3b minimum/ | ; if process-mode=(0 or 2), PR-mode=1 |
| `<IKU1-length>` | /16b/ | ; if process-mode=(0 or 2) |
| `<IKU1>` | /unspecified/ | ; if process-mode=(0 or 2) |
| `<IKU2-length>` | /16b/ | ; if process-mode=(0 or 2), PR-mode=1 |
| `<IKU2>` | /unspecified | ; if process-mode=(0 or 2), PR-mode=1 |
| `<ticket-in>` | /64b/ | ; if process-mode=2 |
| `<C3>` | /128b/ | ; if process-mode=(0 or 1) |
| `<C4>` | /128b/ | ; if process-mode=(0 or 1) |
| → | | |
| `<e*KM.C4(KKL)>` | /64b/ | ; if process-mode=(0 or 1) |
| `<3*KM.C5(KKR)>` | /64b/ | ; if process-mode=(0 or 1) |
| `<keyblk-length>` | /16b/ | ; if process-mode=(0 or 2) |
| `<ePUM(keyblk)>` | /unspecified/ | ; if process-mode=(0 or 2) |
| `<dsig1-length>` | /16b/ | ; if process-mode=(0 or 2), PR-mode=1 |
| `<dsig1>` | /unspecified/ | ; if process-mode=(0 or 2), PR-mode=1 |
| `<ticket-out>` | /64b/ | ; if process-mode=1 |
| CC | /unspecified/ | |

PARAMETER DEFINITIONS:

| Inputs | Description |
|---|---|
| process-mode | specifies the instruction processing mode, as follows:<br>• process-mode=0 : produce outputs from inputs<br>• process-mode=1 : produce intermediate outputs from inputs<br>• process-mode=2 : produce outputs from intermediate outputs |
| domain-id | The domain-id parameter specifies a domain identifier that ranges from 0 to 15. When C3 and C4 are 64 bit control vectors (EXTENSION = B'00'), a value of domain-id=0 must be specified. This parameter is required only when process-mode=(0 or 1). |
| key-management-protocol | The key-management-protocol parameter specifies the protocol used for key management, as follows:<br>• key-management-protocol=0 : private protocol<br>• key-management-protocol=1 : certification center protocol<br>This parameter is required only when process-mode=(0 or 1). |
| key-management-mode | The key-management-mode parameter specifies the method (called mode) used to register a public key management key with the certification center, as follows:<br>• key-management-mode=0 : key registration is performed using mode 0<br>• key-management-mode=1 : key registration is performed using mode 1<br>    The CF does not define the meaning of modes 0 and 1. These modes are defined on the basis of the network key management architecture, and (as far as the CF is con- |

| | -continued |
|---|---|
| | cerned) can be whatever a customer wants them to be. This parameter is required only when process-mode=(0 or 1) and key-management-protocol=1. |
| PR-mode | The PR-mode parameter specifies whether a digital signature is generated and, if so, then also the source of PR.<br>• PR-mode=0 : no<br>• PR-mode=1 : yes, use PR in IKU2<br>This parameter is required only when process-mode=0 or process-mode =2. |
| hash-rule | Specifies the hash algorithm to be used to calculate a hash value on ePUM(keyblk). The encoding of the hash-rule is as follows:<br>• hash-rule = 0 : MDC-2 algorithm<br>• hash-rule = 1 : MDC-4 algorithm<br>• hash-rule = 2 : MD4 algorithm<br>• hash-rule = 3 : quadratic residue<br>• hash-rule = 4–7 : reserved<br>This parameter is required only when process-mode=(0 or 2) and PR-mode=1. |
| IKU1-length | The length of IKU1 in bytes.<br>This parameter is required only when process-mode=(0 or 2). |
| IKU1 | An Internal Key Unit containing a PUM of another device and belonging to domain-id. The value of EID in SCB1 must not equal the value in the EID register. The values of Tstart and Texp in SCB1 must satisfy the relationship Tstart ≦ DT < Texp, where DT is the current date and time expressed in Coordinated Universal Time.<br>This parameter is required only when process-mode=(0 or 2). |
| IKU2-length | The length of IKU2 in bytes. This parameter is required only when process-mode=(0 or 2) and PR-mode=1. |
| IKU2 | An Internal Key Unit containing a PRM of this device and belonging to domain-id. The value of EID in SCB2 must equal the value in the EID register. The values of Tstart and Texp in SCB2 must satisfy the relationship Tstart ≦ DT < Texp, where DT is the current date and time expressed in Coordinated Universal Time. This parameter is required only when process-mode=(0 or 2) and PR-mode=1. |
| ticket-in | An 8-byte value that must be equal to the 8-byte value stored in the GKSP-Ticket register in the CF. This parameter is required only when process-mode=2. |
| C3 | A 16-byte control vector associated with the leftmost 64 bits of the key-encrypting receiver key KK to be exported to a receiving cryptographic system. For prcoess-mode=0, C3 MUST be equal to the control vector stored in keyblk of output parameter ePUM(keyblk). See control vector checking for a specification of C3. This parameter is required only when process-mode=(0 or 1). |
| C4 | A 16-byte control vector associated with KKL, where KKL is the leftmost 64 bits of the key-encrypting sender key KK to be retained at the generating cryptographic system. This parameter is required only when process-mode=(0 or 1). |
| Outputs | Description |
| e*KM.C4(KKL) | 64 bit KKL enciphered under 128 bit master key KM and 128 bit control vector C4. KKL is the left half of a 128 bit key-encrypting key. This parameter is produced only when process-mode=(0 or 1). |
| e*KM.C5(KKR) | 64 bit key KKR enciphered under 128 bit master key KM and 128 bit control vector C5. KKR is the right half of a 128 bit key-encrypting key. This parameter is produced only when process-mode=(0 or 1). |
| keyblk-length | The length of keyblk and ePUM(keyblk) in bits. This parameter is produced only when process-mode=(0 or 2). |
| ePUM(keyblk) | keyblk encrypted with public key PUM of another device. For process-mode=0, keyblk is a key block produced from a Crypto Facility DEA Key Record (CFDKR). For process-mode=(1 or 2), keyblk has an unspecified format. This parameter is produced only when process-mode=(0 or 2). |
| dsig1-length | The length of dsig1 in bits. This parameter is produced only when process-mode=(0 or 2) and PR-mode=1. |
| dsig1 | A digital signature produced from a CF System Signature Record (CFSSR) and a private key management key PRM of this device, in accordance with section 6 or ISO DIS 9796. The CFSSR contains a 128-bit hash value calculated on ePUM(cfbdkb1). This parameter is produced only when process-mode=(0 or 2) and PR-mode=1. |
| ticket-out | An 8-byte value equal to an 8-byte value stored in the GKSP-Ticket register in the CF. This parameter is produced only when process-mode=1. |
| CC | Condition code indicating success or failure of the instruction execution. |

Description:

The Generate Key Set PKA instruction generates two encrypted copies of a 128-bit key-encrypting key, KK=(KKL,KKR), where KKL and KKR are the left and right 64-bit parts of KK. The first copy, which is encrypted with the master key, is for local use at the generating device. The second copy, which is encrypted with a public key management key, is distributed to a receiving device where it is imported with and IDK instruction. At the generating device, KK is designated (via a control vector) to be a key-encrypting sender key with a 'GKS OP-EX' attribute. At the receiving device, KK is designated (via a control vector) to be a key-encrypting receiver key with an 'RTMK' attribute. (When the receiving device does not implement PKCD or control vectors, KK usage must be controlled via other means.) The EXPORT CONTROL field in the control vectors associated with KK must also specify 'no export.'

The first encrypted copy of KK as the form e*KM.C4(KKL), e*KM.C5(KKR), where e*KM.C4(KKL) and e*KM.C5(KKR) are the encrypted left and right 64-bit parts of KK, respectively. KM.C4 and KM.C5 are variant keys formed as the Exclusive-OR produce of master key KM and control vectors C4 and C5, respectively. C4 and C5 are control vectors associated with KKL and KKR, respectively. The second encrypted copy of KK has the form ePUM(keyblk), where PUM is the public key management key of the receiving device and keyblk is a key block containing KK.

A process-mode parameter provides different processing options within the GKSP instruction. When process-mode=0 is specified, keyblk is key block produced from a Crypto Facility DEA Key Record (CFDKR). The format of the CFDKR and the algorithm for producing keyblk from CFDKR are ridigly defined by PKCD. Process-modes 1 and 2 permit a keyblk with unspecified format to be processed. This is accomplished by invoking the GKSP instruction with process-mode=1 to produce a CFDKR stored within the CF, then invoking a Translate-from-CFDKR instruction which translates CFDKR to a specified key block (keyblk) also stored within the CF, and finally invoking the GKSP instruction with process-mode=2 to take the so-translated keyblk and encrypt it with the public key management key, PUM, of the receiving device. The aim of process-modes 1 and 2 is to remove the translation step from the GKSP instruction, so that the GKSP instruction need not directly implement a host of different possible translation options for compatibility with other non-PKCD devices. A significant advantage can be achieved if the Translate-from-CFDKR instruction is implemented within a programmable memory within the CF.

The Generate Key Set PKA instruction has options for generating a system signature, dsig1, on output ePUM(keyblk) (PR-mode=1) or not generating a system signature on output ePUM(keyblk) (PR-mode=0). When PR-mode=1 is specified, a private key management key, PRM, belonging to the ending device is used to generated the system signature. A hash-rule parameter indicates to the GKSP instruction the hash algorithm to be used in generating the digital signature.

The Generate Key Set PKA instruction executes only in the "run" state.

Functional Specification:
1. Verify process-mode=0, 1, or 2. If verification fails, set CC status flag and jump to step 13.
2. Validate ticket-in, and extract fields from CF Environment, if process-mode=2.
   If process-mode=2 then do:
   a. Verify GKSP Buffer Flag in CF Environment=2 or 3. If verification fails then set CC status flag and jump to step 13
   b. Verify ticket-in:=value stored in GKSP Ticket field in CF Environment. If verification fails then set CC status flag and jump to step 13
   c. Set domain-id:=bits 00..03 of GKSP Save field in CF Environment
   d. Set key-management-protocol:=bit 04 of GKSP Save field in CF Environment
   e. Set key-management-mode:=bit 05 of GKSP Save field in CF Environment.
3. Perform input parameter consistency checking if process-mode=0 or 2:
   If process-mode=0 or process-mode=2 then do:
   a. Verify PR-mode=0 or 1
   b. Verify that IJU1 is consistent to definition of an IKU.
   c. If PR-mode=1, then verify the IKU2 is consistent to definition of an IKU.
   Continue if checking succeeds; otherwise set CC status flag and jump to step 13.
4. Perform configuration vector and state vector checking:
   a. Verify that DEFINE(GKSP) in config. vector=B'1'.
   b. If key-management-protocol=1, then KMGT PROTOCOL in config. vector=B'11' or B'10'.
   c. If key-management-protocol=1 and key-management-mode=0, then KREG in config. vector=B'0'.
   d. If key-management-protocol=0, then KMGT PROTOCOL in config. vector=B'11' or B'01'.
   e. Verify that CF STATE in state vector is int he "run" state.
   f. Verify that KMP-FLAG(CKMP) in state vector is in the "full" state.
   g. Verify that CKM FLAG in state vector is in the "full" state.
   h. (optional) Verify LPID FLAG in state vector is int he "full" state.
   i. Verify that ENABLE(GKSP) in state vector=B'00'.
   Continue if checking succeeds; otherwise set CC status flag and jump to step 13.
5. Perform control block and control vector checking. Continue if checking succeeds; otherwise set CC status flag and jump to step 13.
6. Construct a record code record-code1 for cfdkr1 based on parameters key-management-protocol and key-management-mode, if process-mode=0 or process-mode=1.
7. Construct cfdkr1 if process-mode=1:
   a. Generate a 128-bit random key KK consisting of a 64-bit left half KKL and a 64-bit right half KKR.
   b. Adjust parity of KK to odd parity.
   c. Set EID:=contents of the EID register in CF Environment.
   d. Construct the cryptographic facility DEA key record cfdkr1 based on KK, EID, C3, and record-code1.
8. Produce outputs e*KM.C4(KKL) and e*KM.C5(KKR) if process-mode=0 or process-mode=1:
   If process-mode=0 or process-mode =1 then do:
   a. Set KM:=contents of CKM Register in the CF Environment.
   b. Exclusive-OR KM to C4 and use the resulting key to encrypt KKL.
   c. Set C5:=C4 and invert the values in bits 41 and 42 in C5 (i.e., adjust the KEY FORM field in C5).
   d. Exclusive-OR KM to C5 and the resulting key to encrypt KKR.
9. Produce output ticket-out and store parameter values in CF Environment if process-mode=1:
   If process-mode=1 then do:
   a. Generate a 64-bit random number and assign it to ticket-out.
   b. Save parameter values in CF Environment:
   1) Set GKSP Ticket field in CF Environment:-=ticket-out
   2) Set GKSP Save field in CF Environment:-=domain-id || key-management-protocol || key-management-mode || B'00'
   3) Set GKSP Buffer Flag in CF Environment:=1.
   4) Set GKSP Buffer field in CF Environment:=416-bit cfdkr1 (left-justified in GKSP Buffer field).
   5) Set GKSP Record Length field in CF Environment:=416
   6) Set GKSP Buffer Length in CF Environment:=value of GKSP-buffer-length in Configuration Table.

10. Produce outputs keyblk-length and ePUM(keyblk) if process-mode=0 or process-mode=2:
    a. If process-mode=0 then do:
       1) Set key-process=1
       2) Set cfdkr1-length:=416
    b. If process-mode=2 then do:
       1) Set key-process:=value of GKSP Buffer Flag in CF Environment—2/*Set key-process:=0, if GKSP Buffer flag=2*//*Set key-process:=1, if GKSP Buffer Flag=3*/
       2) Set cfdkr1-length:=value stored in GKSP Record Length field in CF Environment
       3) Set cfdkr1:=the leftmost cfdkr1-length bits of value stored in GKSP-buffer.
    c. Construct an encrypted DEA key block ePUM(keyblk), from cfdkr1, using the public key PUM stored in IKU1. Note: keyblk-length is also produced by this step.
11. Produce outputs dsig1-length and dsig1, if (process-mode=0 or process-mode=2) and if PR-mode=1:
    a. Extract 16-byte control vector C from IKU2
    b. Construct record-code to be stored in a cryptographic facility system signature record, based on control vector C.
    c. Calculate a hash value on ePUM(keyblk), using the hash algorithm specified by input hash-rule.
    d. Construct a cryptographic facility system signature record cfssr1 from hash-rule, record-code, and the calculated hash value.
    e. Calculated digital signature dsig1 on the constructed cfssr1, using the private key stored in IKU2.
12. Reset CF Environment parameters if process-mode=2:
    If process-mode=2 then do:
    a. Set GKSP Ticket field in CF Environment:=8X'00'
    b. Set GKSP Save field in CF Environment:=X'00'
    c. Set GKSP Buffer Flag in CF Environment:=0.
13. Produce output CC from CC status flags.

Control Block and Control Vector Checking:
Perform control block and control vector checking:
A. Perform the checking in steps 1, 2, and 3, if process-mode=0 or process-mode=1:
1. Checking on C3 (associated with KKL sent to receiver)
   a. CV TYPE in C3='Key-Encrypting Receiver Key'
   b. Verify RTMK in C3=B'1' (i.e., enabled)
   c. Verify XLTKEY-in in C3=B'0' (i.e., disabled)
   d. Verify GKS in C3=B'000' (i.e., disabled)
   e. Verify EXPORT CONTROL in C3=B'0' (i.e., export via RFMK not permitted)
   f. If EXPRESSION in C3=B'00', then verify domain-id (in instruction)=0
   g. Verify KEY FORM=B'010' or B'110' (i.e., KKL)
   h. Verify EXTENSION in C3=B'00' or B'01'.
   i. If EXTENSION in C3=B'00', then do:
      1) Verify C3R=C3L (i.e., CV EXTENSION=CV BASE)
      2) Verify domain-id (in instruction)=0
   j. If EXTENSION in C3=B'01', then do:
      1) Verify DOMAIN ID in C3=domain-id (in instruction).
      2) Verify HIST-GKSP/IDK field in C3=B'1'
2. Checking on C4 (associated with KKL retained by sender):
   a. CV TYPE in C4='Key-Encrypting Sender Key'
   b. Verify GKS in C4=B'111' (i.e., enabled)
   c. Verify RFMK in C4=B'0' (i.e., disabled)
   d. Verify XLTKEY-out in C4=B'0' (i.e., disabled)
   e. Verify EXPORT CONTROL in C4=B'0' (i.e., export via RFMK not permitted)
   f. If EXTENSION in C4=B'00', then do:
      1) Verify C4R=C4L (i.e., CV EXTENSION=CV BASE)
      2) Verify domain-id (in instruction)=0
3. Checking on C3 and C4:
   a. Verify KEY FORM in C4=KEY FORM in C3.
   b. Verify EXTENSION in C4=EXTENSION in C3.
   c. If LOG INDICATOR in C3=1 then LOG in C3=USAGE in C4 (i.e. C3(50..54)=C4(18..22)
   d. If LOG INDICATOR in C4=1 then LOG in C4=USAGE in C3 (i.e. C4(50..54)=C3(18..22)
   e. If EXTENSION=B'01', then verify C4R=C3R
   Continue if checking succeeds: otherwise set CC status flag and jump to step 13.
B. Perform the checking in steps 4, 5, ..., 10, if process-mode=0 or process-mode=2;
4. Extract SCB1 and C1 from IKU1:
   a. Extract system control block SCB1 from IKU1.
   b. Extract control vector C1 from SCB1.
5. Extract SCB2 and C2 from IKU2, if PR-mode=1
   a. Extract system control block SCB2 from IKU2.
   b. Extract control vector C2 from SCB2.
6. Checking on C1 (associated with PUM):
   a. Verify CV TYPE in C1='public key management key'
   b. Note: checking on CV TYPE EXTENSION has been deleted.
   c. Verify GKSP usage in C1=B'1' (i.e., enabled)
   d. Verify HIST-IPUK=B'1' (i.e., imported)
   e. Verify DOMAIN ID in C1=domain-id (in instruction)
   f. If key-management-protocol (in instruction)=B'1' (i.e., 'certification center protocol'), then do:
      1) If key-management-mode (in instruction)=0, then KREGMODE in C1=B'01'.
      2) If key-management-mode (in instruction)=1, then KREGMODE in C1=B'10'.
      3) Verify HIST-CHAIN in C1=2.
   g. Perform Control Vector Validate on C1 to validate certain fields in C1.
   h. Verify HIST-MDC in C1≧FLOOR-MDC in configuration vector.
7. Checking on C2 (associated with PRM), if PR-mode=1:
   a. Verify CV TYPE in C2='private key management key'
   b. Verify GKSP in C2=B'1' (i.e., enabled)
   c. Verify DOMAIN ID in C2=domain-id (in instruction)
   d. Perform Control Vector Validate on C2 to validate certain fields in C2.
   e. Verify RC2=0
8. Checking on C1 and C2 (associated with PUM and PRM), if PR-mode=1:
   a. Verify HIST-MDC in C1≧THRES-MDC in C2. (This check is valid for private protocols and certification center protocols.)
   b. Note: checking on CV TYPE EXTENSION has been deleted.
9. Checking on SCB1:
   a. Verify that the current data and time are in the time interval (Tstart,Texp), specified in SCB1 (i.e., Tstart≦DT<Texp).

b. Verify that the Environment ID stored in the EID register is not the same as the Environment ID stored in SCB1.
10. Checking on SCB2, if PR-mode=1:
    a. Verify that the current date and time are in the time interval (Tstart,Texp), specified in SCB2 (i.e., Tstart≦DT<Texp).

b. Verify that the Environment ID stored in the EID register is the same as the Environment ID stored in SCB2.

Continue if checking succeeds; otherwise set CC status flag and jump to step 13.

Import DEA Key (IDK)

| EQUATION: | | |
|---|---|---|
| process-mode | /2b minimum/ | |
| domain-id | /4b/ | ; if process-mode=(0 or 1) |
| key-management-protocol | /1b minimum/ | ; if process-mode=(0 or 1) |
| <key-management-mode> | /1b minimum/ | ; if process-mode=(0 or 1), key-management-protocol=1 |
| <IKU1-length> | /16b/ | ; if process-mode=(0 or 1), dsig1-length>0 |
| <IKU1> | /unspecified/ | ; if process-mode=(0 or 1), dsig1-length>0 |
| <IKU2-length> | /16b/ | ; if process-mode=(0 or 1) |
| <IKU2> | /unspecified/ | ; if process-mode=(0 or 1) |
| <keyblk-length> | /16b/ | ; if process-mode=(0 or 1) |
| <ePUM(keyblk)> | /unspecified/ | ; if process-mode=(0 or 1) |
| <dsig1-length> | /16b/ | ; if process-mode=(0 or 1) |
| <dsig1> | /unspecified/ | ; if process-mode=(0 or 1), dsig1-length>0 |
| <ticket-in> | /64b/ | ; if process-mode=2 |
| <sender-EID> | /128b/ | ; if process-mode=(0 or 2) |
| <C3> | /128b/ | ; if process-mode=(0 or 2) |
| <C4> | /128b/ | ; if process-mode=(0 or 2) |
| <e*KM.C5(KKL)> | /64b/ | ; if process-mode=(0 or 2) |
| <e*KM.C6(KKR)> | /64b/ | ; if process-mode=(0 or 2) |
| <ticket-out> | /64b/ | ; if process-mode=1 |
| CC | /unspecified/ | |

PARAMETER DEFINITIONS:

| Inputs | Description |
|---|---|
| process-mode | specifies the instruction processing mode, as follows:<br>• process-mode=0 : produce outputs from inputs<br>• process-mode=1 : produce intermediate outputs from inputs<br>• process-mode=2 : produce outputs from intermediate outputs |
| domain-id | The domain-id parameter specifies a domain identifier that ranges from 0 to 15. When C3 and C4 are 64 bit control vectors (EXTENSION = B'00'), a value of domain-id=0 must be specified. This parameter is required only when process-mode=(0 or 1). |
| key-management-protocol | The key-management-protocol parameter specifies the protocol used for key management, as follows:<br>• key-management-protocol=0 : private protocol<br>• key-management-protocol=1 : certification center protocol<br>This parameter is required only when process-mode=(0 or 1). |
| key-management-mode | The key-management-mode parameter specifies the method (called mode) used to register a public key management key with the certification center, as follows:<br>• key-management-mode=0 : key registration is performed using mode 0<br>• key-management-mode=1 : key registration is performed using mode 1<br>    The CF does not define the meaning of modes 0 and 1. These modes are defined on the basis of the network key management architecture, and (as far as the CF is concerned) can be whatever a customer wants them to be. This parameter is required only when process-mode=(0 or 1) and key-management-protocol=1. |
| IKU1-length | The length of IKU1 in bytes. This parameter is required only when process-mode=(0 or 1) and dsig1-length ≧ 0. |
| IKU1 | An Internal Key Unit containing a PUM of another device and belonging to domain-id. The value of EID in SCB1 must not equal the value in the EID register. The values of Tstart and Texp in SCB1 must satisfy the relationship Tstart ≦ DT < Texp, where DT is the current date and time expressed in Coordinated Universal Time. This parameter is required only when process-mode=(0 or 1) and dsig1-length ≧ 0. |
| IKU2-length | The length of IKU2 in bytes. This parameter is required only when process-mode=(0 or 1). |
| IKU2 | An Internal Key Unit containing a PRM of this device and belonging to domain-id. The value of EID in SCB2 must equal the value in the EID register. The values of Tstart and Texp in SCB2 must satisfy the relationship Tstart ≦ DT < Texp, where DT is the current date and time expressed in Coordinated Universal Time. This parameter is required only when process-mode=(0 or 1). |
| keyblk-length | The length of keyblk and ePUM(keyblk) in bits. This parameter is required only when process-mode=(0 or 1). |
| ePUM(keyblk) | keyblk encrypted with public key PUM of this device. For process-mode=0, keyblk is a key block produced from a Crypto Facility DEA Key Record (CFDKR). For process-mode=(1 or 2), keyblk has an unspecified format. This parameter is required only when process-mode=(0 or 1). |
| dsig1-length | The length of dsig1 in bits. A value of dsig1-length=0 indicates that no dsig1 parameter is specified to the IDK instruction. This parameter is required only when process-mode=(0 or 1). |
| dsig1 | A digital signature produced from a CF System Signature Record (CFSSR) and a private key management key PRM of another device, in accordance with section 6 of ISO DIS 9796. The CFSSR contains a 128-bit hash value calculated on ePUM(keyblk). This parameter is required only when process-mode=(0 or 2) and dsig1-length > 0. |

-continued

| | |
|---|---|
| ticket-in | An 8-byte value that must be equal to the 8-byte value stored in the IDK Ticket field in the CF Environment. This parameter is required only when process-mode=2. |
| sender-EID | A 128-bit environment ID of the sender of DEA key. This parameter is required only when process-mode=0 or process-mode=2. |
| C3 | A 16-byte control vector associated with KKL, where KKL is the leftmost 64 bits of the key-encrypting receiver key KK to be imported. For process-mode=0, C3 MUST be equal to the control vector stored in keyblk of input parameter ePUM(keyblk). See control vector checking for a specification of C3. This parameter is required only when process-mode=(0 or 2). |
| C4 | A 16-byte control vector associated with KKL, where KKL is the leftmost 64 bits of the key-encrypting receiver key KK to be imported. Except for certain fields which CFAP is permitted to set, C4 must equal C3. Control vector checking ensures that C4 is a valid derivative of C3. This parameter is required only when process-mode=(0 or 2). |
| Outputs | Description |
| e*KM.C5(KKL) | 64 bit key KKL enciphered under 128 bit master key KM and 128 bit control vector C5. KKL is the left half of a 128 bit key-encrypting key. Except for certain fields which the IDK instruction is permitted to set, C5 must equal C4. C5 is derived from C4 via an internal control vector generation routine. This parameter is required only when process-mode=(0 or 2). |
| e*KM.C6(KKR) | 64 bit key KKR enciphered under 128 bit master key KM and 128 bit control vector C6. KKR is the right half of a 128 bit key-encrypting key. C6 is derived from C5 via an internal control vector generation routine. This parameter is required only when process-mode=(0 or 2). |
| ticket-out | An 8-byte value equal to an 8-byte value stored in the IDK-Ticket register in the CF. This parameter is required only when process-mode=1. |
| CC | Condition code indicating success or failure of the instruction execution. |

Description:

The IDK instruction reenciphers a 128-bit key-encrypting key KK (=KKL,KKR) in encrypted form ePUM(keyblk) to encrypted form e*KM.C5(KK), e*KM.C6(KKR). ePUM(keyblk) denotes a key block containing KK encrypted with a public key management key of this device. e*KM.C5(KKL) and e*KM.C6(KKR) are the encrypted left and right 64-bit parts of KK, respectively. KM.C5 and KM.C6 are variant keys formed as the Exclusive-OR product of master key KM and control vectors C5 and C6, respectively. C5 and C6 are control vectors associated with KKL and KKR, respectively. C5 and C6 designate KK as a key-encrypting receiver key with an "RTMK" attribute. The EXPORT CONTROL field in C5 and C6 must also specify 'no export.'

A process-mode parameter provides different processing options within the IDK instruction. When process-mode=0 is specified, keyblk is a key block produced from a Crypto Facility DEA Key Record (CFDKR). The format of the CFDKR and the algorithm for producing keyblk from CFDKR are rigidly defined by PKCD. Process-modes 1 and 2 permit a keyblk with unspecified format to be processed. This is accomplished by invoking the IDK instruction with process-mode=1 to decrypt ePUM(keyblk) and store the recovered keyblk within the CF, then involving a Translate-To-CFDKR instruction which translates the keyblk to a CFDKR also stored within the CF, and finally invoking the IDK instruction with process-mode=2 to process and recover KK from the so-produced CFDKR and to produce e*KM.C5(KKL), e*KM.C6(KK). The aim of process-modes 1 and 2 is to remove the translation step from the IDK instruction, so that the IDK instruction need not directly implement a host of different possible translation options for compatibility with other non-PKCD devices. A significant advantage can be achieved if the Translate-To-CFDKR instruction is implemented within a programmable memory within the CF.

The dsig1-length parameter indicates to the IDK instruction whether ePUM(keyblk) has an accompanying system signature, dsig1 (dsig1-length>0), or has no accompanying system signature (dsig1-length=0). If present, dsig1 is validated with a public key, PU, contained in the specified Internal Key Unit, IKU1. ePUM(keyblk) may be imported with no accompanying system signature.

A field in the configuration vector, designated SIG-COMPATIBILITY(IDK), indicates whether dsig1 is required (i.e., signified by SIG-COMPATIBILITY(IDK)=B'0') or whether dsig1 is optional (i.e., signified by SIG-COMPATIBILITY(IDK)=B'1'). For example, when dsig1-length=0 is specified, the IDK instruction ensures that SIG-COMPATIBILITY(IDK)=B'1'. In other words, when a device is configured as a compatibility device, the IDK instruction does not require specification of a system signature.

Control vectors C3, C4, and C5 are all associated with the KKL to be imported. C3 must be equal in value to the control vector stored in CFDKR. The EXPORT CONTROL field in C3, C4, and C5 must specify 'no export.' C4 is an intermediate value used by the CFAP to request changes to C3, as follows. When a KKL is imported, the CFAP is permitted, in certain cases, to change control vector fields. If no change is desired or no change is permitted, then the CFAP sets C4:=C3, else the CFAP produces C4 by making selected changes to C3. The control vector checking process assures that C4 is properly specified. Likewise, when a KKL is imported the CF is permitted to change certain control vector fields. If no change is needed or prescribed, then the CF sets C5:=C4; else the CF produces C5 by making selected changes to C4. Control vector C6 associated with KKR is derived within the Import DEA Key instruction from C5.

The Import DEA Key instruction executes only in the "run" state.

Functional Specification:
1. Verify process-mode=0, 1, or 2. If verification fails, set CC status flag and jump to step 17.
2. Validate ticket-in, and extract fields from CF Environment, if process-mode=2:
   If process-mode=2 then do:

a. Verify IDK Buffer Flag in CF Environment=1. If verification fails then set CC status flag and jump to step 17.
b. Verify ticket-in:=value stored in IDK Ticket field in CF Environment. If verification fails then set CC status flag and jump to step 17.
c. Set domain-id:=bits 00..03 of IDK Save field in CF Environment.
d. Set key-management-protocol:=bit 04 of IDK Save field in CF Environment.
e. Set key-management-mode:=bit 05 of IDK Save field in CF Environment.
f. Set cfdkr1-length:=value stored in IDK Record Length field in CF Environment.
g. Set cfdkr1:=leftmost cfdkr1-length bits of value stored in IDK Buffer field in CF Environment.
3. Perform input parameter consistency checking if process-mode=0 or 1:
If process-mode=0 or process-mode=1 then do:
a. If dsig1-length>0, then verify that IKU1 is consistent to definition of an IKU.
b. Verify that IKU2 is consistent to definition of an IKU.
Continue if checking succeeds: otherwise set CC status flag and jump to step 17.
4. Perform configuration vector and state vector checking:
a. Verify that DEFINE(IDK in config. vector=B'1'.
b. If key-management-protocol=1, then KMGT PROTOCOL in config. vector=B'11' or B'10'.
c. If key-management-protocol=1 and key-management-mode=0, then KREG in config. vector=B'0'.
d. If key-management-protocol=0, then KMGT PROTOCOL in config. vector=B'11' or B'01'.
e. Verify that CF STATE in state vector is in the "run" state.
f. Verify that KMP-FLAG(CKMP) in state vector is in the "full" state.
g. Verify that CKM FLAG in state vector is in the "full" state.
h. (optional) Verify LPID FLAG in state vector is in the "full" state.
i. Verify that ENABLE(IDK) in state vector=B'00'.
j. If process-mode=0 or process-mode=1, and if dsig1-length=0, then verify SIG-COM-PATIBILITY(IDK) in config. vector=B'1'.
Continue if checking succeeds; otherwise set CC status flag and jump to step 17.
5. Perform control block and control vector checking.
Continue if checking succeeds; otherwise set CC status flag and jump to step 17.
6. construct expected record-code to be referenced against record-code stored in cfssr1, if (process-mode-32 0 or process-mode=1) and dsig1-length>0:
a. Extract control vector C from IKU1
b. Construct record-code from control vector C.
7. Recover and validate cfssr1, if (process-mode=0 or process-mode=1) and dsig1-length>0:
a. Recover cryptographic facility system signature record cfssr1 from the digital signature dsig1, using the public key stored in IKU1.
b. Verify that cfssr1 is consistent to definition of a cryptographic facility system signature record.
c. Extract hash rule hash-rule 1 from cfssr1.
d. Verify that record-code stored in cfssr1 is the same as record-code constructed in step 6.

Continue if verifications succeed: otherwise set CC status flag and jump to 17.
8. Calculate hash value MCD on ePUM(keyblk) using the hash algorithm specified by hash-rule1, if (process-mode=0 or process-mode=1) and dsig1-length>0.
9. Validate MDC against reference MDC in cfssr1, if (process-mode=0 or process-mode=1) and disg1-length>0:
a. Extract the hash value stored in the hash field in cfssr1.
b. Verify that MDC is the same as the extracted hash value.
Continue if verification succeeds; otherwise set CC status flag and jump to step 17.
10. Recover cfdkr1 if process-mode=0:
a. Set key-process:=1
b. Recover the CFDKR cfdkr1 from the encrypted DEA key block ePUM(keyblk), using the private key PRM stored in IKU2.
11. Recover key block, if process-mode=1:
a. Set key-process:=0
b. Recover the key block keyblk from the encrypted DEA key block ePUM(keyblk), using the private key PRM stored in IKU2.
12. Produce output ticket-out and store parameter values in CF Environment if process-mode=1:
a. Produce ticket-out:
1) Generate an 8-byte random number and assign it to ticket-out.
b. Save parameter values in CF Environment:
1) Save parameter values in CF environment:
1) Set IDK Ticket field in CF Environment:=ticket-out
2) If key-process=0, then set IDK Buffer Flag in CF Environment:=2
3) Else (key-process=1) set IDK Buffer Flag in CF Environment:=3
4) Set IDK Save field in CF Environment:=domain-id || key-management-protocol || key-management-mode || B'00'
5) Set IDK Buffer field in CF Environment:=keyblk (left-justified in IDK Buffer field).
6) Set IDK Record Length field in CF Environment:=keyblk-length
7) Set IDK Buffer Length field in CF Environment:=value of IDK-buffer-length in Configuration Table.
13. Construct a record code record-code1 for cfdkr1 based on parameters key-management-protocol and key-management-mode, if process-mode=0 or process-mode=2.
14. Validate cfdkr1 if process-mode=0 or process-mode=2:
a. Verify cfdkr1-length=416/*check length*/.
b. Verify that record ID in cfdkr1 is B'00000000'.
c. Extract the one-byte record code from cfdkr1 and assign it to Y.
d. Verify record-code1=(B'11111000' AND Y) ("AND" is logical AND)
e. Verify that the value of the EID field in cfdkr1 is not the same as the contents of the EID register in CF Environment (i.e., EID acts as an anti-reimport value.)
f. Verify that the value of the EID field in cfdkr1 is the same as the sender-EID./*receiver can't be fooled about sender's identity*/ g. Verify that the value of the hash control vector field (i.e.,h(C)) in cfdkr1 is the same as C3.
h. Extracted the 64-bit left half KKL of the 128-bit key KK from cfdkr1.
i. Verify that parity of KKL is odd.
j. Extracted the 64-bit right half KKR of the 128-bit key KK from cfdkr1.
k. Verify that parity of KKR is odd.
l. Verify that reserved fields in cfdkr1 are all zero.
Continue if verifications succeed; otherwise set CC status flag and jump to step 17.
15. Produce outputs e*KM.C5(KKL) and e*KM.C6(KKR) if process-mode=0 or process-mode=2:
  a. Set KM:=contents of CKM Register in the CF Environment.
  b. Set C5:=C4 and update the history bits in C5 if necessary.
  c. Exclusive-OR KM and C5 and use the resulting key to to encrypt KKL.
  d. Set C6:=C5 and invert the values in bits 41 and 42 in C5 (i.e., adjust the KEY FORM field in C5).
  e. Exclusive-OR KM with C6 and use the resulting key to to encrypt KKR.
16. Perform state vector update: None.
17. Produce output CC from CC status flags.
Control Block and Control Vector Checking:
Perform control block and control vector checking:
A. Perform the checking in steps 1 and 2, if process-mode=0 or process-mode=2:
1. Checking on C3 (associated with KKL):
  a. CV TYPE in C3='Key-Encrypting Receiver Key2'
  b. Verify RTMK usage in C3=B'1' (i.e., enabled)
  c. Verify XLTKEY-in in C3=B'0' (i.e., disabled)
  d. Verify GKS in C3=B'000' (i.e., disabled)
  e. Verify EXPORT CONTROL in C3=B'0' (i.e., export via RFMK not permitted)
  f. Verify KEY FORM=B'010' or B'110' (i.e., KKL)
  g. Verify EXTENSION in C3=B'00' or B'01'.
  h. If EXTENSION in C3=B'00', then do:
    1) Verify C3R=C3L (i.e., CV EXTENSION=CV BASE)
    2) Verify domain-id (in instruction)=0
  i. If EXTENSION in C3=B'01', then do:
    1) Verify DOMAIN ID in C3=domain-in (in instruction).
    2) Verify HIST-GKSP/IDK field in C3=B'1'
2. Checking on C3 and C4:
  a. Verify C4=C3.
Note: Currently there is nothing in C3 that can be changed by CFAP in the IDK instruction.
Continue if checking succeeds; otherwise set CC status flag and jump to step 17.

B. Perform the checking in steps 3 thru 9, if process-mode=0 or process-mode=1:
3. Extract SCB1 and C1 from IKU1, if dsig1-length>0:
  a. Extract system control block SCB1 from IKU1.
  b. Extract control vector C1 from SCB1.
4. Extract SCB2 and C2 from IKU2:
  a. Extract system control block SCB2 from IKU2.
  b. EXtract control vector C2 from SCB2.
5. Checking on C1 (associated with PUM), is dsig1-length>0:
  a. Verify CV TYPE in C1='public key management key'
  b. Verify IDK in C1=B'1' (i.e., enabled)
  c. Verify HIST-IPUK=B'1' (i.e., imported)
  d. Verify DOMAIN ID in C1=domain-id (in instruction)
  e. If key-management-protocol (in instruction)=B'1' (i.e., 'certification center protocol'), then do:
    1) If key-management-mode (in instruction)=0, then KREGMODE in C1=B'01'.
    2) If key-management-mode (in instruction)=1, then KREGMODE in C1=B'10'.
    3) Verify HIST-CHAIN in C1=2.
  f. Perform Control Vector Validate on C1 to validate certain fields in C1.
6. Checking on C2 (associated with PRM):
  a. Verify CF TYPE in C2='private key management key'
  b. Verify IDK usage in C2=B'1' (i.e., enabled)
  c. Verify DOMAIN ID in C2=domain-id (in instruction)
  d. Perform Control Vector Validate on C1 to validate certain fields in C2.
7. Checking on C1 and C2 (associated with PUM and PRM), if dsig1-length>0:
  a. Verify HIST-MDC in C1>THRES-MDC in C2. (This check is valid for private protocols and certification center protocols.)
8. Checking on SCB1, if dsig1-length>0:
  a. Verify that the current date and time are in the time interval (Tstart,Texp), specified in SCB1 (i.e., Tstart≦DT<Texp).
  b. Verify that the Environment ID stored in the EID register is not the same as the Environment ID stored in SCB1.
9. Checking on SCB2:
  a. Verify that the current date and time are in the time interval (Tstart,Texp), specified in SCB2 (i.e., Tstart≦DT<Texp).
  b. Verify that the Environment ID stored in the EID register is the same as the Environment ID stored in SCB2.
Continue if checking succeeds; otherwise set CC status flag and jump to step 17.

Verify Internal Key Unit (VIKU)

| EQUATION: | |
|---|---|
| KMP-mode | /2b/ |
| IKU1-length | /16b/ |
| IKU1 | /unspecified/ |
| → | |
| CC | /unspecified |
| PARAMETER DEFINITIONS: | |
| Inputs | Description |
| KMP-mode | Specifies the PKA master key as follows:<br>0 : CKMP<br>1 : NKMP<br>2 : OKMP |
| IKU1-length | The length of IKU1 in bytes. |

| | |
|---|---|
| IKU1 | An Internal Key Unit. |
| Outputs | Description |
| CC | Condition code indicating success or failure of the instruction execution. |

Description:

The Verify Internal Key Unit instruction extracts the encrypted CFPKR and encrypted CFKAR from an Internal Key Unit, decrypts them, and validates the CFPKR using the CFKAR. A KMP-mode parameter permits the validation to be performed using the current, new, or old PKA master key.

The Verify Internal Key Unit instruction executes only in the "run" state.

System Digital Signatures
Generate Digital Signature (GDS)

```
PR-mode          /1b/
<IKU1-length>    /16b/         ; if PR-mode=0
<IKU1>           /unspecified/ ; if PR-mode=0
data-length      /16b/
data             /unspecified/
hash-rule        /3b/
inst-code        /4b/
→
dsig-length      /16b/
dsig             /unspecified/
CC               /unspecified/
```

PARAMETER DEFINITIONS:

| Inputs | Description |
|---|---|
| PR-mode | The PR-mode parameter specifies the source of the private key used to generate the digital signature, as follows:<br>• PR-mode=0 : use PR in IKU1<br>• PR-mode=1 : use PRA in CF |
| IKU1-length | The length of IKU1 in bytes. This parameter is required only when PR-mode=0. |
| IKU1 | An Internal Key Unit containing a private key PR. PR must be a private certification key, a private key management key, or a private user key. The value of EID in SCB1 must equal the value in the EID register. The values of Tstart and Texp in SCB1 must satisfy the relationship Tstart ≦ DT < Texp, where DT is the current date and time expressed in Coordinated Universal Time. This parameter is required only when PR-mode=0. |
| data-length | The length of data in bits. |
| data | The data upon which a digital signature is to be calculated. |
| hash-rule | Specifies the hash algorithm to be used to hash the input data and the rule, if any, for formatting and producing the CF System Signature Record (CFSSR). The encoding of the hash-rule is as follows:<br>• hash-rule = 0 : MDC-2 algorithm (with 128 bit hash right justified in the Hash field).<br>• hash-rule = 1 : MDC-4 algorithm (with 128 bit hash right justified in the Hash field).<br>• hash-rule = 2 : MD4 algorithm (with 128 bit hash right justified in the Hash field).<br>• hash-rule = 3 : quadratic residue (with 128 bit hash right justified in the Hash field).<br>• hash-rule = 4–15 : reserved |
| inst-code | Specifies the PKCD instruction to be emulated (inst-codes 0 thru 3) or the GDS instruction (inst-code=4), as follows:<br>• inst-code=0 : ECFAR instruction<br>• inst-code=1 : EPUK instruction<br>• inst-code=2 : GKSP instruction<br>• inst-code=3 : ECFER instruction<br>• inst-code=4 : GDS instruction<br>Note: For inst-code=0, data is a CFAR; for inst-code=1, data is an EKU; for inst-code=2, data is ePUM(keyblk); for inst-code=3, data is ePUA(CFBDKB). |
| Outputs | Description |
| dsig-length | The length of dsig in bits. |
| dsig | A digital signature produced from a CF System Signature Record (CFSSR) according to the signature generation processing rules outlined in Section 6 of ISO DIS 9796. |
| CC | Condition code indicating success or failure of the instruction execution. |

Description:

The Generate Digital Signature instruction generates a digital signature, called dsig, from a Crypto Facility System Signature Record (CFSSR) in accordance with Section 6 of ISO DIS 9796. The CFSSR is a 253-bit CF-generated record containing a 128-bit hash value calculated on a variable length input data record, called data. The length CFSSR must be less than or equal to ½ the modulus length of the public key algorithm. The process of producing dsig from CFSSR consists of pre-processing steps, decryption with a private key, and post-processing steps.

A PR-mode parameter specifies to the GDS instruction whether the PR key used to produce the system signature is specified in IKU1 (PR-mode=0) or whether the PR key used to produce the system signature is the PRA key stored in the CF (PR-mode=1).

A private certification key can be specified to the GDS instruction only when the device is configured as a certification center (CERTIFICATION field in the configuration vector is B'1'). A private authentication key, a private key management key, or a private user key can be specified to the GDS instruc-authentication key, a private key management key, or a private user key can be specified to the GDS instruction only when the device is configured as an interchange device (INTERCHANGE field in the configuration vector is B'1'). A device may act as both a certification center and an interchange device.

The GDS instruction executes only in the "run" state.

Verify Digital Signature (VDS)

128-bit has value calculated on a variable length input data record, called data. CFSSR is recovered from dsig by encrypting dsig with a public key, performing consistency checking on the recovered block and discarding redundant data and extracting CFSSR.

```
PU-mode          /1b/           ; if PU-mode=0
<IKU1-length>    /16b/          ; if PU-mode=0
<IKU1>           /unspecified/
data-length      /16b/
data             /unspecified/
dsig-length      /16b/
dsig             /unspecified/
→
hash-rule        /4b/
inst-code        /4b/
CC               /unspecified/
```

PARAMETER DEFINITIONS:

| Inputs | Description |
|---|---|
| PU-mode | The PU-mode parameter specifies the source of the public key used to validate the digital signature, as follows:<br>• PU-mode=0 : use PU in IKU1<br>• PU-mode=1 : use PUA in CF |
| IKU1-length | The length of IKU1 in bytes. This parameter is required only when PU-mode=0. |
| IKU1 | An Internal Key Unit containing a public key PU. The values of Tstart and Texp in SCB1 must satisfy the relationship Tstart $\leq$ DT $<$ Texp, where DT is the current date and time expressed in Coordinated Universal Time. This parameter is required only when PU-mode=0. |
| data-length | The length of data in bits. |
| data | The data upon which a digital signature is to be calculated. |
| dsig-length | The length of dsig in bits. |
| dsig | A digital signature originally produced from a CF System Signature Record (CFSSR) according to the signature generation processing rules outlined in Section 6 of ISO DIS 9796. |

| Outputs | Description |
|---|---|
| hash-rule | The encoded hash-rule field in the CF System Signature Record (CFSSR), as follows:<br>• hash-rule = 0 : MDC-2 algorithm (with 128 bit hash right justified in the Hash field).<br>• hash-rule = 1 : MDC-4 algorithm (with 128 bit hash right justified in the Hash field).<br>• hash-rule = 2 : MD4 algorithm (with 128 bit hash right justified in the Hash field)<br>• hash-rule = 3 : quadratic residue (with 128 bit hash right justified in the Hash field)<br>• hash-rule = 4–15 : reserved |
| inst-code | The leftmost 4 bits of the Record Code field in the CF System Signature Record (CFSSR) (i.e., the PKCD instruction that created the digital signature or the PKCD instruction emulated by a GDS instruction), as follows:<br>• inst-code=0 : ECFAR instruction<br>• inst-code=1 : EPUK instruction<br>• inst-code=2 : GKSP instruction<br>• inst-code=3 : ECFER instruction<br>• inst-code=4 : GDS instruction<br>Note: For inst-code=0, data is a CFAR; for inst-code=1, data is an EKU; for inst-code=2, data is ePUM(keyblk); for inst-code=3, data is ePUA(CFBDKB). |
| CC | Conditon code indicating success or failure of the instruction execution. |

Description:

The Verify Digital Signature instruction verifies a system signature, called dsig, in accordance with Section 7 of ISO DIS 9796, where dsig was created from a Crypto Facility System Signature Record (CFSSR) in accordance with Section 6 of ISO DIS9796. The CFSSR is a 253-bit CF-generated record containing a There are no restrictions on the key type of the public key that may be used with the VDS instruction.

The VDS instruction executes only the "run" state.

Application Digital Signatures

Generate Application Digital Signature (GADS)

```
         EQUATION:
IKU1-length      /16b/
IKU1             /unspecified/
hash-val-length  /16b/
hash-val         /unspecified/
→
dsig-length      /16b/
dsig             /unspecified/
CC               /unspecified/
```

PARAMETER DEFINITIONS:

| Inputs | Description |
|---|---|
| IKU1-length | The length of IKU1 in bytes. |
| IKU1 | An internal Key Unit containing a private key PR. PR must be a private certification key, a private key management key, or a private user key. The value of EID in SCB1 must equal the value in the EID register. The values of Tstart and Texp in SCB1 must satisfy the relationship Tstart $\leq$ DT $<$ Texp, where DT is the current date and time expressed in Coordinated Universal Time. |

| | |
|---|---|
| hash-val-length | The length of hash-val in bytes. It must be ≤ one half of modulus length indicated in the control vector associated with the private key PR in IKU1. |
| hash-val | The hash value on which the signature is produced. hash-val is computed from the data by either the application or CFAP, using any hash algorithm. |
| Outputs | Description |
| dsig-length | The length of dsig in bits. |
| dsig | A digital signature produced from hash-val and private key PR in accordance with section 6 of ISO DIS 9796. |
| CC | Condition code indicating success or failure of the instruction execution. |

Description:

The Generate Application Digital Signature instruction generates a digital signature, called dsig, from an input hash value (called hash-val) in accordance with Section 6 of ISO DIS 9796. hash-val must be a whole number of bytes and the length of hash-val must be less than or equal to ½ the modulus length of the public key algorithm. The process of producing dsig from hash-val consists of pre-processing steps, decryption with a private key, and posts-processing steps.

A signature produced by the GADS instruction is called an application signature; a signature produced by the ECFAR, EPUK, GKSP, ECFER, or GDS instruction is called a system signature. to prevent the GADS instruction from producing a system signature, the system signature is produced from a 253-bit CF System Signature Record, whereas the application signature is produced from a hash value consisting of a whole number of bytes. Note that 253 bits is not a whole number of bytes.

A private certification key can be specified to the GADS instruction only if the deice is configured as a certification center (CERTIFICATION field in the configuration vector is B'1').

The GADS instruction executes only in the "run" state.

Verify Application Digital Signature (VADS)

Description:

The Verify Application Digital Signature instruction validates a digital signature, called dsig, using an input hash value (called hash-val) and a public key PU in accordance with Section 7 of ISO DIS 9796. hash-val must be a whole number of bytes and the length of hash-val must be less than or equal to ½ the modulus length of the public key algorithm. The process of validating dsig consists of encryption with a public key, consistency checking to validate the redundancy bytes, and recovery of the hash-value-of-reference originally used to generate dsig. The hash value supplied to the VADS instruction (i.e., hash-val) is compared for equality of hash-value-of-reference.

A signature validated by the VADS instruction is called an application signature; a signature validated by the VDS instruction is called a system signature. See the GADS instruction for an explanation of system and application signatures.

The VADS instruction operates with any public key supplied in IKU1.

The VADS instruction executes only in the "run" state.

Export Crypto Facility Environment Record (ECFER)

| EQUATION: | |
|---|---|
| IKU1-length | /16b/ |
| IKU1 | /unspecified/ |
| hash-val-length | /16b/ |
| hash-val | /unspecified/ |
| dsig-length | /16b/ |
| dsig | /unspecified/ |
| → | |
| CC | /unspecified/ |

PARAMETER DEFINITIONS:

| Inputs | Description |
|---|---|
| IKU1-length | The length of IKU1 in bytes. |
| IKU1 | An Internal Key Unit containing a public key PU. The values of Tstart and Texp in SCB1 must satisfy the relationship Tstart ≤ DT < Texp, where DT is the current date and time expressed in Coordinated Universal Time. |
| hash-val-length | The length of hash-val in bytes. It must be ≤ one half of modulus length indicated in the control vector associated with the public key PU in IKU1. |
| hash-val | The hash value on which the signature is produced. hash-val is computed from the data by either the application or CFAP, using any hash algorithm. |
| dsig-length | The length of dsig in bits. |
| dsig | A digital signature produced from hash-val and private key PR in accordance with section 6 of ISO DIS 9796, and which is validated in the VADS instruction using the public key PU (specified in IKU1) in accordance with section 7 of ISO DIS 9796. |
| Outputs | Description |
| CC | Condition code indicating success or failure of the instruction execution. |

| EQUATION: | |
|---|---|
| protocol-mode | /2b minimum/ |
| KM-mode | /1b minimum/ |
| KMP-mode | /1b minimum/ |
| hash-rule | /3b minimum/ |
| IKU1-length | /16b/ |

-continued

| | |
|---|---|
| IKU1 | /unspecified/ |
| → | |
| xcfer-length | /32b/ |
| xcfer | /unspecified/ |
| cfbdkb1-length | /16b/ |
| ePUAb(cfbdkb1) | /unspecified/ |
| dsig1-length | /16b/ |
| dsig1 | /unspecified/ |
| CC | /unspecified |

PARAMETER DEFINITIONS:

| Inputs | Description |
|---|---|
| protocol-mode | The protocol-mode parameter specifies the protocol used for export and import of the CF environment, as follows:<br>• 0 : reserved<br>• 1 : CBKUP1 (certification center protocol where the PUA control vector has HIST-CHAIN=2)<br>• 2 : CBKUP2 (certification center protocol where the PUA control vector has HIST-CHAIN=3)<br>• 3 : PBKUP (private protocol, i.e., no restriction on how PUA is imported)<br>Note that the control vector for PUAb(i.e., C1) contains a similar BKUP PROTOCOL field that must match the protocol-mode parameter. |
| KM-mode | The KM-mode parameter indicates whether the master key KM is required to be entered into the new KM register at the receiving device via the LFMKP and CMKP instructions:<br>• KM-mode=0 : no<br>• KM-mode=1 : yes (load via LFMKP and CMKP)<br>Note: KM-mode=1 should be selected only if the value of KM is known outside the crypto facility, i.e., KM was originally loaded into the CF of the sending device via the LFMKP and CMKP instructions. |
| KMP-mode | The KMP-mode parameter indicates whether the PKA master key KMP is required to be entered into the new KMP register at the receiving device via the LFPMKP and CPMKP instructions:<br>• KMP-mode = 0 : no<br>• KMP-mode = 1 : yes (load via LFPMKP and CPMKP)<br>Note: KMP-mode= 1 should be selected only if the value of KMP is known outside the crypto facility, i.e., KMP was originally loaded into the CF of the sending device via the LFPMKP and CPMKP instructions. |
| hash-rule | Specifies the hash algorithm to be used to calculate a hash value on ePUAb(cfbdkb1) and on the cfer. The encoding of the hash-rule is as follows:<br>• hash-rule = 0 : MDC-2 algorithm<br>• hash-rule = 1 : MDC-4 algorithm<br>• hash-rule = 2 : MD4 algorithm<br>• hash-rule = 3 : quadratic residue<br>• hash-rule = 4-7 : reserved |
| IKU1-length | The length of IKU1 in bytes. |
| IKU1 | An Internal Key Unit containing PUAb of device "b". Note that "a" is this device and "b" is the other device. The value of EID in SCB1 must not equal the value in the EID register. The values of Tstart and Texp in SCB1 must satisfy the relationship Tstart ≦ DT < Texp, where DT is the current date and time expressed in Coordinated Universal Time. |

| Outputs | Description |
|---|---|
| xcfer-length | The length of xcfer in bytes. |
| xcfer | An External Crypto Facility Environment Record. |
| cfbdkb1-length | The length of cfbdkb1 and ePUAb(cfbdkb1) in bits. |
| ePUAb(cfbdkb1) | cfbdkb1 encrypted with public key PUAb of device "b". The Encrypted Secret (ESP) in xcfer is encrypted with a key stored in cfbdkb1. cfbdkb1 also contains a 128-bit hash value (MDC) calculated on cfer. |
| dsig1-length | The length of dsig1 in bits. |
| dsig1 | A digital signature produced from a CF System Signature Record (CFSSR) and a private authentication key PRAa of device "a", in accordance with section 6 of ISO DIS 9796. The CFSSR contains a 128-bit hash value calculated on ePUAb(cfbdkb1). |
| CC | Conditon code indicating success or failure of the instruction execution. |

The Export Crypto Facility Environment Record instruction constructs an External Crypto Facility Environment Record, xcfer, an encrypted Crypto Facility Backup Key Block, ePUAb(cfbdkbl), and a digital signature, dsig1. dsig1 is calculated from a Crypto Facility System Signature Record (cfssrl) and a private authentication key PRAa. Subscripts "a" and "b" designate this device and another device, respectively. cfssrl contains a hash value (e.g., an MDC) calculated on ePUAb(cfbdkbl), i.e., the digital signature authenticates ePUAb(cfbdkbl). cfbdkbl contains a similar hash value (e.g., an MDC) calculated on cfer, which permits xcfer to be authenticated. Both hash values (i.e., the hash value in cfssrl and the hash value in cfbdkbl) are calculated using the same hash algorithm, as specified in the hash-rule parameter of the ECFER instruction. cfbdkbl also contains a 128 bit key KK2 used to encrypt the Secret Part (SP) of xcfer, where KK2=KK1 xor X xor Y. xcfer also contains a Nonsecret Part (NSP). The values X and Y are determined as follows: (1) X:=KMP if KMP-mode=1 and X:=0 if KMP=mode=0, and (2) Y:=KM if KM-mode=1 and Y:=0 if KM-mode=0. Together SP and NSP constitute everything in the CF Environment except the PUA and PRA key, their length fields, and control vectors, and the contents of the DID register. These elements do not port in the xcfer.

Any one of three protocol modes may be used to export and import a CF-environment record: (a)

PBKUP, (b) CBKUP1, and (c) CBKUP2. The PBKUP (i.e., private protocol) mode is the least restrictive. This mode permits an installation to effect device backup using privately exchanged PUA keys. The CBKUP1 and CBKUP2 modes make use of a certification center to indirectly validate the PUA key, and thus are more restrictive. In the CBKUP2 mode, the control vector of the PUA key must have a HIST-CHAIN value equal to 3, i.e., the PUA key is imported using a PUM key whose control vector has a HIST-CHAIN value equal to 2 and the PUM key is imported using a PUC key whose control vector has a HIST-CHAIN value equal to 1. In the CBKUP1 mode, the control vector of the PUA key must have a HIST-CHAIN value equal to 2, i.e., the PUA key is imported using a PUC key whose control vector has a HIST-CHAIN value equal to 1.

Several mechanisms are provided to authorize and control the execution of the ECFER instruction. These control mechanisms are effected via the configuration vector, the control vectors, and the instruction parameters. The ECFER and ICFER instructions are designed to operate only if both the exporting and importing devices "agree" to use the same protocol and protocol options. In effect, this means that both devices must be configured the same (i.e., both configuration vectors must be the same with respect to device backup), both devices must use the same key management protocol, and the same parameter options must be specified to the ECFER and ICFER instructions. The following addition conditions are enforced: (1) the method of loading or generating KMP at the exporting and importing devices must be the same, and (2) when protocol-mode=1 or 2 the PUC keys (or PUM and PUC keys) used at the exporting and importing devices to import the PUA keys must be the same. A HIST-DOMAIN ID field in the state vector of a cloned CF environment records the domain identifier of the PUC keys (or PUC and PUM keys) used to import the PUA keys when protocol modes 1 or 2 are used. By using the ECFAR instruction, a cloned device can be audited to ensure that backup and recovery was effected with the proper PUC key. Agreement between the exporting and importing devices is effected through the use of the record code field in the Crypto Facility Backup DEA Key Record and through direct comparisons of the information stored in the CFER produced at the exporting device and the CF Environment of the importing device.

The ECFER and ICFER instructions provide an option requiring the master key KM and/or the PKA master key KMP to be reentered at the importing (or receiving) device. In that case, the cryptovariable encrypting key KK1 under which the Secret Part of xcfer is encrypted can be recovered at the receiving device only if the required values of KM and/or KMP have been properly entered. This option permits a CF Environment to be ported without exposing KM or KMP to any greater extent than would otherwise be required for ordinary manual key entry at a sending or receiving device.

The ECFER instruction executes only in the "run" state.

Import Crypto Facility Environment Record (ICFER)

```
EQUATION:
  PARAMETER DEFINITONS:
  protocol-mode      /2b minimum/
  KM-mode            /1b minimum/
  KMP-mode           /1b minimum/
  IKU1-length        /16b/
  IKU1               /unspecified/
  xcfer-length       /32b/
  xcfer              /unspecified/
  cfbdkb1-length     /16b/
  ePUAb(cfbdkb1)     /unspecified/
  disg1-length       /16b/
  dsig1              /unspecified/
  →
  CC                 /unspecified/
```

PARAMETER DEFINITIONS:

| Inputs | Description |
|---|---|
| protocol-mode | The protocol-mode parameter specifies the protocol used for export and import of the CF environment, as follows:<br>• 0 : reserved<br>• 1 : CBKUP1 (certification center protocol where the PUA control vector has HIST-CHAIN=2)<br>• 2 : CBKUP2 (certification center protocol where the PUA control vector has HIST-CHAIN=3)<br>• 3 : PBKUP (private protocol, i.e., not restriction on how PUA is imported).<br>Note that the control vector for PUAa (i.e., C1) contains a similar BKUP PROTOCOL field that must match the protocol-mode parameter. |
| KM-mode | The KM-mode parameter indicates whether the master key KM is required to be entered into the new KM register at the receiving device via the LFMKP and CMKPO instructions:<br>• KM-mode=0 : no<br>• KM-mode=1 : yes (load via LFMKP and CMKP)<br>Note: KM-mode=1 should be selected only if the value of KM is known outside the crypto facility, i.e., KM was originally loaded into the CF of the sending device via the LFMKP and CMKP instructions. |
| KMP-mode | The KMP-mode parameter indicates whether the PKA master key KMP is required to be entered into the new KMP register at the receiving device via the LFPMKP and CPMKP instructions:<br>• KMP-mode = 0 : no<br>• KMP-mode = yes (load via LFPMKP and CPMKP)<br>Note: KMP-mode=1 should be selected only if the value of KMP is known outside the crypto facility, i.e., KMP was originally loaded into the CF of the sending device via the |

| | LFPMKP and CPMKP instructions. |
|---|---|
| IKU1-length | The length of IKU1 in bytes. |
| IKU1 | An Internal Key Unit containing PUAa of device "a". Note that "a" is the other device and "b" is this device. The value of EID in SCB1 must not equal the value in the EID register. The values of Tstart and Texp in SCB1 must satisfy the relationship Tstart ≤ DT < Texp, where DT is the current date and time expressed in Coordinated Universal Time. |
| xcfer-length | The length of xcfer in bytes. |
| xcfer | An External Crypto Facility Environment Record. |
| cfbdkb1-length | The length of cfbdkb1 and ePUAb(cfbdkb1) in bits. |
| ePUAb(cfbdkb1) | cfbdkb1 encrypted with public key PUAb of device "b". The Encrypted Secret Part (ESP) in xcfer is encrypted with a key stored in cfbdkb1. cfbdkb1 also contains a 128-bit hash value (MDC) calculated on cfer. |
| dsig1-length | The length of dsig1 in bits. |
| dsig1 | A digital signature produced from a CF System Signature Record (CFSSR) and a private authentication key PRAa of device "a", in accordance with section 6 of ISO DIS 9796. The CFSSR contains a 128-bit hash value calculated on ePUAb(cfbdkb1). |
| Outputs | Description |
| CC | Condition code indicating success or failure of the instruction execution. |

Description:

The Import Crypto Facility Environment Record instruction permits an xcfer produced with an ECFER instruction at a sending device, to be imported at a receiving device. In effect, the output of an ECFER instruction becomes the input to an ICFER instruction. Execution of the ICFER instruction causes the variables stored in the xcfer to replace the comparable variables in the CF Environment of the receiving device.

The inputs to the Import Crypto Facility Environment Record instruction consists of an External Crypto Facility Environment Record, xcfer, an encrypted Crypto Facility Backup Key Block, ePUAb(cfbdkbl), and a digital signature dsig1. dsig1 is calculated from a Crypto Facility System Signature Record (cfssrl) and a private authentication key PRAa. Subscripts "b" and "a" designate this device and another device, respectively. cfssrl contains a hash value (e.g., an MDC) calculated on ePUAb(cfbdkbl), i.e., the digital signature authenticates ePUAb(cfbdkbl). cfbdkbl contains a similar hash value (e.g., an MDC) calculated on cfer, which permits xcfer to be authenticated. Both hash values (i.e., the hash value in cfssrl and the hash value in cfbdkbl) are calculated using the same hash algorithm, as originally specified in the hash-rule parameter of the ECFER instruction. cfbdkbl also contains a 128 bit key KK2 used to encrypt the Secret Part (SP) of xcfer, where KK2=KK1 xor X xor Y. xcfer also contains a Nonsecret Part (NSP). The values X and Y are determined as follows: (1) X:=KMP if KMP-mode=1 and X:=0 if KMP=mode=0, and (2) Y:=KM if KM-mode=1 and Y:=0 if KM-mode=0. Together SP and NSP constitute everything in the CF Environment except the PUA and PRA key, their length fields, and control vectors, and the contents of the DID register. These elements do not port in the xcfer.

Any one of three protocol modes may be used to export and import a CF-environment record: (a) PBKUP, (b) CBKUP1, and (c) CBKUP2. The PBKUP (i.e., private protocol) mode is the least restrictive. This mode permits an installation to effect device backup using privately exchanged PUA keys. The CBKUP1 and CBKUP2 modes make use of a certification center to indirectly validate the PUA key, and thus are more restrictive. In the CBKUP2 mode, the control vector of the PUA key must have a HIST-CHAIN value equal to 3, i.e., the PUA key is imported using a PUM key whose control vector has a HIST-CHAIN value equal to 2 and the PUM key is imported using a PUC key whose control vector has a HIST-CHAIN value equal to 1. In the CBKUP1 mode, the control vector of the PUA key must have a HIST-CHAIN value equal to 2, i.e., the PUA key is imported using a PUC key whose control vector has a HIST-CHAIN value equal to 1.

Several mechanisms are provided to authorize and control the execution of the ECFER instruction. These control mechanisms are effected via the configuration vector, the control vectors, and the instruction parameters. The ECFER and ICFER instructions are designed to operate only if both the exporting and importing devices "agree" to use the same protocol and protocol options. In effect, this means that both devices must be configured the same (i.e., both configuration vectors must be the same with respect to device backup), both devices must use the same key management protocol, and the same parameter options must be specified to the ECFER and ICFER instructions. The following additional conditions are enforced: (1) the method of loading or generating KMP at the exporting and importing devices must be the same, and (2) when protocol-mode=1 or 2 the PUC keys (or PUM and PUC keys) used at the exporting and importing devices to import the PUA keys must be the same. A HIST-DOMAIN ID field in the state vector of a cloned CF environment records the domain identifier of the PUC keys (or PUC and PUM keys) used to import the PUA keys when protocol modes 1 or 2 are used. By using the ECFAR instruction, a cloned device can be audited to ensure that backup and recovery was effected with the proper PUC key. Agreement between the exporting and importing devices is effected through the use of the record code field in the Crypto Facility Backup DEA Key Record and through direct comparisons of the information stored in the CFER produced at the exporting device and the CF Environment of the importing device.

The ECFER and ICFER instructions provide an option requiring the master key KM and/or the PKA master key KMP to be reentered at the importing (or receiving) device. In that case, the cryptovariable encrypting key KK1 under which the Secret Part of xcfer is encrypted can be recovered at the receiving device only if the required values of KM and/or KMP have been properly entered. This option permits a CF Environment to be ported without exposing KM or KMP to any greater extent than would otherwise be required for ordinary manual key entry at a sending or receiving device. To permit recovery, KMP must be reentered into the NKMP register and KM must be reentered into the NKM register using the CF instructions.

The concept of CF Environment backup using the ECFER and ICFER instructions is such that the PUA and PRA keys are not ported from one device to another. Thus, when a CF Environment is reimported at a receiving device, the existing PUA and PRA keys are not changed, and the content of the DID register is not changed. However, the content of the EID register IS changed, i.e., the content of the EID register ports from one device to another. These ensure that existing certificates containing EID remain valid, and the anti-reimport property of EID remains valid.

The ICFER instruction executes only in the "run" state.

Set and Rest Alarm (SRALM)

| EQUATION: | |
|---|---|
| mode | /1b minimum/ |
| → | |
| CC | /unspecified/ |

PARAMETER DEFINITIONS:

| Inputs | Description |
|---|---|
| mode | A parameter indicating whether to set or reset alarm, as follows:<br>• 0 : reset alarm<br>• 1 : set alarm |
| Outputs | Description |
| CC | Condition code indicating success or failure of the instruction execution. |

Description:
The Set and Reset Alarm instruction signals the CF that an "alarm" condition should be set or reset. The term "alarm" means a signal sent on a line, e.g., causing a light to come on or a signal to be sent on a monitoring line to a central location.

Besides the frequently used Key Record Encrypt and Key Record Decrypt algorithms, there are other algorithms commonly used by the PKCD instructions. They are described as follows.

IPRN-Initialize Pseudo-Random Number Algorithm

Inputs: None.
Outputs: None.
Algorithm Description:
1. Produce KK1 and KK2 from PRNGKEY1, PRNGKEY2 and PRNGCTR1 registers:
   a. Set KK1L:=leftmost PRNGKEY1 XOR PRNGCTR1
   b. Set KK1R:=rightmost PRNGKEY1 XOR PRNGCTR1
   c. Set KK2L:=leftmost PRNGKEY2 XOR PRNGCTR1
   d. Set KK2R:=rightmost PRNGKEY2 XOR PRNGCTR1

Note: the IPRN algorithm assumes that PRNGCTR1 is continuously updated by by hardware. If PRNGCTR1 is not implemented, one may alternatively read an internal Time of Day Clock value and, if TOD has more than 64 bits, use the low-order 64 bits of TOD instead of PRNGCTR1.
2. Calculate KK3 and KK4:
   a. Calculate a hash value on KK1 using the MDC-2 algorithm, and assign the result to KK3.
   b. Calculate a hash value on KK2 using the MDC-2 algorithm, and assign the result to KK4.

Note this step eliminates the need to erase or zeroize the PRNGKEY1 and PRNGKEY2 resisters when the CF Environment is clear. It also distributes any randomness uniformly over the key.
3. Fix bits in KK3 and KK4:
   a. Set bits 00..01 of KK3:=B'00'.
   b. Set bits 64..65 of KK3:=B'01'.
   c. Set bits 00..01 of KK4:=B'10'.
   d. Set bits 64..65 of KK4:=B'11'.
4. (Optional) adjust parity of KK3 and KK4:
   a. For each byte in KK3 and KK4 (whose bits are numbered b0 to b7), set bit b7 so that bits b0 thru b7 have an odd number of bits set to B'1'.
5. Write KK3 to PRNGKEY1 register and KK4 to PRNGKEY2 resister:
   a. PRNGKEY1:=KK3.
   b. PRNGKEY2:=KK4.

ENCKU-Encrypt CKU to IKU Algorithm

The ENCKU algorithm is the inverse of the RCKUI algorithm.

The ENCKU algorithm is as follows:

ENCKU(KMP,nl,CKU→IKU)

| Inputs: | |
|---|---|
| KMP | A 128 bit DEA key. |
| nl | The length of CKU and IKU in bytes. |
| CKU | A Clear Key Unit. |
| Outputs: | |
| IKU | An Internal Key Unit. |

Algorithm Description:
1. Extract control data (consisting of a system control block concatenated to a user control block) from CKU.
2. Extract key record and key authenticator record from CKU.
3. Encrypt key record and key authenticator record using the method described in the Key Record Encrypt algorithm.
4. Convert CKU to IKU by updating the header and by replacing the key record and key authenticator record in CKU with encrypted key record and encrypted key authenticator, respectively.

RCKUI-Recover CKU from IKU Algorithm

The RCKUI algorithm is the inverse of the ENCKU algorithm.

The RCKUI algorithm is as follows:

RCKUI(KMP,nl,IKU→CKU,RC)

Inputs:

| | |
|---|---|
| KMP | A 128 bit DEA key. |
| n1 | The length of IKU in bytes. |
| IKU | An Internal Key Unit. |
| Outputs: | |
| CKU | A Clear Key Unit. |
| RC | Return code |
| | 1. successful completion |
| | 2. key authenticator record in the IKU does not verify |

Algorithm Description:
1. Extract the control data from IKU.
2. Extract encrypted key record and key authenticator record from CKU.
3. Decrypt encrypted key record and encrypted key authenticator record using the method described in the Key Record Decrypt algorithm.
4. Convert IKU to CKU by updating the header and by replacing the encrypted key record and encrypted key authenticator record in IKU with key record and key authenticator, respectively.

PKGA-PKA Key Generation Algorithm

The PKA Key Generation algorithm as follows:

PKGA(C,gmode,codeword-,res→s1,cfpkr1,s2,cfpkr2,RC)

| | |
|---|---|
| Inputs: | |
| C | A 16 byte control vector of the generated public key. |
| gmode | A parameter indicating the mode of key generation, as follows: |
| | 'R': Random - Key generation makes use of an L-bit seed randomly generated. |
| | 'D': Derived - Key generation makes use of an L-bit seed derived from a 128 bit codeword supplied as an input parameter. |
| codeword | A 128 bit "seed" value used to generate an L-bit pseudorandom number. |
| res | A parameter indicating key length restrictions, as follows: |
| | • 0 : no restriction |
| | • 1 : length restriction type "I" |
| Outputs: | |
| s1 | The length of cfpkr1 in 8-byte blocks. |
| cfpkr1 | A Cryto Facility PKA Key Record containing a generated private key. |
| s2 | The length of cfpkr2 in 8-byte blocks. |
| cfpkr2 | A Crypto Facility PKA Key Record containing a generated private key. |
| RC | Return code |
| | 1. - successful operation |
| | 2. - Algorithm specified in the control vector is not supported |

Algorithm Description:
1. Set alg:=ALGORITHM field in C
2. If gmode='R', then generate an L-bit seed using a random or a pseudorandom number generator.
3. Else (gmode='D'), derive an L-bit seed from the supplied codeword.
4. Perform the Key Generation Algorithm (KGA) on the L-bit seed to generate a pair of public and private key records cfpkr1 and cfpkr2, respectively.

Note:KGA and the method for deriving an L-bit seed from a codeword have been described in copending patent by S. M. Matyas, et al. entitled "Generating Public and Private Key Pairs using a Passphrase," cited in the background art.

CVVLD-Control Vector Validate Algorithm

The Control Vector Validate algorithm is as follows:

CVVLD(Ci→RC)

| | |
|---|---|
| Inputs: | |
| Ci | The input control vector Ci on which the CV checking is performed. |
| Outputs: | |
| RC | Return code |
| | 1. successful completion |
| | 2. unsuccessful completion |

Algorithm Description:
The Control Vector Validate checks a control vector associated with a PKA key. No checking is performed to the CV TYPE field.
1. Set RC:=0
2. Verify ANTIVARIANT ZERO in $Ci = B'0'$
3. Verify ANTIVARIANT ONE in $Ci = B'1'$
4. Verify EXTENSION in $Ci = B'10'$(i.e., >128 bit control vector)
5. Verify TESTZERO in $Ci = B'000'$(i.e., RPZ are valid)
6. If checking fails, then set RC:=1 and abort operation.

CVG-Control Vector Generation Algorithm

The Control Vector Generate algorithm is used by the IPUK instruction to set history information in an output control vector. The specific fields set by the Control Vector Generate routine are HIST-IPUK, HIST-CHAIN, HIST-MDC, HIST-DOMAIN ID and HIST-KREGMODE. These history fields are interrogated for compliance with minimum threshold values set forth in the configuration vector and in other control vectors, when a public key is used for key management or CF environment backup The Control Vector Generate is as follows:

CVG(import-mode,mdc-mode,mdc-index,signature-mode,C1,C2→C3)

| | |
|---|---|
| Inputs: | |
| import-mode | A 1 bit value indicating the import-mode, as follows: |

-continued

- 0 : import-mode=0 in IPUK instruction
- 1 : import-mode=1 in IPUK instruction mdc-mode  A 1 bit value indicating the MDC-mode, as follows:
- 0 : MDC-mode=0 in IPUK instruction
- 1 : MDC-mode=1 in IPUK instruction
  This parameter is valid only when import-mode=0.

mdc-index  A parameter has a value equal to the MDC-index parameter in the IPUK instruction.

signature-mode  A 2 bit value indicating the signature mode, as follows:
- 0 : signature-mode=0 in IPUK instruction
- 1 : signature-mode=1 in IPUK instruction
- 2 : signature-mode=2 in IPUK instruction C1  A 16 byte control vector associated with a PU to be imported.
C2  A 16 byte control vector associated with a PU used to validate a digital signature.

Outputs:

C3  A 16 byte control vector, associated with the imported PU.

Algorithm Description:
1. Set C3:=C1
2. Update HIST-IPUK field:
   a. Set HIST-IPUK in C3:=B'1'(i.e., imported)
3. Update HIST-MDC field:
   a. If import-mode=0 and mdc-mode=0, then set HIST-MDC in C3:=B'01'.
   b. If import-mode=0 and mdc-mode=1, then set HIST-MDC in C3:=EKUMDC FLAG(mdc-index) in state vector.
   c. If import-mode=1, then set HIST-MDC in C3:=HIST-MDC in C2.
4. Update HIST-KREGMODE field, if CV TYPE in C1='PUA' and CV TYPE in C2='PUM':
   a. Set HIST-KREGMODE in C3:=KREGMODE in C2. Note: The HIST-KREGMODE field may contain valid history information when HIST-CHAIN≠B'11'. Notwithstanding this, the HIST-KREGMODE field is considered valid only when HIST-IPUK=B'1' and HIST-CHAIN=B'11'.

Note:Since for import-mode=0 CV TYPE in C1 always equals CV TYPE in C2, step 4 is executed only when import-mode=1.

5. Update HIST-DOMAIN ID field, if CV TYPE in C1='PUA' and (CV TYPE in C2='PUC' or CV TYPE in C2='PUM):
   a. Set HIST-DOMAIN ID in C3:=DOMAIN ID in C2. Note:The HIST-DOMAIN ID field may contain valid history information when HIST-CHAIN≠B'10' or B'11'. Notwithstanding this, the HIST-DOMAIN ID field is considered valid only when HIST-IPUK=B'1' and (either HIST-CHAIN=B'10' or HIST-CHAIN=B'11').

Note:Since for import-mode=0 CV TYPE in C1 always equals CV TYPE in C2, step 5 is executed only when import-mode=1.

6. Update HIST-CHAIN field:
   a. Set HIST-CHAIN in C3:=B'00'
   b. If (import-mode=0) and (signature-mode=0 or signature-mode=1) and (CV TYPE in C1='PUC'),then set HIST-CHAIN in C3:=B'01'.
   c. If (import-mode=1) and (CV TYPE in C1='PUC') and (CV TYPE in C2='PUC') and (HIST-IPUK in C2:=B'1') and (HIST-CHAIN in C2=B'01'.
   d. If (import-mode=1) and (CV TYPE in C1='PUM') and (CV TYPE in C2='PUC') and (HIST-IPUK in C2:=B'1') and (HIST-CHAIN in C2=B'01') and (DOMAIN ID in C1=DOMAIN ID in C2), then set HIST-CHAIN in C2:=B'10'.
   e. If (import-mode=1) and (CV TYPE in C1='PUA') and (CV TYPE in C2='PUC') and (HIST-IPUK in C2:=B'1') and (HIST-CHAIN in C2=B'01'), then set HIST-CHAIN in C3:=B'10'.
   f. If (import-mode=1) and (CV TYPE in C1='PUA') and (HIST-IPUK in C1=B'0') and (CV TYPE in C2='PUM') and (HIST-IPUK in C2:=B'1') and (HIST-CHAIN in C2=B'10') then set HIST-CHAIN in C3:=B'11'. Note:Checking that HIST-IPUK in C1=B'0' ensures that PUA is generated at the same device as the PRM used to generate the digital signature on EKU.

Note:For import-mode=0 and signature-mode=0, HIST-CHAIN is set equal to B'00', which, in terms of the CFAP definition of 'merit', limits all imported PU keys to be 'BRONZE' keys (i.e., no 'GOLD' or 'SILVER' keys can be imported).

Although a specific embodiment of the invention has been disclosed, it will be understood by those having skill in the art that changes can be made to the specific embodiment without departing from the spirit and the scope of the invention.

What is claimed is:

1. In a data processing system, a method for managing a public key cryptographic system, comprising the steps of:

generating a first public key and a first private key as a first pair in said data processing system, for use with a first public key algorithm;

generating a second public key and a second private key as a second pair in said data processing system, for use with a second public key algorithm;

assigning a private control vector for said first private key and said second private key in said data processing system, for defining permitted uses for said first and second private keys;

forming a private key record which includes said first private key and said second private key in said data processing system, and encrypting said private key record under a first master key expression which is a function of said private control vector;

forming a private key token which includes said private control vector and said private key record, and storing said private key token in said data processing system;

receiving a first key use request in said data processing system, requiring said first public key algorithm;

accessing said private key token in said data processing system and checking said private control vector to determine if said private key record contains a key having permitted uses which will satisfy said first request;

decrypting said private key record under said first master key expression in said data processing system and extracting said first private key from said private key record;

selecting said first public key algorithm in said data processing system for said first key use request;

selecting said first public key algorithm in said data processing system using said first private key to perform a cryptographic operation to satisfy said first key use request.

2. The method of claim 1, which further comprises:

said private key record including first parse data to locate said first private key and said second private key in said key record;

said extracting step including using said parse data for extracting said first private key from said private key record.

3. The method of claim 1, which further comprises:

forming a first private key authentication record in said data processing system, by computing a hash value using a hashing function on said private key record and encrypting said first private key authentication record under a second master key expression which is a function of said private control vector;

said private key token including said first private key authentication record.

4. The method of claim 3, which further comprises:

after said decrypting step, computing a second private key authentication record in said data processing system, by computing a second hash value using said hashing function on said decrypted private key record and comparing said second a private key authentication record with said first private key authentication record;

aborting further processing of said first key use request in said data processing system, if said second private key authentication record is not equal to said first private key authentication record.

5. The method of claim 4, which further comprises:

said private key token including first header data to locate said control vector, said private key record and said private key authentication record in said private key token;

said accessing step including using said header data to locate said private key record in said private key token.

6. The method of claim 1, which further comprises:

assigning a public control vector for said first public key and said second public key in said data processing system, for defining permitted uses for said first and second public keys;

forming a public key record which includes said first public key and said second public key in said data processing system, and encrypting said public key record under a third master key expression which is a function of said public control vector;

forming a public key token which includes said public control vector and said public key record, and storing said public key token in said data processing system;

receiving a second key use request in said data processing system, regulating said second public key algorithm;

accessing said public key token in said data processing system and checking said public control vector to determine if said public key record contains a key having permitted uses which will satisfy said second request;

decrypting said public key record under said third master key expression in said data processing system and extracting said first public key from said public key record;

selecting said second public key algorithm in said data processing system for said second key use request;

selecting said second public key algorithm in said data processing system using said first public key to perform a cryptographic operation to satisfy said second key use request.

7. The method of claim 6, which further comprises:

said public key record including second parse data to locate said first public key and said second public key in said key record;

said extracting step for said first public key including using said parse data for extracting said first public key from said public key record.

8. The method of claim 6, which further comprises:

forming a second public key authentication record in said data processing system, by computing a hash value using said hashing function on said public key record and encrypting said second public key authentication record under a fourth master key expression which is a function of said public control vector;

said public key token including said second public key authentication record.

9. The method of claim 8, which further comprises:

after said decrypting step for said public key record, computing a second public key authentication record in said data processing system, by computing a second hash value using said hashing function on said decrypted public key record and comparing said second a public key authentication record with said second public key authentication record;

aborting further processing of said second key use request in said data processing system, if said second public key authentication record is not equal to said second public key authentication record.

10. The method of claim 9, which further comprises:

said public key token including second header data to locate said control vector, said public key record and said public key authentication record in said public key token;

said accessing step for said public key token including using said header data to locate said public key record in said public key token.

11. In a data processing system, a method for managing a public key cryptographic system, comprising the steps of:

generating a public key and a private key as a pair in said data processing system, for use with a public key algorithm;

assigning a private control vector for said private key in said data processing system, for defining permitted uses for said private key;

forming a private key record which includes said private key in said data processing system, and encrypting said private key record under a first master key expression which is a function of said private control vector;

forming a private key token which includes said private control vector and said encrypted private key record and storing said private key token in said data processing system;

receiving a first key use request in said data processing system, requiring execution of said public key algorithm with a private key;

accessing said private key token in said data processing system and checking said private control vector to determine if said private key record contains a key having permitted uses which will satisfy said first request;

decrypting said private key record under said first master key expression in said data processing system and extracting said private key from said private key record;

executing said public key algorithm in said data processing system using said private key to perform a cryptographic operation to satisfy said first key use request.

12. The method of claim 11, which further comprises:

assigning a public control vector for said public key in said data processing system, for defining permitted uses for said public key;

forming a public key record which includes said public key in said data processing system, and encrypting said public key record under a second master key expression which is a function of said public control vector;

forming a public key token which includes said public control vector and said public key record and storing said public key token in said data processing system;

receiving a second key use request in said data processing system, requiring execution of said public key algorithm with a public key;

accessing said public key token in said data processing system and checking said public control vector to determine if said public key record contains a key having permitted uses which will satisfy said second request;

decrypting said public key record under said second master key expression in said data processing system and extracting said public key from said public key record;

executing said public key algorithm in said data processing system using said public key to perform a cryptographic operation to satisfy said second key use request.

13. The method of claim 12, which further comprises:

forming a first private key authentication record in said data processing system, by computing a hash value using a hashing function on said private key record;

said private key token including said first private key authentication record.

14. The method of claim 13, which further comprises:

after said decrypting step for said private key record, computing a second private key authentication record in said data processing system, by computing a second hash value using said hashing function on said decrypted private key record and comparing said second a private key authentication record with said first private key authentication record;

aborting further processing of said first key use request in said data processing system, if said second private key authentication record is not equal to said first private key authentication record.

15. The method of claim 14, which further comprises:

forming a second public key authentication record in said data processing system, by computing a hash value using said hashing function on said public key record;

said public key token including said second public key authentication record.

16. The method of claim 15, which further comprises:

after said decrypting step for said public key record, computing a second public key authentication record in said data processing system, by computing a second hash value using said hashing function on said decrypted public key record and comparing said second a public key authentication record with said second public key authentication record;

aborting further processing of said second key use request in said data processing system, if said second public key authentication record is not equal to said second public key authentication record.

17. In a data processing system, a method for managing a public key cryptographic system, comprising the steps of:

generating a public key and a private key in said cryptographic system;

assigning a public key control vector to said public key in accordance with intended uses for said public key;

assigning a private key control vector to said private key in accordance with intended uses for said private key;

storing said public key in a public key record and storing said private key in a private key record;

encrypting said public key record under a master key and encrypting said private key under said master key;

forming a modification detection code on a concatenated expression of said public key control vector and said public key record as a public key authentication record;

forming a modification detection code on a concatenated expression of said private key control vector and said private key record to produce a private key authentication record;

encrypting said public key authentication record under said master key and encrypting said private key authentication record under said master key;

forming a public key token which includes said public key control vector in a first field, said encrypted public key record in a second field, and said encrypted public key authentication record in a third field;

forming a private key token including said private key control vector in a first field, said encrypted private key record in a second field, and said encrypted private key authentication record in a third field.

18. The method of claim 17 wherein said master key is a secret key belonging to a symmetric key algorithm.

19. The method of claim 18 wherein said secret key is a data encryption algorithm key.

20. In a data processing system, a computer program for managing a public key cryptographic system, which when executed on said data processing system, performs a method comprising the steps of:

generating a first public key and a first private key as a first pair in said data processing system, for use with a first public key algorithm;

generating a second public key and a second private key as a second pair in said data processing system, for use with a second public key algorithm;

assigning a private control vector for said first private key and said second private key in said data processing system, for defining permitted uses for said first and second private keys;

forming a private key record which includes said first private key and said second private key in said data processing system, and encrypting said private key record under a first master key expression which is a function of said private control vector;

forming a private key token which includes said private control vector and said private key record, and storing said private key token in said data processing system;

receiving a first key use request in said data processing system, regulating said first public key algorithm;

accessing said private key token in said data processing system and checking said private control vector to determine if said private key record contains a key having permitted uses which will satisfy said first request;

decrypting said private key record under said first master key expression in said data processing system and extracting said first private key from said private key record;

selecting said first public key algorithm in said data processing system for said first key use request;

selecting said first public key algorithm in said data processing system using said first private key to perform a cryptographic operation to satisfy said first key use request.

21. The method of claim 20, which further comprises:
said private key record including first parse data to locate said first private key and said second private key in said key record;
said extracting step including using said parse data for extracting said first private key from said private key record.

22. The method of claim 20, which when executed on said data processing system, performs the further steps, comprising:
forming a first private key authentication record in said data processing system, by computing a hash value using a hashing function on said private key record and encrypting said first private key authentication record under a second master key expression which is a function of said private control vector;
said private key token including said first private key authentication record.

23. The method of claim 22, which when executed on said data processing system, performs the further steps, comprising:
after said decrypting step, computing a second private key authentication record in said data processing system, by computing a second hash value using said hashing function on said decrypted private key record and comparing said second a private key authentication record with said first private key authentication record;
aborting further processing of said first key use request in said data processing system, if said second private key authentication record is not equal to said first private key authentication record.

24. The method of claim 23, which further comprises:
said private key token including first header data to locate said control vector, said private key record and said private key authentication record in said private key token;
said accessing step including using said header data to locate said private key record in said private key token.

25. In a data processing system, a computer program for managing a public key cryptographic system, which when executed on said data processing system, performs a method comprising the steps of:
generating a public key and a private key as a pair in said data processing system, for use with a public key algorithm;
assigning a private control vector for said private key in said data processing system, for defining permitted uses for said private key;
forming a private key record which includes said private key in said data processing system, and encrypting said private key record under a first master key expression which is a function of said private control vector;
forming a private key token which includes said private control vector and said encrypted private key record and storing said private key token in said data processing system;
receiving a first key use request in said data processing system, requiring execution of said public key algorithm with a private key;
accessing said private key token in said data processing system and checking said private control vector to determine if said private key record contains a key having permitted uses which will satisfy said first request;
decrypting said private key record under said first master key expression in said data processing system and extracting said private key from said private key record;
executing said public key algorithm in said data processing system using said private key to perform a cryptographic operation to satisfy said first key use request.

26. The method of claim 25, which when executed on said data processing system, performs the further steps, comprising:
assigning a public control vector for said public key in said data processing system, for defining permitted uses for said public key;
forming a public key record which includes said public key in said data processing system, and encrypting said public key record under a second master key expression which is a function of said public control vector;
forming a public key token which includes said public control vector and said public key record, and storing said public key token in said data processing system;
receiving a second key use request in said data processing system, requiring execution of said public key algorithm with a public key;
accessing said public key token in said data processing system and checking said public control vector to determine if said public key record contains a key having permitted uses which will satisfy said second request;
decrypting said public key record under said second master key expression in said data processing system and extracting said public key from said public key record;

executing said public key algorithm in said data processing system using said public key to perform a cryptographic operation to satisfy said second key use request.

27. The method of claim 26, which when executed on said data processing system, performs the further steps, comprising:
forming a first private key authentication record in said data processing system, by computing a hash value using a hashing function on said private key record;
said private key token including said first private key authentication record.

28. The computer program of claim 27, which when executed on said data processing system, performs the further steps, comprising:
after said decryption step for said private key record, computing a second private key authentication record in said data processing system, by computing a second hash value using said hashing function on said decrypted private key record and comparing said second a private key authentication record with said first private key authentication record;
aborting further processing of said first key use request in said data processing system, if said second private key authentication record is not equal to said first private key authentication record.

29. The computer system of claim 28, which when executed on said data processing system, performs the further steps, comprising:
forming a second public key authentication record in said data processing system, by computing a hash value using a hashing function on said public key record;
said public key token including said second public key authentication record.

30. The computer program of claim 29, which when executed on said data processing system, performs the further steps, comprising:
after said decrypting step for said public key record, computing a second public key authentication record in said data processing system, by computing a second hash value using said hashing function on said decrypted public key record and comparing said second a public key authentication record with said first public key authentication record;
aborting further processing of said second key use request in said data processing system, if said second public key authentication record is not equal to said second public key authentication record.

31. A data processing system for managing a public key cryptographic system, comprising:
first generating means for generating a first public key and a first private key as a first pair in said data processing system, for use with a first public key algorithm;
second generating means for generating a second public key and a second private key as a second pair in said data processing system, for use with a second public key algorithm;
assigning means for assigning a private control vector for said first private key in said second private key in said data processing system, for defining permitted uses for said first and second private keys;

key record forming means coupled to said first and second generating means, for forming a private key record which includes said first private key and said second private key in said data processing system, encrypting means coupled to said key record forming means and said assigning means, for encrypting said private key record under a first master key expression which is a function of said private control vector;
key token forming means coupled to said assigning means and to said key record forming means, for forming a private key token which includes said private control vector and said private key record;
storing means coupled to said key token forming means, for storing said private key token in said data processing system;
receiving means coupled to a user input, for receiving a first key use request in said data processing system, requiring said first public key algorithm;
accessing means coupled to said receiving means and to said storing means, for accessing said private key token in said data processing system and checking said private control vector to determine if said private key record contains a key having permitted uses which will satisfy said first request;
decrypting means coupled to said accessing means, for decrypting said private key record under said first master key expression in said data processing system and extracting said first private key from said private key record;
selecting means coupled to said receiving means, for selecting said first public key algorithm in said data processing system for said first key use request;
executing means coupled to said selecting means and to said decrypting means, for executing said first public key algorithm in said data processing system using said first private key to perform a cryptographic operation to satisfy said first key use request.

32. The system of claim 31, which further comprises:
authentication record forming means coupled to said key record forming means, for forming a first private key authentication recording said data processing system, by computing a hash value using a hashing function on said private key record and encrypting said first private key authentication record under a second master key expression which is a function of said private control vector;
said private key token including said first private key authentication record.

33. The system of claim 32, which further comprises:
computing means coupled to said decryption means, for computing a second private key authentication record in said data processing system, by computing a second hash value using said hashing function on said decrypted private key record and comparing said second a private key authentication record with said first private key authentication record;
terminating means coupled to said computing means, for aborting further processing of said first key use request in said data processing system, if said second private key authentication record is not equal to said first private key authentication record.

* * * * *